US008612397B2

(12) United States Patent
Henderson

(10) Patent No.: US 8,612,397 B2
(45) Date of Patent: Dec. 17, 2013

(54) SYSTEM AND METHOD FOR A COMPUTER BASED FORMS LANGUAGE

(75) Inventor: Charles E. Henderson, Lexington, VA (US)

(73) Assignee: Coral Networks, Inc., Arlington, VA (US)

( * ) Notice: Subject to any disclaimer, the term of this patent is extended or adjusted under 35 U.S.C. 154(b) by 30 days.

(21) Appl. No.: 13/163,634

(22) Filed: Jun. 17, 2011

(65) Prior Publication Data

US 2011/0320411 A1    Dec. 29, 2011

Related U.S. Application Data

(60) Provisional application No. 61/355,864, filed on Jun. 17, 2010.

(51) Int. Cl.
*G06F 17/30*    (2006.01)
(52) U.S. Cl.
USPC .......................................................... 707/687
(58) Field of Classification Search
USPC .......................................................... 707/687
See application file for complete search history.

(56) References Cited

U.S. PATENT DOCUMENTS

| 7,698,346 B2 | 4/2010 | Henderson |
| 2002/0194201 A1 | 12/2002 | Wilbanks et al. |
| 2007/0150480 A1 | 6/2007 | Hwang et al. |
| 2007/0276847 A1* | 11/2007 | Butler et al. .................. 707/100 |
| 2008/0228697 A1 | 9/2008 | Adya et al. |
| 2010/0114841 A1 | 5/2010 | Holenstein et al. |

OTHER PUBLICATIONS

Notification of Transmittal of the International Search Report and the Written Opinion of the International Searching Authority, or the Declaration for Application No. PCT/US2011/40991, mailed Nov. 14, 2011.

* cited by examiner

*Primary Examiner* — Rehana Perveen
*Assistant Examiner* — Alexander Khong
(74) *Attorney, Agent, or Firm* — McGuireWoods LLP; Charles J. Gross

(57) ABSTRACT

A computational platform and related methods that generally combines the object model and the programming model into a single set of constructs (e.g., Forms, relations, entities, relationships). These constructs provide the characteristics of inheritance, linkage, immutability, versioning, and substitution in a single structure that can store the objects, processes, and instructions/programs, and provide for convergence and divergence of information in information streams, a database graph, or a database web distributed across a set of nodes.

18 Claims, 88 Drawing Sheets

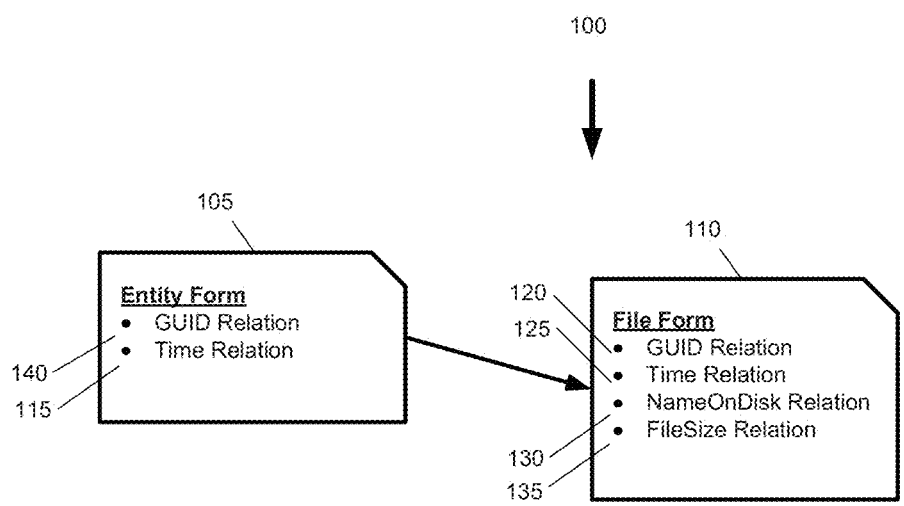
Figure 1. Simplified Example of Form Inheritance and Subclassing

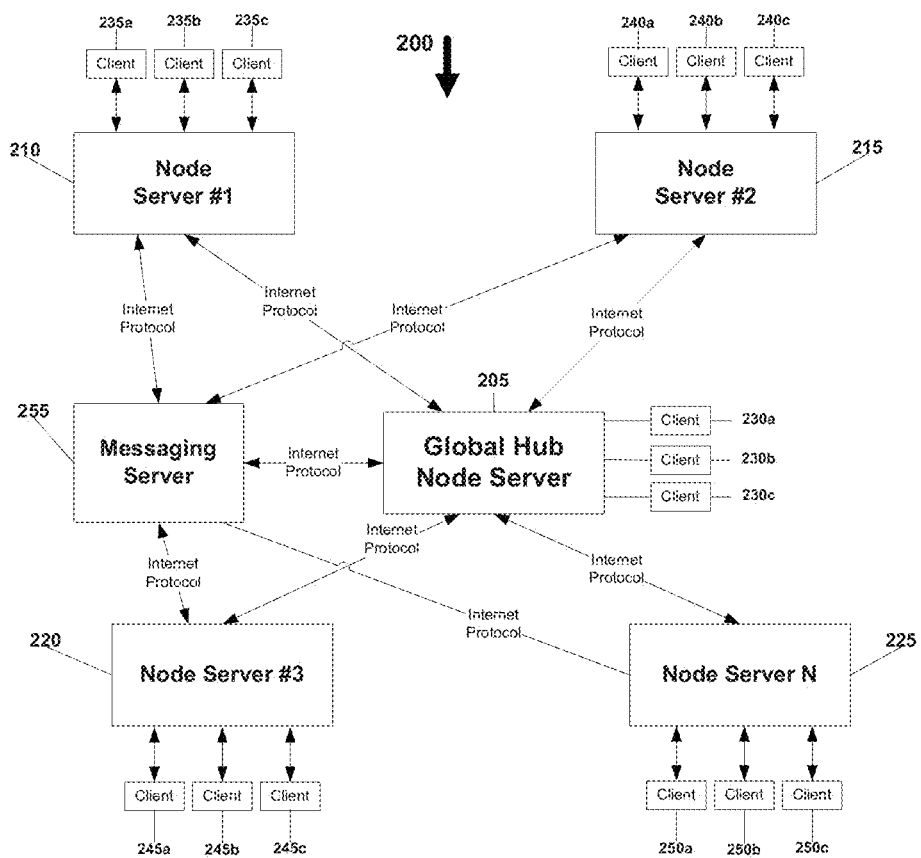
Figure 2. Architecture of an Example System Configured
According to the Principles of the Disclosure

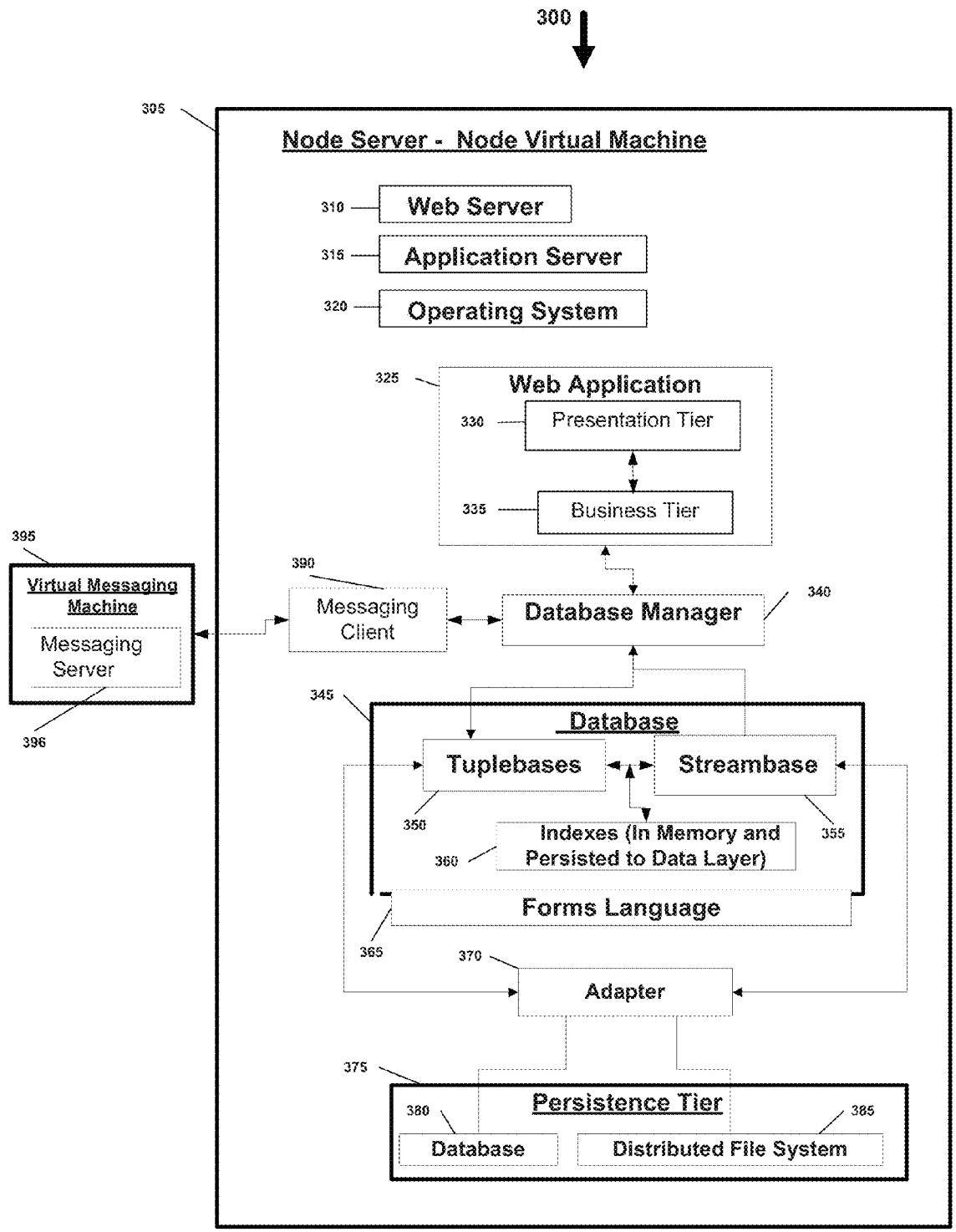
Figure 3. Architecture of an Example Node Server Configured According to the Principles of the Disclosure

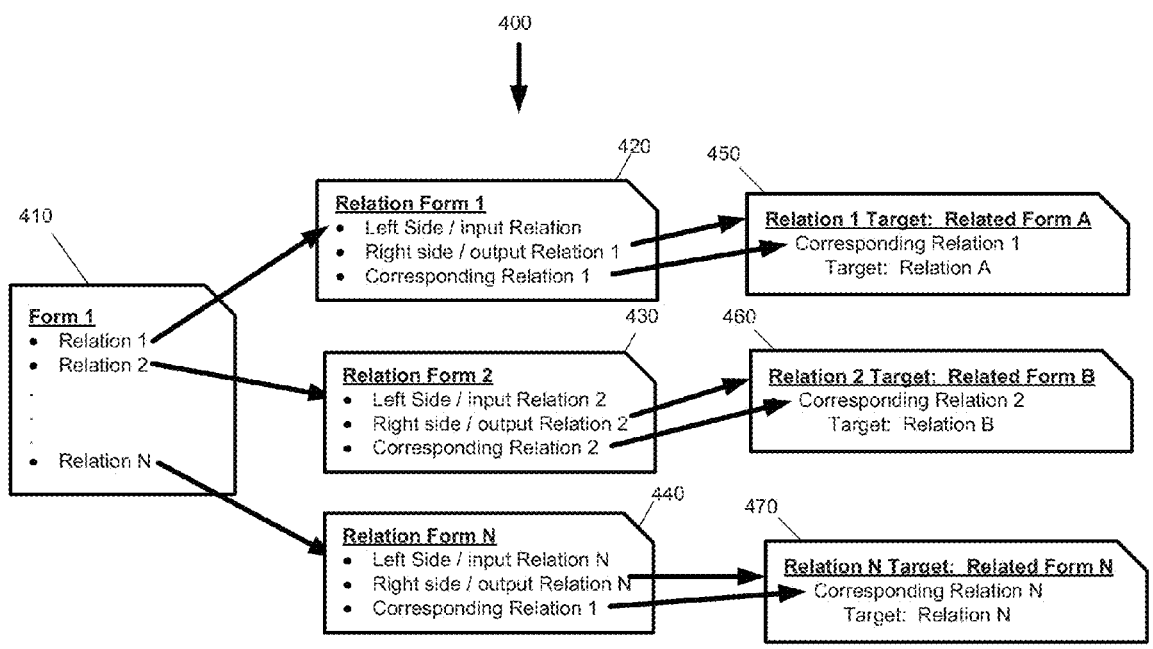
Figure 4. Forms, Relations, and Corresponding Relations

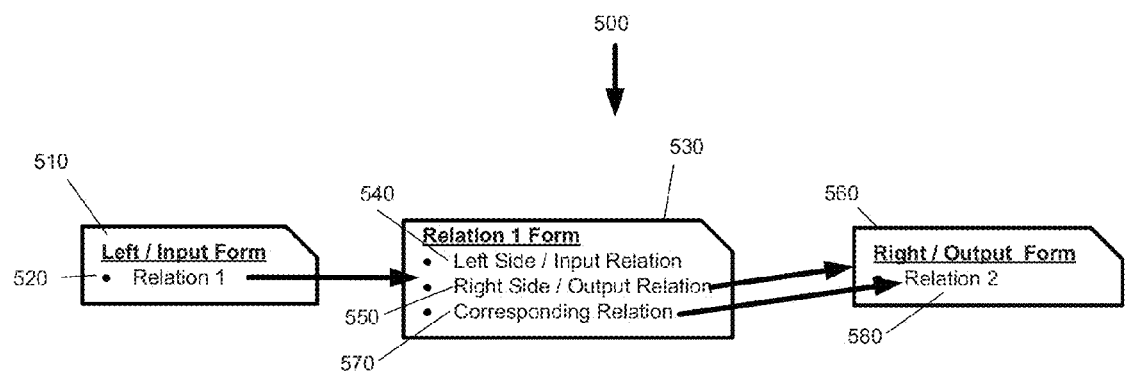
Figure 5. Relation Form

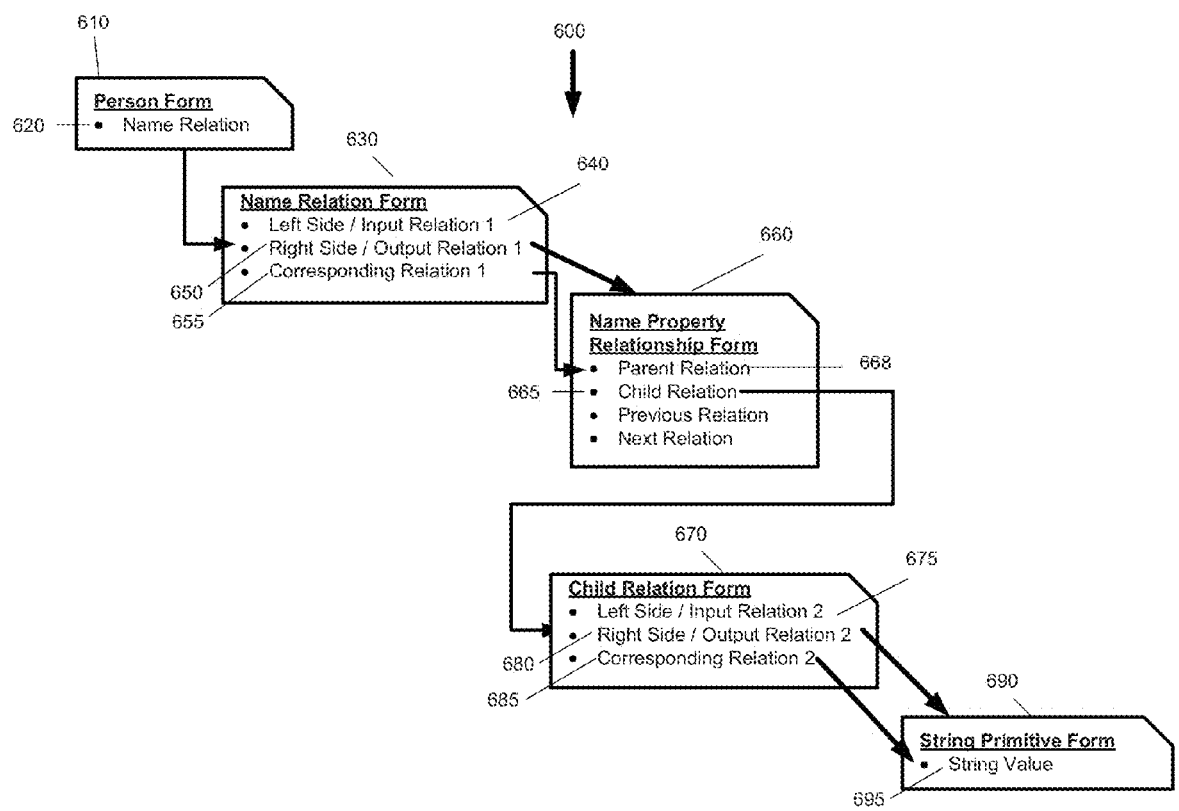
Figure 6. Example Name Relation Form with Left Side Relation and Right Side Relation

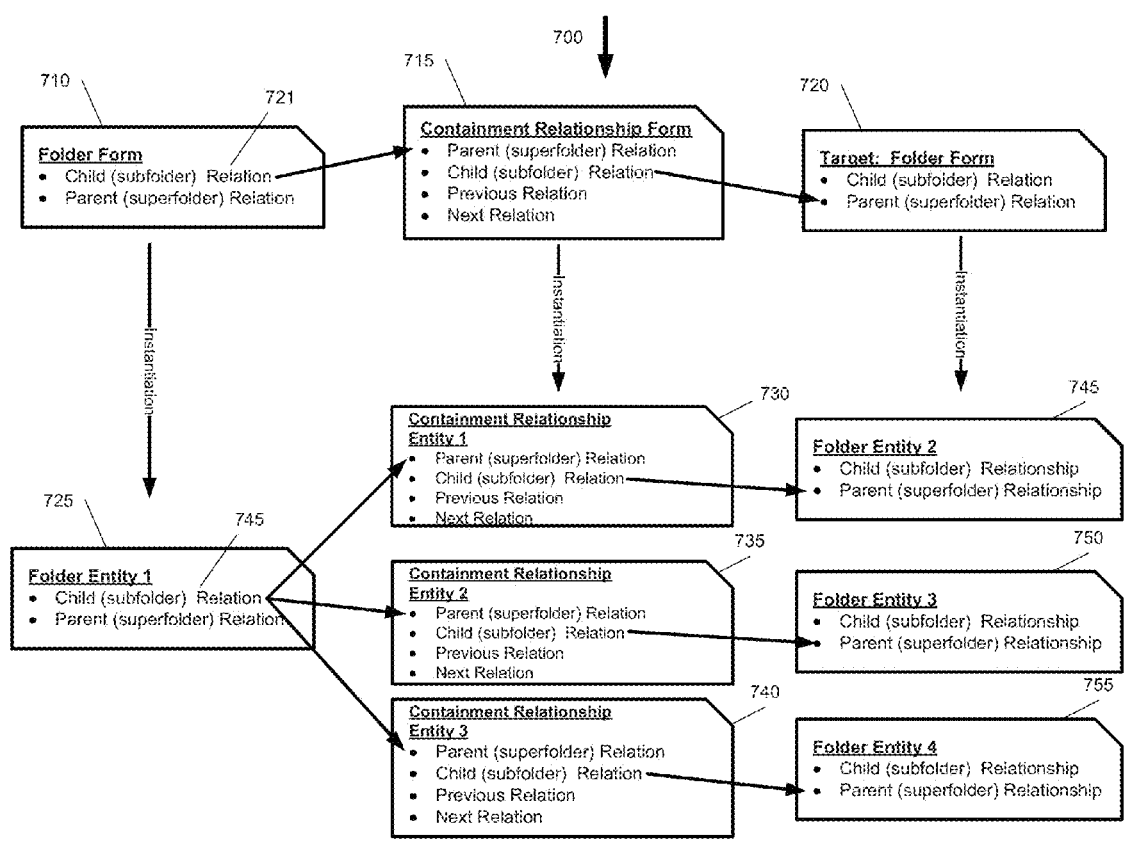
Figure 7. Example Variant Child (Subfolder) Relation

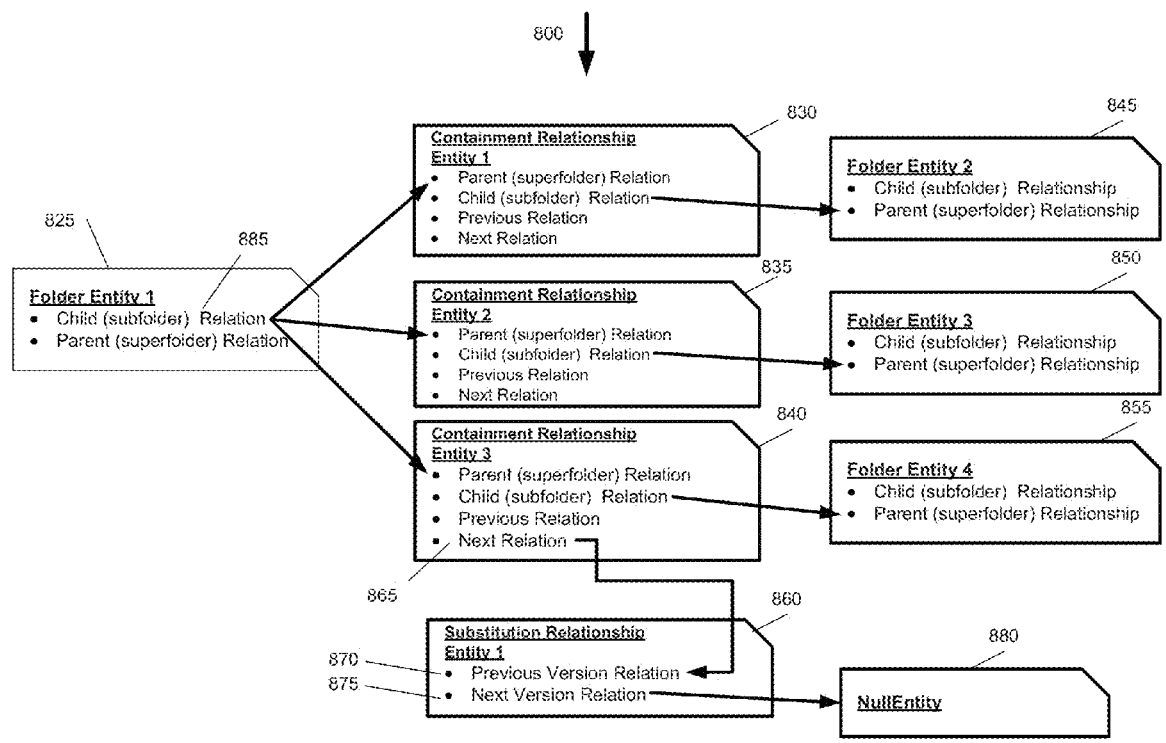
Figure 8. Relationship Entity Signifying Change to a Variant Relation

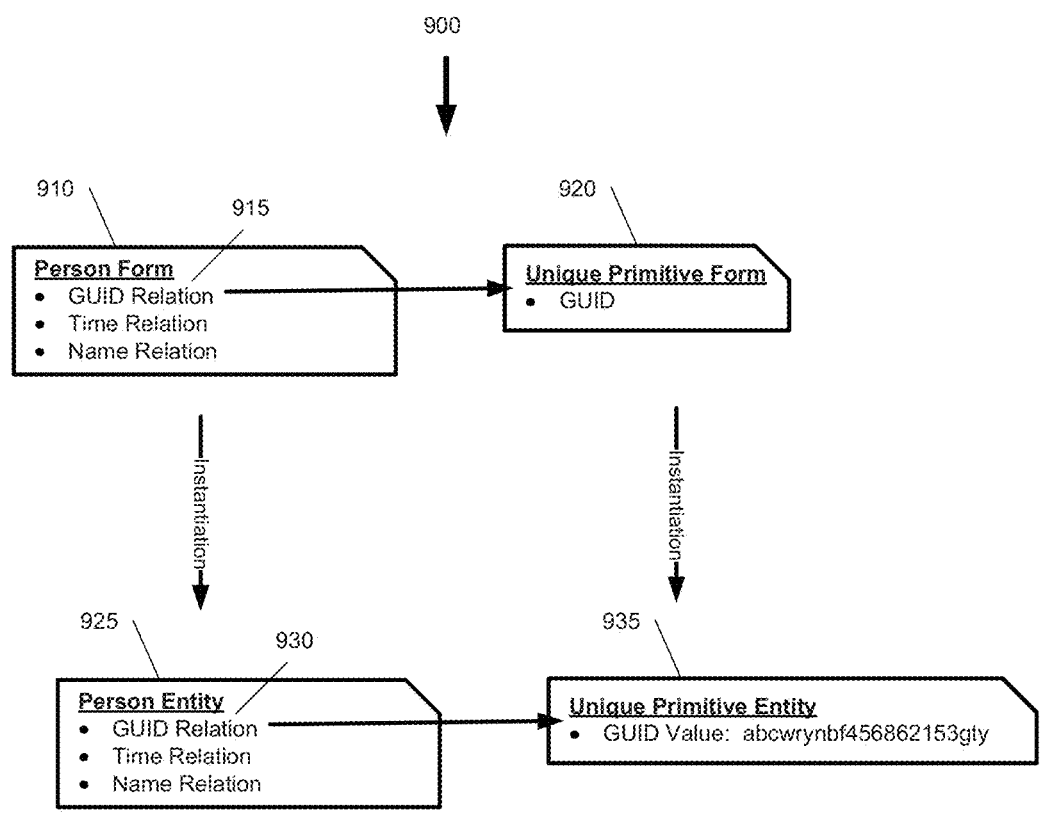
Figure 9. Invariant Relation

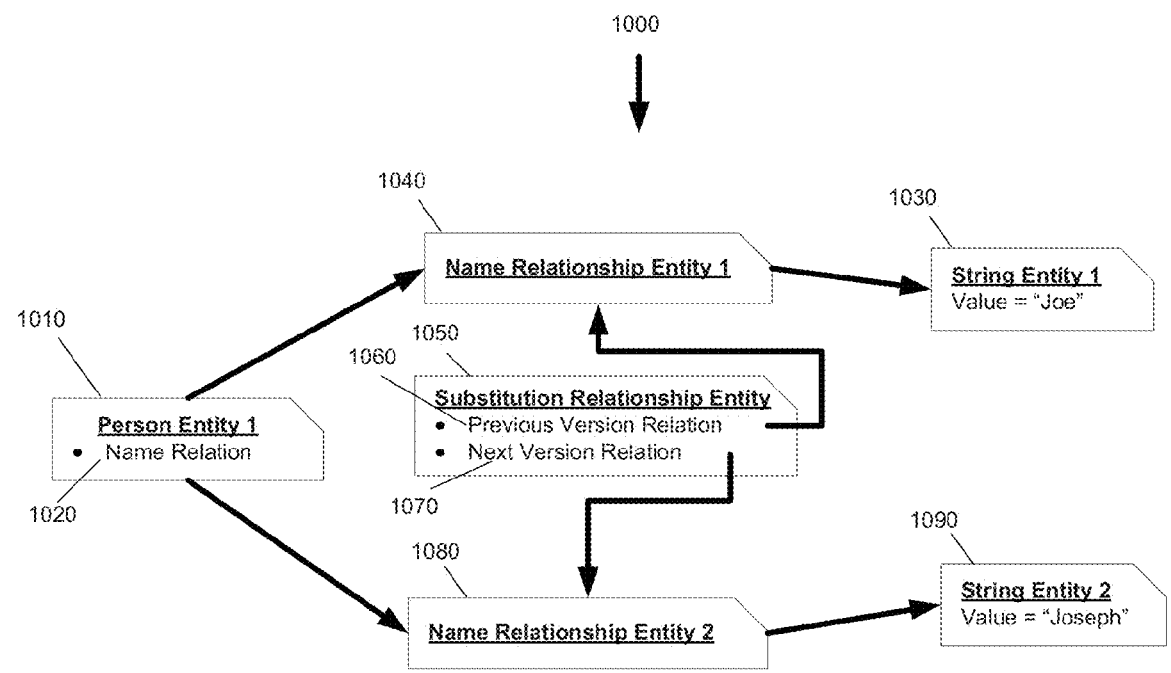
Figure 10. Simplified Example of a Substitution Relationship

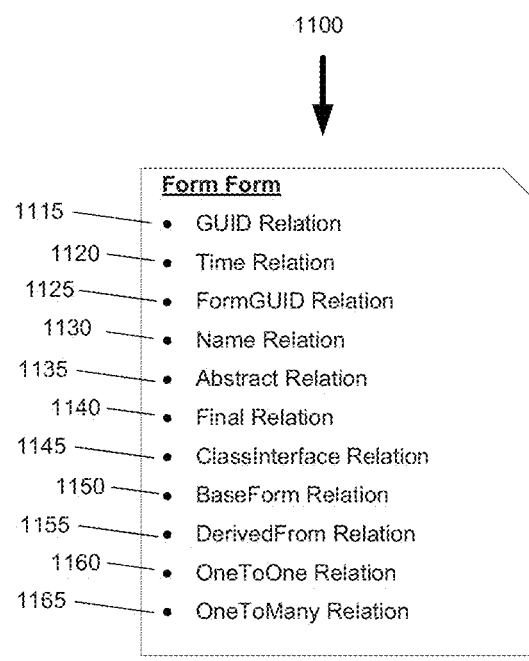
Figure 11. Example Form Form

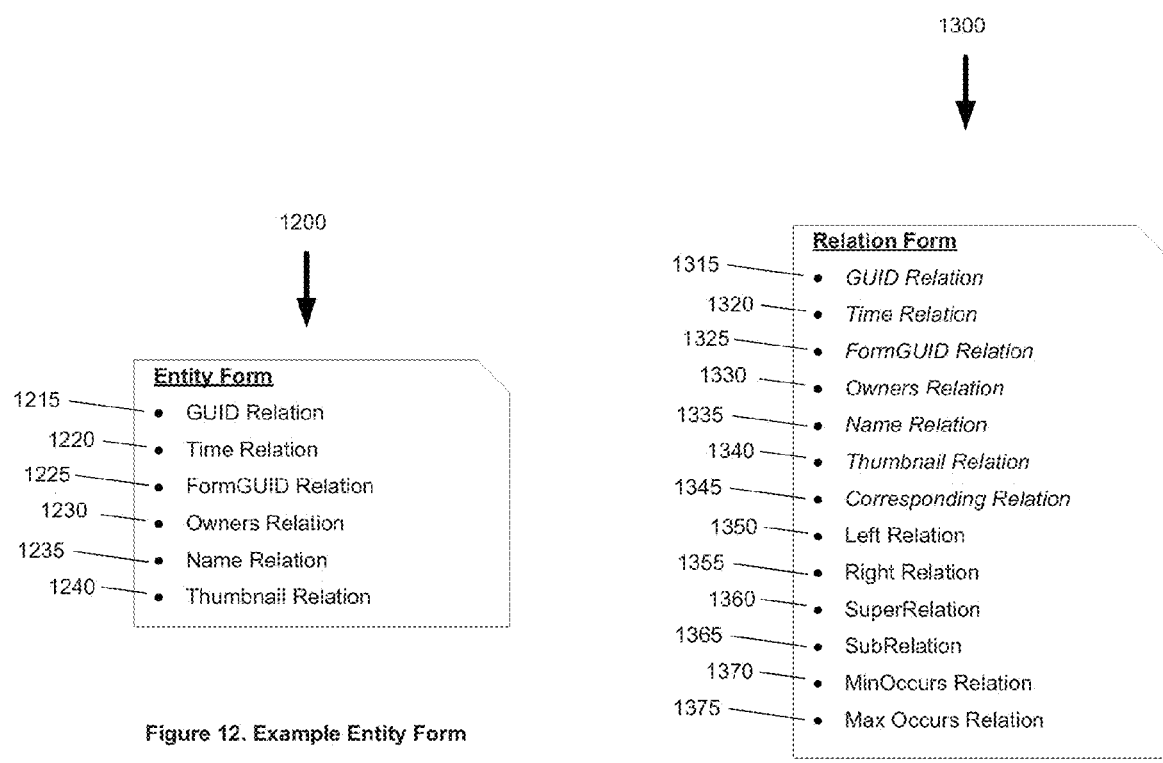
Figure 12. Example Entity Form
Figure 13. Example Relation Form

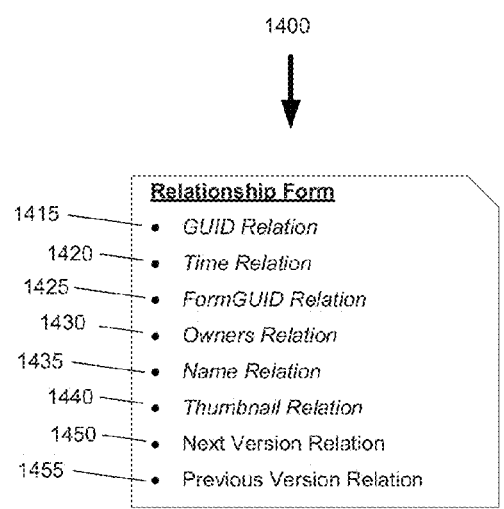
Figure 14. Example Relationship Form
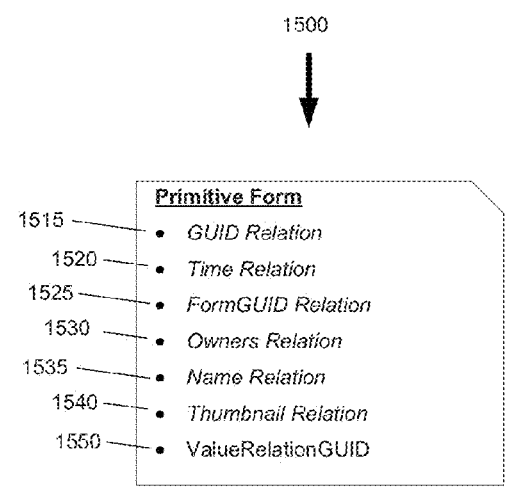
Figure 15. Example Primitive Form

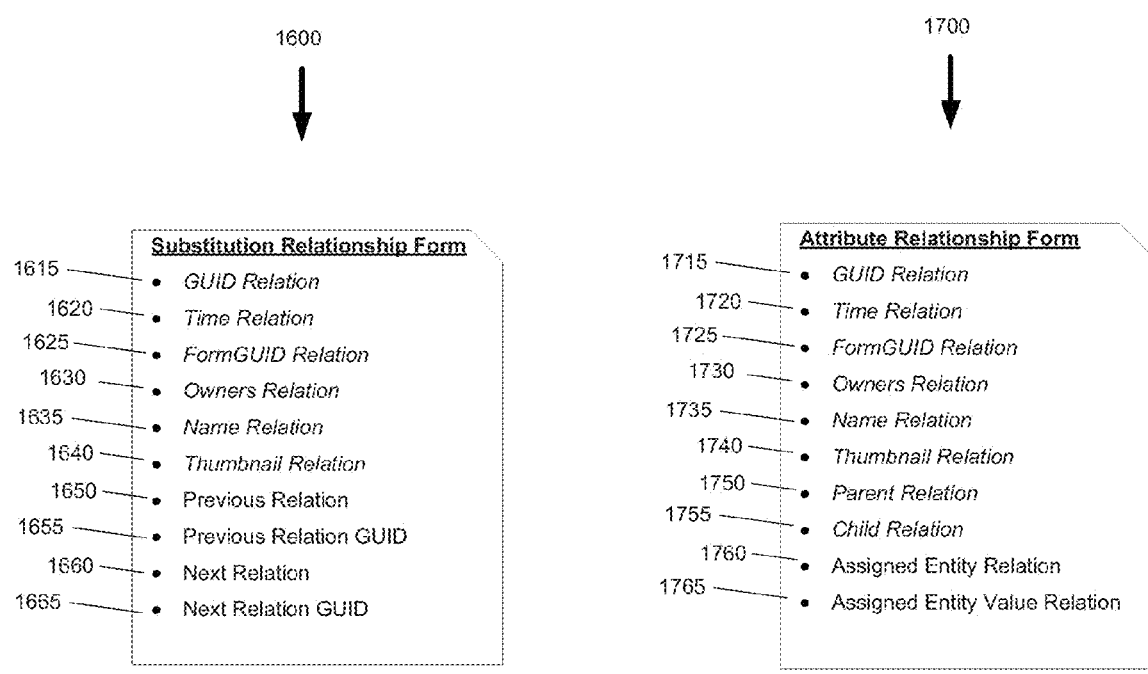
Figure 16. Example Substitution Relationship Form       Figure 17. Example Attribute Relationship Form

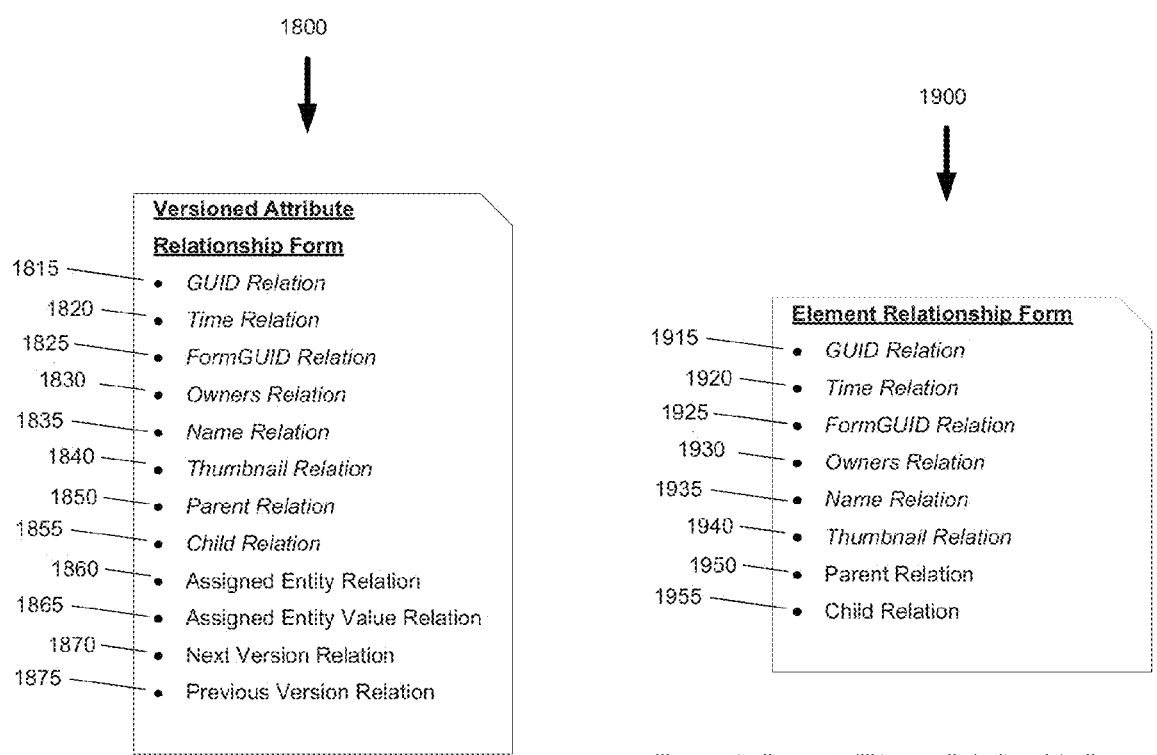
Figure 18. Example Versioned Attribute Relationship Form
Figure 19. Example Element Relationship Form

2000

↓

Property Relationship Form
- 2015 — GUID Relation
- 2020 — Time Relation
- 2025 — FormGUID Relation
- 2030 — Owners Relation
- 2035 — Name Relation
- 2040 — Thumbnail Relation
- 2050 — Parent Relation
- 2055 — Child Relation Figure 20. Example Property Relationship Form

2100

↓

Ownership Relationship Form
- 2115 — GUID Relation
- 2120 — Time Relation
- 2125 — FormGUID Relation
- 2130 — Owners Relation
- 2135 — Name Relation
- 2140 — Thumbnail Relation
- 2150 — Owner Relation
- 2155 — Owned Relation Figure 21. Example Ownership Relationship Form

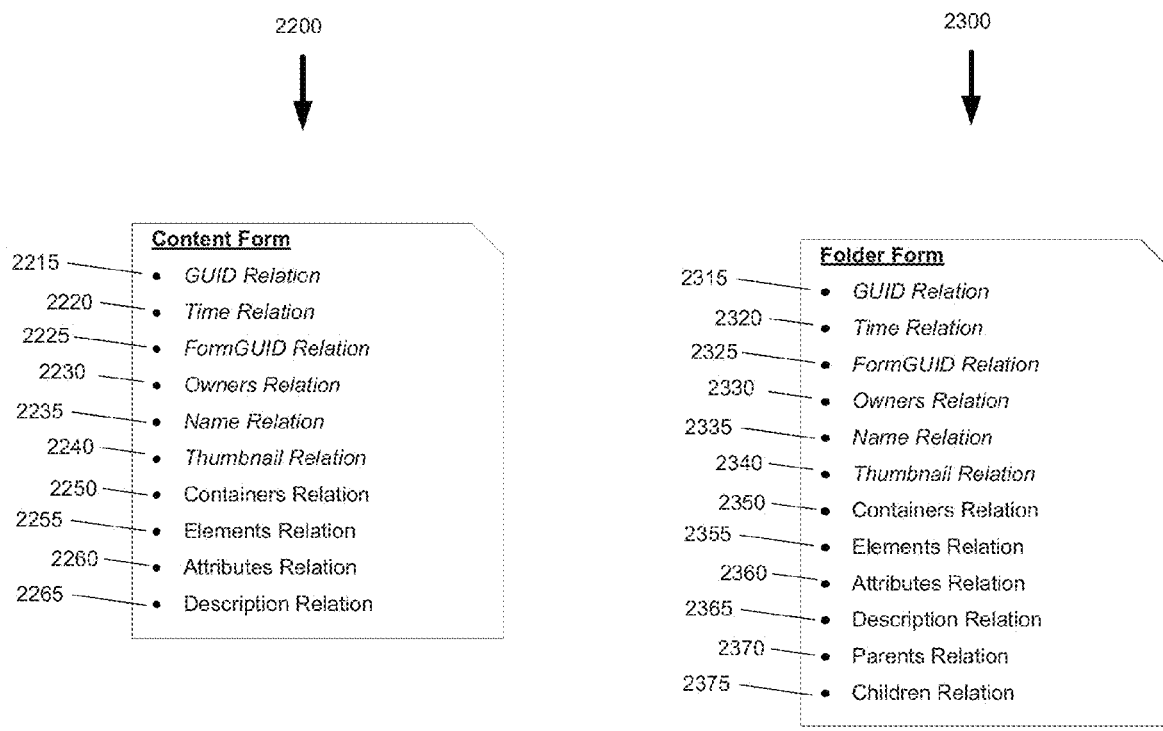
Figure 22. Example Content Form
Figure 23. Example Folder Form

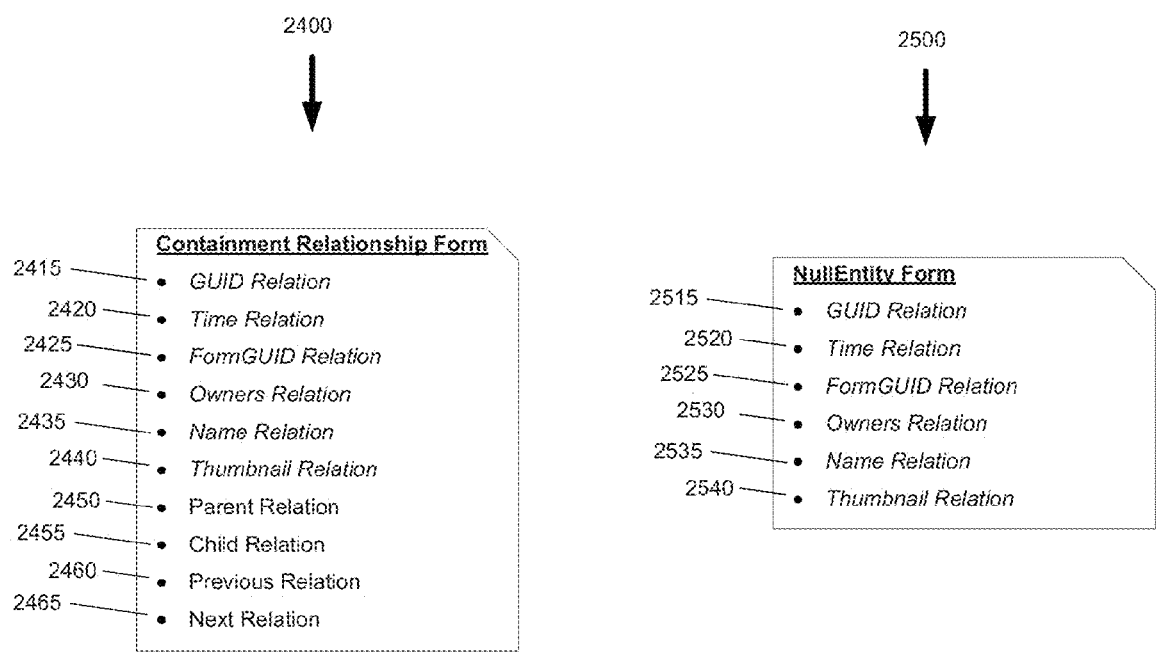
Figure 24. Example Containment Relationship Form
Figure 25. Example NullEntity Form

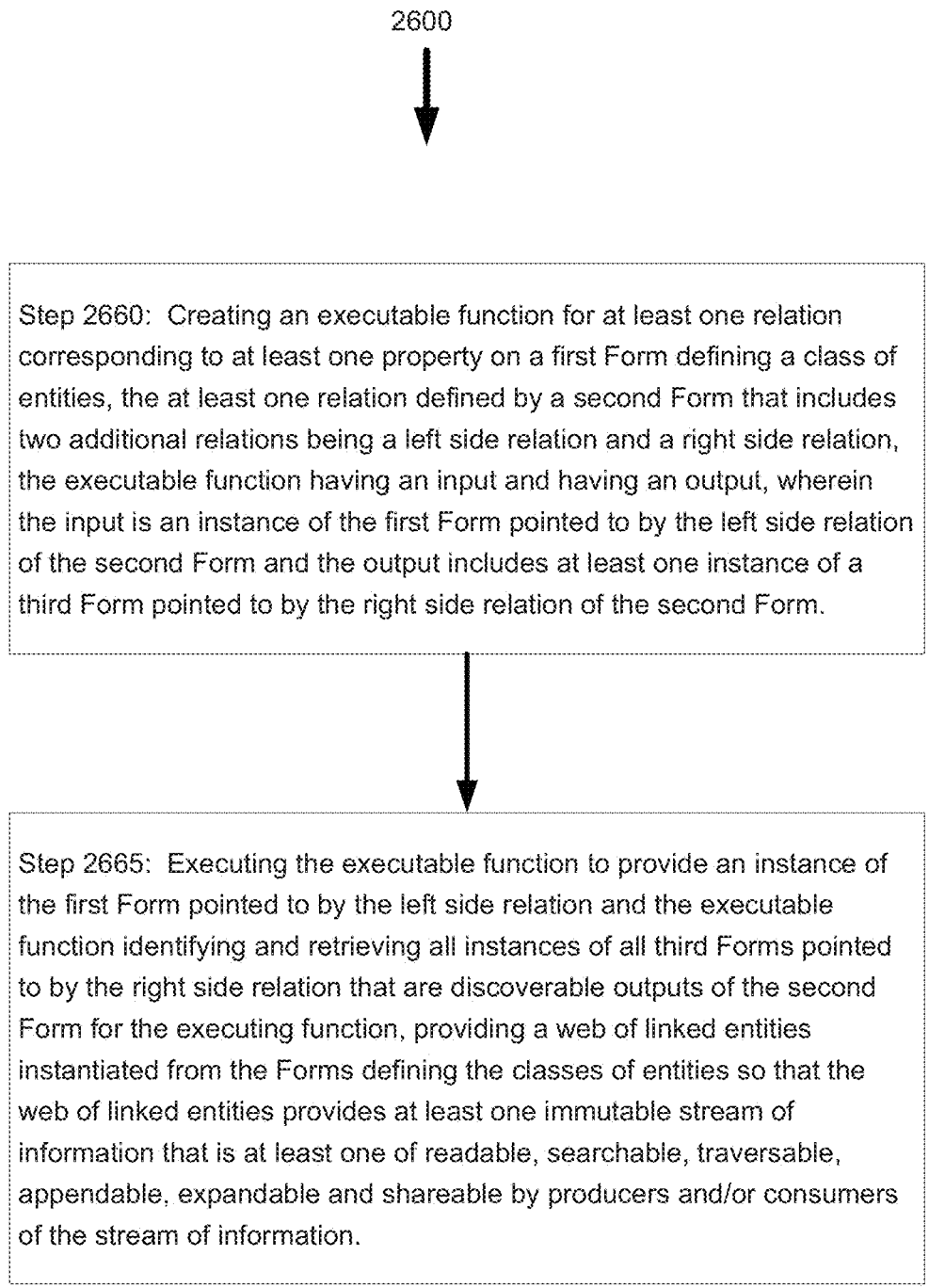
Figure 26. Flow Diagram for the Process of Creating and Executing Functions For Relations

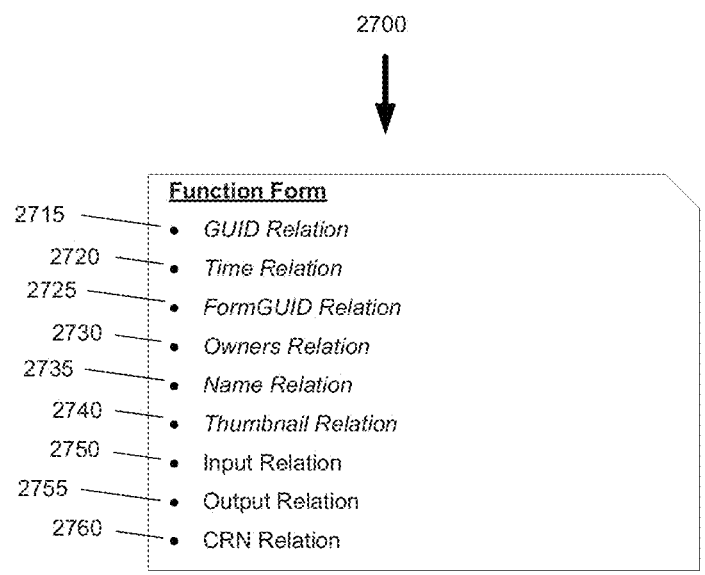
Figure 27. Example Function Form

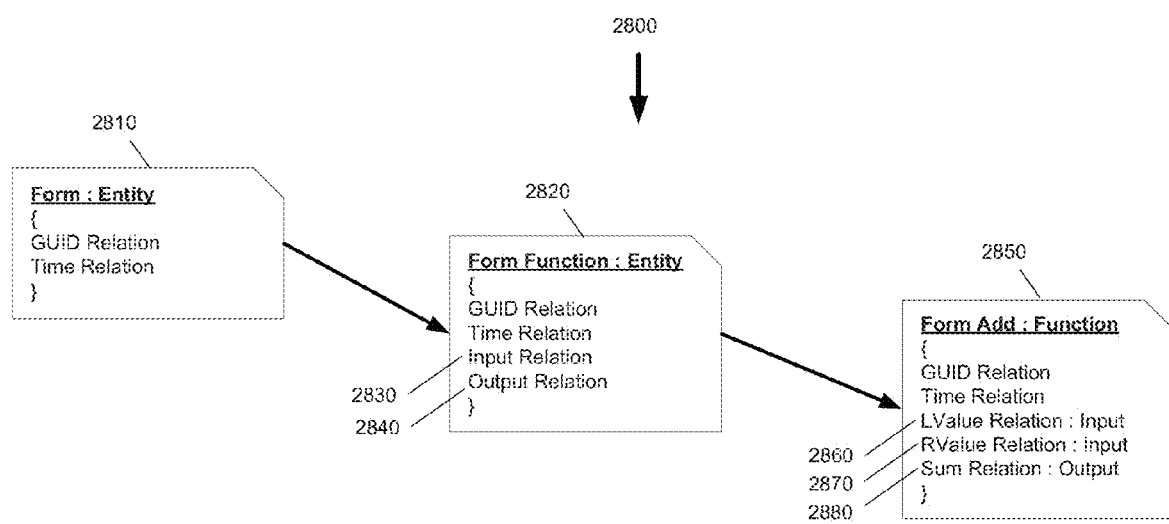
Figure 28. Pseudocode and Inheritance for Add Function

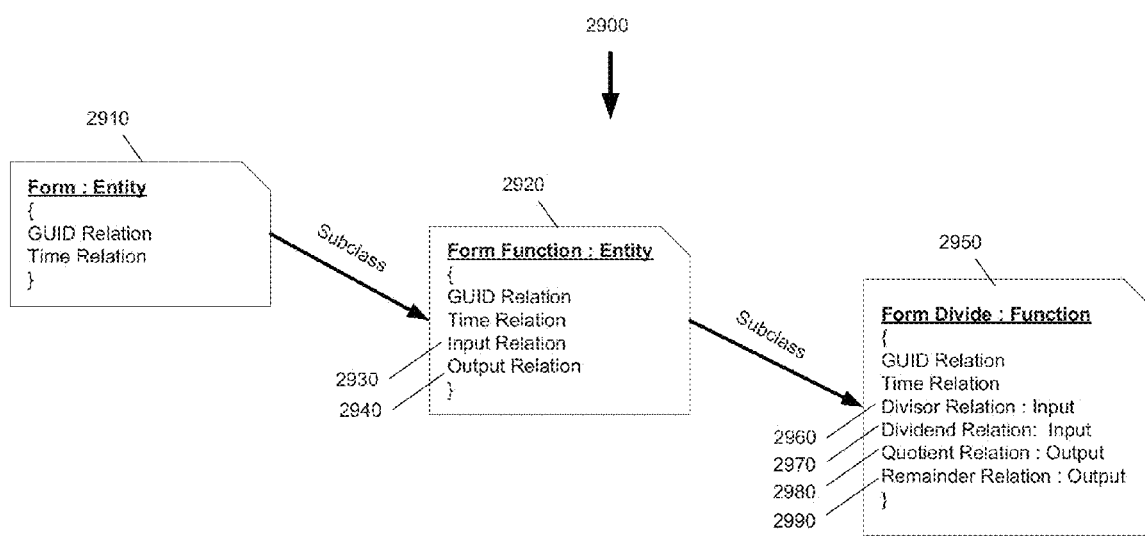
Figure 29. Pseudocode and Inheritance for Divide Function

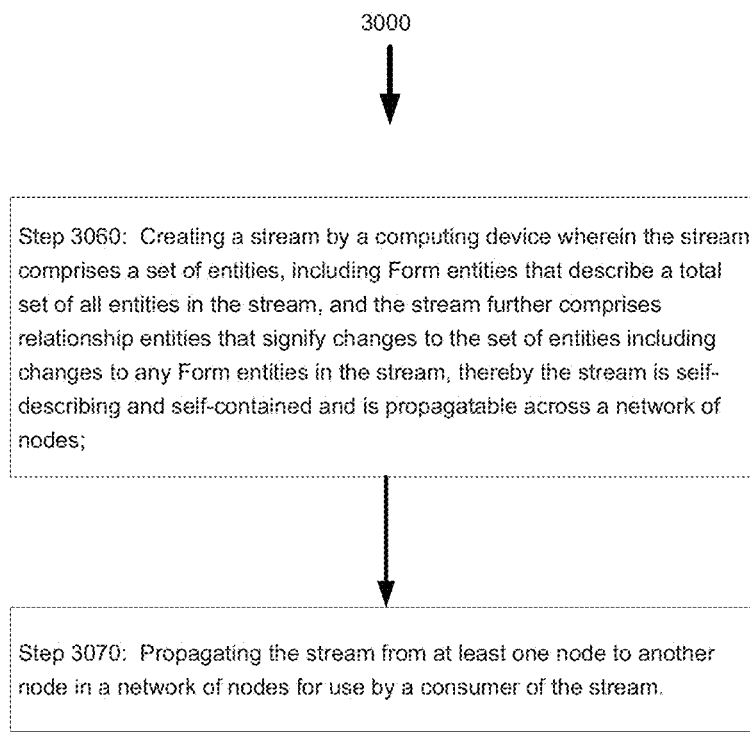
Figure 30. Process Flow for Creating and Propagating Streams in a Network of Nodes

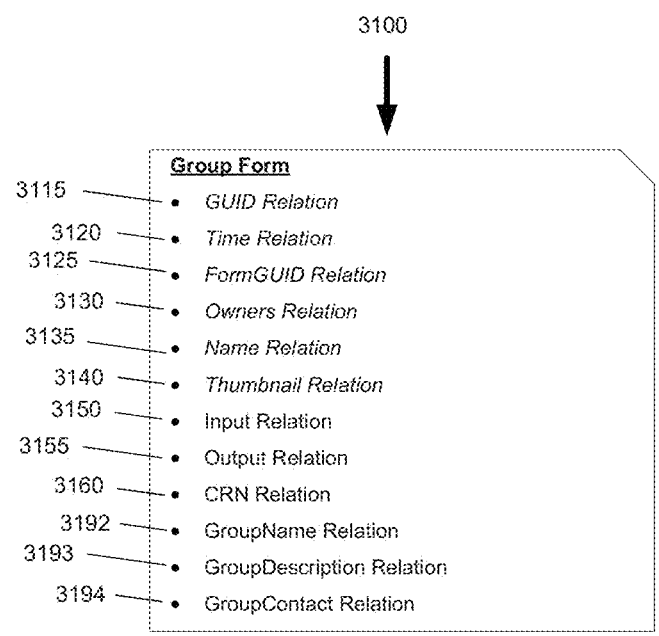
Figure 31. Example Group Form

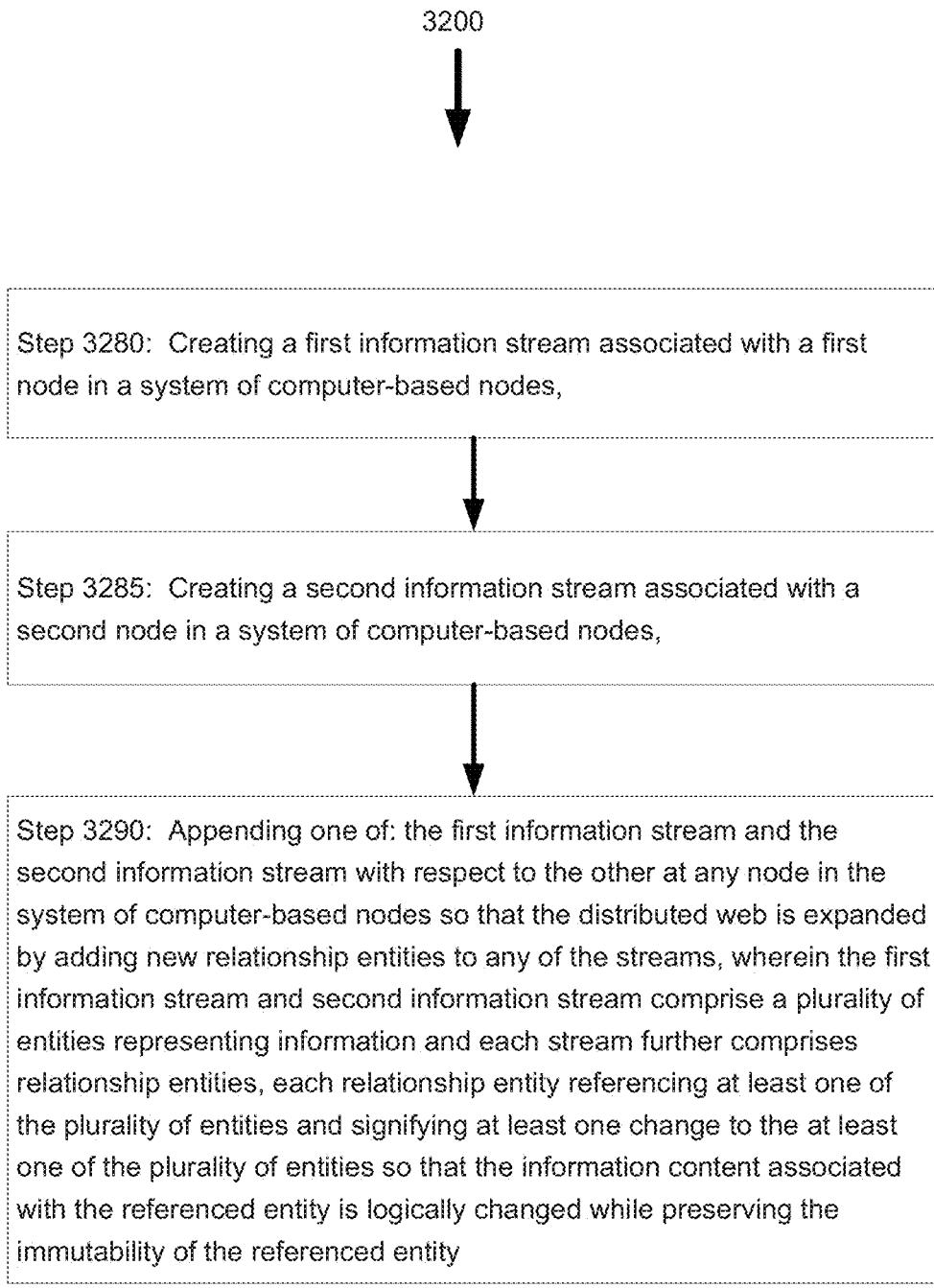
Figure 32. Process Flow for Expanding the Distributed Web by Appending Information Streams

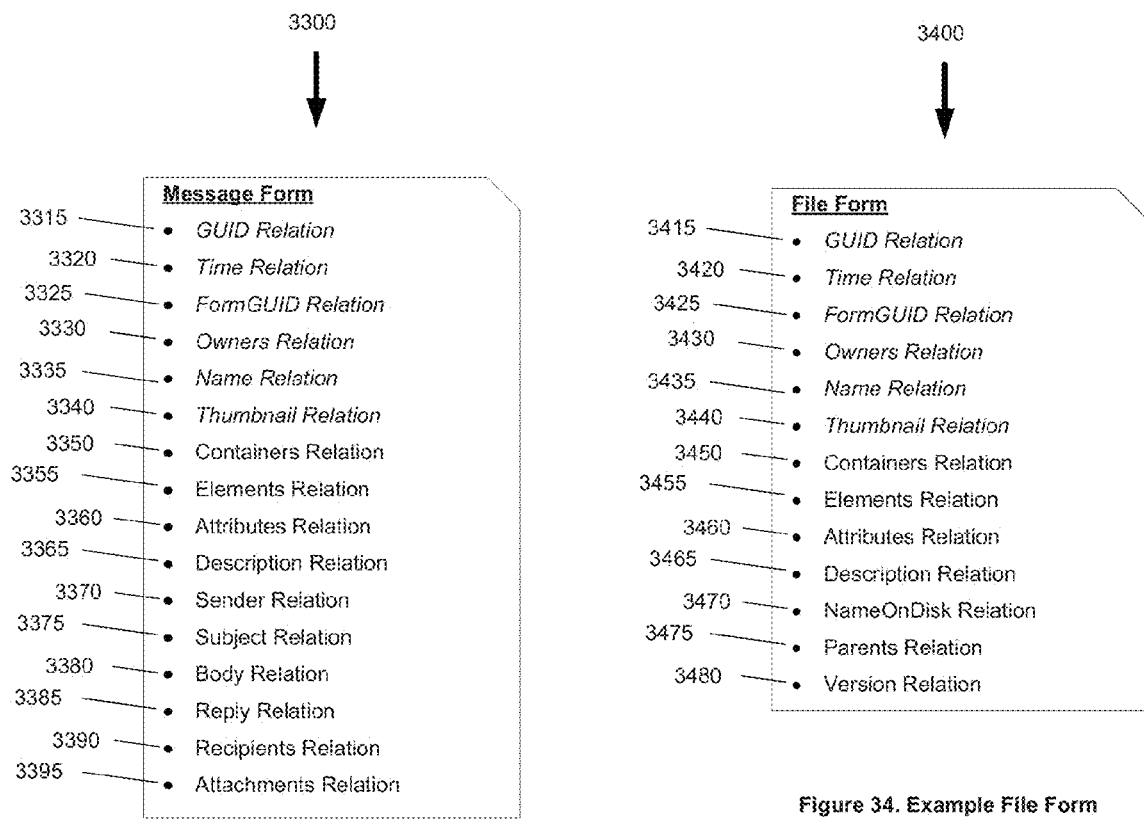
Figure 33. Example Message Form
Figure 34. Example File Form

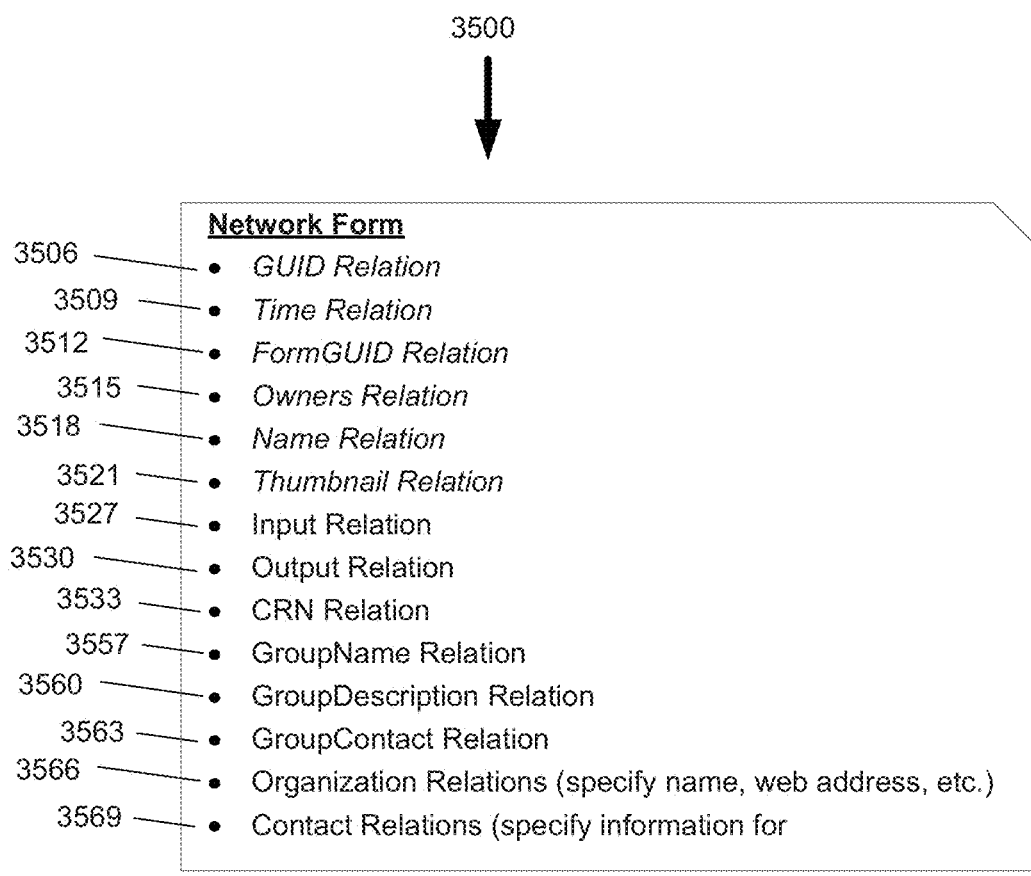
Figure 35. Example Network Form

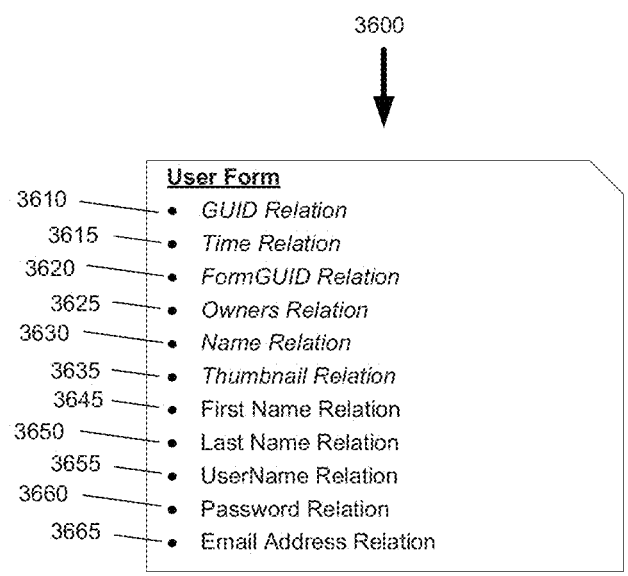
Figure 36. Example User Form

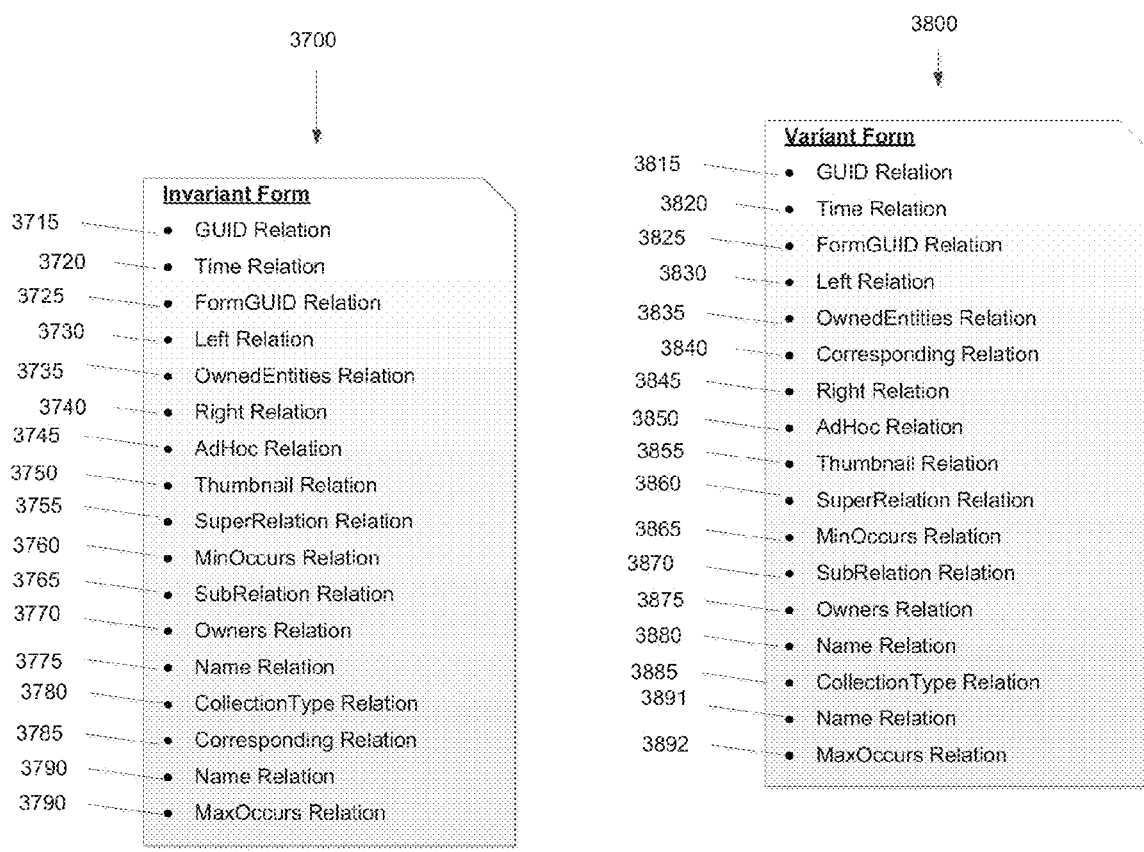
Figure 37. Example Invariant Form
Figure 38. Example Variant Form

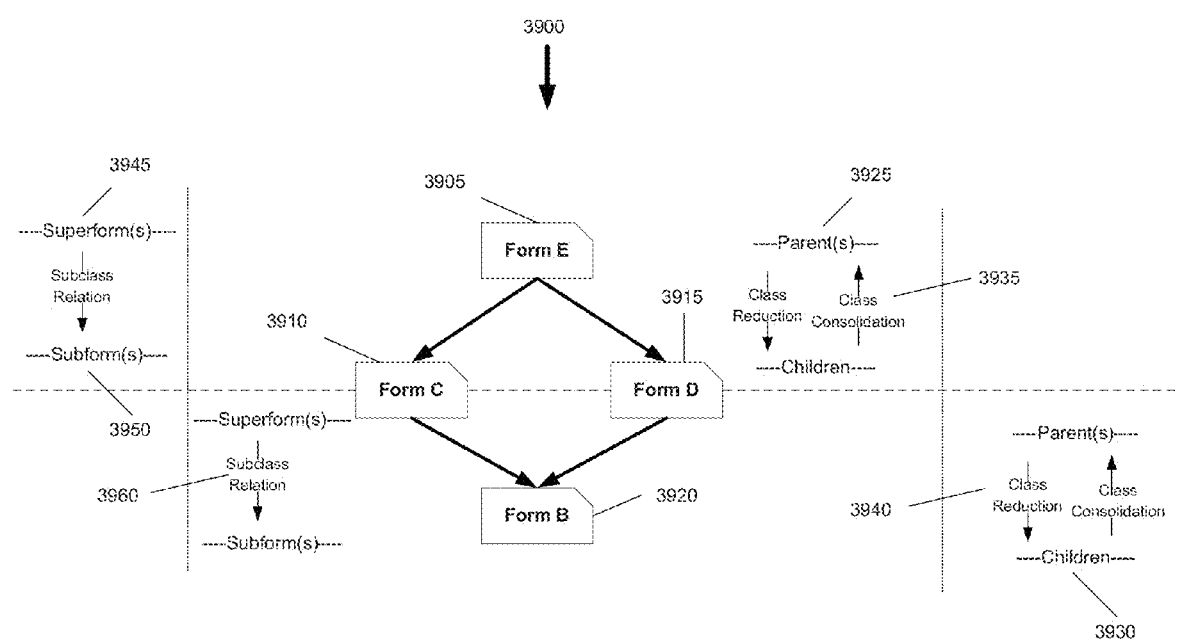
Figure 39. Subclassing Forms and Relations

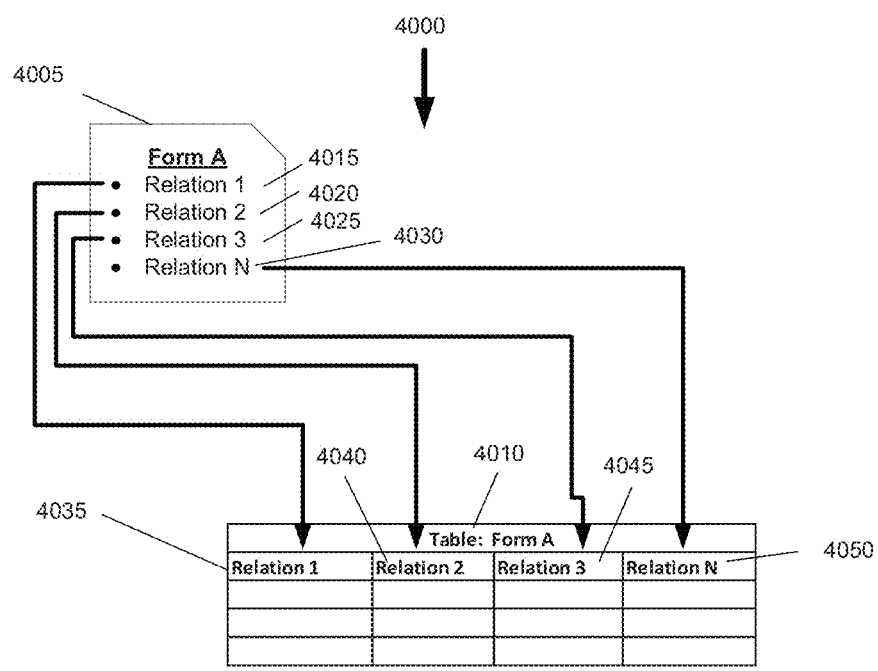
Figure 40. Mapping a Form with Invariant Relations to a Database

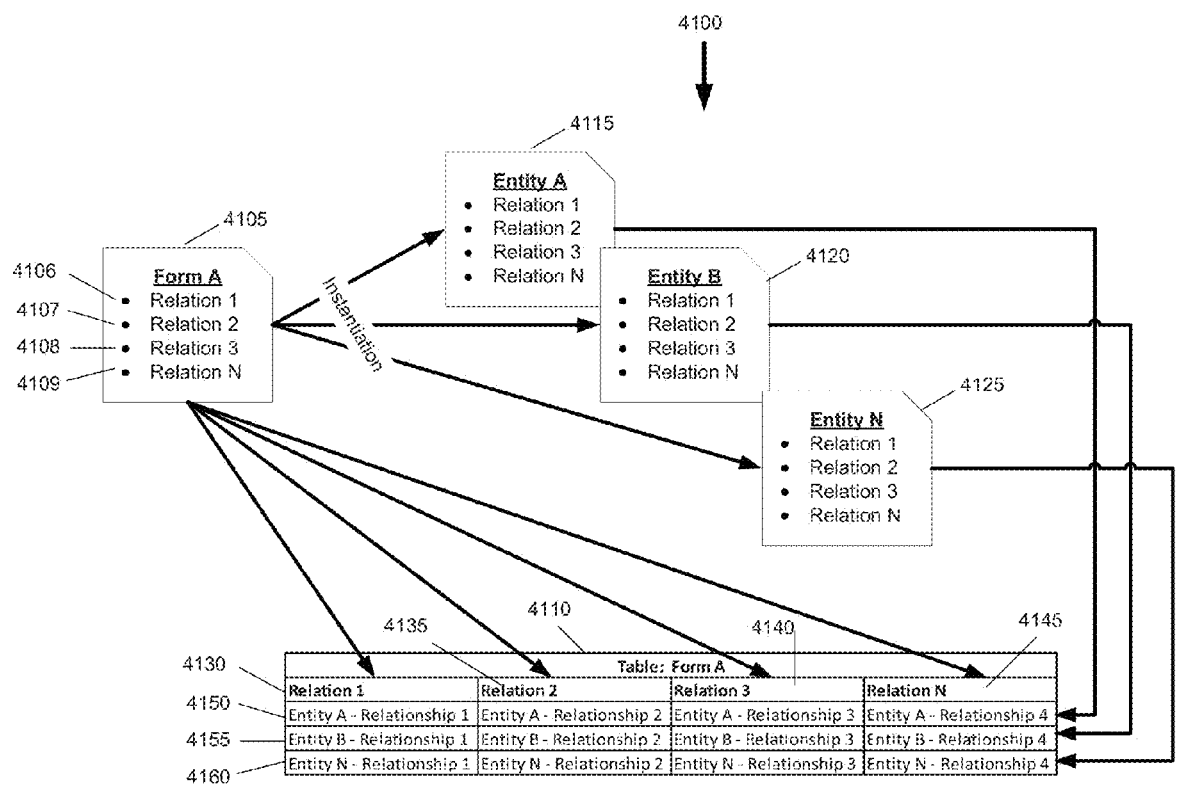
Figure 41. Mapping Invariant Relations of an Entity to a Database Table

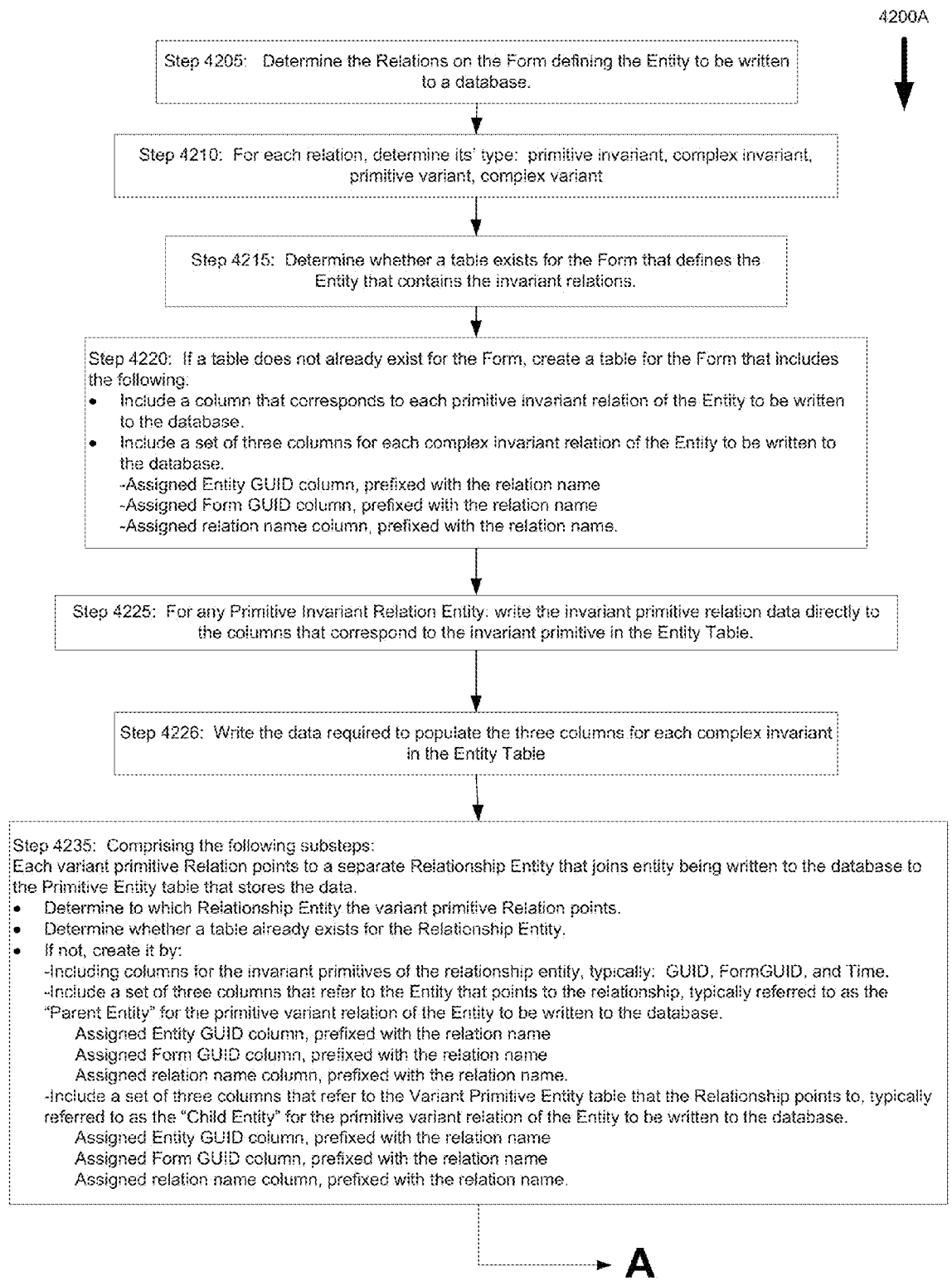
Figure 42A. Process Flow for Writing Entities to a Database

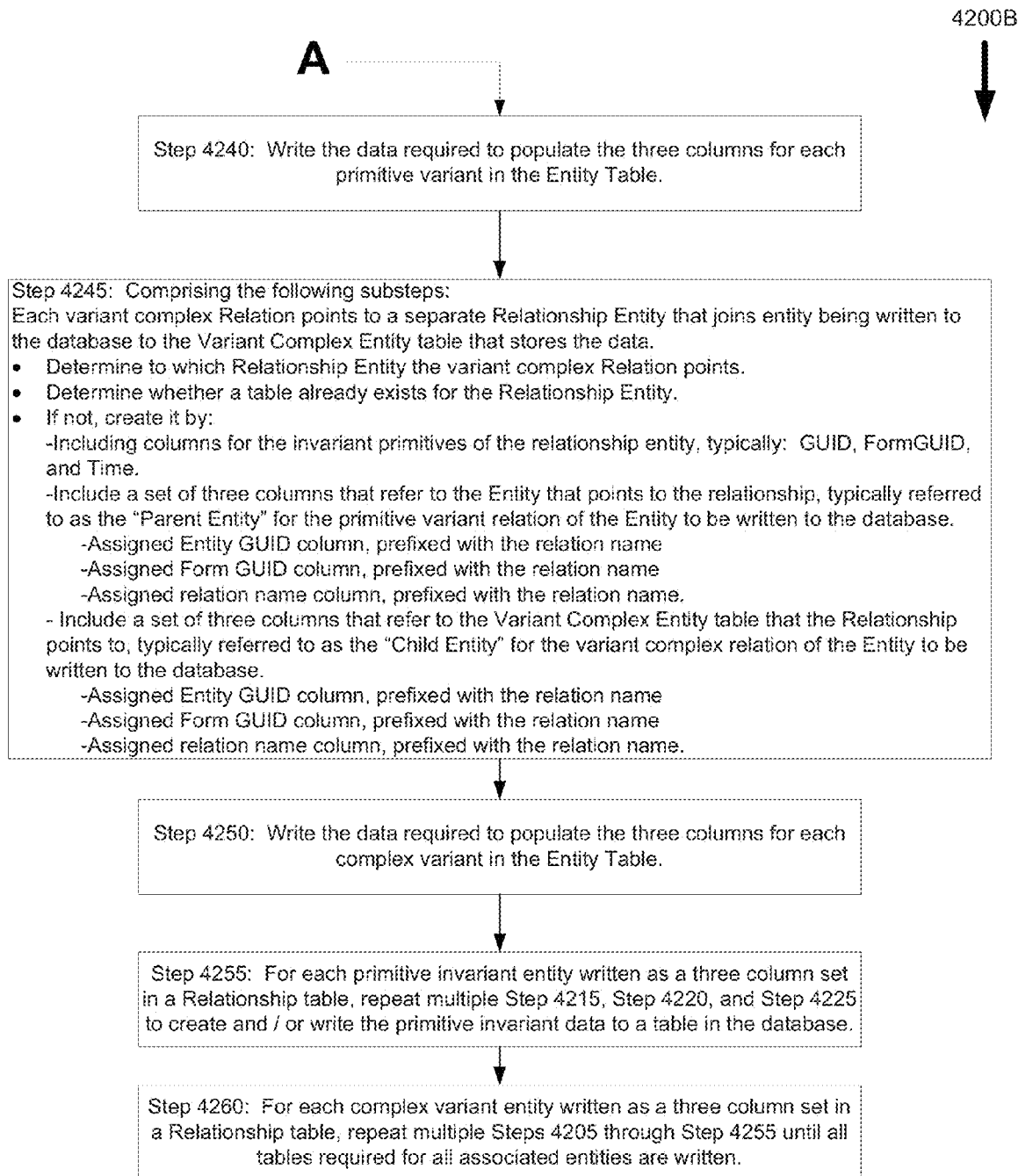
Figure 42B. Process Flow for Writing Entities to a Database - continued

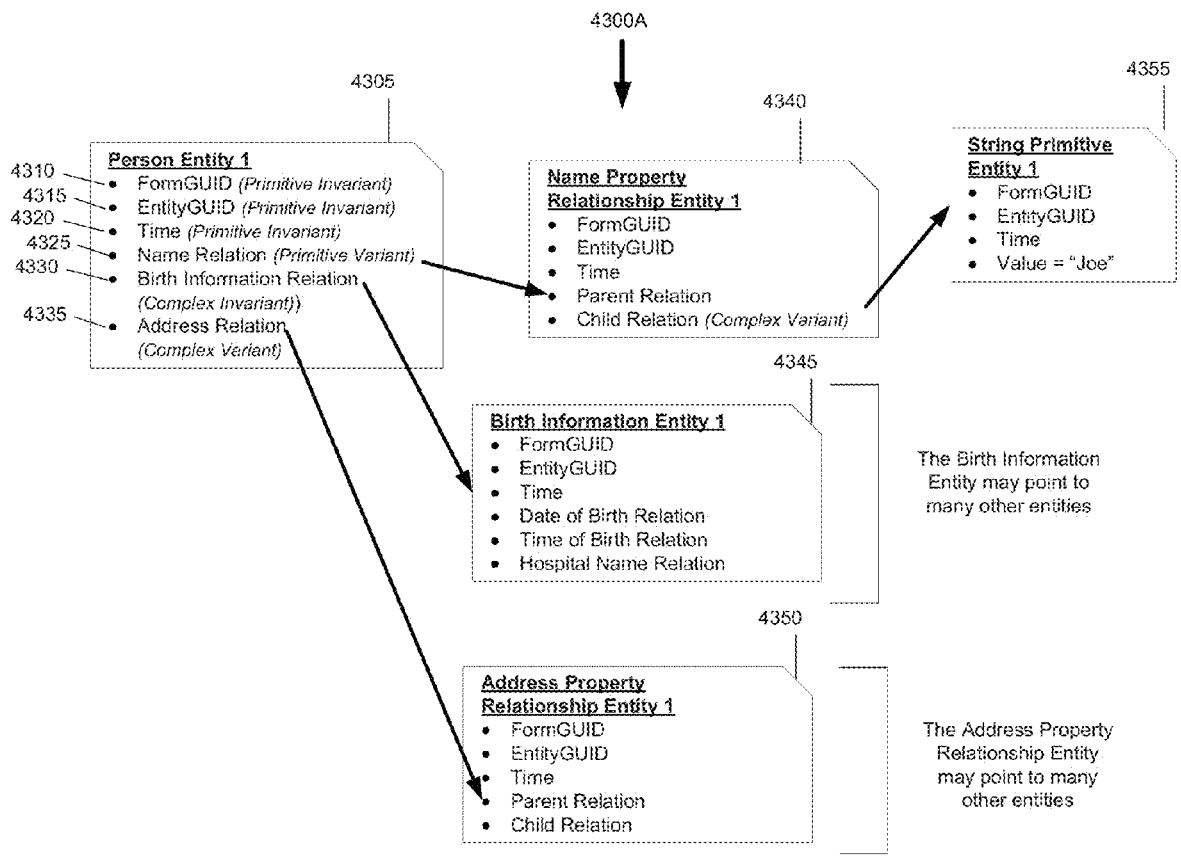
Figure 43A. Person Entity and Referenced Entities, Including Several Relation Types

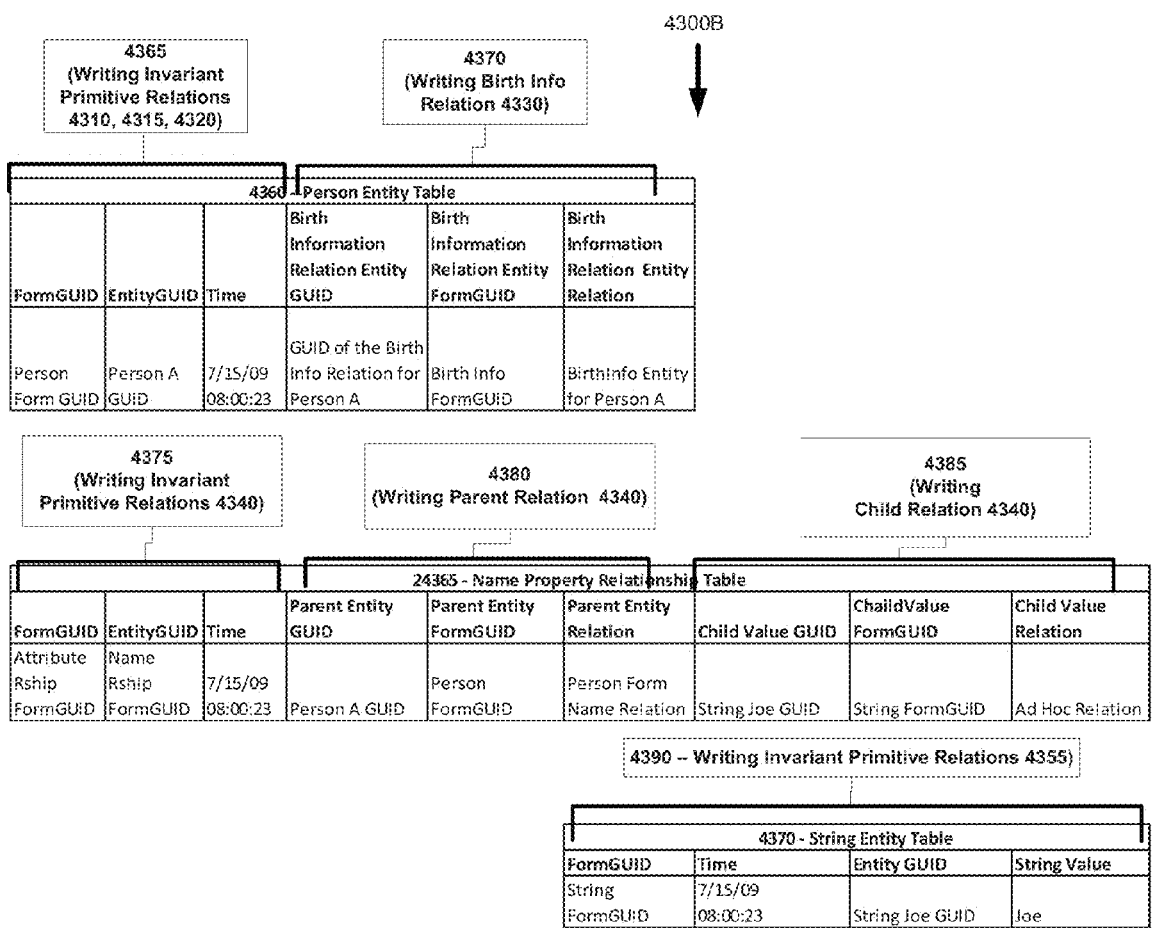
Figure 43B. Example Writing of Several Entity Types to a Table in a Database

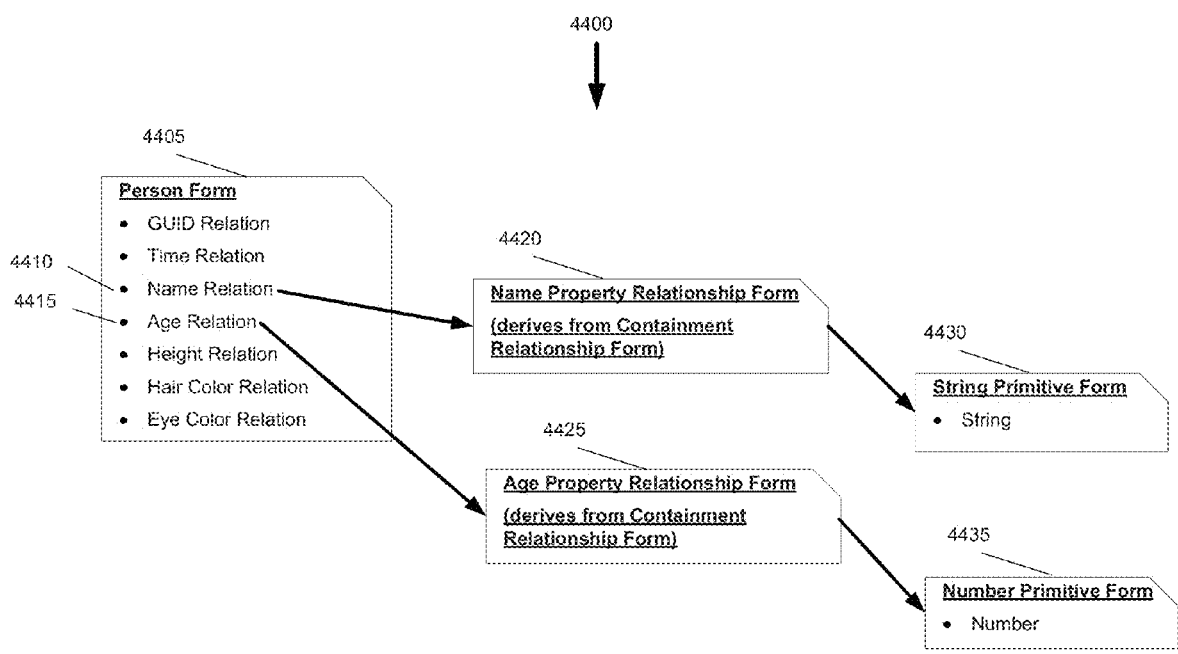
Figure 44. Example of Static Typing

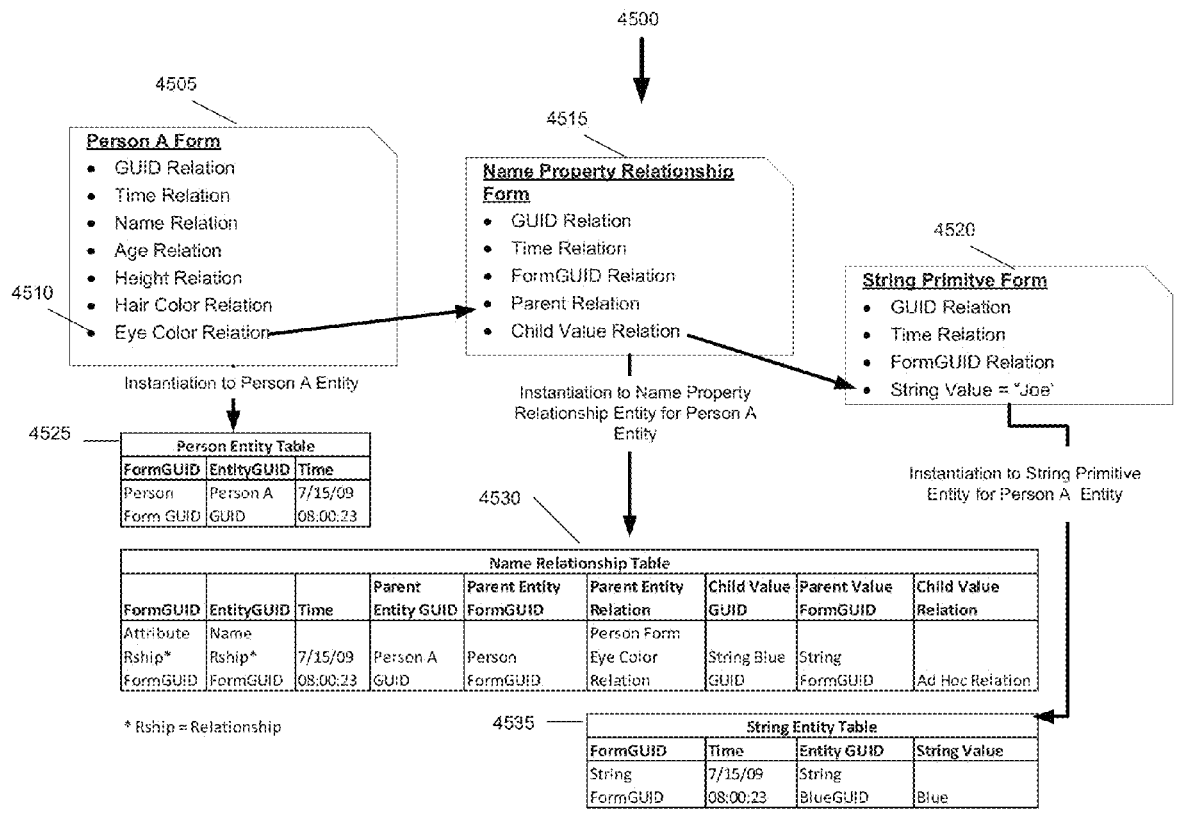
Figure 45. Example of Mapping a Statically Typed Invariant Property to a Tuplebase

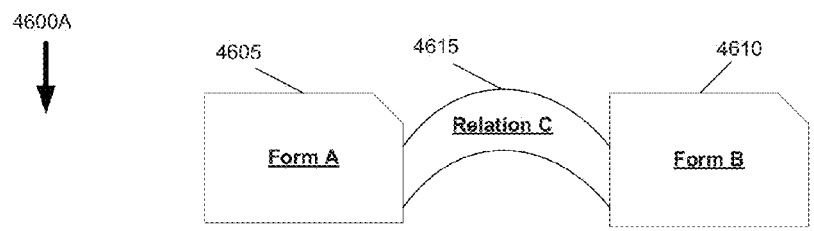
Figure 46A. Example of Relational Bridge Joining Two Forms
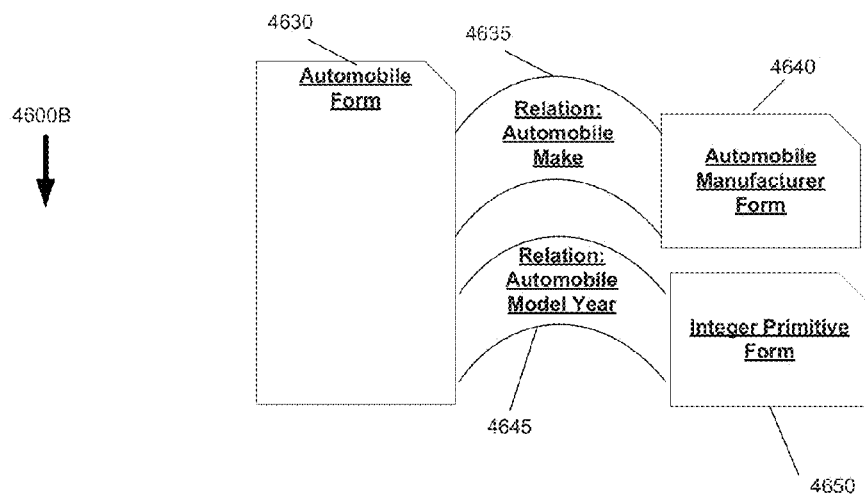
Figure 46B. Example Relational Bridge Joining Three Forms through Two Invariant Relation

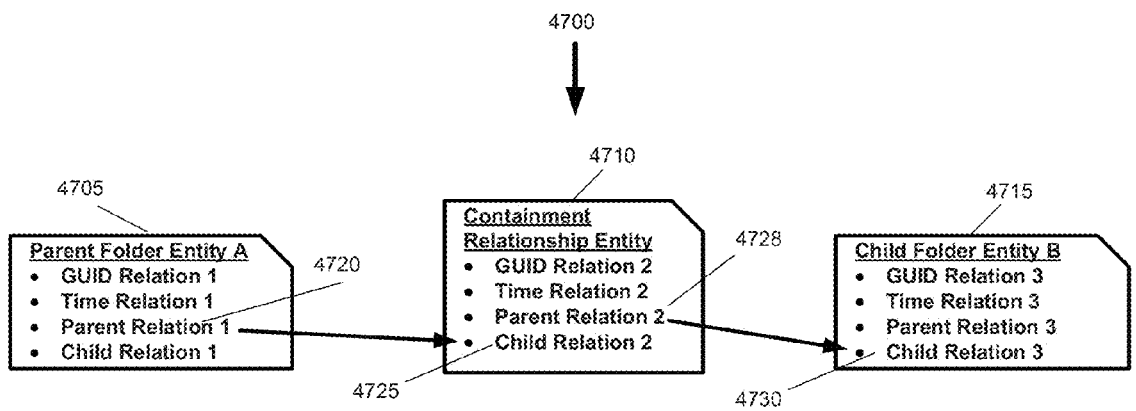
Figure 47. Example Relation Walking Between a Parent Folder Entity and a Child Folder Entity
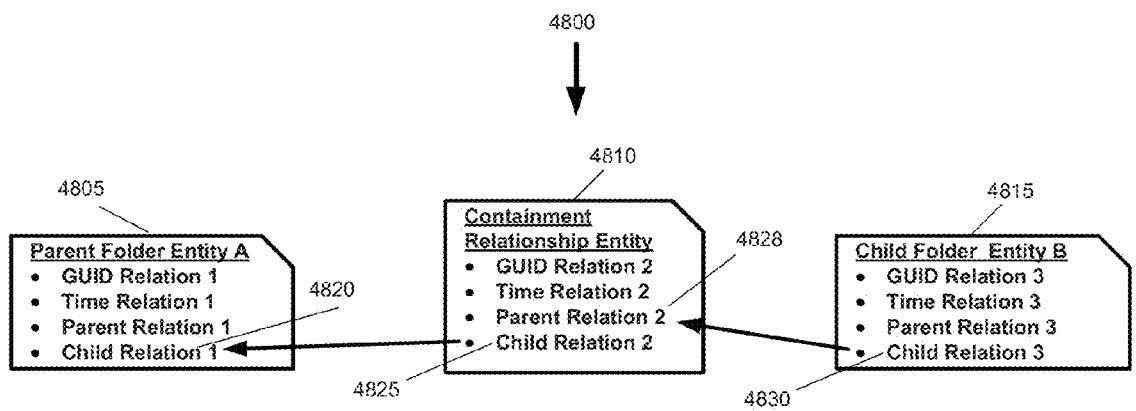
Figure 48. Example Relation Walking Between a Child Folder Entity and a Parent Folder Entity

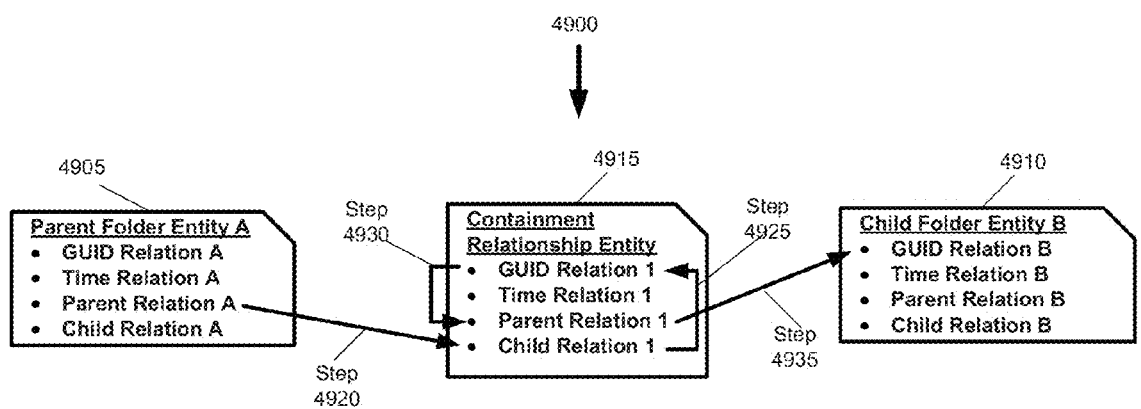
Figure 49. Additional Example of Relation Walking Between
a Parent Folder Entity and a Child Folder Entity

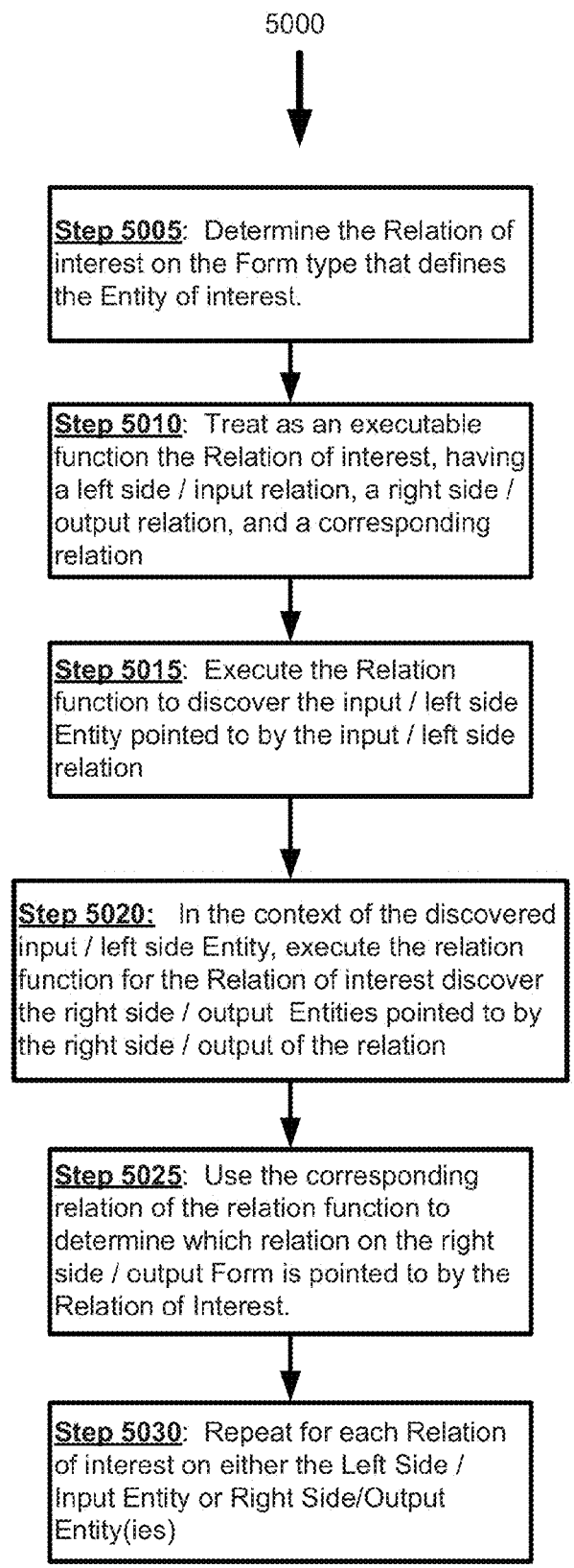
Figure 50. Conceptual Overview of the Process Flow For Traversing Relations

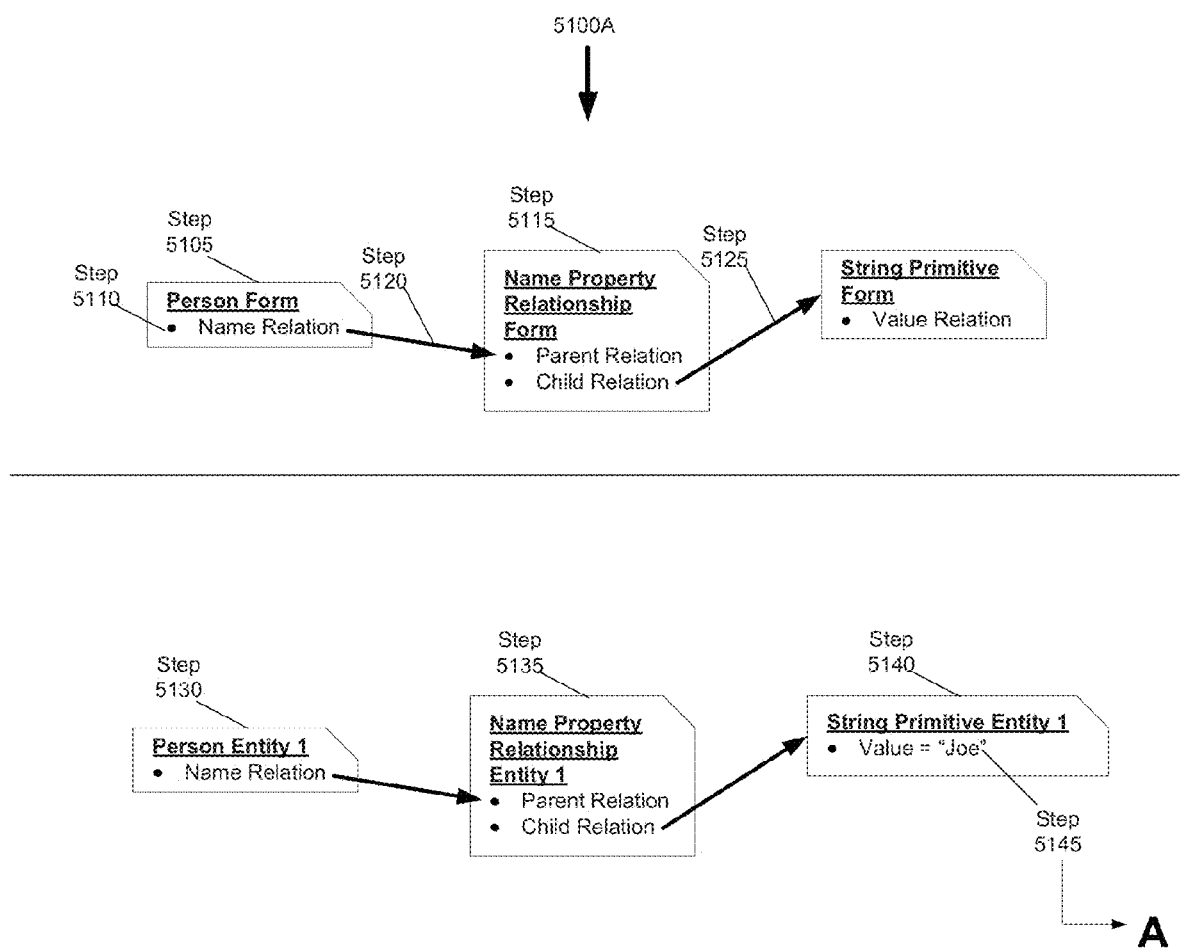
Figure 51A. Substitution Process Flow Example: Step 5105 through – Step 5145

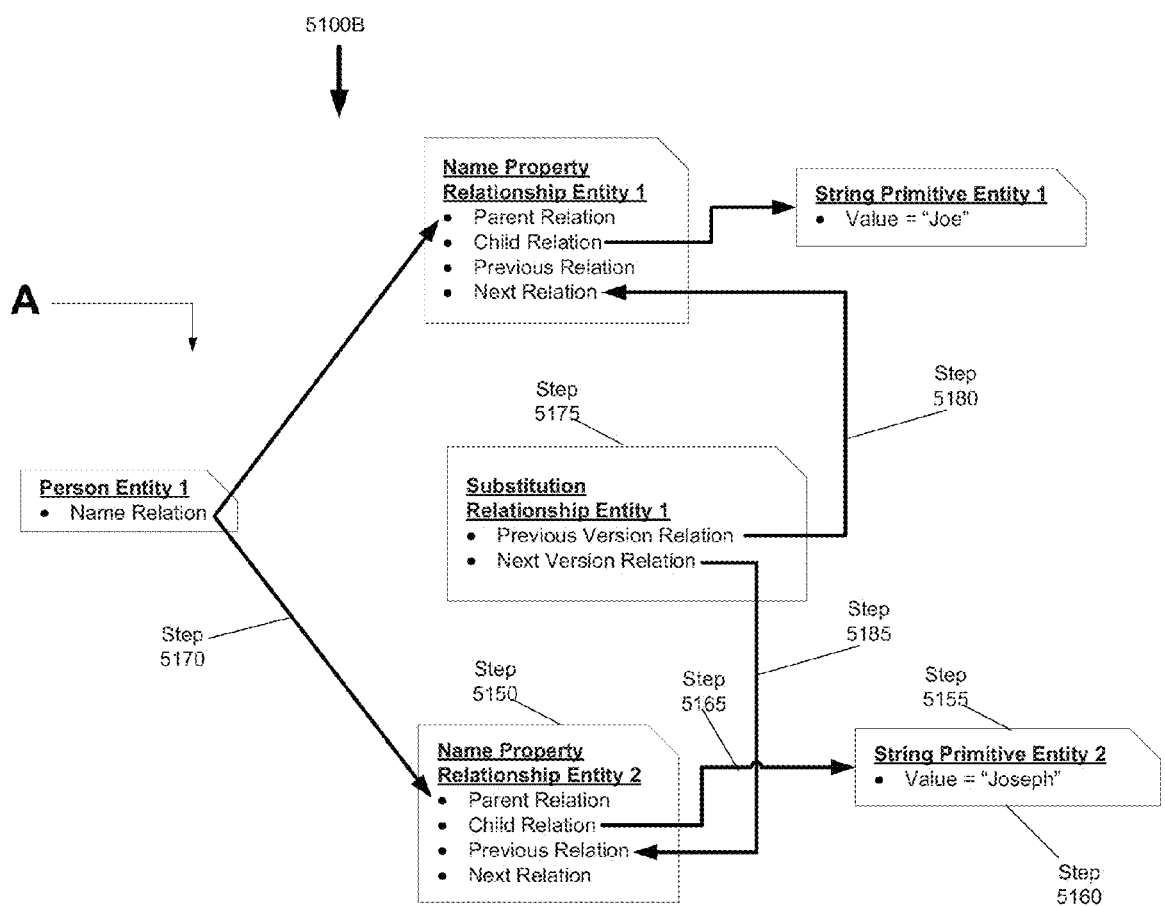
Figure 51B. Substitution Process Flow Example: Step 5150 through – Step 5180

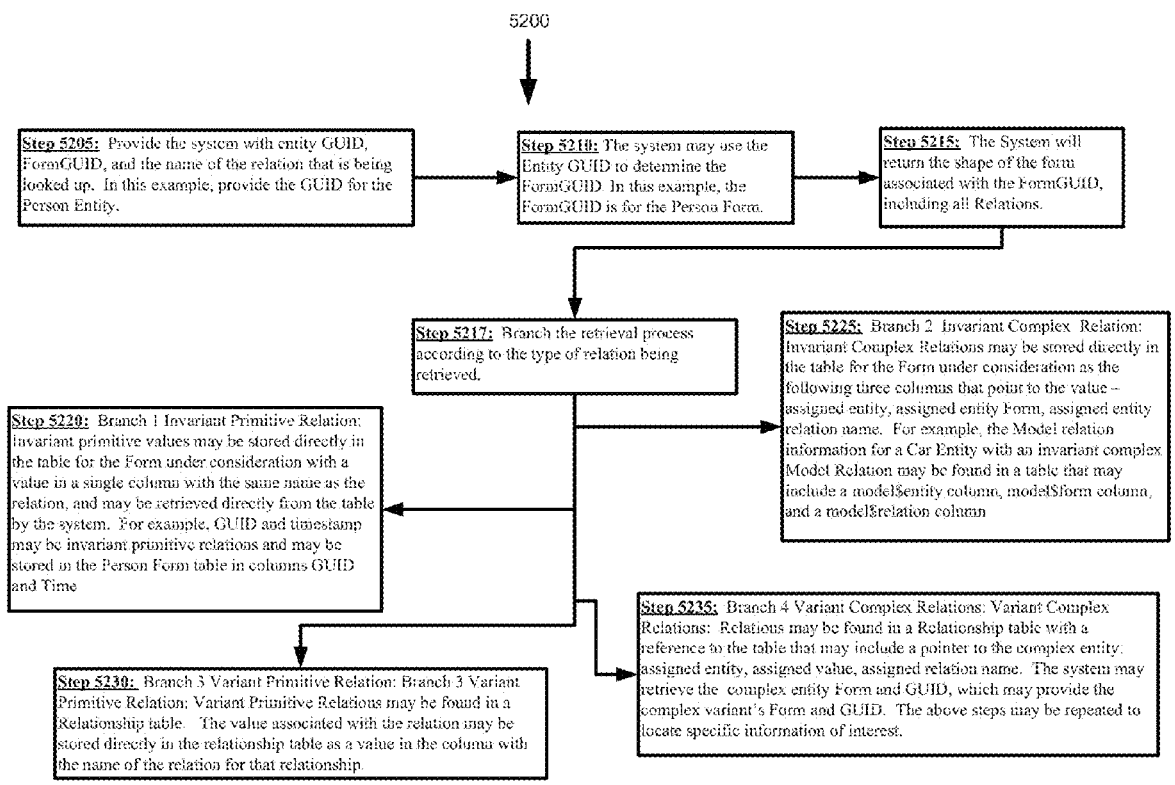
Figure 52. Example Process Flow for Retrieving Entity State

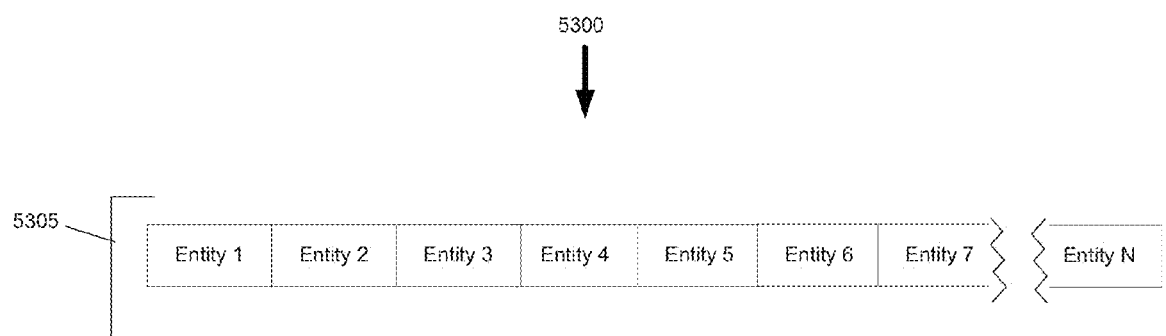
Figure 53. Information Stream

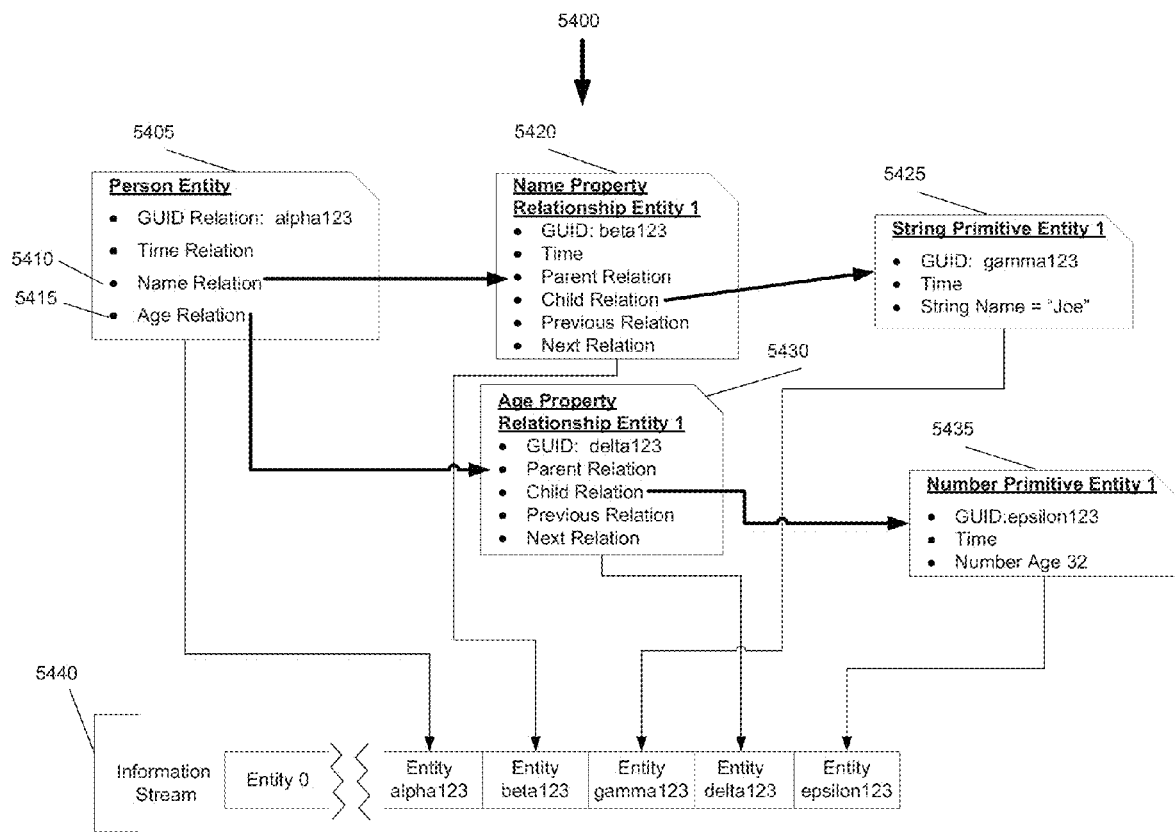
Figure 54. Simplified Conceptual View of Writing Person Entity and Related Entities to an Information Stream

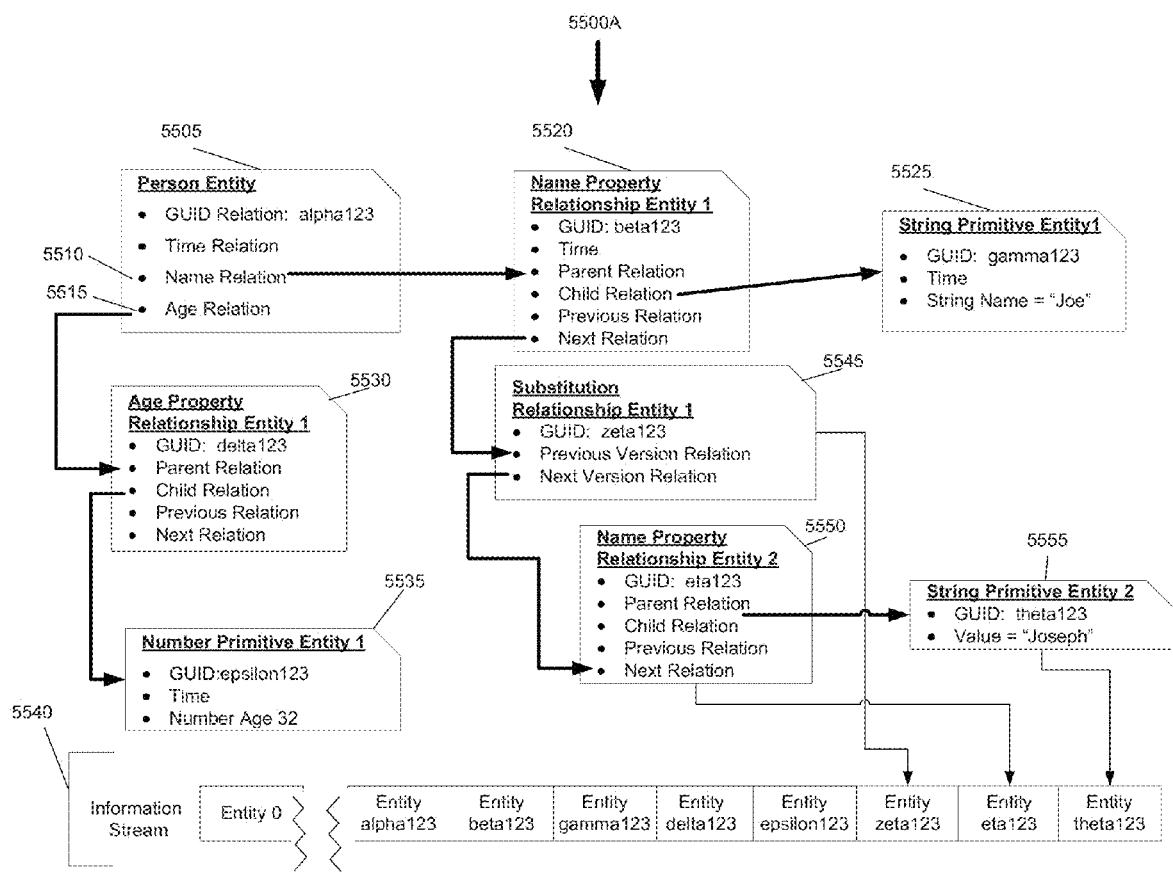
Figure 55A. Appending Substitution Relationship Entities to an Information Stream

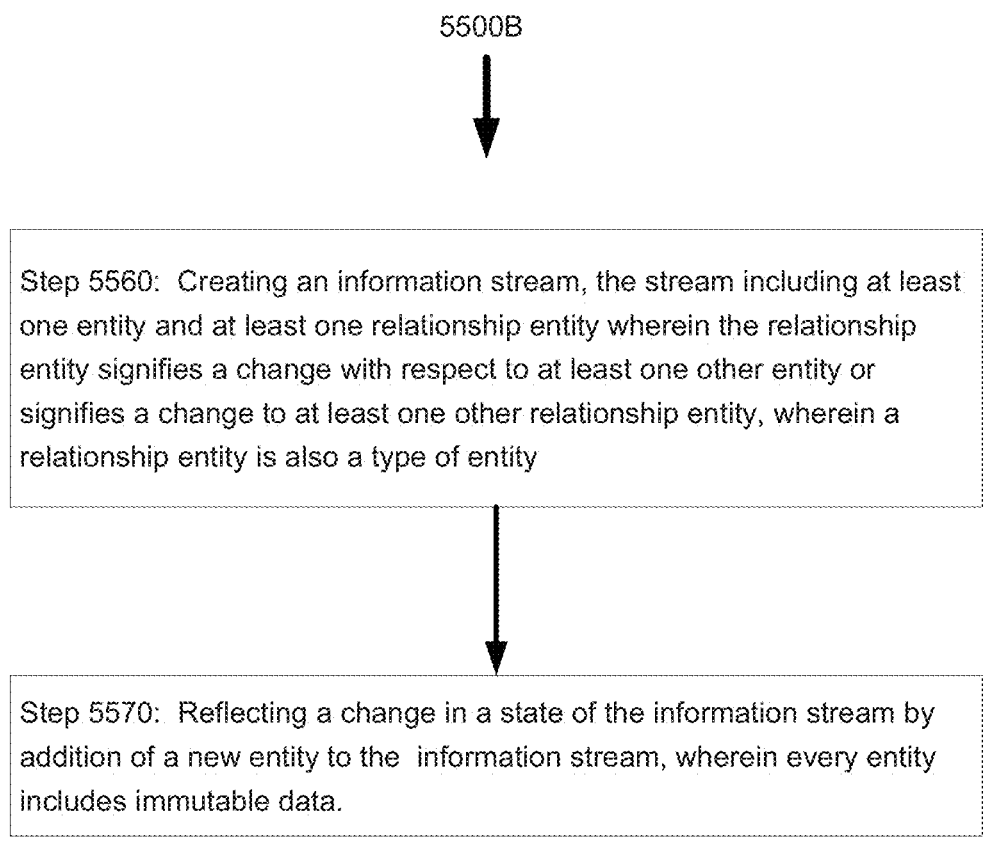
Figure 55B. Process Flow for Creating Information Streams and Reflecting Change in State by the Addition of New Entities

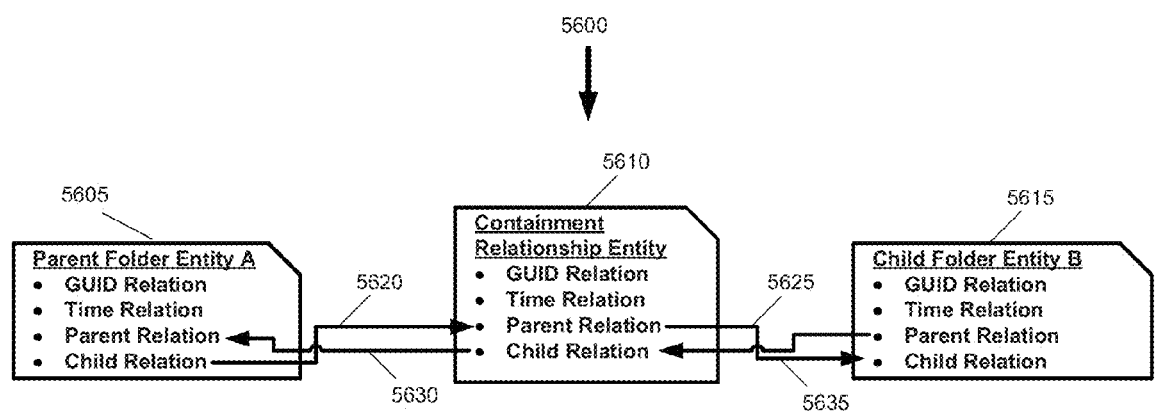
Figure 56. Example of Writing Streams for Single Containment Relationship

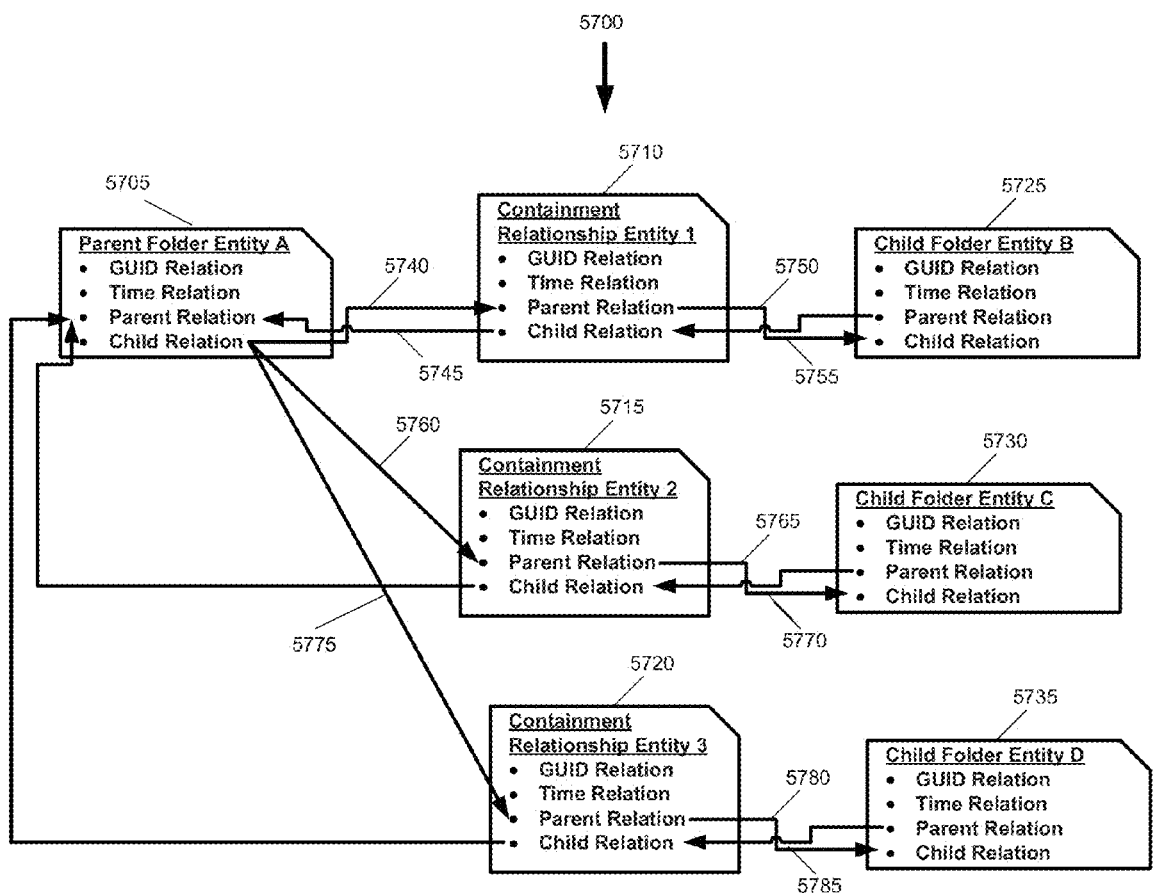
Figure 57. Example of Writing Streams for Multiple Containment Relationship

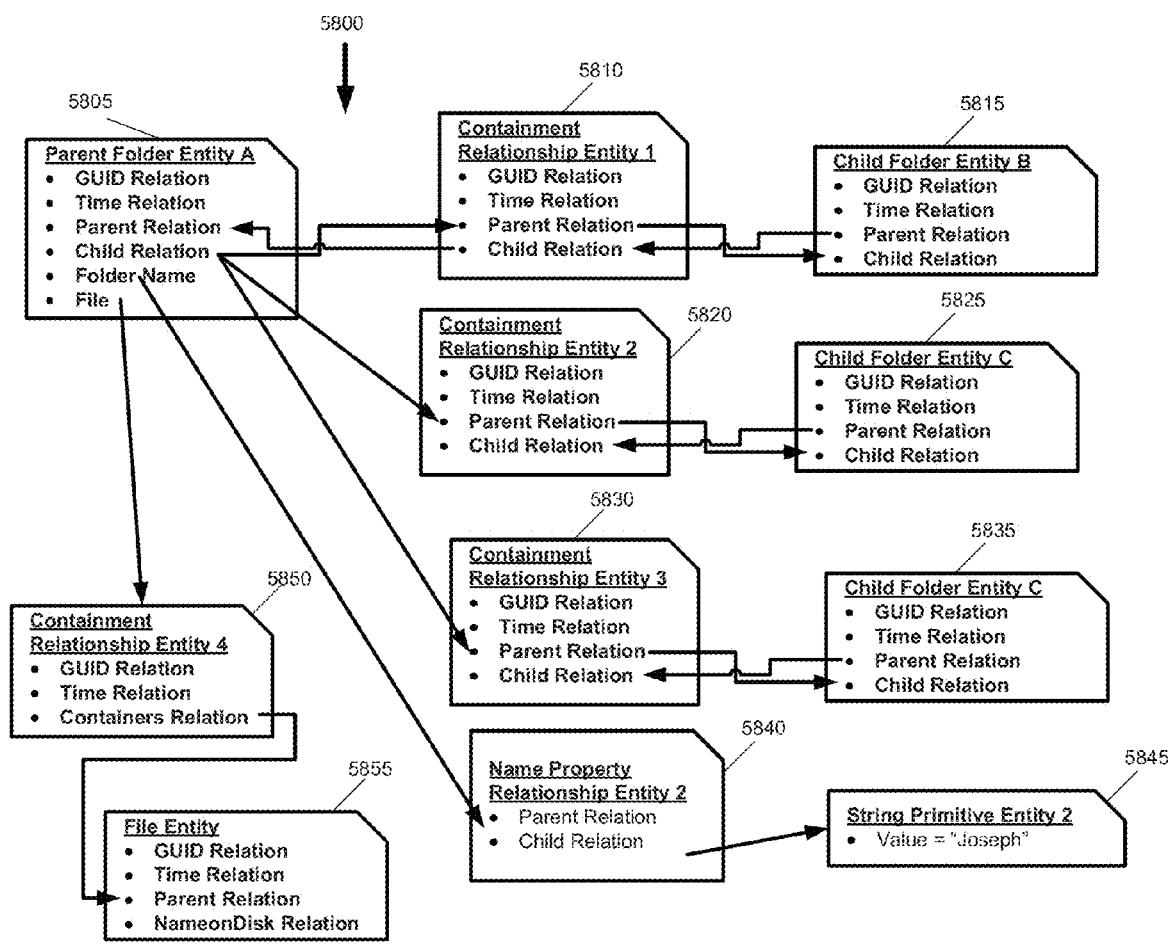
Figure 58. Example of Writing Streams for Multiple Containment and Other Relationships

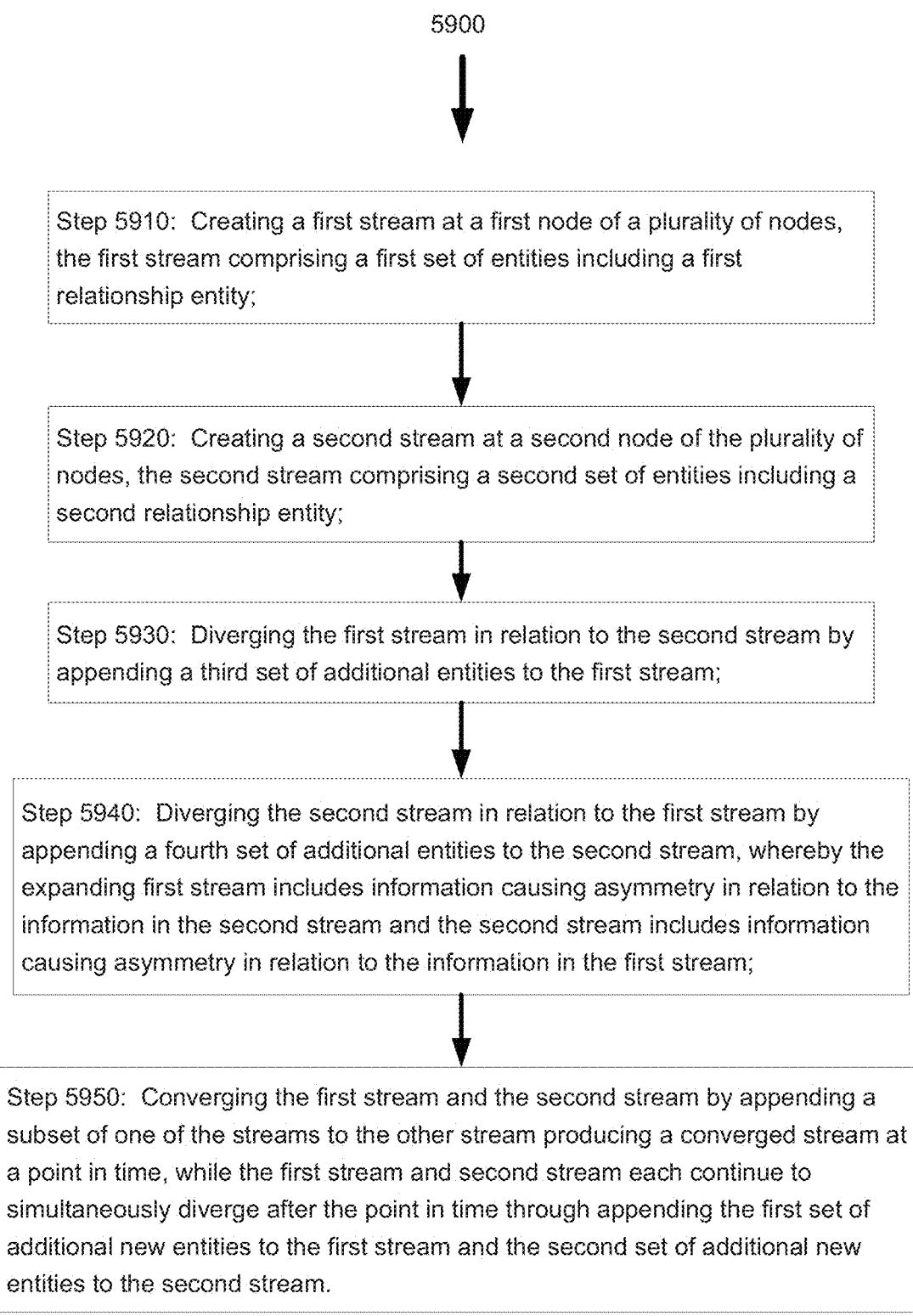
Figure 59. Process Flow for Diverging and Converging Streams

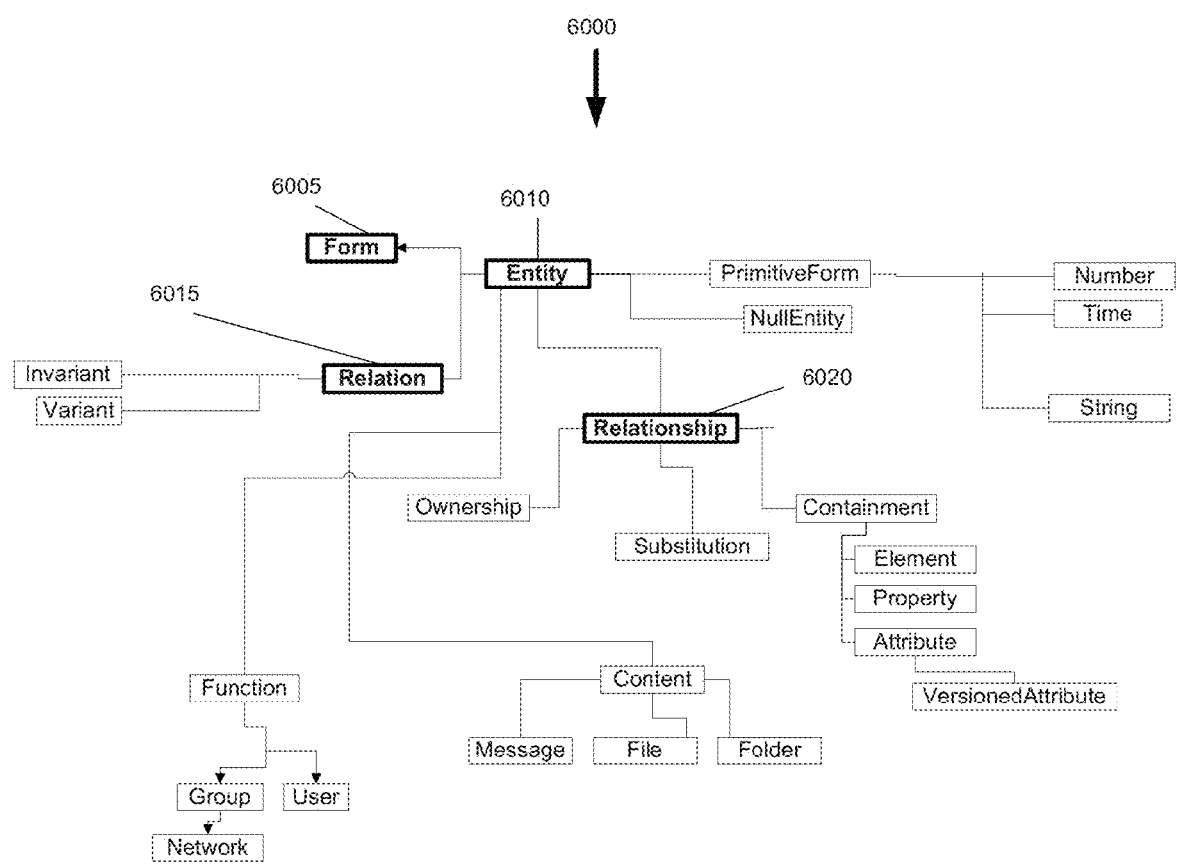
Figure 60. Class Hierarchy

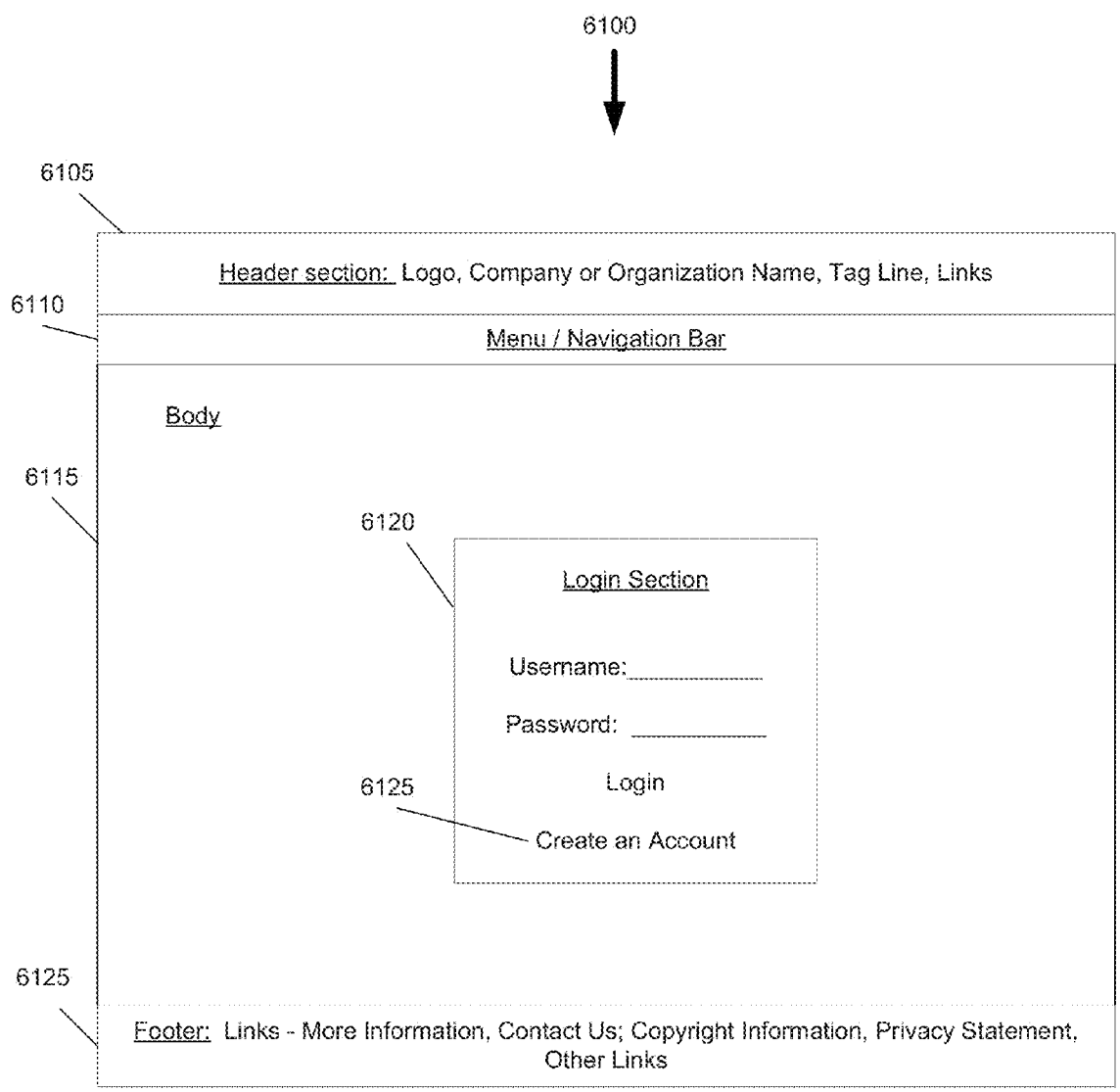
Figure 61. Login Page

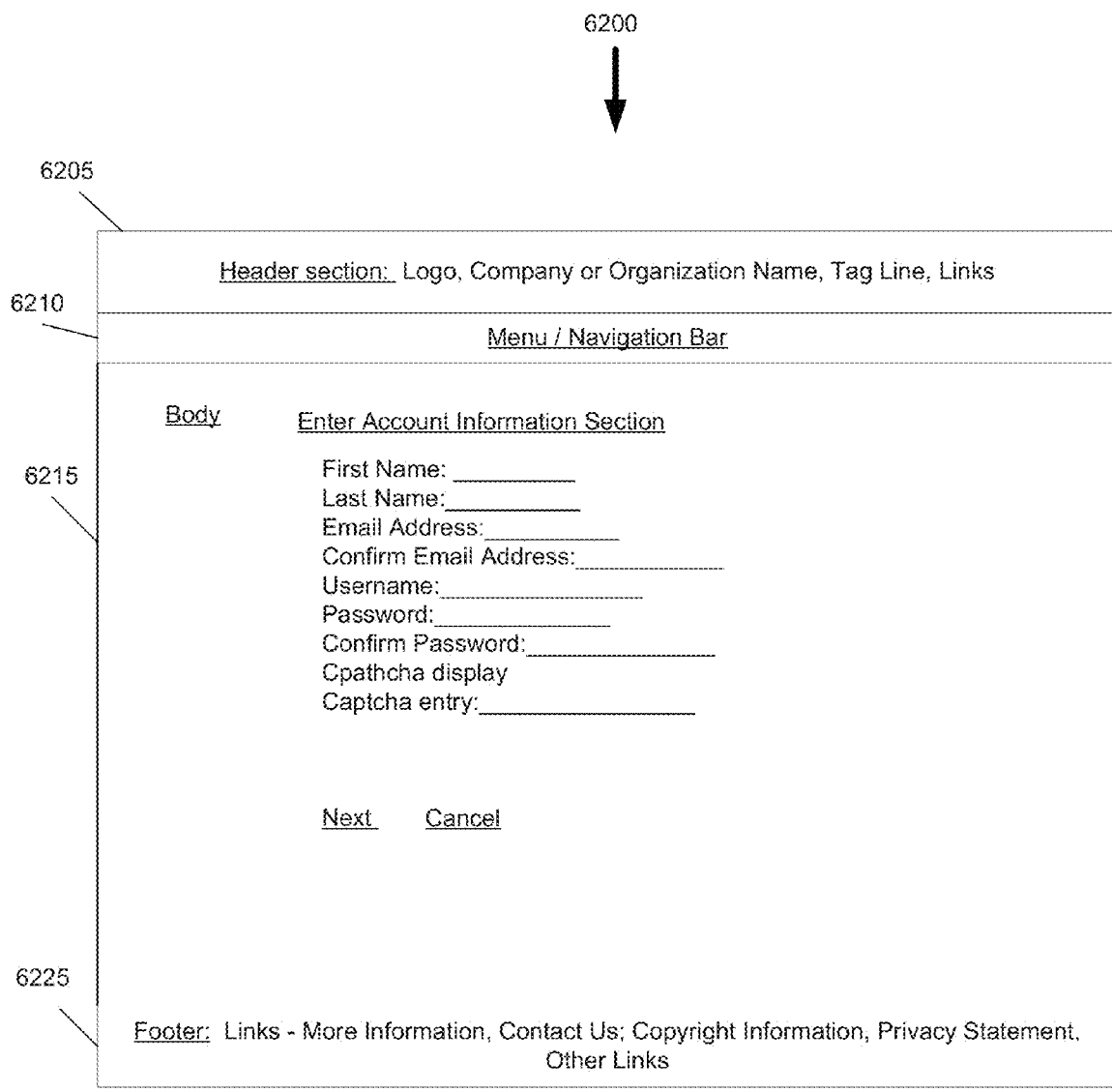
Figure 62. Create Account - Enter Account Information Page

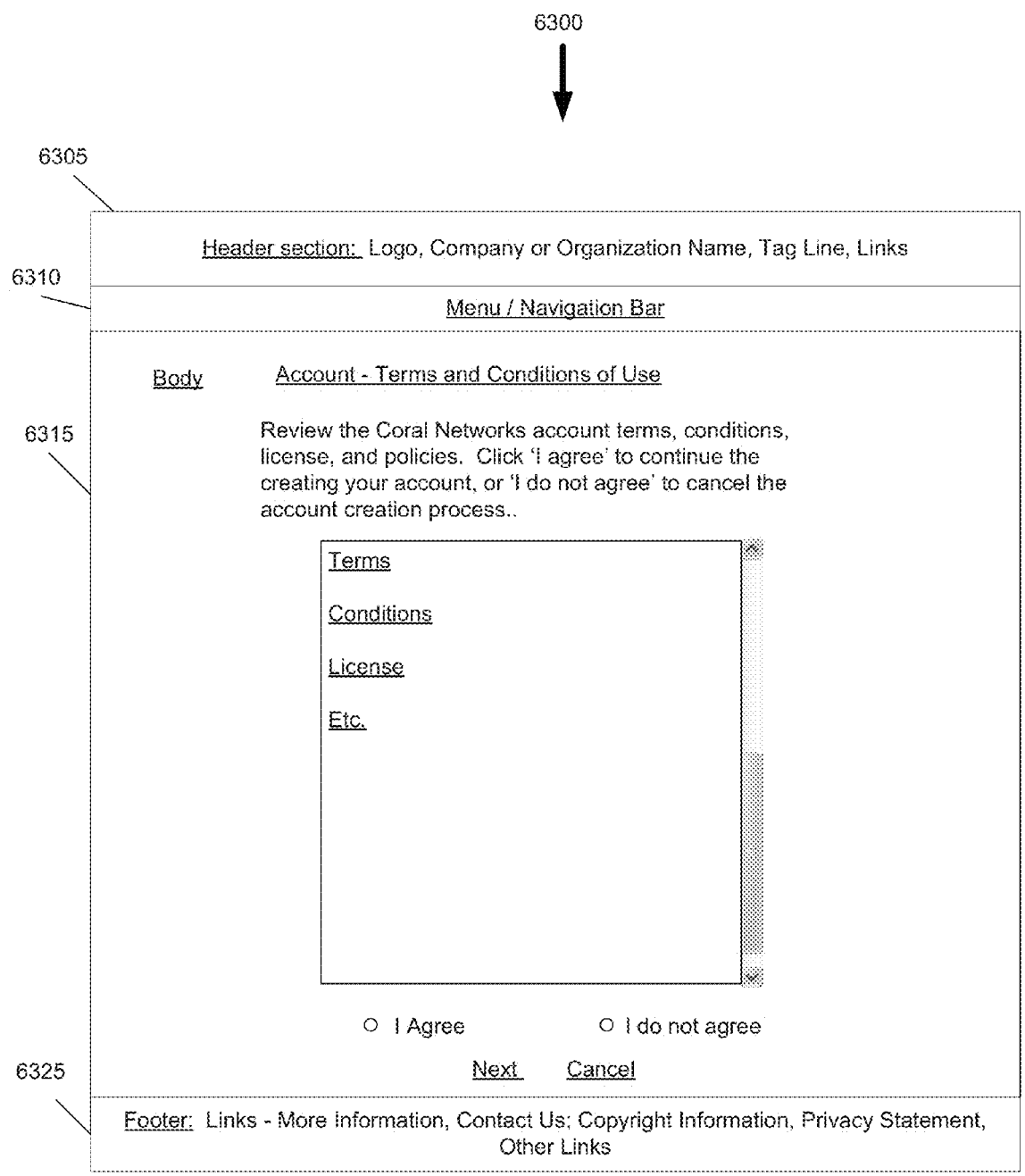
Figure 63. Create Account – Terms and Conditions of Use

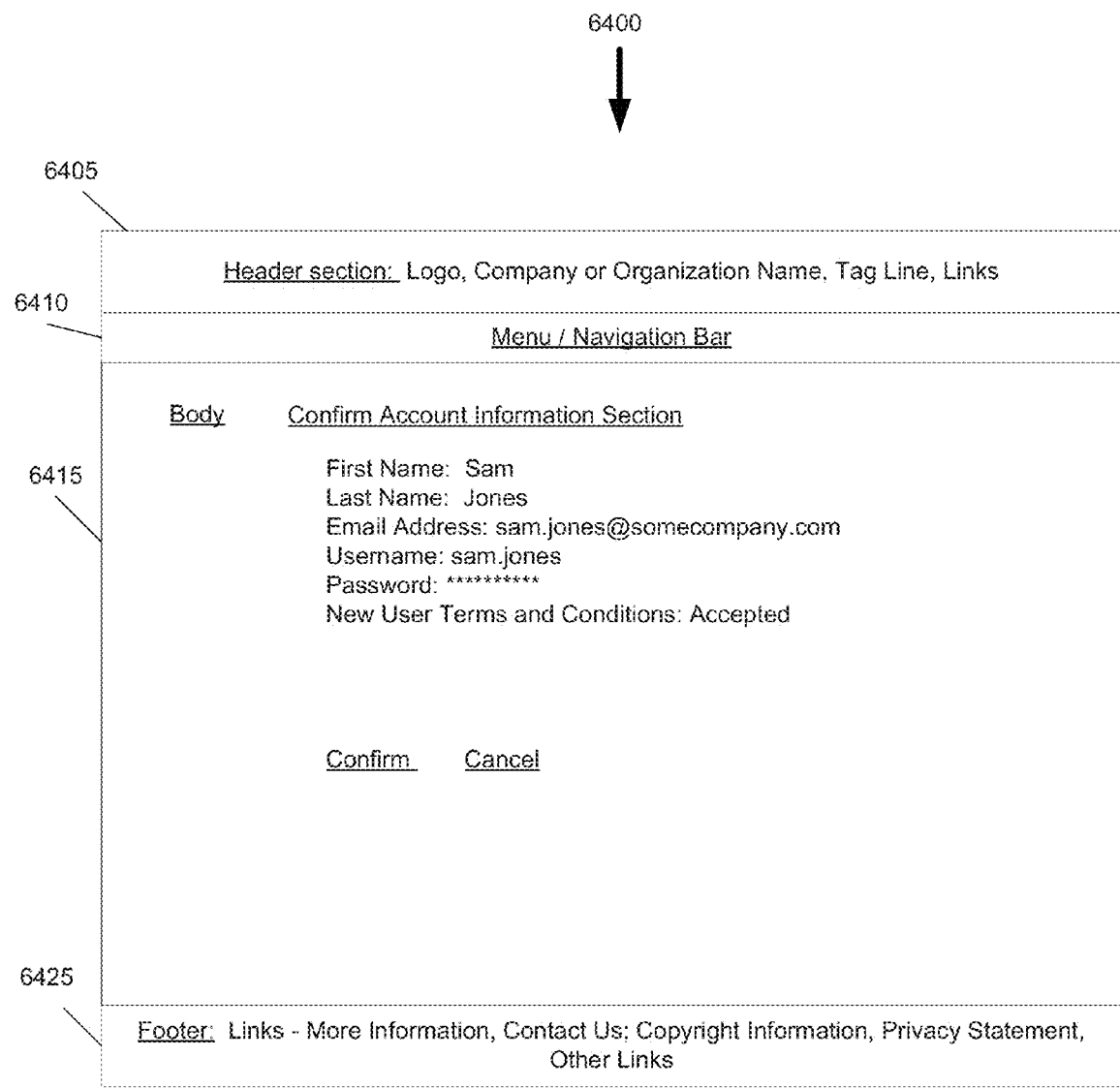
Figure 64. Create Account - Confirm Account Information Page

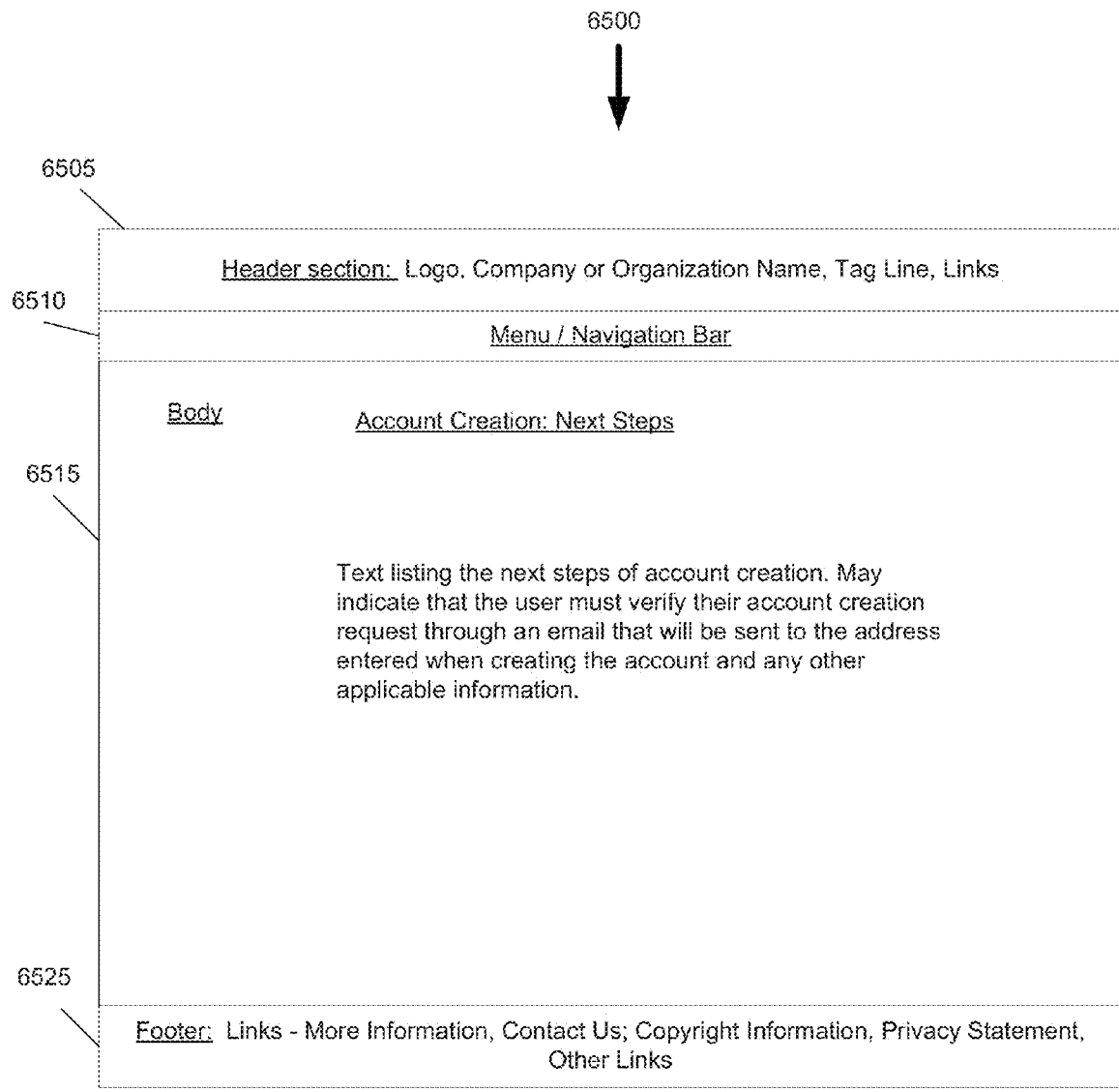
Figure 65. Create Account – Next Steps

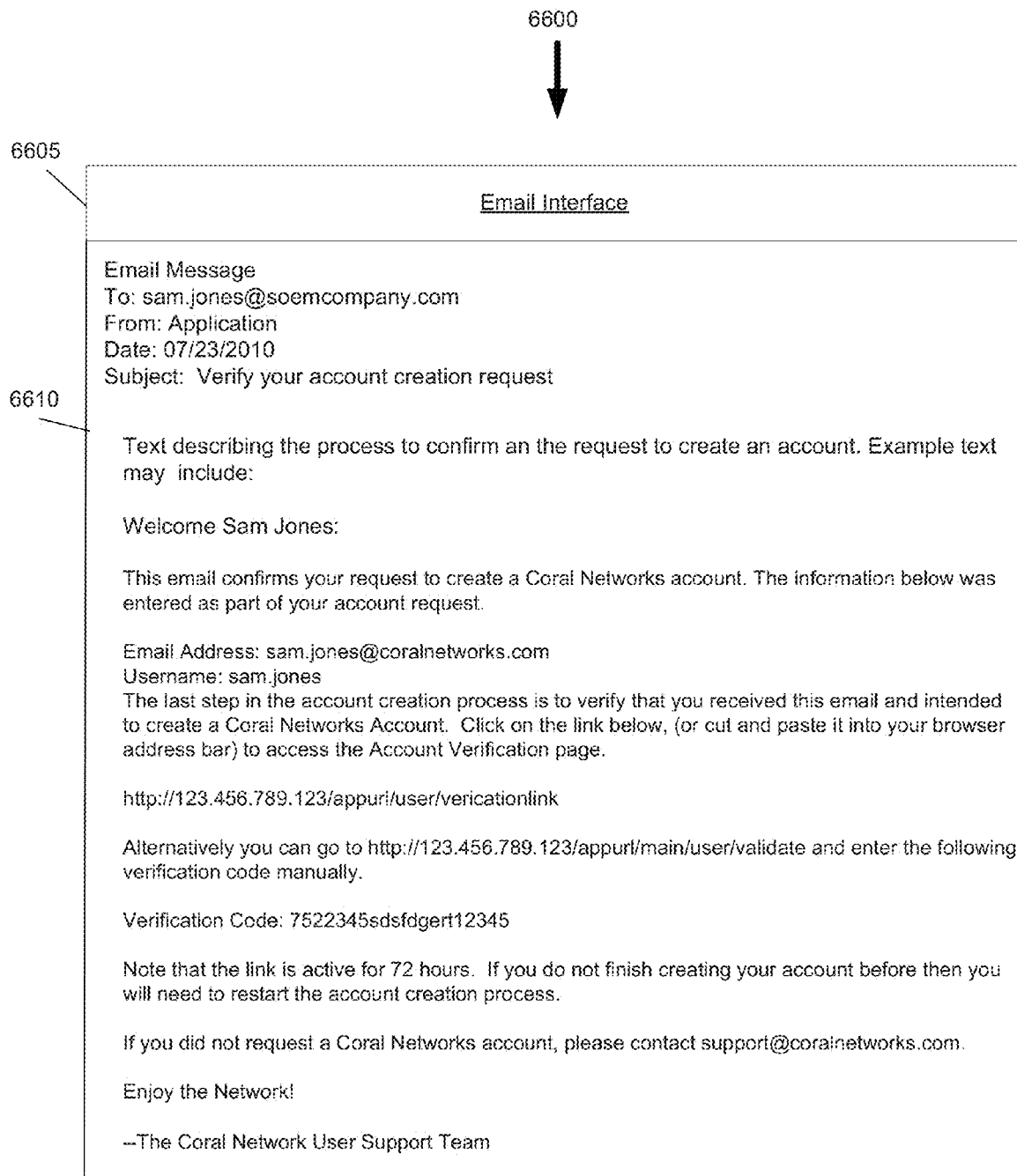
Figure 66. Create Account – Email with Instructions to Verify Account Creation Request

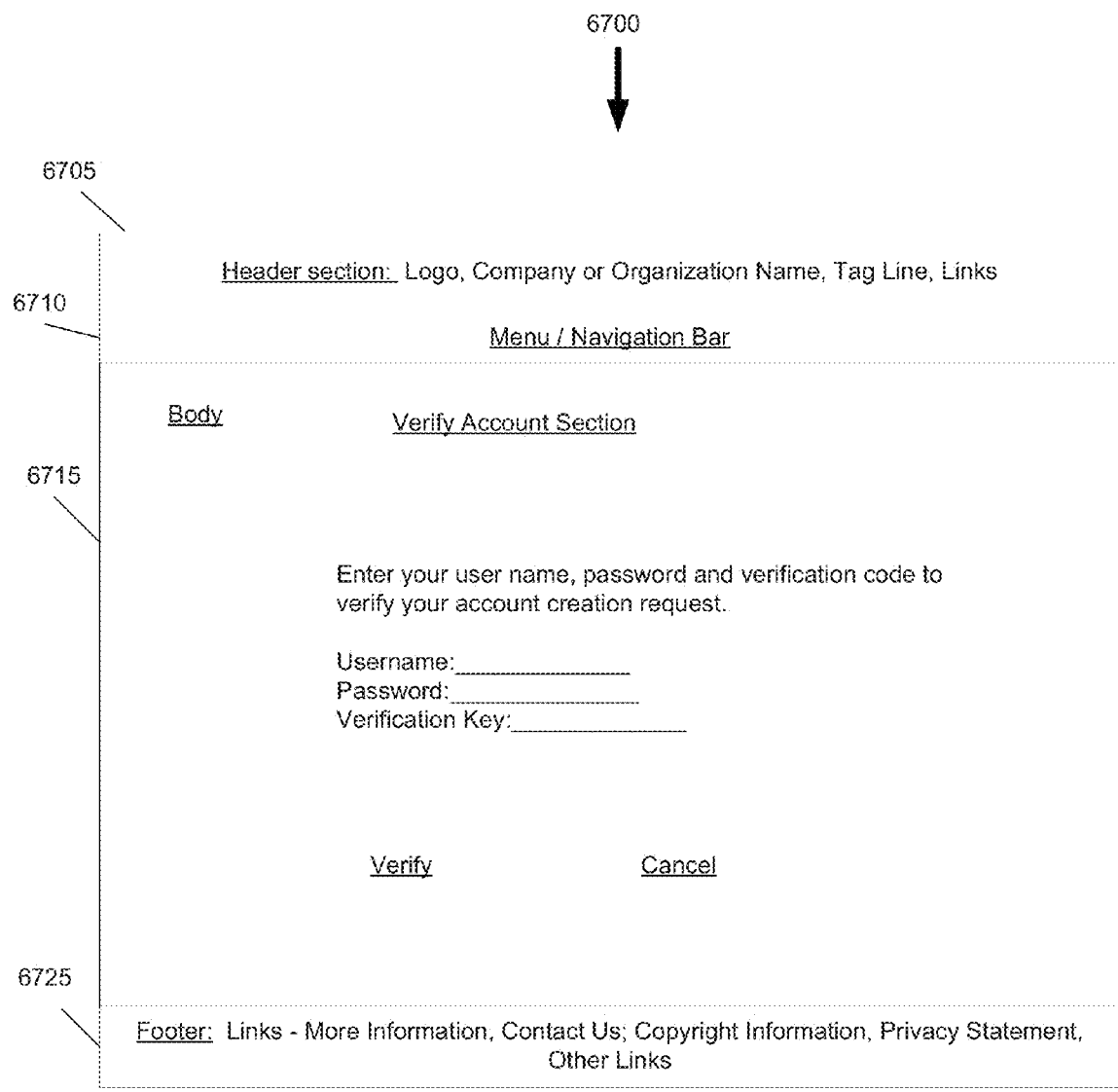
Figure 67. Verify Account Creation Page

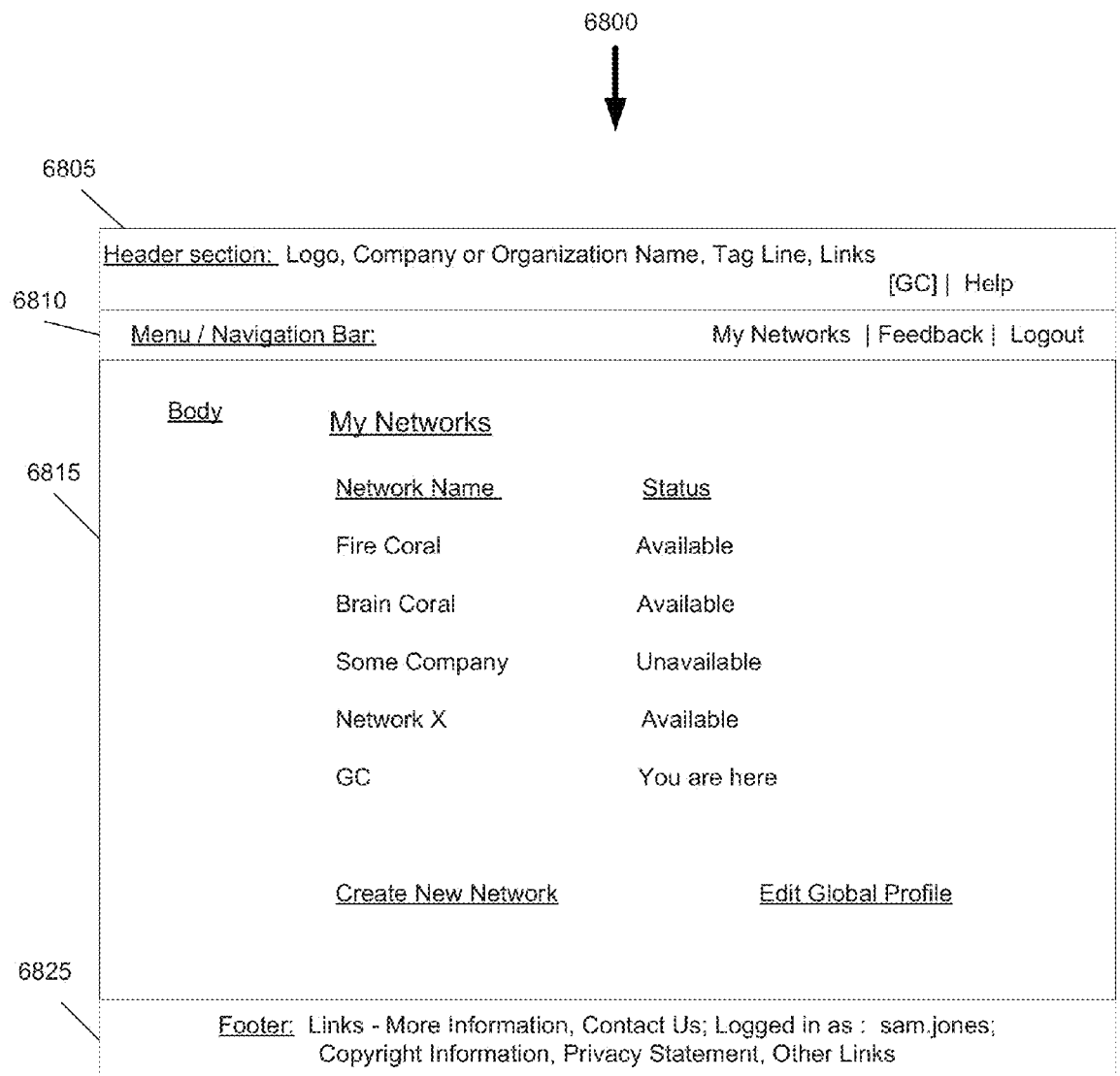
Figure 68. My Networks Page

6900

6905

Header section: Logo, Company or Organization Name, Tag Line, Links

[GC] | Help

6910

Menu / Navigation Bar:  My Networks | Feedback | Logout

Body  Enter Network Name and Description

6915

Name for your Network: _____

Domain Name for your Network: _____

Description of your Network

[ text area ]

Cancel | Next

6920

Footer: Links - More Information, Contact Us; Logged in as : sam.jones;
Copyright information, Privacy Statement, Other Links Figure 69. Create Network- Enter Network Name and Description

7000

7005

Header section: Logo, Company or Organization Name, Tag Line, Links
[GC] | Help

7010

Menu / Navigation Bar:            My Networks | Feedback | Logout

7015

Body       Enter Network Contact and Security Information

Organization Information

*Organization Name:: _____

*Organization Web Address:: _____

Contact Person for your Organization

*First Name _____

*Last Name_____

*Email _____

*Confirm Email _____

*Phone Number: _____

Administrator for your Organization

*Administrator First Name _____

*Administrator Last Name_____

*Administrator Email _____

*Confirm Administrator Email _____

7020

[ Next ] [ Cancel ]

Footer: Links - More Information, Contact Us; Logged in as : sam.jones; Copyright Information, Privacy Statement, Other Links Figure 70. Create Network- Enter Network Contact and Security Information

7100

7105

Header section: Logo, Company or Organization Name, Tag Line, Links

[GC] | Help

7110

Menu / Navigation Bar:      My Networks | Feedback | Logout

Body      Select a Network Plan

7115

○ One Month Trial at $$$

OR

○ Build your own plan

*Select Options to Build Your Own Plan*

| | |
|---|---|
| Number of Users: | 20 users @ $xxxx ▼ |
| Server Memory and Storage: | 1 GB RAM/40GB Storage ($xxx) ▼ |
| Bandwidth (for incoming and Outgoing data transfer)*: | 20 GB@ $xxx ▼ |
| Back-up | Weekly @ $xxx /GB ▼ |
| Service Plan: | Platinum(24x7) - $xxx ▼ |

Estimated Monthly Total:      $xxxx

*Bandwidth fees will be adjusted if the selected plan is exceeded at a rate of $xx per GB

[ Next ] [ Cancel ]

7120

Footer: Links - More Information, Contact Us; Logged in as : sam.jones; Copyright Information, Privacy Statement, Other Links Figure 71. Create Network- Select a Network Plan

7200

7205

Header section: Logo, Company or Organization Name, Tag Line, Links
[GC] | Help

7210

Menu / Navigation Bar: My Networks | Feedback | Logout

Body — Network License, Terms, and Conditions of Use

7215

Review the Networks terms, conditions, license, and policies. Click 'I agree' to continue the creating your network, or 'I do not agree' to cancel the network creation process..

Terms

Conditions

License

Etc.

○ I Agree   ○ I do not agree

Next | Cancel

7220

Footer: Links - More Information, Contact Us; Logged in as : sam.jones; Copyright Information, Privacy Statement, Other Links Figure 72. Create Network — Network License, Terms, and Conditions of Use

7300

7305

Header section: Logo, Company or Organization Name, Tag Line, Links
[GC] | Help

7310

Menu / Navigation Bar:  My Networks | Feedback | Logout

Body  Confirm Network Information

7315

Network Name and Description
- Name for your Network: Acme
- Domain Name for your Network: acme@coralnetworks.com
- Description of your Network: At Acme, Inc, we do everything from making widgets to supplying specialized gadgets

Organization Information
- Organization Name: Acme, Inc.
- Organization Web Address: www.acme.com

Contact Person for your Organization
- First Name: Sam
- Last Name: Jones
- Email: sam.jones@acme.com
- Phone Number: 703.555.12122

Administrator for your Organization
- First Name: Anne
- Last Name: Wilson
- Email: anne.wilson@acme.com
- Phone Number: 703-555-1212

Terms and Conditions: I have read, understand, and agree to the Coral Networks, Inc. terms, conditions, and license restrictions.

Network Plan
- 1 month trial
- 4 GB RAM / 120 GB Storage
- Bandwidth (monthly): 100 GB inbound/100 GB outbound
- Backup: Weekly
- Estimated Cost: $$$$

[ Confirm ]  [ Cancel ]

7320

Footer: Links - More Information, Contact Us; Logged in as : sam.jones; Copyright Information, Privacy Statement, Other Links Figure 73. Create Network – Confirm Network Information

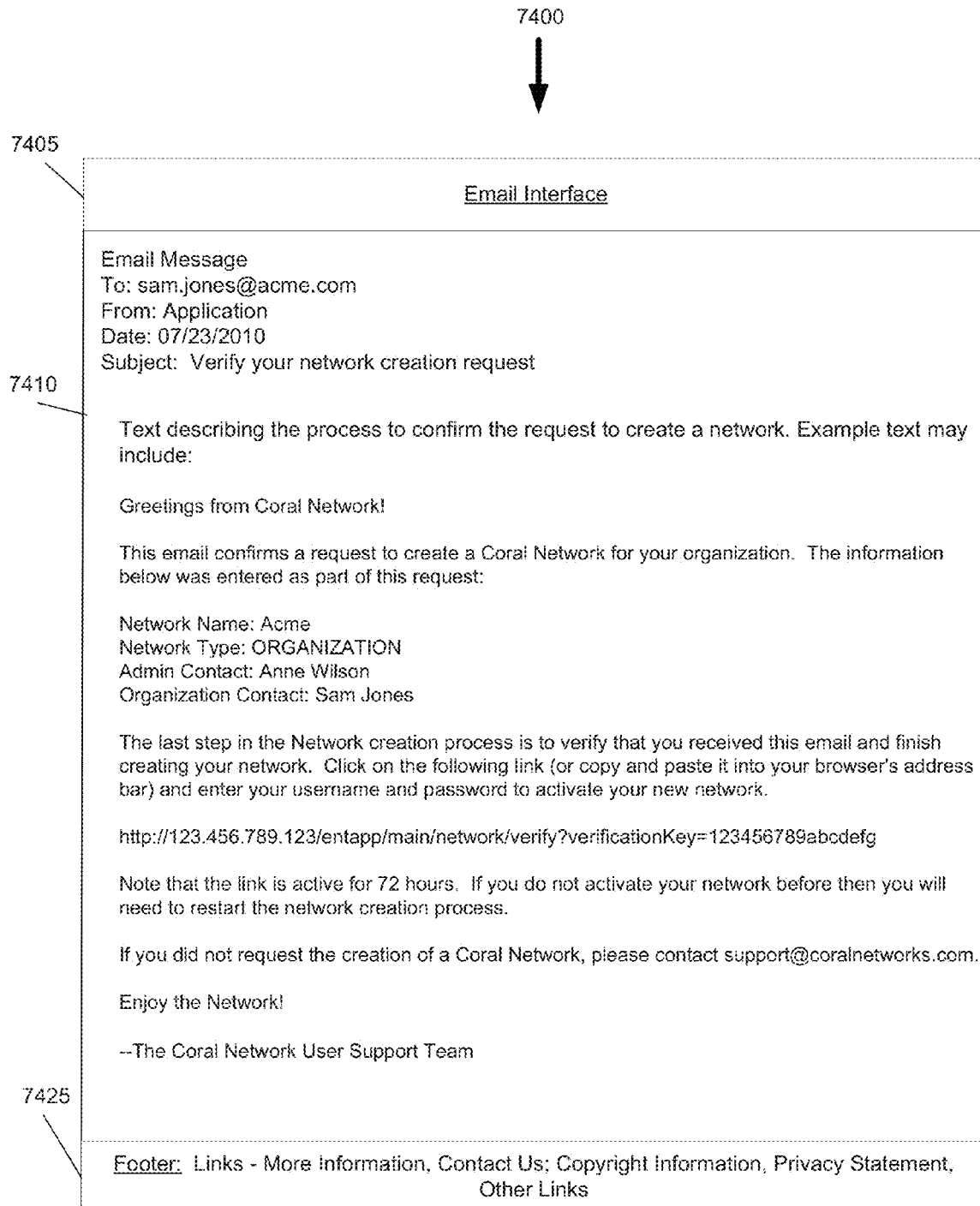
Figure 74. Create Network – Email with Instructions to Verify Network Creation Request

7500

7505

| Header section: Logo, Company or Organization Name, Tag Line, Links |
| --- |
| [GC] | Help |

7510

Menu / Navigation Bar:                              My Networks | Feedback | Logout Body        Verify Network Creation Request

7515

Enter your user name, password and verification code to
verify your network creation request.

Username:_____
Password:_____
Verification Key:_____

| Verify | Cancel |

7520

Footer: Links - More Information, Contact Us; Logged in as : sam.jones;
Copyright Information, Privacy Statement, Other Links Figure 75. Create Network – Verify Network Creation Request Page

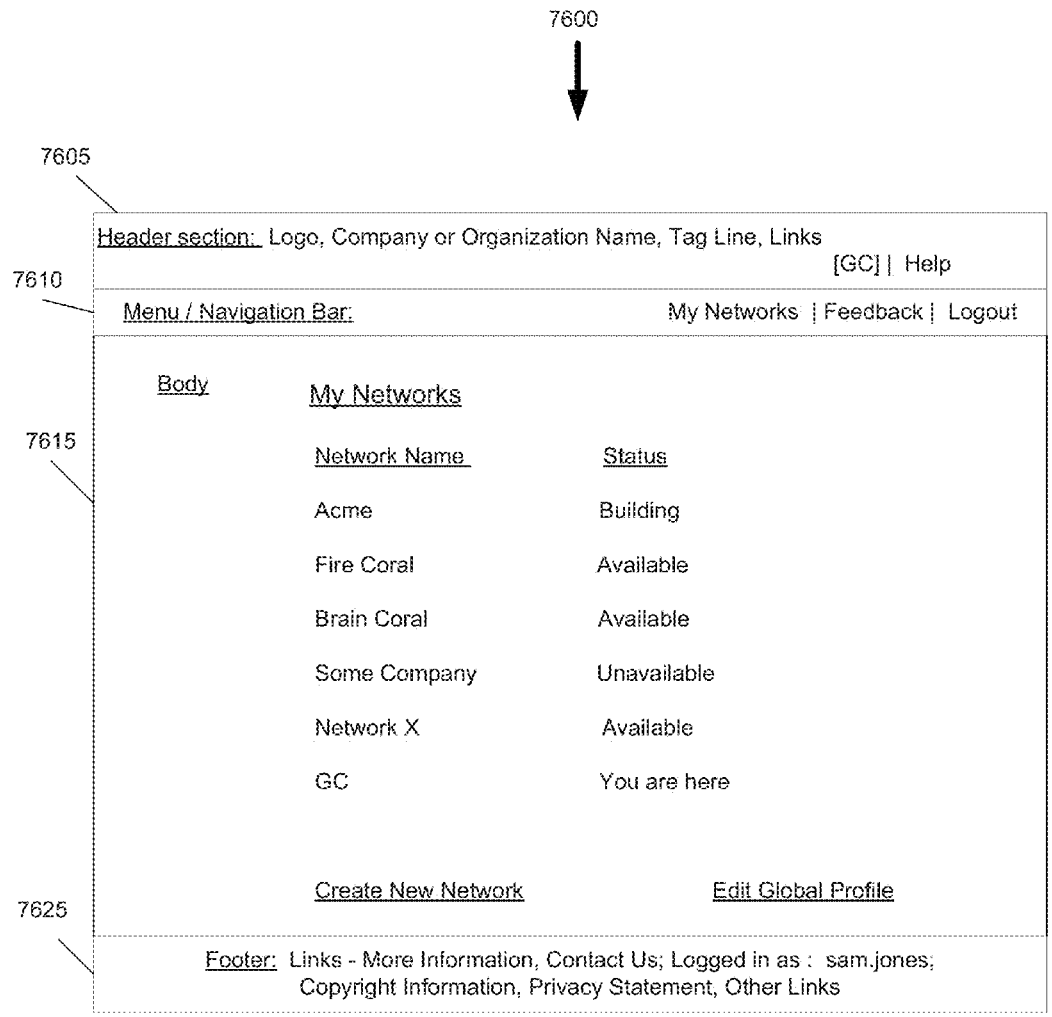
Figure 76. Network Building Display

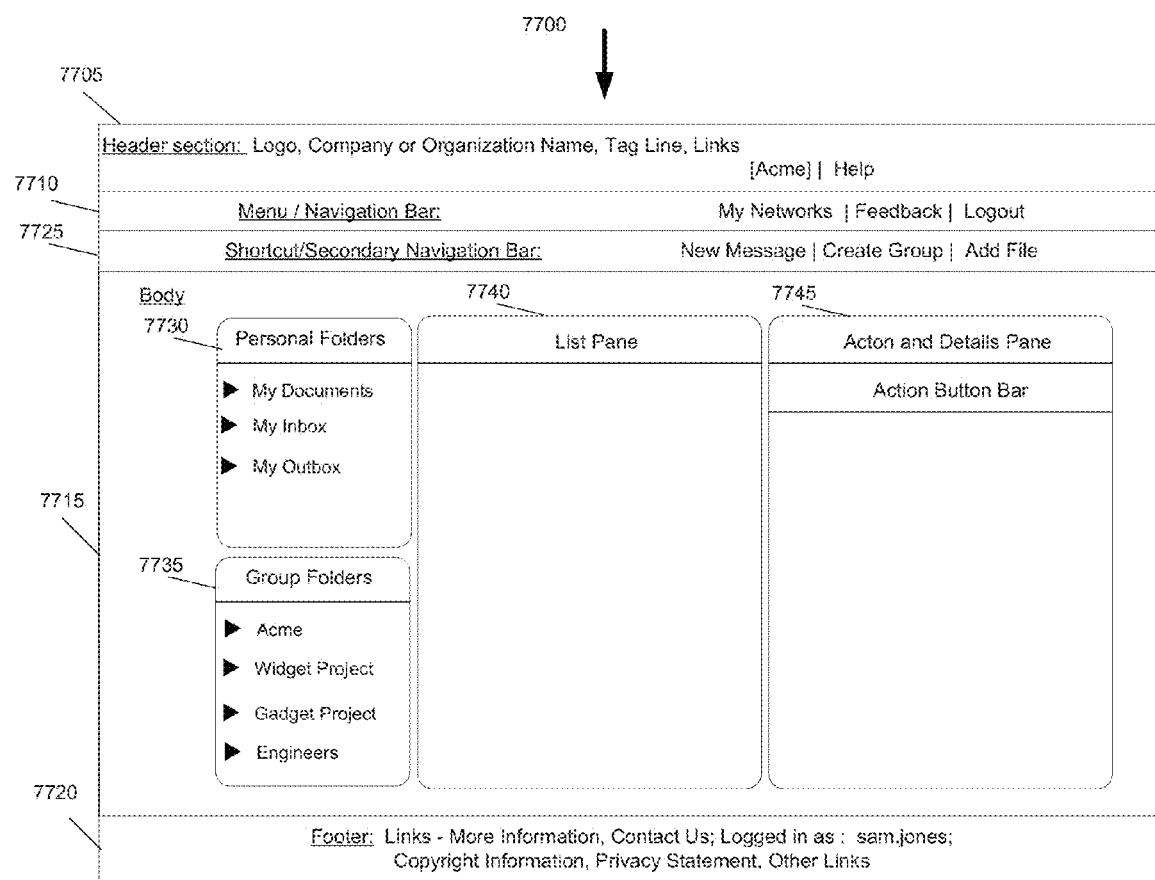
Figure 77. Network Home Page

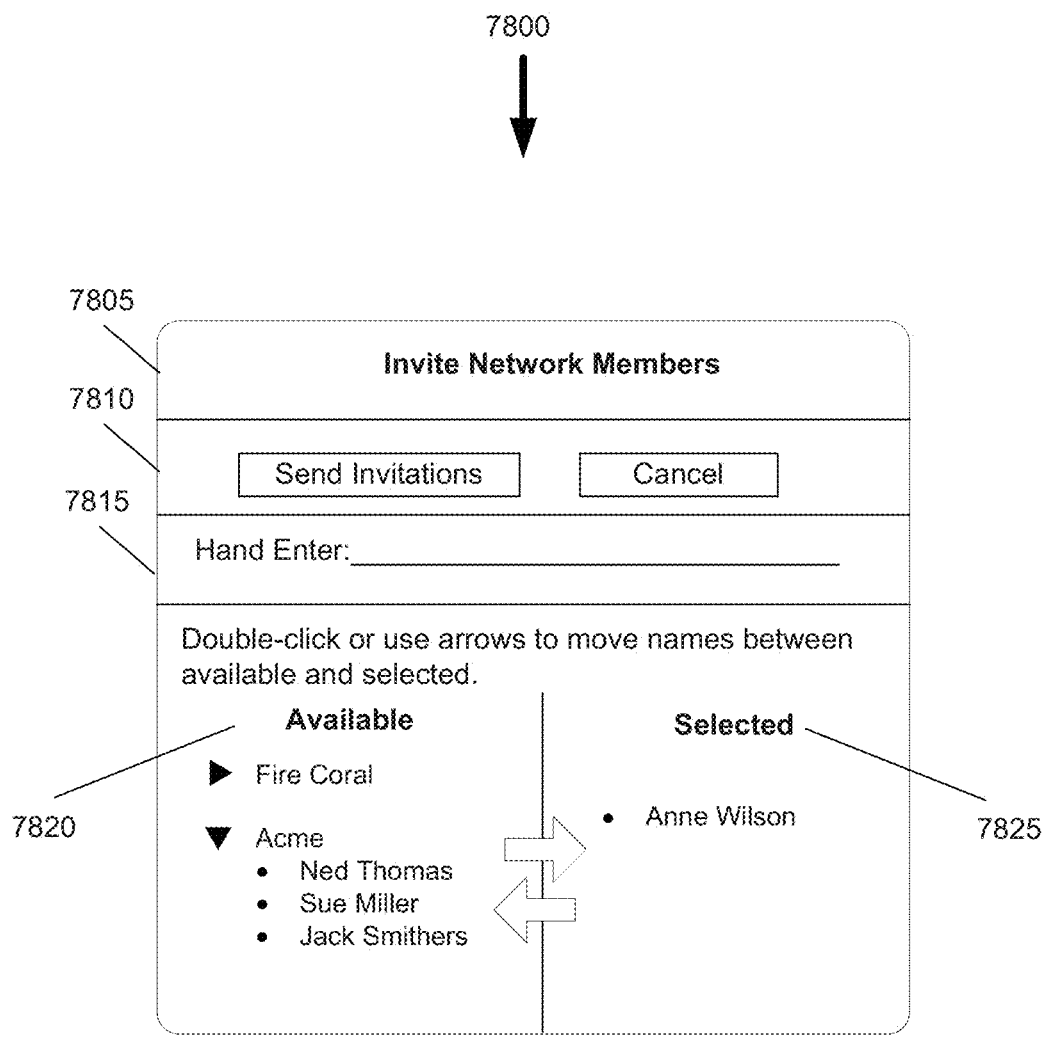
Figure 78. Invite Network Members Popup

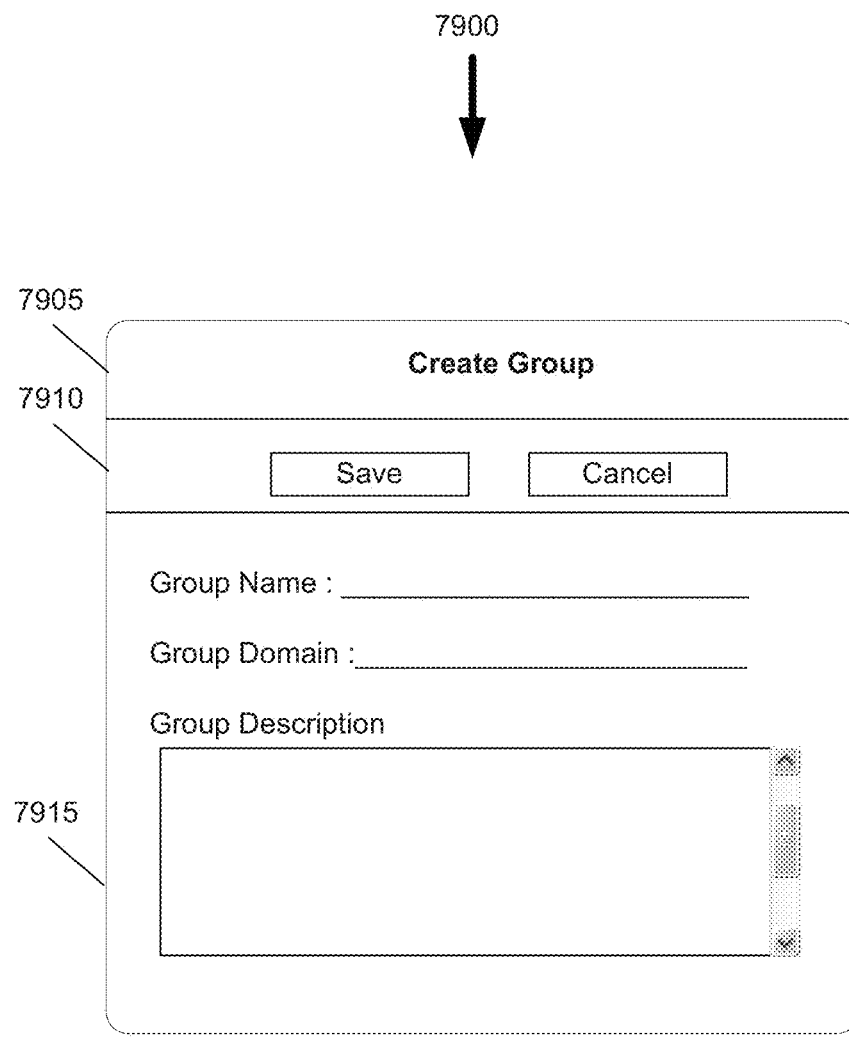
Figure 79. Create Group Popup

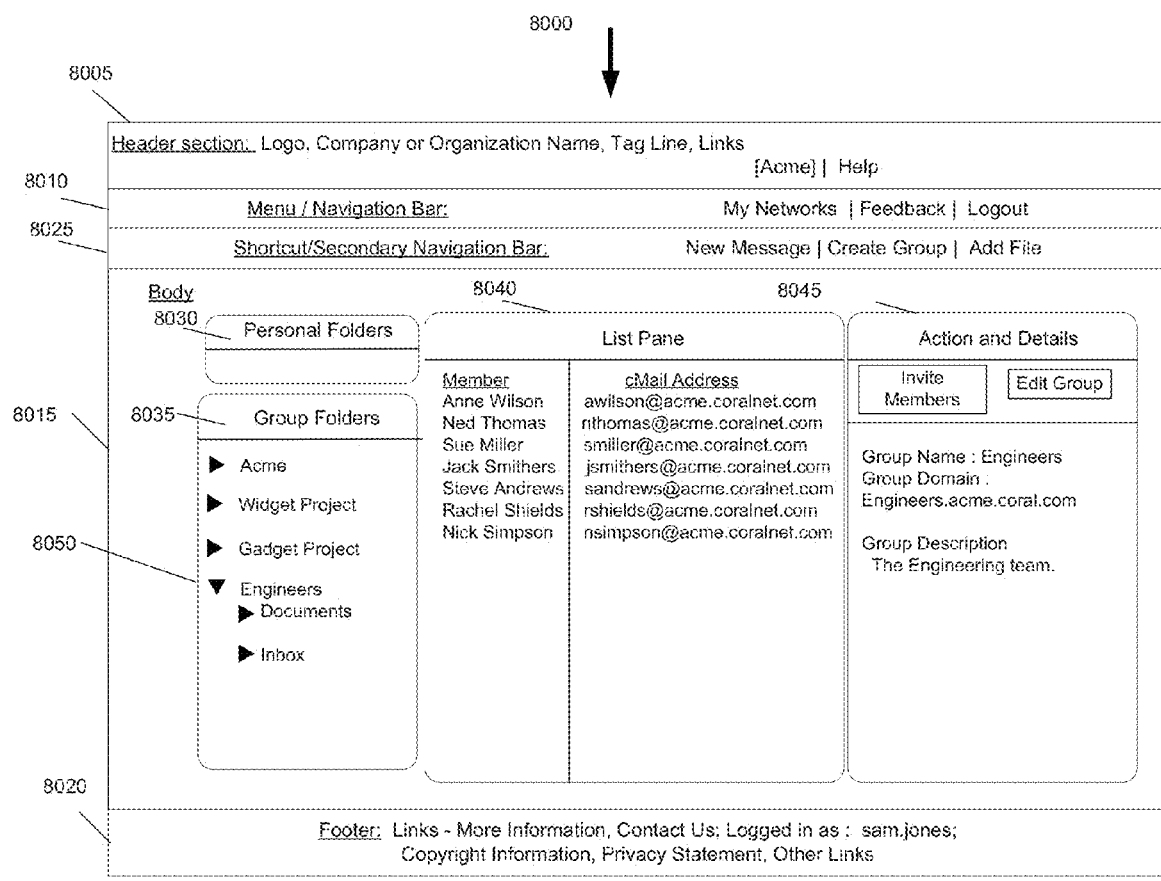
Figure 80. Group and Group Members View

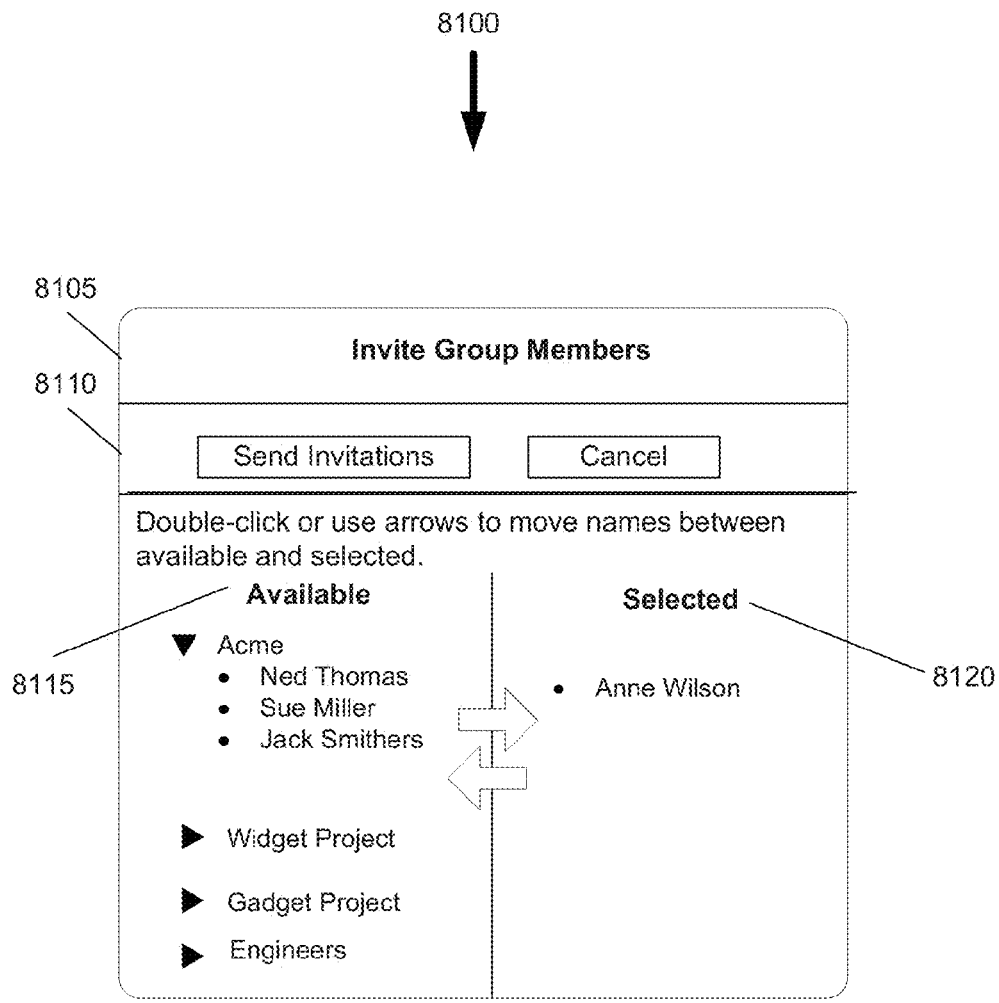
Figure 81. Invite Group Members Popup

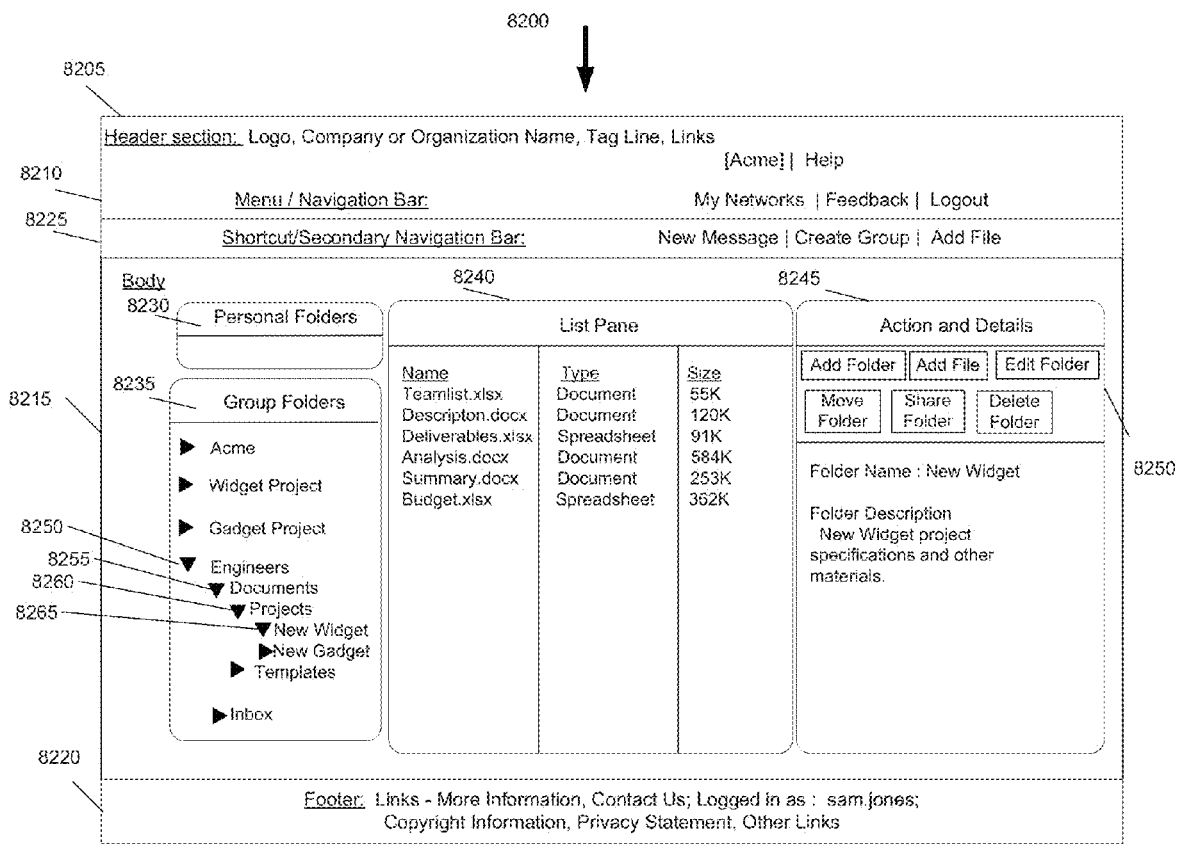
Figure 82. Group Folders Expanded View

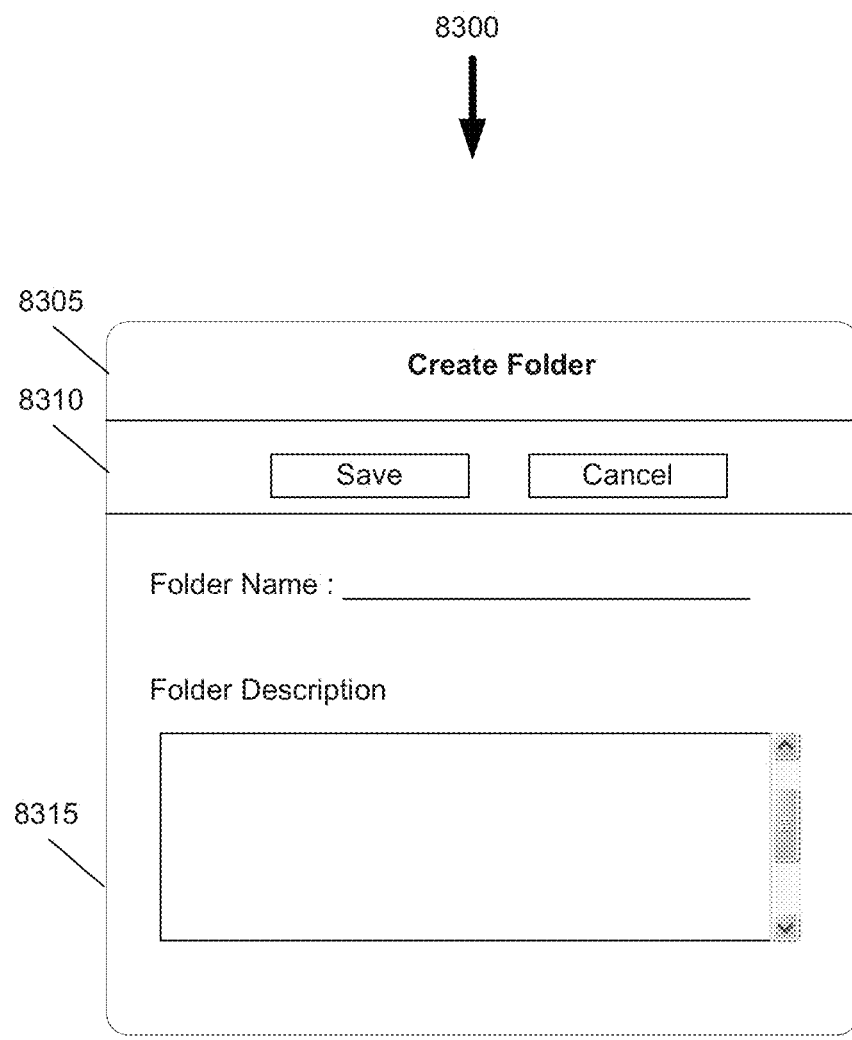
Figure 83. Create Folder Popup

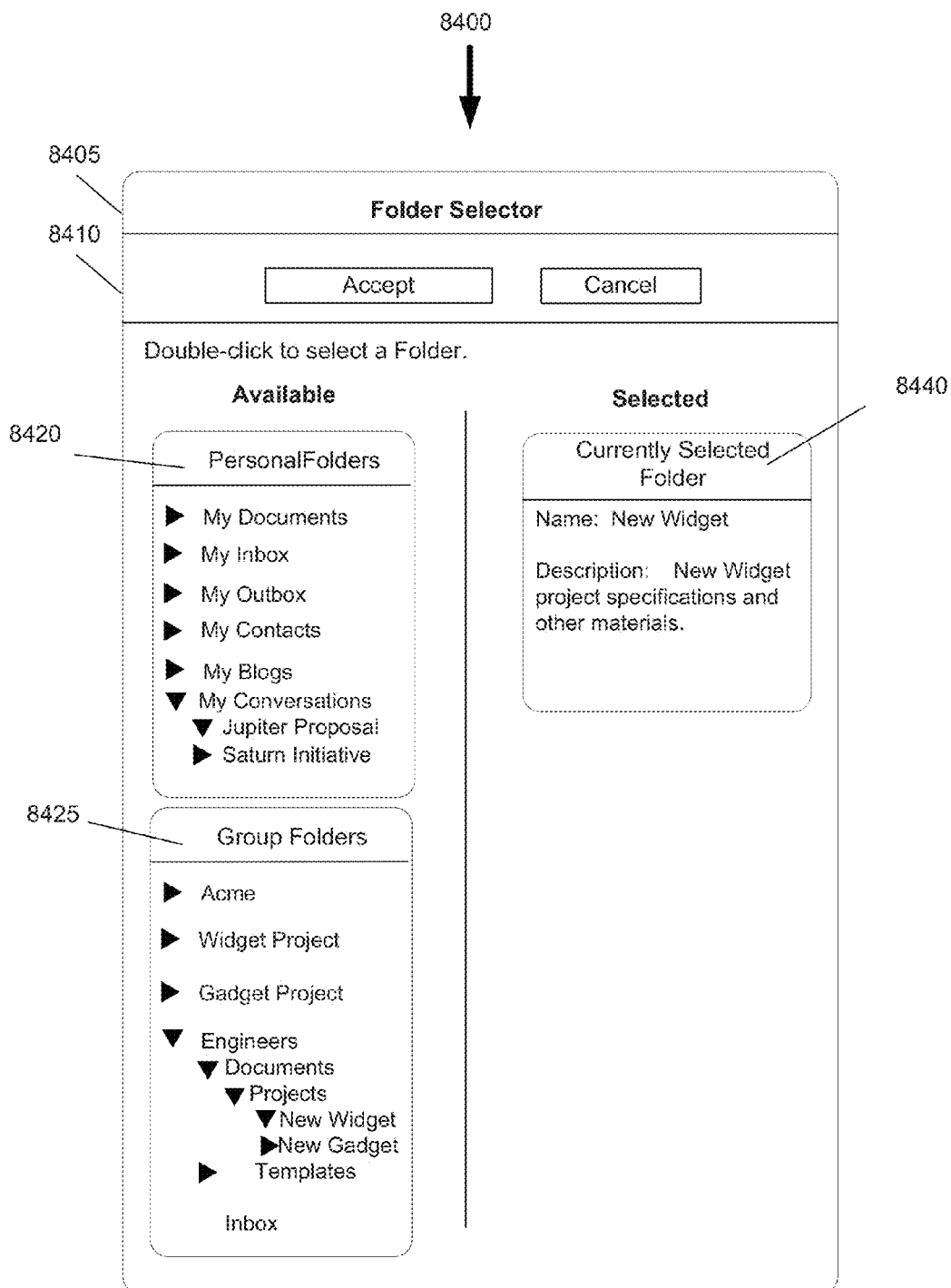
Figure 84. Move File or Folder Popup

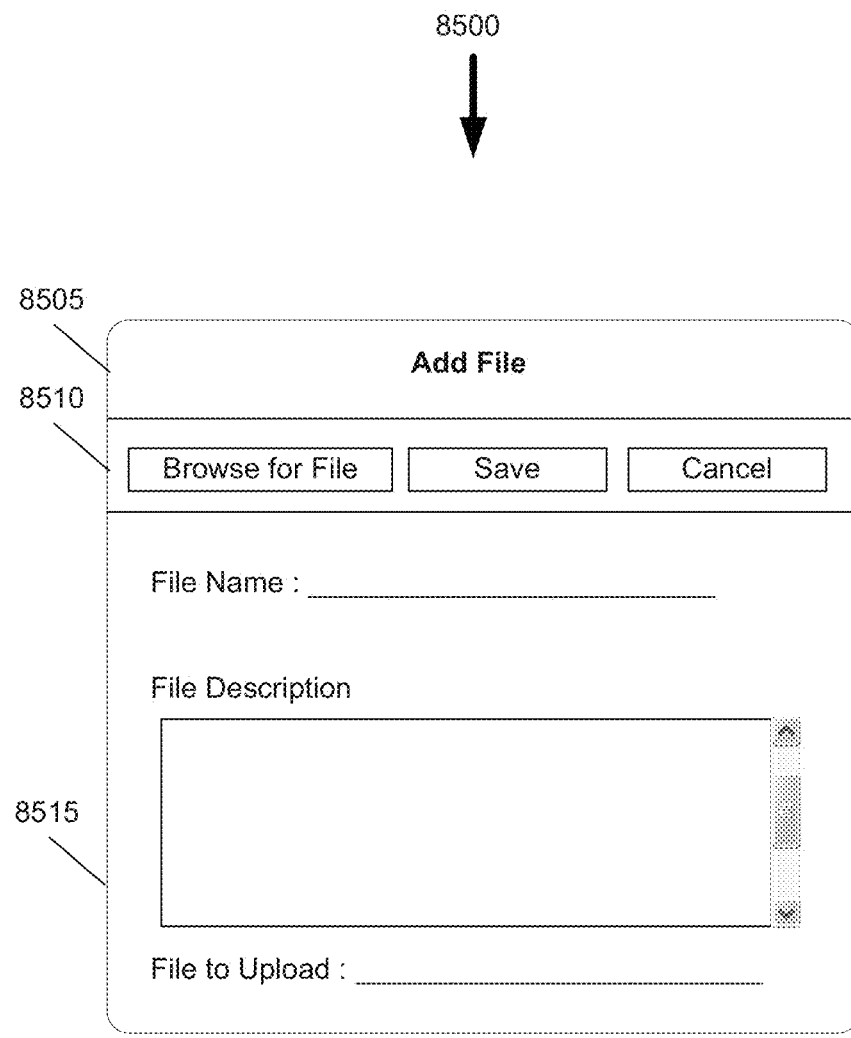
Figure 85. Add File Popup

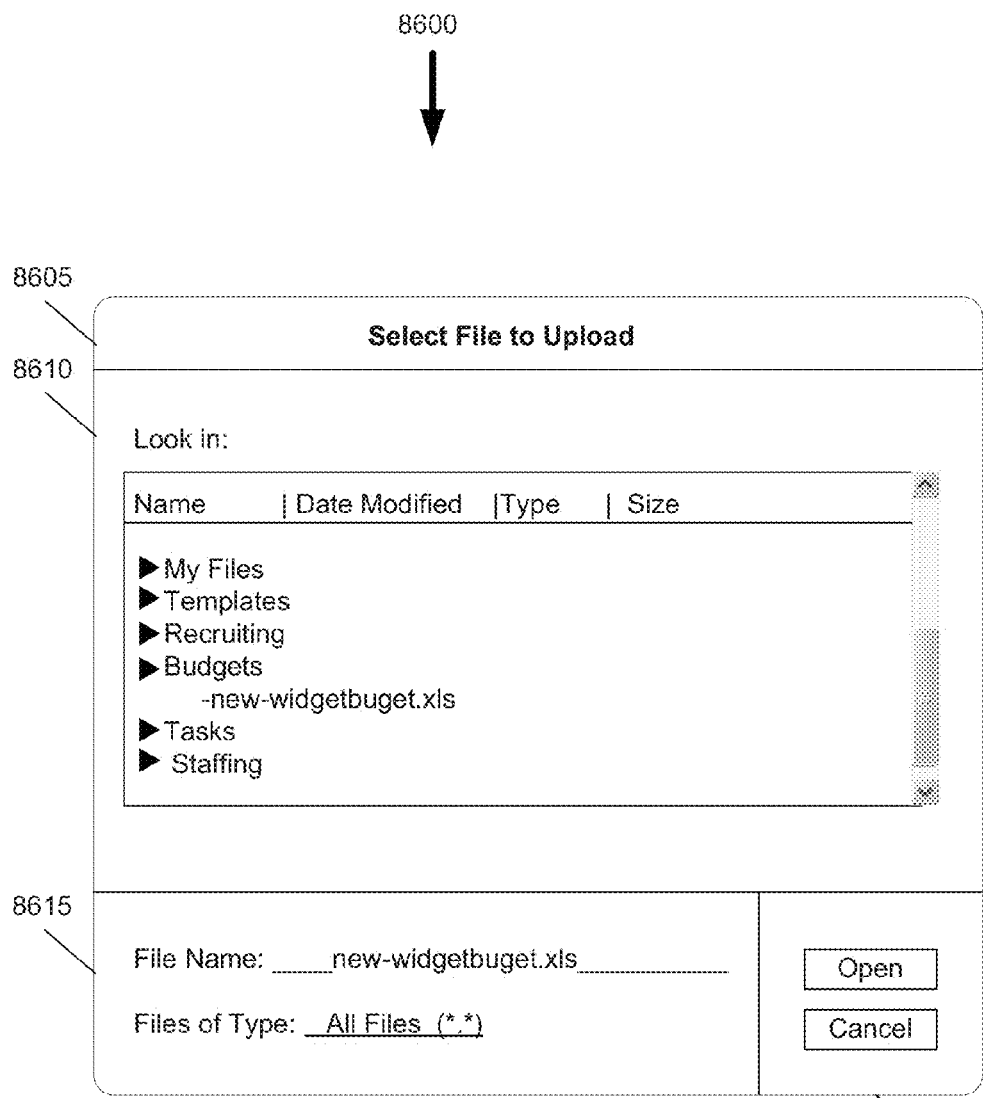
Figure 86. Select File to Upload Popup

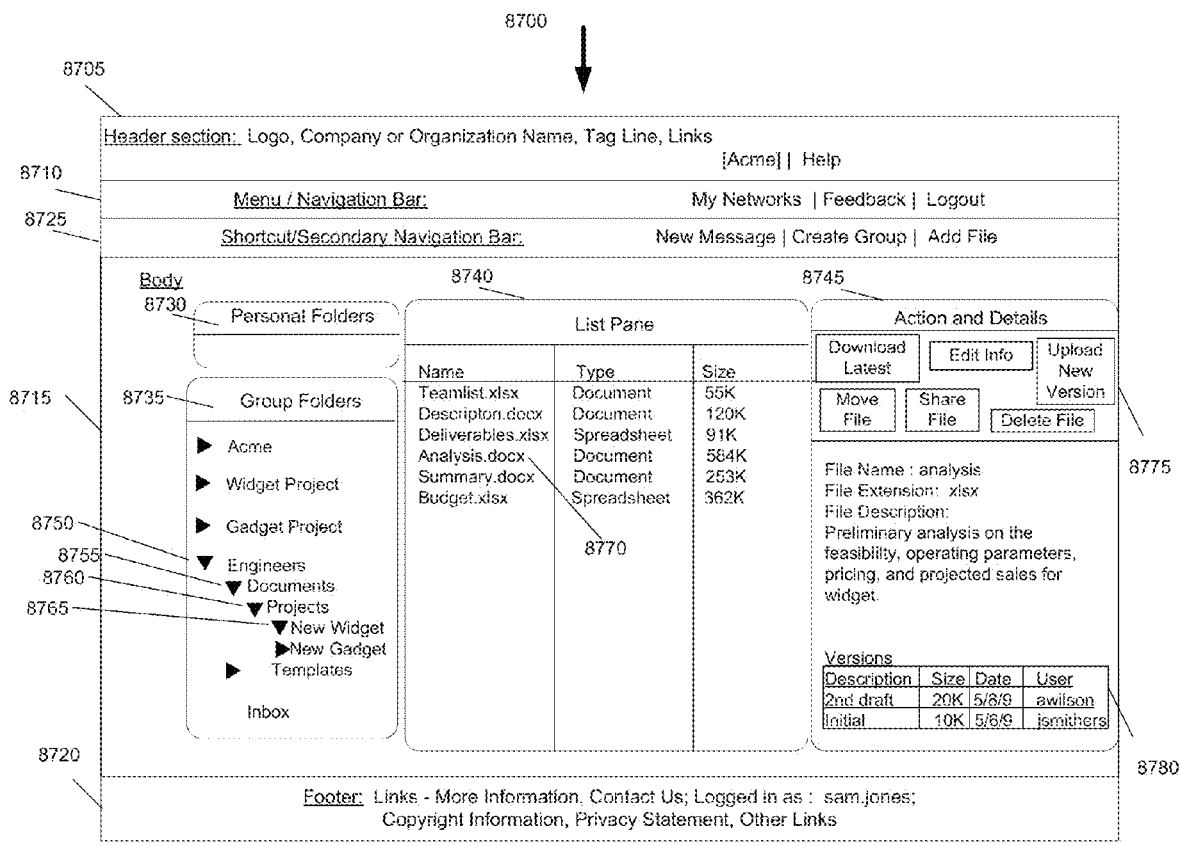
Figure 87. File Detail View

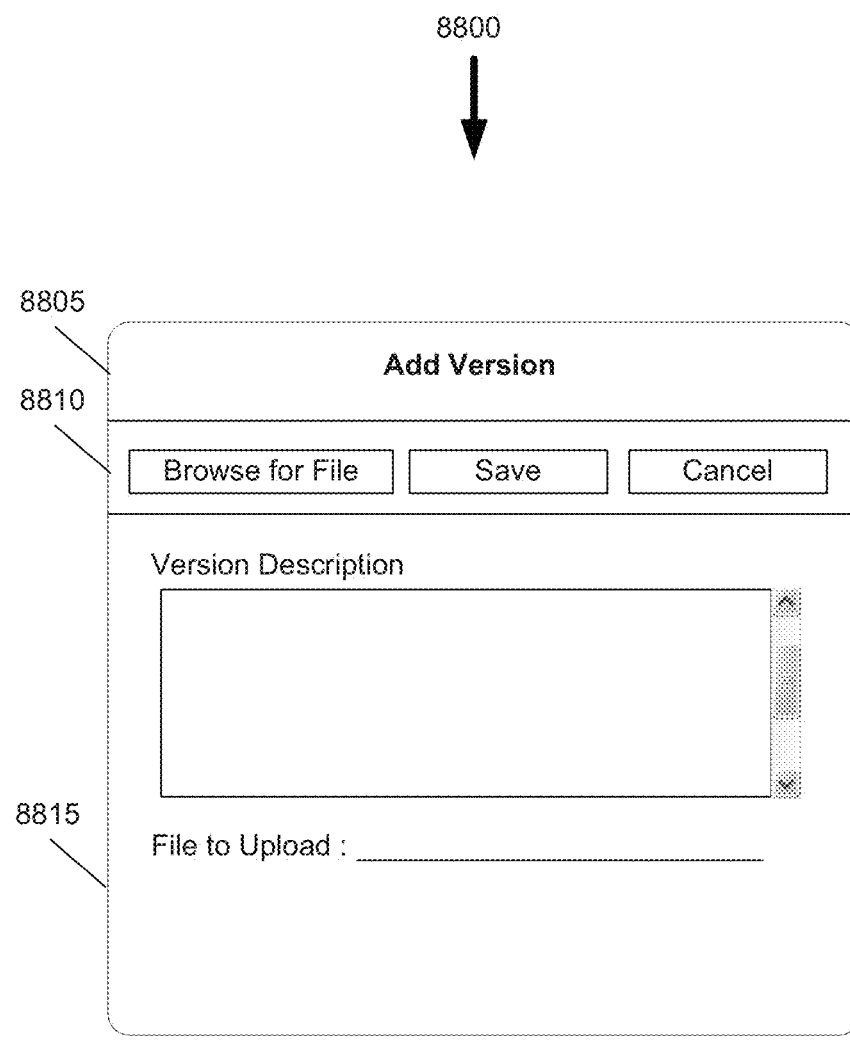
Figure 88. Add Version Popup

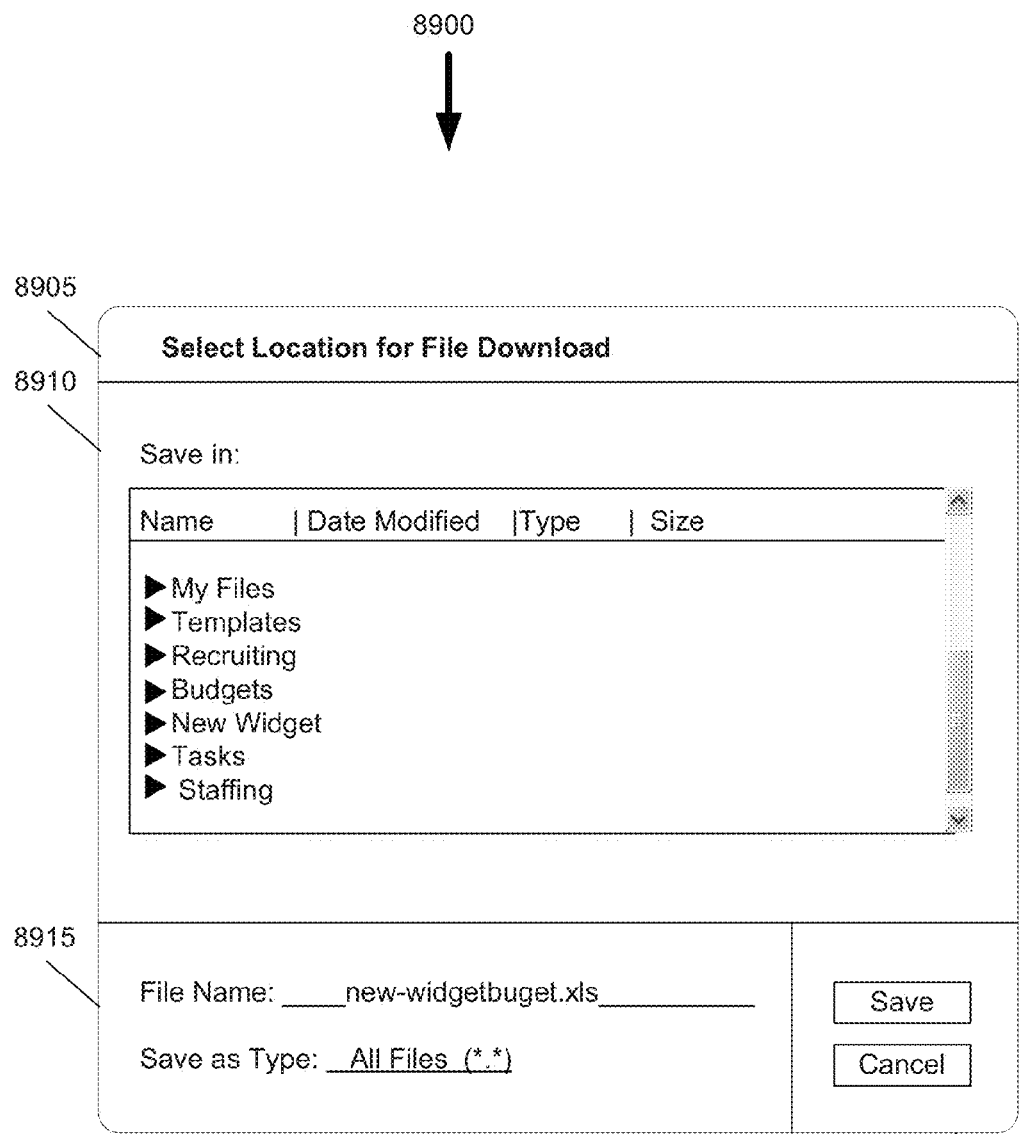
Figure 89. Download File Popup

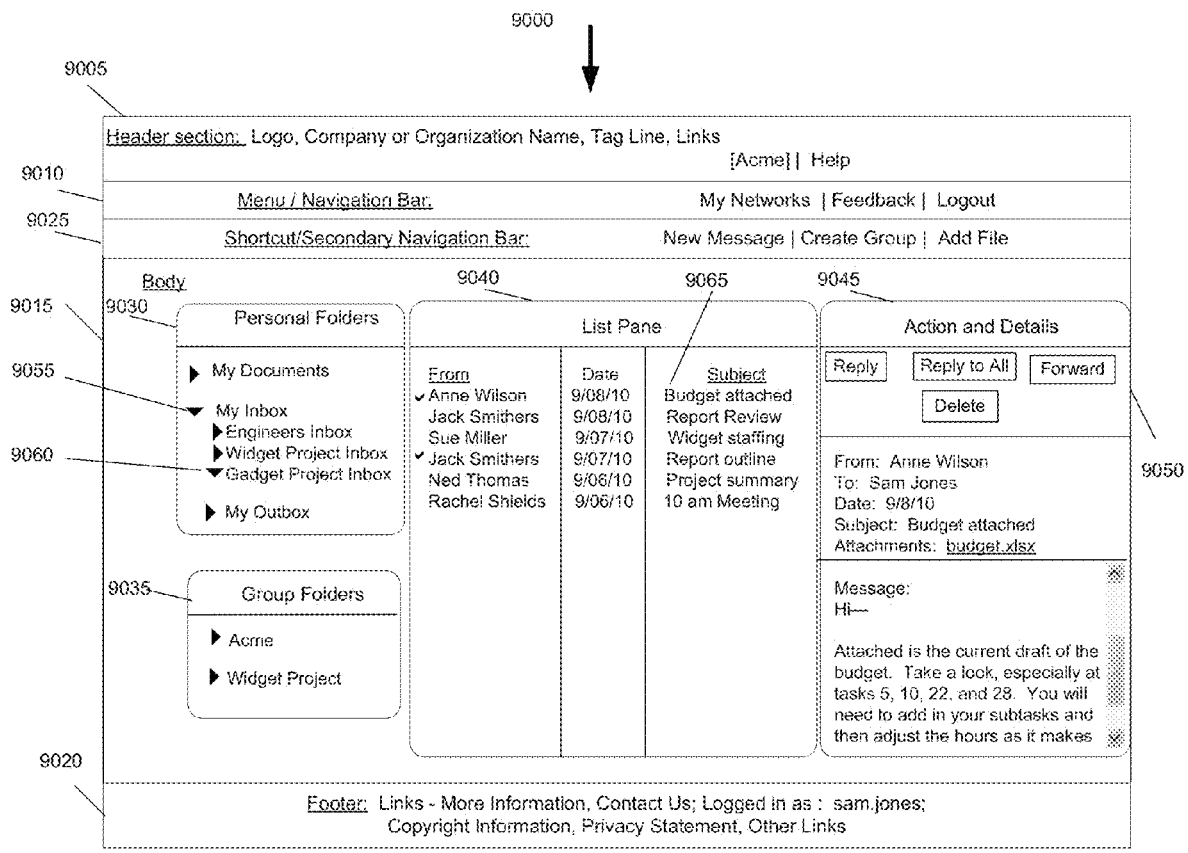
Figure 90. View Messages and Details

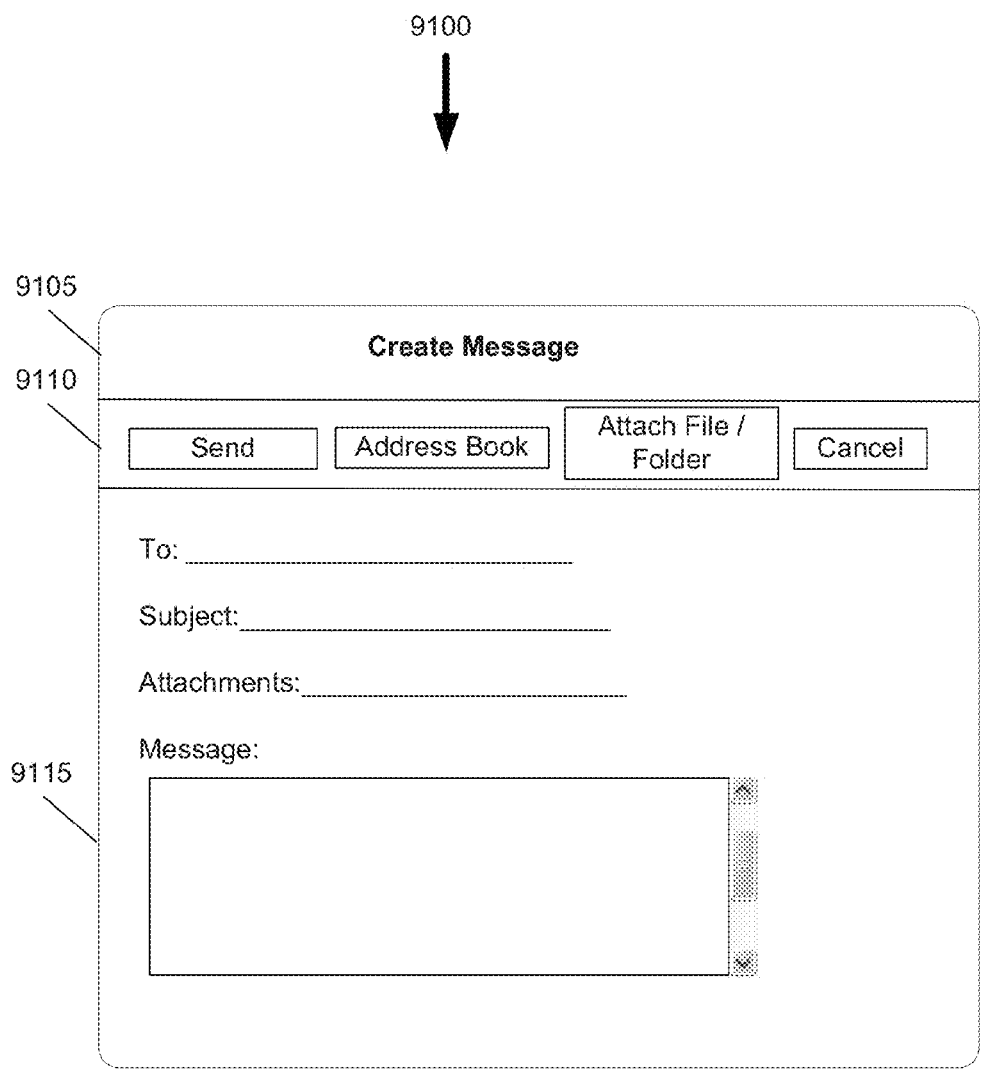
Figure 91. Create Message Popup

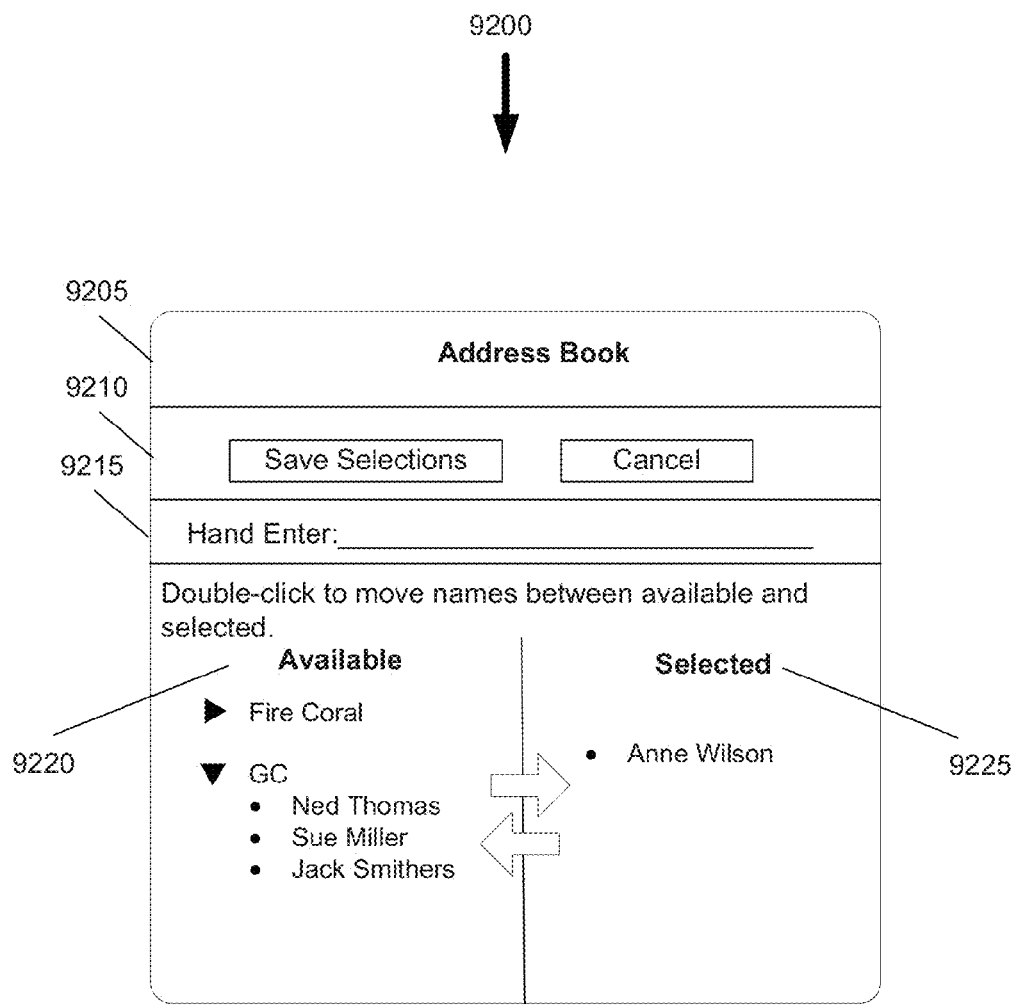
Figure 92. Address Book Popup

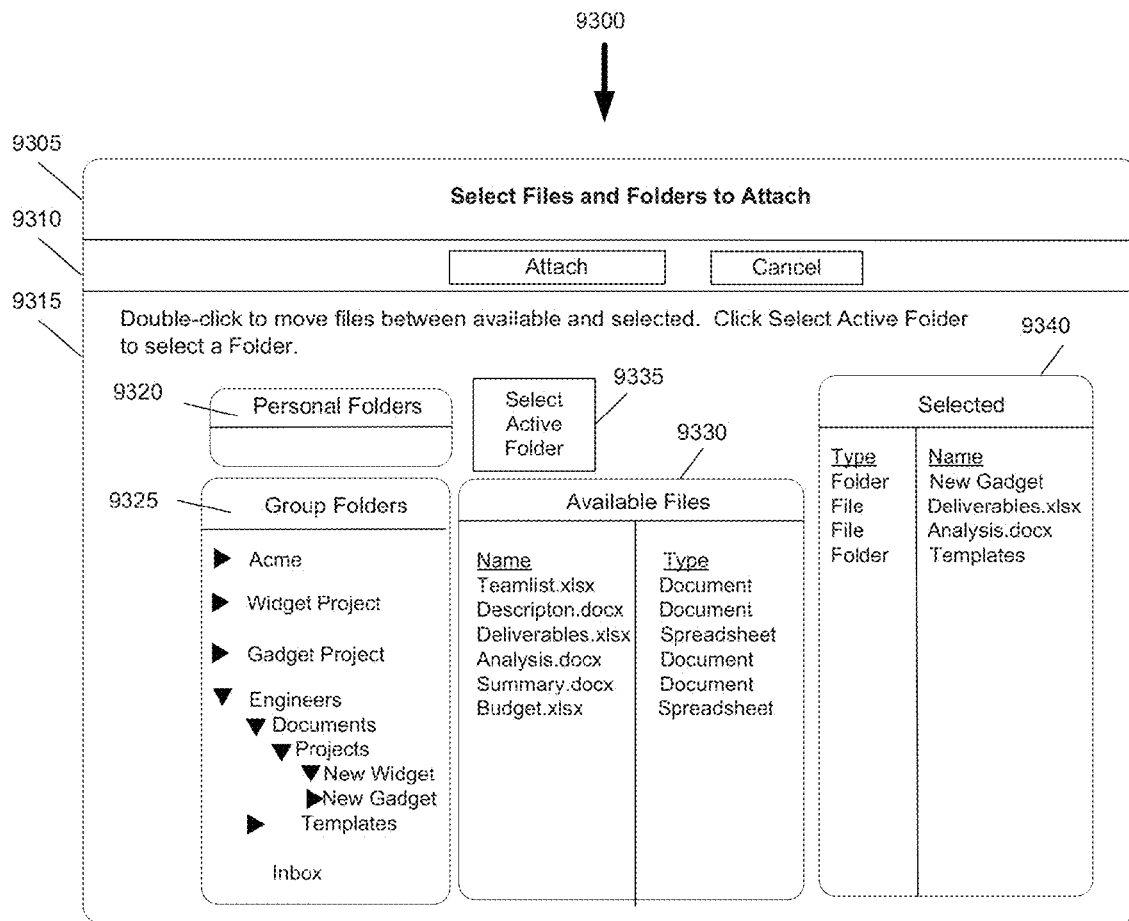
Figure 93. Attach Files and Folders Popup

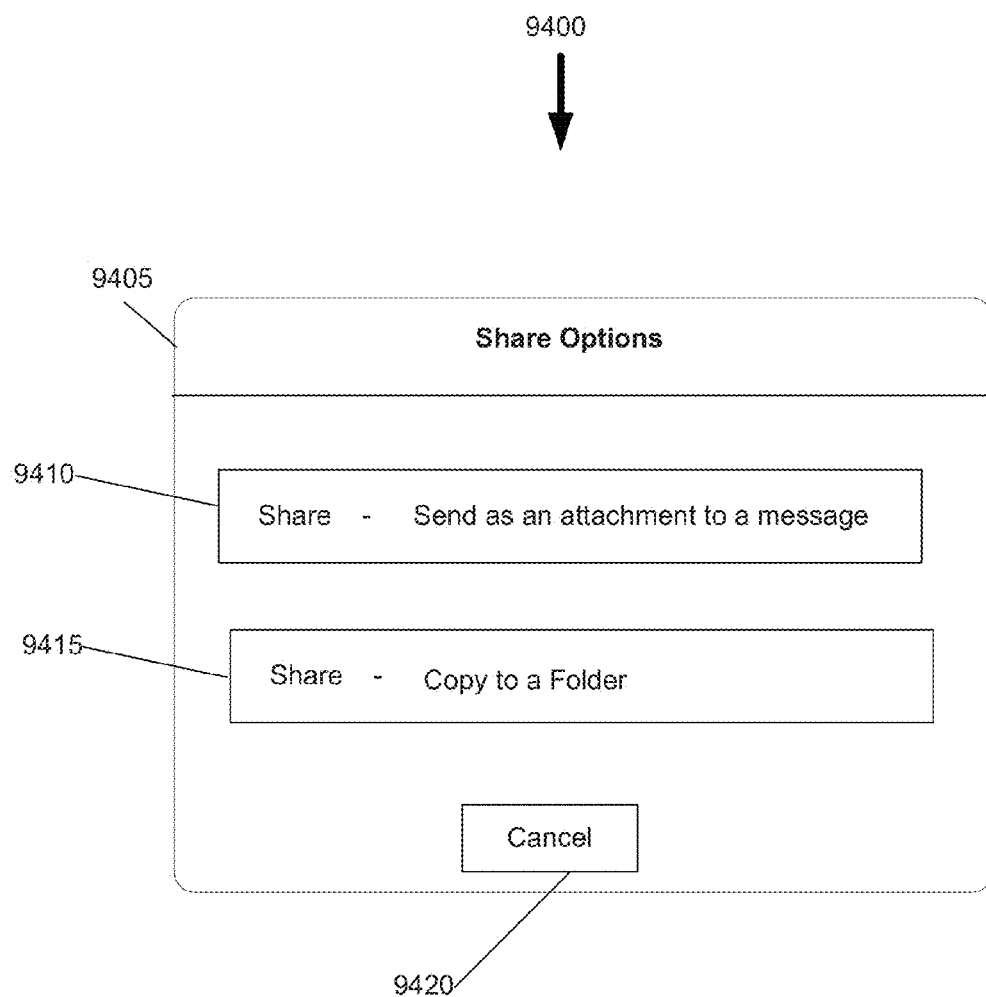
Figure 94. Options to Share File or Folder Popup

SYSTEM AND METHOD FOR A COMPUTER BASED FORMS LANGUAGE

CROSS-REFERENCE TO RELATED APPLICATIONS

This application claims priority and benefit of U.S. Provisional Application No. 61/355,864 filed on Jun. 17, 2010, entitled SYSTEM AND METHOD FOR A COMPUTER BASED FORMS LANGUAGE, the disclosure of which is incorporated herein in its entirety.

This application is also generally related to U.S. application Ser. No. 12/714,094 and is also generally related to U.S. application Ser. No. 13/155,601, and is also generally related to U.S. patent application Ser. No. 13/020,531.

BACKGROUND

1. Field of the Invention

The invention relates generally to information processing technology and, more specifically, to a system and method that generally provides for convergence and divergence of information in information streams, a database graph, or a database web distributed across a set of nodes, among other aspects.

2. Related Art

Systems of today, before this disclosure, do not capture the linkages needed to make information meaningful, do not manage change, and do not effectively manage the limited collection of primarily disconnected data that is captured, among other issues. Data becomes meaningful information as connections, or links, are made between other data in a collection. Data that are already known comprises a baseline of understanding; new, or differential data, are required to truly inform. Systems today are not designed to store, manage, distribute, and process differential data and the connections between data. Systems today manage a snapshot of known information with small set of selected linkages artificially applied as a result of key strategies or data analytics. A synopsis of the limitations of systems before this disclosure includes:

Databases typically snapshot the current state of the data it contains.

Updates to data in databases and other systems before the invention are typically completed by overwriting data, losing information history and evolution.

Databases before the disclosure include a small set of selectively predefined links, typically implemented primary key and foreign keys that are artificially specified by the database designer. Because most of the connections between data are lost, many of the links that give the data meaning and context are also lost.

Today's database structures are static and changes to structure are costly to implement, especially given the cost to update others system that use or supply data based on the statics structure.

Information management is ad hoc, resulting a proliferation of disconnected and orphaned data that requires after the fact indexing or tagging to reconstruct a subset of the linkage. This indexing strategy is applied to static data structures after they are populated, requiring continual re-analysis and re-indexing as content evolves.

Systems before this disclosure do not maintain change as a separate inspectable, discoverable, queryable object.

Today's systems before this disclosure do not make use of characteristics of immutability.

Today's systems do not typically allow retrieval of the state of information at any point in time.

Today's system before the disclosure cannot support the dichotomy of business: the need to share data and the need to keep data separate. Systems before the disclosure do not leverage the combination of immutability and relationships to allow information distributed across a system of nodes to cooperatively converge, creating cooperative advantage, and competitively diverge, creating competitive advantage, while at the same time maintaining the immutability and convergeability of the total data set.

Knowledge management systems of today, before the disclosure, depend largely on user-driven entry of tags or after the fact results of data analytics and insertion of artificial created links based on the analytic result. The success in populating tags is limited.

Today's systems before this disclosure do not support the implementation of systems and applications that can be distributed across a collection of virtual or physical nodes, maintaining a loose coupling of entities through characteristics of immutability and change.

Today's systems before this disclosure do not allow businesses or organizations to seamlessly move applications between Cloud environment, and between Cloud and non-Cloud environments, such as behind a firewall or on organization-maintained servers.

In today's systems before this disclosure, properties are just fields in a database rather than classes that can be reused, inherited, and updated in a way that does not require reworking existing structures and systems.

Overwriting: Today's systems before this disclosure typically change data by simply replacing and existing value with a new value. Historical values may be maintained, but an analyst must typically identify for which data historical values are important; software developers and database administrators must then write software to manage the process of inserting a new data item, storing historical entries for the new data item, and associating the historical values with the new data item.

Synchronization: Synchronizing data in today's distributed systems before this disclosure is nearly impossible. Data changes on one or more distribution nodes are nearly impossible to capture and push to all other nodes without other changes occurring before the updates are completed, frequently resulting in orphaned data, conflicting data, and synchronization problems. Reconciling data typically stoppage of the systems and/or development of additional software.

Today's system typically cannot interoperate without writing custom software using tools such as XML/web services, SOAP and REST, and custom information exchange protocols.

Today's system link data through uncharacterized constructs, such as left joins and right joins and outer joins. The linkages provide no information about the context of the link; the context must be inferred based on what is being linked, the report that uses the link, the business rules in the query used to create a linkage, and the like.

Today's technology is focused on self-contained, fully-defined software-based computer systems that operate on and through the use of a specific set of information representations. The information representations are often poor models of reality as they are constrained by that availability of a limited set of static data types.

Today's "systems" collect data corresponding to the target information representation, the data may be stored in databases, and the systems manipulate, analyze, and report on the data. The possible execution paths of the systems are fully defined, and the systems programming logic may execute from a starting point to one or more specified endpoints.

Today's computer systems are typically limited by one or more of the following, among other limitations:

Static and constrained information representations: each system may operate on a constrained set of information that is force-fit into a static representation that once defined, cannot be readily changed;

Location and format/lack of interoperability: some of the data needed to properly complete an analysis or create a report may be collected by a different system, may be in a different format, or may be in a different location. Data cannot be easily shared between systems, a convoluted set of formatting, transfer, parsing, and reformatting procedures must be programmed to enable sharing;

Limited ability to represent and adapt to changing information structures: system inputs, outputs, and intermediate information representations must be fully defined prior to system development using the limited set of static data types available today. Typically, the system can only operate using those static information representations and cannot be easily adjusted when real-world changes to the information representation become apparent;

Stove-piped nature of data: data are not inherently relational; each data element must be explicitly linked to other data elements to create an information representation;

Mutability: data in systems are constantly changed with typically no maintenance of history: in cases where history is maintained, it requires specialized programs or software, and in many cases can only be retrieved through a complicated set of roll-back procedures;

Static execution paths and end states: an execution path or end state not defined before the system was programmed cannot be readily implemented.

SUMMARY OF THE DISCLOSURE

The principles of the invention described in this disclosure satisfies the above needs and avoids the drawbacks of the prior art by providing a computational platform that includes combining an object model and a programming model into a single set of constructs (e.g., Forms, Relations, Entities, Relationships). These constructs may provide characteristics of inheritance, linkage, immutability, versioning and substitution in a single structure that may store objects, process, and instructions/programs, and provide for convergence and divergence of information in information streams, a database graph, or a database web distributable across a set of nodes for use by consumers and producers of the information. Other aspects include the following.

In one aspect, a distributable electronic database embodied in a tangible medium and readable by a computer is provided, the distributable electronic database including a first information stream maintained in the tangible medium including at least one entity and at least one relationship entity wherein the relationship entity signifies a change with respect to at least one other entity or at least one other relationship entity, wherein a relationship entity is also a type of entity, and wherein every entity includes immutable data so that a change in the state of the distributable electronic database is reflected by the addition of a new entity to the first information stream.

In another aspect, a distributed system for improved information and knowledge management is provided including a first information stream associated with a first node in a system of computer-based nodes, a second information stream associated with a second node in a system of computer-based nodes, wherein the first information stream and the second information stream are mutually appendable with respect to the other at any node in the system of computer-based nodes so that the web is expandable by adding new relationship entities to any of the streams, wherein the first information stream and second information stream comprise a plurality of entities representing information and each stream further comprises relationship entities, each relationship entity referencing at least one of the plurality of entities and signifying at least one change to the at least one of the plurality of entities so that the information content associated with the referenced entity is logically changed while preserving the immutability of the referenced entity.

In another aspect, a computer implemented method embodied as computer code in a non-transitory computer readable medium for managing convergence and divergence of information in a system of nodes is provided, the computer code when read and executed by a computer performing the steps of creating a first stream at a first node of a plurality of nodes, the first stream comprising a first set of entities including a first relationship entity, creating a second stream at a second node of the plurality of nodes, the second stream comprising a second set of entities including a second relationship entity, diverging the first stream in relation to the second stream by appending a third set of additional entities to the first stream, diverging the second stream in relation to the first stream by appending a fourth set of additional entities to the second stream, whereby the expanding first stream includes information causing asymmetry in relation to the information in the second stream and the second stream includes information causing asymmetry in relation to the information in the first stream, converging the first stream and the second stream by appending a subset of one of the streams to the other stream producing a converged stream at a point in time, while the first stream and second stream each continue to simultaneously diverge after the point in time through appending the first set of additional new entities to the first stream and the second set of additional new entities to the second stream.

In yet another aspect, a computer-implemented method embodied as computer logic in a non-transitory computer readable storage medium, the computer logic when read and executed by a computer performing the steps of creating an executable function for at least one relation corresponding to at least one property on a first form defining a class of entities, the at least one relation defined by a second form that includes two additional relations being a left side relation and a right side relation, the executable function having an input and having an output, wherein the input is an instance of the first form pointed to by the left side relation of the second form and the output includes at least one instance of a third form pointed to by the right side relation of the second form, and executing the executable function to provide an instance of the first form pointed to by the left side relation and the executable function identifying and retrieving all instances of all third forms pointed to by the right side relation that are discoverable outputs of the second form for the executing function, providing a web of linked entities instantiated from the forms defining the classes of entities so that the web of linked entities provides at least one immutable stream of information that is at least one of readable, searchable, traversable, appendable, expandable and shareable by producers and/or consumers of the stream of information.

In another aspect, a database embodied in a tangible medium and readable by a computer, the database including a stream maintained in the tangible medium wherein the stream comprises a set of entities, including form entities that describe a total set of all entities in the stream, and the stream further comprising relationship entities that signify changes to the set of entities including changes to any form entities in the stream, thereby the stream is self-describing and self-contained and is propagatable across a network of nodes.

In another aspect, a computer-implemented method for creating or maintaining a database embodied as computer code in a tangible computer readable storage medium that when read and executed by the computer performs the steps of creating a stream by a computing device wherein the stream comprises a set of entities, including form entities that describe a total set of all entities in the stream, and the stream further comprises relationship entities that signify changes to the set of entities including changes to any form entities in the stream, thereby the stream is self-describing and self-contained and is propagatable across a network of nodes, and propagating the stream from at least one node to another node in a network of nodes for use by a consumer of the stream.

In another aspect, a computer-implemented method embodied as computer programming code embodied on a non-transitory storage medium that when read and executed causes the following steps to be performed: creating an information stream, the stream including at least one entity and at least one relationship entity wherein the relationship entity signifies a change with respect to at least one other entity or signifies a change to at least one other relationship entity, wherein a relationship entity is also a type of entity, and reflecting a change in a state of the information stream by addition of a new entity to the information stream, wherein every entity includes immutable data.

In another aspect, a computer-implemented method for creating or maintaining a distributed web for improved information and knowledge management embodied as computer code in a tangible computer readable storage medium that when read and executed by the computer performs the steps of: creating a first information stream associated with a first node in a system of computer-based nodes, creating a second information stream associated with a second node in a system of computer-based nodes, appending one of: the first information stream and the second information stream with respect to the other at any node in the system of computer-based nodes so that the distributed web is expanded by adding new relationship entities to any of the streams, wherein the first information stream and second information stream comprise a plurality of entities representing information and each stream further comprises relationship entities, each relationship entity referencing at least one of the plurality of entities and signifying at least one change to the at least one of the plurality of entities so that the information content associated with the referenced entity is logically changed while preserving the immutability of the referenced entity.

BRIEF DESCRIPTION OF THE DRAWINGS

The accompanying drawings, which are included to provide a further understanding of the invention, are incorporated in and constitute a part of this specification, illustrate aspects of the invention and together with the detailed description serve to explain the principles of the invention. No attempt is made to show structural details of the invention in more detail than may be necessary for a fundamental understanding of the invention and the various ways in which it may be practiced. In the drawings:

FIG. 1 is an exemplary illustration of a simplified example of Form Inheritance and Subclassing, configured according to the principles of the disclosure;

FIG. 2 is an exemplary illustration of an architecture of an example system, configured according to the principles of the disclosure;

FIG. 3 is an exemplary illustration of an architecture of an example Node, configured according to the principles of the disclosure;

FIG. 4 is an exemplary illustration of Forms, Relations, and Corresponding Relations configured according to the principles of the disclosure;

FIG. 5 is an exemplary illustration of a Relation Form, configured according to the principles of the disclosure;

FIG. 6 is an exemplary illustration of an example Name Relation Form with Left Side Relation and Right Side Relation, configured according to the principles of the disclosure;

FIG. 7 is an exemplary illustration of an example Variant Child (Subfolder) Relation, configured according to the principles of the disclosure;

FIG. 8 is an exemplary illustration of a Relationship Entity Signifying Change to a Variant Relation, configured according to the principles of the disclosure;

FIG. 9 is an exemplary illustration of an Invariant Relation, configured according to the principles of the disclosure;

FIG. 10 is an illustration of a simplified example of a Substitution Relationship, configured according to the principles of the disclosure;

FIG. 11 is an illustration of an example Form Form, configured according to the principles of the disclosure;

FIG. 12 is an illustration of an example Entity Form, configured according to the principles of the disclosure;

FIG. 13 is an illustration of an example Relation Form, configured according to the principles of the disclosure;

FIG. 14 is an illustration of an example Relationship Form, configured according to the principles of the disclosure;

FIG. 15 is an illustration of an example Primitive Form, configured according to the principles of the disclosure;

FIG. 16 is an illustration of an example Substitution Relationship Form, configured according to the principles of the disclosure;

FIG. 17 is an illustration of an example Attribute Relationship Form, configured according to the principles of the disclosure;

FIG. 18 is an illustration of an example Versioned Attribute Relationship Form, configured according to the principles of the disclosure;

FIG. 19 is an illustration of an example Element Relationship Form, configured according to the principles of the disclosure;

FIG. 20 is an illustration of an example Property Relationship Form, configured according to the principles of the disclosure;

FIG. 21 is an illustration of an example Ownership Relationship Form, configured according to the principles of the disclosure;

FIG. 22 is an illustration of an example Content Form configured according to the principles of the disclosure;

FIG. 23 is an illustration of an example Folder Form, configured according to the principles of the disclosure;

FIG. 24 is an illustration of an example Containment Relationship Form, configured according to the principles of the disclosure;

FIG. 25 is an illustration of an example NullEntity Form, configured according to the principles of the disclosure;

FIG. 26 is an example flow diagram for the process of Creating and Executing Functions for Relations, configured according to the principles of the disclosure;

FIG. 27 is an illustration of an example Function Form, configured according to the principles of the disclosure;

FIG. 28 is an illustration of Pseudocode and Inheritance for Add Function, configured according to the principles of the disclosure;

FIG. 29, is an illustration of exemplary Pseudocode and Inheritance for Divide Function, configured according to the principles of the disclosure;

FIG. 30 is an example process flow for Creating and Propagating Streams in a Network of Nodes;

FIG. 31 is an illustration of an example Group Form, configured according to the principles of the disclosure;

FIG. 32 is an example process flow for Expanding the Distributed Web by Appending Information Streams;

FIG. 33 is an illustration of an example Message Form, configured according to the principles of the disclosure;

FIG. 34 is an illustration of an example File Form, configured according to the principles of the disclosure;

FIG. 35 is an illustration of an example Network Form, configured according to the principles of the disclosure;

FIG. 36 is an illustration of an example User Form, configured according to the principles of the disclosure;

FIG. 37 is an illustration of an example Invariant Relation Form, configured according to the principles of the disclosure;

FIG. 38 is an illustration of an example Invariant Relation Form, configured according to the principles of the disclosure;

FIG. 39 is an exemplary illustration of a Subclassing Forms and Relations, configured according to the principles of the disclosure;

FIG. 40 is an exemplary illustration of Mapping a Form with Invariant Relations to a Database, configured according to the principles of the disclosure;

FIG. 41 is an exemplary illustration of Mapping Invariant Relations of an Entity to a Database Table, configured according to the principles of the disclosure;

FIGS. 42A and 42B are an exemplary flow chart of a Process Flow for Writing Entities to a Database, performed according to the principles of the disclosure;

FIG. 43A is an exemplary illustration of a Person Entity and Referenced Entities, including several Relation Types, configured according to the principles of the disclosure;

FIG. 43B is a continuation of the exemplary illustration of FIG. 43A, that includes an example writing of several Entity Types to a Table in a Database, configured according to the principles of the disclosure;

FIG. 44 is an illustration of an example Static Typing, configured according to the principles of the disclosure;

FIG. 45 is an illustration of an example of Mapping a Statically Typed Invariant Property to a Tuplebase, configured according to the principles of the disclosure;

FIG. 46A is an illustration of an example Relational Bridge Joining Two Forms, configured according to the principles of the disclosure;

FIG. 46B is an illustration of an example Relational Bridge Joining Three Forms through Two Invariant Relations, configured according to the principles of the disclosure;

FIG. 47 is an illustration of an example Relation Walking Between a Parent Folder Entity and a Child Folder Entity, configured according to the principles of the disclosure;

FIG. 48 is an illustration of an example Relation Walking Between a Child Folder Entity and a Parent Folder Entity, configured according to the principles of the disclosure;

FIG. 49 is an illustration of an additional example of Relation Walking Between a Parent Folder Entity and a Child Folder Entity, configured according to the principles of the disclosure;

FIG. 50 is a flowchart of an exemplary Process Flow For Traversing Relations, performed according to the principles of the disclosure;

FIG. 51A is a flow diagram of an exemplary Substitution Process Flow, performed according to the principles of the disclosure;

FIG. 51B is a flow diagram of an exemplary Substitution Process Flow, performed according to the principles of the disclosure;

FIG. 52 is an exemplary illustration of an example of Retrieving Entity State, configured according to the principles of the disclosure;

FIG. 53 is an illustration of an exemplary Information Stream, configured according to the principles of the disclosure;

FIG. 54 is an illustration of an exemplary Simplified Conceptual View of Writing Person Entity and Related Entities to an Information Stream, configured according to the principles of the disclosure;

FIG. 55A is an exemplary illustration of Appending Substitution Relationship Entities to an Information Stream, configured according to the principles of the disclosure;

FIG. 55B is an example process flow for Creating Information Streams and Reflecting Change in State by the Addition of New Entities, configured according to the principles of the disclosure;

FIG. 56 is an illustration of an example of Writing Streams for Single Containment Relationship, configured according to the principles of the disclosure;

FIG. 57 is an illustration of an example of Writing Streams for Multiple Containment Relationship, configured according to the principles of the disclosure;

FIG. 58 is an illustration of an example of Writing Streams for Multiple Containment and Other Relationships, configured according to the principles of the disclosure;

FIG. 59 is an example process flow for Converging and Diverging Streams in a system of nodes, configured according to the principles of the disclosure;

FIG. 60 is an illustration of an example Forms Language Class Hierarchy, configured according to the principles of the disclosure;

FIG. 61 is an illustration of an example Login Page, configured according to the principles of the disclosure;

FIG. 62 is an illustration of an example Create Account—Enter Account Information Page, configured according to the principles of the disclosure;

FIG. 63 is an illustration of an example Create Account—Terms and Conditions of Use, configured according to the principles of the disclosure;

FIG. 64 is an illustration of an example Create Account—Confirm Account Information Page, configured according to the principles of the disclosure;

FIG. 65 is an illustration of an example Create Account—Next Steps, configured according to the principles of the disclosure;

FIG. 66 is an illustration of an example Create Account—Email with Instructions to Verify Account Creation Request, configured according to the principles of the disclosure;

FIG. 67 is an illustration of an example Verify Account Creation Page, configured according to the principles of the disclosure;

FIG. 68 is an illustration of an example My Networks Page, configured according to the principles of the disclosure;

FIG. 69 is an illustration of an example Create Network—Enter Network Name and Description, configured according to the principles of the disclosure;

FIG. 70 is an illustration of an example Create Network—Enter Network Contact and Security Information, configured according to the principles of the disclosure;

FIG. 71 is an illustration of an example Create Network—Select a Network Plan, configured according to the principles of the disclosure;

Figure 72:
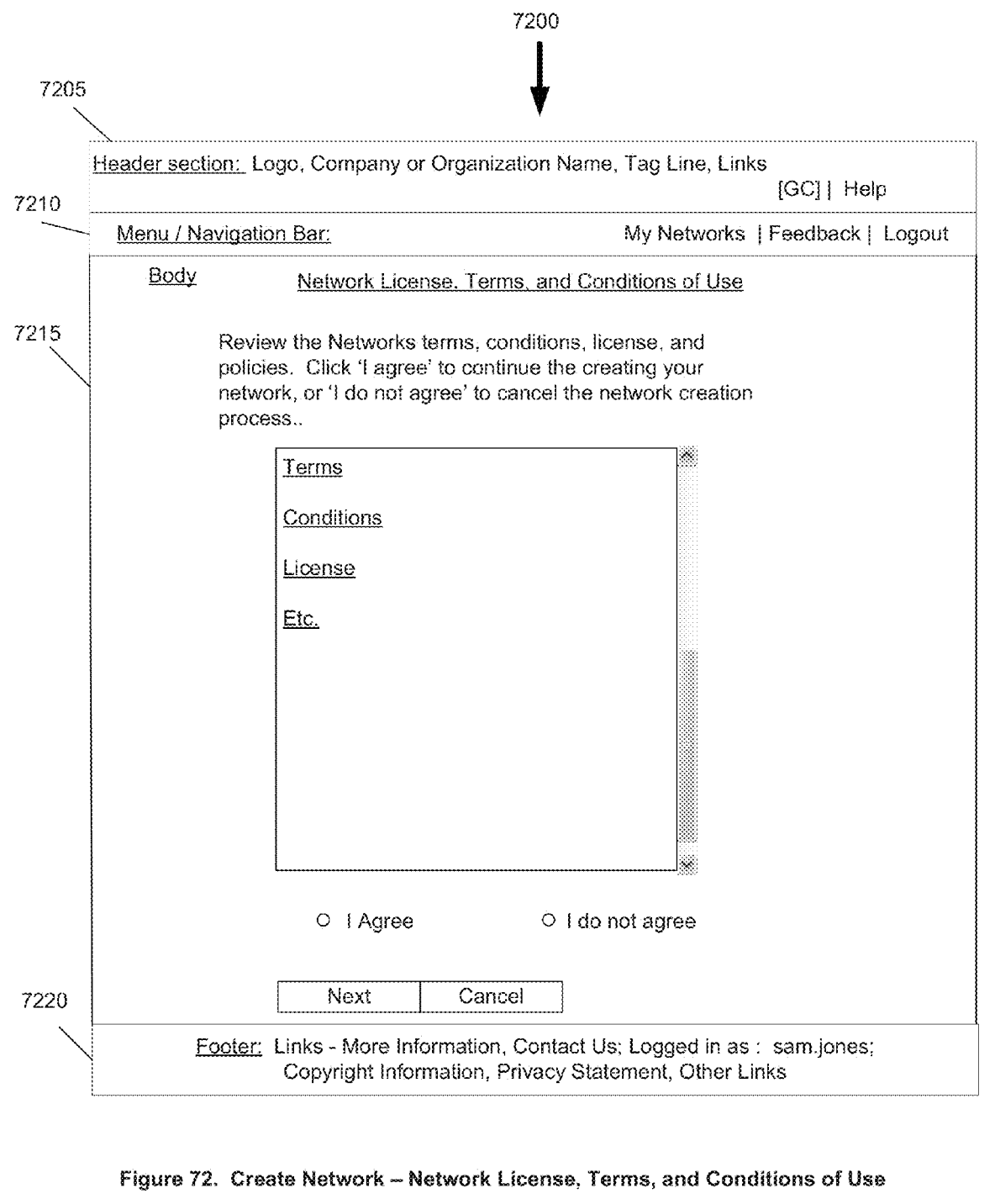

FIG. 72 is an illustration of an example Create Network—Network License, Terms, and Conditions of Use, configured according to the principles of the disclosure;

FIG. 73 is an illustration of an example Create Network—Confirm Network Information, configured according to the principles of the disclosure;

FIG. 74 is an illustration of an example Create Network—Email with Instructions to Verify Network Creation Request, configured according to the principles of the disclosure;

FIG. 75 is an illustration of an example Create Network—Verify network Creation Request Page, configured according to the principles of the disclosure;

FIG. 76 is an illustration of an example Network Building Display, configured according to the principles of the disclosure;

FIG. 77 is an illustration of an example Network Home Page, configured according to the principles of the disclosure;

FIG. 78 is an illustration of an example Invite Network Members Popup, configured according to the principles of the disclosure;

FIG. 79 is an illustration of an example Create Group Popup, configured according to the principles of the disclosure;

FIG. 80 is an illustration of an example Group and Group members View, configured according to the principles of the disclosure;

FIG. 81 is an illustration of an example Invite Group Members Popup, configured according to the principles of the disclosure;

FIG. 82 is an illustration of an example Group Folders Expanded View, configured according to the principles of the disclosure;

FIG. 83 is an illustration of an example Create Folder Popup, configured according to the principles of the disclosure;

FIG. 84 is an illustration of an example Move File or Folder Popup, configured according to the principles of the disclosure;

FIG. 85 is an illustration of an example Add File Popup, configured according to the principles of the disclosure;

FIG. 86 is an illustration of an example Select File to Upload Popup, configured according to the principles of the disclosure;

FIG. 87 is an illustration of an example File Detail View, configured according to the principles of the disclosure;

FIG. 88 is an illustration of an example Add Version Popup, configured according to the principles of the disclosure;

FIG. 89 is an illustration of an example Download File Popup, configured according to the principles of the disclosure;

FIG. 90 is an illustration of an example View Messages and Details, configured according to the principles of the disclosure;

FIG. 91 is an illustration of an example Create Message Popup, configured according to the principles of the disclosure;

FIG. 92 is an illustration of an example Address Book Popup, configured according to the principles of the disclosure;

FIG. 93 is an illustration of an example Attach Files and Folders Popup, configured according to the principles of the disclosure;

FIG. 94 is an illustration of an example Options to Share File or Folder Popup, configured according to the principles of the disclosure;

DETAILED DESCRIPTION OF THE DISCLOSURE

The various aspects of the invention and the various features and advantageous details thereof are explained more fully with reference to the non-limiting examples that are described and/or illustrated in the accompanying drawings and detailed in the following description. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the various examples of the invention. The examples used herein are intended merely to facilitate an understanding of ways in which the invention may be practiced and to further enable those of skill in the art to practice the various aspects of the invention. Accordingly, the examples herein should not be construed as limiting the scope of the invention, which is defined solely by the appended claims and applicable law. Moreover, it is noted that like reference numerals represent similar parts throughout the several views of the drawings.

It is understood that the invention is not limited to the particular methodology, protocols, devices, apparatus, materials, applications, etc., described herein, as these may vary. It is also to be understood that the terminology used herein is used for the purpose of describing particular examples only, and is not intended to limit the scope of the invention, unless specifically stated otherwise. It must be noted that as used herein and in the appended claims, the singular forms "a," "an," and "the" include plural reference unless the context clearly dictates otherwise.

A system and method for a computer based Forms Language may include defining the structures that may be needed to capture, store, manage, transfer, copy, append, distribute, evolve, diverge, and converge information across a distributed set of nodes, or even within a given node. The information may include data elements, connections between data elements, and collections of connected data elements. In addition to providing constructs for data and the connections between data, the Forms Language may also provide a construct that captures changes to the connections between data as a separate object.

The value of data linkage, or the relations between data, is often underestimated; a link between two data elements may itself be information about the two linked data elements. For example, linking George Washington and the United States in a "President-County" relation may convey not only that the two are linked in some way, but may also convey the information associated with the "president" relation. Further linking George Washington to Martha Custis using a "Spouse" relation provides additional information. Linking George Washington to Boston and Yorktown with the "Battles Won" relation provides even more information. The more links exist between George Washington and other data in a system, the more information is known about George Washington, and reciprocally, the more that is known about the data to which George Washington is linked. Using the system and method for a computer based Forms Language described herein, the usefulness of data may be increased as its connectivity increases, in other words, the more data are connected to other data, the more information is available as a result of those connections.

Today's systems before this disclosure link data through uncharacterized constructs, such as left joins and right joins and outer joins. The linkages do not provide information about the context of the link; the context must be inferred based on what is being linked, the report that uses the link, the business rules in the query used to create a linkage, and the like. In a system configured according to the principles of this disclosure, links are objects themselves and have their own relations, allowing for a robust set of descriptive relations to be included as part of the link itself so that a link can add to the information set through the information it contains, and possibly linking the link to other entities or links, expanding the information web organically.

The structures and constructs that may be building blocks of one implementation of a system and method for a computer-based Forms Language, may include but are not limited to the following:
The Forms Language
  Forms
  Relations
  Entities
  Relationships
A Database configured according to the principles of the disclosure:
  Tuplebase
  Streambase These structures and constructs may be used to create streams that may comprise a rich web, or graph, of entities that include and link data elements, link to other entities, collections of entities and linkage between entities, and changes to the linkages between entities. Because changes may be captured as separate data themselves, each data element may itself be immutable. This rich web, or graph, of connected information, may be used to implement functions, processing, and systems that may not typically be possible with the technology available before this disclosure.

In one implementation of the Forms Language, the rich web, or graph of data, its connections, and its changes may comprise a database structure and/or a computational model that may combine: data immutability with link Entities that may be referred to as relations, change entities that may be referred to as relationships as well as inheritance, linkage, versioning, and substitution, into a single structure for storing both the objects and programs.

Inheritance: Once a construct such as a Form, is specified, it may be used as a template to create child or derived constructs that share all characteristics of the template or parent construct. This derivation process may also be referred to as subclassing the Form, or parent construct. Additional characteristics may be added to a child construct, or subclass, and may not affect the parent construct, or superclass. Unlimited generations of inheritance, or subclassing, may be specified, and any child may itself be a parent, or superclass, for additional children. The inherited characteristics may include all characteristics specified for the parents and children preceding the lowest level child construct.

FIG. 1 an exemplary illustration of a simplified example of Form Inheritance and Subclassing, generally denoted by 100. The simplified example of Form Inheritance and Subclassing 100 is one implementation of the invention and may be used to subclass a generic Entity Form (105) to a File Form (110) that inherits the relations of the entity Form, generally denoted by reference numeral 100. In this example, a generic Entity Form (105) specifies characteristics, or relations, that all subclassed Forms inherit, including a GUID Relation (140) and a Time Relation (115). Continuing the example, the generic Entity Form (105) may be subclassed to create the File Form (110). This File Form may inherit the relations of the generic Entity Form (105), including a GUID Relation (120) and a Time Relation (125), and additional relations, including NameOnDisk (130) and FileSize (135) may be added.

Linkage: All objects may be represented by Forms and instantiated as Entities. Relations and Relationships may provide the linkage between Entities. For example, a File Form may link to its Name through the Name Relation, and a Folder Entity may link to its Subfolders through a Containment Relationship Entity.

Immutability: Data may not be changed (i.e., changed in the sense of traditional systems) in a system configured according to the principles of the disclosure; rather data may evolve as a result of the addition of Relationship Entities, negation of Relationship Entities, or creation of Versions through Substitution Relationship Entities.

Relationships: Relationships may signify change between two entities, typically by creating links or substituting links. Relationships may also be described by Relations, providing additional context to a change and may link to other entities or other Relationships. Change in the system configured according to the principles of this disclosure may be signified by the information in a Relationship, and may capture change in an object that may itself be distributable and streamable, thereby making change distributable and streamable.

Substitution/Versioning: In a system configured according to the principles of the disclosure, Entities may only be changed through the addition of Relationship Entities that target the Variant Relations belonging to the Form that defines an entity. Variant Relation point to Relationships that may evolve over time through Substitution, a process in which a new Relationship that points to a new Entity may be created, and a previous Relationship may be substituted with the new Relationship. Using this process, any Relationship may be versioned and the chain of Relationship Substitutions may be maintained.

With these characteristics, implementation of the Forms Language constructs may be used to create collector architectures (e.g., local grid, organizational grid, regional grid, global grid and the like) in which the objects and programs may be aggregated and disaggregated based on human or automated instruction. Once aggregated, the Forms Language constructs may be used to create simple and complex computational models and algorithms. One of ordinary skill in the art may recognize that these constructs may be used to implement other types of architectures as well.

DEFINITIONS

Definitions for terms used to describe aspects of one implementation of the system and method for a computer based Forms Language are provided below:
Form: A Form may be a construct that may be used to model objects in databases, configured according to the principles of the disclosure. A Form may be a collection of Relations, and Relations may also be defined by Forms. For example, a system may include two Forms: A "Person" Form and a "Company" Form. The "Person" Form may contain a "Name" Relation to link a name with the person. A "Company" Form may contain two relations: a "Name" Relation to link a name with a company and an "Employee" Relation to link multiple "Person" Forms to the "Company" Form. A Form may model essentially anything tangible and/or anything intangible.

Relation: A link between two or more Forms. A Relation may act as a Function that may join a Form on one side (e.g., the input Form, or left Form) to a Form in the other side (e.g., the output Form, or right Form). For example, a system may include three Forms: A "Person" Form, a "Name" Form, and a "Company" Form.

The "Person" Form may contain a "Name" Relation to link a name with a person. The "Name" Relation may act as a Function, joining the "Person" Form on one side (as the left side Relation on the Name Relation) with a "Name" Property Relationship Form (as the right side Relation on the Name Relation). The Name Property Relationship Form would link to another Form, such as a string primitive Form, that may store the name to be associated with the Person Form.

Similarly, a "Company" Form may also contain a "Name" Relation to link a name with a company though a "Company Name" Property Relationship Form and another Form, such as a string primitive Form, that may store the name to be associated with the Person Form.

Additionally, the Company" Form may include an "Employee" Relation to link "Person" Forms to a "Company" Form through an Containment Relationship Form.

The phrase "left Form", the phrase "right Form", the phrase "left side Relation", and the phrase "right side Relation" used in this disclosure (including the claims) are names given to the respective logical objects associated with a relation Form and are not meant to refer to an actual specific physical limitation or a specific physical arrangement; the terms are simply names for the respective logical objects to permit improved explanation/description of the relation Form.

Entity: A concrete instance of a Form. For example, a Form and the associated relations used to describe a Company and its properties, respectively, may become an Entity when it is instantiated and a GUID (globally unique identifier) is assigned. After instantiation, a name, such as "Acme, Inc.", may be associated with the "Company" Entity through the "Name" Relation and the "Name" Relationship. Each entity may include immutable data that may not be changed, such as the entity GUID. Typically, each invariant relation is represented by immutable data field belonging to the entity. Anytime a new link is created between entities, a relationship may be created to reflect that the new link may signify one or more changes to the entities being linked, Relationship: An Entity that that may link two or more Entities and may signify change to at least one or more of the linked, or referenced entities. For example, a system may include three Entities: A "Joe" Entity, a "Mary" Entity, and an "Acme, Inc." Entity. The "Acme, Inc." Entity may contain an "Employee" Relation that may link the "Joe" Entity and the "Mary" Entity to the "Acme, Inc." Entity through a Containment Relationship Entity.

Object: As understood by one of ordinary skill in art, an object may be a data structure used in programming that may include attributes to define its properties, methods to define its state, and methods to define operations that it may perform or that may be performed on it.

Instantiate: As understood by one of ordinary skill in the art, to instantiate may be to create a "concrete" instance of an abstract object (e.g., in computer's transient memory or in a computer's physical storage layer). In the Forms Language, a Form may be instantiated when an Entity defined by a specific Form is created.

Attribute: In one implementation of the Forms Language, a relation of an object being modeled that may represent a characteristic with only a single value at a given point in time. For example, a "Person" Form may have a "Name" Attribute. When instantiating the "Person" Form as an entity, only one value (e.g., "Joe") can be associated with the "Name" Attribute at a given time. If a need to change the "Name" Attribute from "Joe" to "Joseph" arises, the "Name" Attribute associated with "Joe" may be substituted and a new version of the "Name" Attribute associated with the string "Joseph" may be created.

Element: In one implementation of the Forms Language, a relation of an object being modeled that may represent a characteristic with multiple values at a given point in time; many elements of the same relationship type may exist at the same time. For example, a "Person" Form may include the relations: "Name" Attribute and a "Friends" Element. When instantiating the "Person" Form as an entity, "Joe" may be associated with the "Name" Attribute and "Bill" may be associated with the "Friends" Element. The "Friends" Element may later be associated with a "Person" Entity "Sally" through the "Friends" element while "Bill" is also associated with the "Friends" Element.

Property: In one implementation of the Forms Language, a property is a characteristic of a Form and may also be referred to as a Relation.

Property Relationship: In one implementation of the Forms Language, a Property Relationship may be used to link a Variant Relation with one or more entities at a given point in time. For example, a Person Form may include a Height Relation and a Friends Relation. A person's height may link to a variant relation that may be expected to point to only one value at a time, but may be expected to change as time progresses. A person's friends relation may be expected to point to multiple values at a given point in time, and may also be expected to change as time progresses.

Substitution: In one implementation of the Forms Language, the process by which an existing Relationship between two Entities may be replaced. During the replacement process, the existing Relationship linking the two entities may be assigned to the "Previous Version Relationship" in the Substitution Relationship Entity. In addition, the newly created Relationship linking the two entities may be assigned to the "Next Version Relationship" in the Substitution Relationship. For example, a system may include a Person Entity that may include a Name Relation. The Name Relation may link the Name Entity "Joe" to the "Person" Form through a "Name Property" Relationship. A new "Name Property" Relationship may be created to link the Name entity "Joseph" to the "Person" Form. A Substitution Relationship may then be created and link the existing "Name Property" Relationship that points to "Joe" as the Previous Relationship, and the newly created "Name Property" Relationship that points to "Joseph" as the Next Relationship.

Versioning: In one implementation of the Forms Language, the process by which a Relationship linking one Entity to another Entity may be updated. One method for updating a relationship is by inserting a Substitution Relationship.

Previous Relationship: In one implementation of the Forms Language substitution and versioning process, the Substitution Relationship Entity may designate the Relationship to be replaced as the "Previous Relationship". For example, a system may include a Person Entity that may include a Name Relation. The Name Relation may link the Name Entity "Joe" to the "Person" Form through a "Name Property" Relationship. A new "Name Property" Relationship may be created to link the Name entity "Joseph" to the "Person" Form. In this example, the Person Entity was initially assigned the Name "Joe" through the Name Relationship, which links the Person Entity and the Name Entity "Joe". To complete replacement, the newly created Substitution Relationship may designate the existing Name Relationship that points to "Joe" as the Previous Version Relationship, and the new Name Version Relationship that points to "Joseph" as the Next Relationship.

Next Relationship: In one implementation of the Forms Language substitution and versioning process, the Substitution Relationship Entity may designate the Relationship that will be assigned as the "Next Relationship" and may complete the update. For example, a system may include a Person Entity that may include a Name Relation. The Name Relation may link the Name Entity "Joe" to the "Person" Form through a "Name Property" Relationship. A new "Name Property" Relationship may be created to link the Name entity "Joseph" to the "Person" Form. In this example, the Person Entity was initially assigned the Name "Joe" through the Name Relationship, which links the Person Entity and the Name Entity "Joe". To complete replacement, the newly created Substitution Relationship may designate the existing Name Relationship that points to "Joe" as the Previous Relationship, and the new Name Relationship that points to "Joseph" as the Next Relationship.

Negation: In one implementation of the Forms Language, the process which by the Next Version of a Substitution Relationship may point to a null entity.

Null Entity: In one implementation of the Forms Language, an entity with a GUID Relation, Time Relation, and no other Relations. In an exemplary implementation of the Forms Language, all negated relationships may point to the same null entity.

Relational Bridge: In one implementation of the Forms Language, a plain English reference to the link that may be created between two Forms when joined by a Relation, or two Entities when joined by a Relationship. The Relational Bridge may be used to retrieve Entities that are linked to other Entities.

Relational Stepping: In one implementation of the Forms Language, the process that may be used to "walk" one or more Relational Bridges by inspecting and/or querying a Relationship to determine the Entities that are linked to a specific Entity, followed by retrieval of the related Entities.

Function: In one implementation of the Forms Language, a construct that may receive one or more input(s) and produce one or more output(s).

System: As understood by one of ordinary skill in the art, a collection of programming code that when read and executed by appropriate computing hardware (which may include various types of non-transitory readable memory or storage that may store the programming code), performs the operations defined in the code. A System may also include the physical hardware or allocated virtual hardware (the hardware may included distributed hardware, perhaps inter-networked) in which the collection of programming code is executed.

Tuple: As understood by one of ordinary skill in the art, a collection of fields of related information that may be stored in a row.

Tuplebase: In one implementation of the Forms Language, a collection of tuples of related information that may comprise part of the storage layer of a database configured according to the principles of the disclosure.

Stream or Entity Stream: In one implementation of the Forms language, a stream may be a collection of entities instantiated from Forms configured according to the principles of the disclosure. A stream may store content for a database configured according to the principles of the disclosure. A stream may typically include a relationship entity signifying a change with respect to at least one other entity or relationship entity which may or may not be present in the stream.

Streamable: In one implementation of the Forms language, entities in one stream that can be merged or appended with any other stream are streamable. A stream may also be referred to as a database configured according to the principles of the disclosure. A stream may be maintained in a readable non-transitory storage medium at any of the nodes (or more than one node) in the network of nodes.

Streambase: In one implementation of the Forms Language, a medium that may store structured data and/or traditionally unstructured data (e.g., documents, images) in a structured way through the use of an entity-relational model configured according to the principles of the disclosure which may suffuses entities and relations into a flat data structure of essentially unlimited length. The Streambase may also comprise a part of the storage layer of a database configured according to the principles of the disclosure. Also known as a streamable database.

Document: In one implementation of the Forms Language, a document may be an unstructured content or may be expressed as a hierarchical structure in which order and sequence matter. A document may be physically rendered in the Forms Language as a contiguous section of structured or unstructured data in a stream. Documents in the Forms language may include files such as word processing, text, XML, spreadsheets, program file, and many other file types.

Non-relationship entity: In one implementation of the Forms Language, a non-relationship entity is an entity that may be pointed to by one or more Relationships, and the non-relationship entity may not itself point to any other Relationships. Example non-relationship entities may include a string, a number, or a file. Expanding the example, a name "Chuck", an age "25", an image file, a set of instructions that make up computer program, and the like, may be non-relationship entities.

Variant Relation: In one implementation of the Forms Language, a one-to-many, or one-to-N, association between a relation and relationships that may be substituted or negated over time. A variant Relation may link a Form to an unlimited number of Relationship Forms or sets of Relationship Forms over time, although only to one Relationship Form or sets of Relationship Forms at any given time. When instantiation, right side Relation of a Variant Relation of an Entity may typically link to a Relationship Entities.

Invariant Relation: In one implementation of the Forms Language, a one-to-one association between a Relation and another entity that may not change over time; invariants represent one-to-one Relations. An invariant Relation may typically link a Form with a single and unchanging Form or set of unchanging Forms over time. For example, GUID and Time may be invariant Relations for Entities.

Complex Entity: In one implementation of the Forms Language, a complex entity may be a construct for structured or unstructured data that may vary in format, size, and content. Examples of Complex Entities may include Files, Folders, and Forms.

Primitive Entity: In one implementation of the Forms Language, a primitive entity may be a construct for structured data of a specified type that may be stored using a specified maximum number of bytes. Examples of "Primitive" entities may include string, number, date, and the like.

Relation Join Stream: In a database configured according to the principles of the disclosure, Relation Join Stream may be used to store the Relations of an Entities in the database. The Relation Join Stream is part of the entity stream.

Construct: In a database configured according to principles of the disclosure, a programming object.

RelationMap: In one implementation of the Forms Language, the list of associations, also referred to as properties or, Relations that may comprise a Form.

Bootstrapping: In one implementation of the Forms Language, a process that may be used to initialize and seed a database configured according to the principles of the disclosure with self-referencing and self-describing Forms.

Base Case: The initial run of a recursive process that may be used to build Forms and Entities during bootstrapping.

formView: In one implementation of the Forms Language, a predefined set of attributes and elements that may be retrieved when accessing an Entity. In other implementations of the Forms Language, a predefined set of properties that may be retrieved when accessing an Entity.

entityView: In one implementation of the Forms Language, the set of Entities that may be returned by executing a formView.

Variant Form: In one implementation of the Forms Language, a Form that may be comprised of mostly variant, or one-to-many, relations. For example, a Folder Form may be comprised of mostly variant relations.

Invariant Form: In one implementation of the Forms Language, a Form that may be comprised of mostly invariant, or one-to-one, relations. For example, Relationship Entities may typically be instantiated from Invariant Relationship Forms.

First-class object: In one implementation of the Forms Language, an object defined by a Form. Forms may also be first class objects as they are themselves defined by Forms.

Differential Data: In one implementation of the Forms Language, a process by which Relationship entities may be used to capture discrete changes in state over time so that changes may become first class objects in the data representation.

State change: in one implementation of the Forms language described by this disclosure, a state change is the addition of any new entity to a system, stream, database, web or the like. For example, instantiation of an entity and the relationships which link the instantiated entity to its properties may all be considered state changes. Changes to a system, stream, database, or the like when configured according to the principles of the disclosure may be signified by the creation of new relationships and may therefore also be state changes. In another example, creation of a relationship substituting one entity for another entity may also be a state change. In addition, Forms and non-relationships may also be entities for which the addition of or changing relationships may also be state changes. In a typical database before the invention, rows in databases are typically mutable integrated states. For example, each rows is a compilation of the current values of a field, such as name and may be updated and state changed directly in the field. Whereas, in a database configured according to the principles of the disclosure, rows are typically immutable differential changes. For example, existing entities are changed by the addition of new entities which reference the existing entities. These new entities my typically be inserted as new rows in the database and may not be subsequently updated, therefore these new rows are immutable.

In memory object representation: a framework that provides for the storage and retrieval of data in the random access memory of a server, personal computer, or other computing device. For example, storage of objects in the Java virtual machine is one type of in-memory representation.

Graph Database: one or more or streams of entities with a rich web of linkage generated during the instantiation of the entities and their relations and relationships, with the entities, relations, and relationships configured according to the principles of the disclosure.

Database Web: In one implementation of the Forms Language, a database web may be a collection of streams configured according to the principles of the disclosure.

Distributed/Distributable: a stream or database graph that are configured according to the principles of the disclosure that may be spread across more than one of any type of electronic infrastructure and may be inter-connected via a communications channel. The electronic infrastructure may include, but is not limited to: virtual machines, physical servers, other computer servers, electronic devices (e.g., smart phones, tablet computers, desktop computers, laptop computers, portable electronic computing devices, netbooks, and the like), other computing devices, or any device configured to receive or transmit the stream or graph database or portions thereof.

Node: A virtual server, virtual machine, a physical server, a physical machine, an electronic device, a program resident on hardware, or a programming environment resident on hardware capable of running a system or part of a system configured according to the principles of the disclosure.

Transmission carrier: a signal transport layer that may move information, such as radio transmission, phone line, cell phone, internet connection, and the like.

Optical memory: a device that may store information written using a laser, such as a CD, DVD, and the like, or memory employing photonic techniques Magnetic memory: a device that may store information written (and/or readable) through magnetization of the media, such as a computer hard disk, magnetic tape, and the like.

Database table: a collection of related data that may be organized into columns and rows "Traditional database" or SQL database: a database that may store related information organized into tables that may contain rows and column. The data may typically be normalized to optimize information storage and retrieval. In a SQL database, the information in one table may reference information in another table through the use of primary keys and/or foreign keys.

Message queue: a collection of information packets that may be waiting to be transferred using a specified communications protocol. Message queues may have quality of service features and may be synchronous, where the recipient must be available to receive the message before it is sent, or may be asynchronous in that the message may be sent without knowledge of whether the recipient is available or otherwise able to receive it.

Portable storage device: a tangible electronic medium on which information may be persisted that may be readily carried by a human. For example, a computer hard drive, external storage drive, smart phone, flash drive, compact disk, DVD, SIM card, and the like.

Consumer: as may be recognized by one of ordinary skill in the art, a consumer may include a user, a device, a computing device, a process, an application, another entity, an information stream that accepts one or more information objects and/or makes use of the one or more accepted information objects.

Producer: as may be recognized by one of ordinary skill in the art, a consumer may include a user, device, computing process, or an application, and the like. Further, in accord with principles herein, a producer may include another entity and/or an information stream that creates or causes the creation of one or more information objects.

Cloud: As one of ordinary skill in the art may recognize, the Cloud is the set of computer servers and associated hardware infrastructure accessible through the Internet that an organization may operate on its own (private Cloud) or operated by third parties (Commercial Cloud) which may offer on an as-needed basis the virtual space and computing resources, operational support, and other services to organizations or individuals on a commercial or free basis. Cloud operators, private or public, may also offer service level agreements guaranteeing a certain percentage of time of availability for the servers, resources, and associated hardware infrastructure. Some implementations of a Cloud may be delivered on a network other than the Internet.

Architecture

FIG. 2 and FIG. 3 are illustrative block diagrams of an exemplary architecture, configured according to principles of the disclosure. The systems shown in these Figures are exemplary and may take on different architectures as one of ordinary skill in the art may recognize.

These exemplary figures show the use of servers, virtual machines, and nodes connected in a distributed system. As one of ordinary skill in the art may recognize, a server may typically be physical device with: one or more hard drives that may provide a storage medium for electronic data; random access memory (RAM) for holding information that may be needed to execute computer programs and their instructions; a processor that may execute the various computer programs and their instructions; various connection points for input/output, multimedia devices, other peripheral devices, and communications with other servers; and a motherboard, may also be referred to as a circuit board, that may connect and may provide power to the server components.

The terms "virtual machine" and "virtual server" may typically refer to a collection of software that may be required to execute and run programs on a physical server. A virtual server may share the memory and storage resources of the physical server on which it resides with other virtual machines or other installed software, or the virtual server may be specifically allocated memory and storage resources that cannot be accessed by other software on the same physical server.

A "node" as shown in exemplary FIGS. 2 and 3 may indicate a virtual server, virtual machine, physical server, physical machine, electronic device, program, or programming environment capable of running a system or part of a system configured according to the principles of the disclosure. A "node" as shown in exemplary FIGS. 2 and 3 may refer to a specific node or collection of nodes associated in a parent:child relationship.

FIG. 2 is a block diagram showing an exemplary architecture of an example system configured according to the principles of the disclosure, generally denoted by 200. The example environment shown in FIG. 2, generally designated by reference numeral 200, may include the following:

Global Hub Node Server (205): Coordinates and manages all Node Servers. Each Server may provide a set of applications (e.g., file management, user management, group management, database applications, etc.), and persist and manage data, information, and users.

Global Hub Node Server Clients (235a, 235b, 235c): interface through which users may access the Node Servers, applications, data, and information. The client interface may be a thin web client, thick web client, desktop interface, command prompt, or another interface type.

Node Servers (210, 215, 220, 225): Dedicated servers that may be allocated for a purpose defined by the user that created the node. Each server may provide a set of applications (e.g., file management, user management, group management, database applications, specialized applications, etc.), and may persist and manage data, information, and users.

Node Server Clients (240a, 240b, 240c, 245a, 245b, 245c, 250a, 250b, 250c): interface through which users may access the Node Servers, applications, data, and information. The interface may be a thin web client, thick web client, desktop interface, command prompt, or other interface type. Messaging Server (255): May receive, queue, store, manage, and otherwise transact information packets being transferred between Node servers.

The Global Hub Node Server (205) may be connected to a set of Node Servers (210, 215, 220, 225), a Messaging Server (255), and a set of Clients (235a, 235b, 235c). Additional Clients (240a, 240b, 240c, 245a, 245b, 245c, 250a, 250b, 250c) may be connected to each Node Server after authenticating to the Global Hub. One of ordinary skill in the art may recognize that any number (greater than zero) of Global Hub Node Servers, Messaging Servers, Node Servers, and Clients may be implemented in this architecture.

In addition, the communications protocol shown in this example is internet protocol. One of ordinary skill in the art may recognize that other protocols may be used. In addition, the connection protocol communications may be secured through the use of firewall, secure socket layer (SSL) technology Virtual Private Network (VPN), or other security protocols.

In the example of FIG. 2, clients may first connect to the Global Hub Node Server (205) via internet protocol, authenticate, and may then be passed to another Node Server (210, 215, 220, 225), with or without secondary authentication. Messages may be passed between Nodes using the exemplary Messaging Server (255).

FIG. 3 is a block diagram of an exemplary architecture of a Node Server, configured according to principles of the disclosure, generally designated by reference numeral 300. The architecture of the Node Server 300 may be used for both the Global Hub Node Server (205) and the Node servers (210, 215, 220, 225). In some implementations, different architectures for the Global Hub Node Server (205) and Node Servers (210, 215, 220, 225) may be used, and various aspects may be operated in a clustered environment that may include a collection of multiple servers or instances of an application or process so that it may be replicated and/or partitioned such that a failure of any single or maximum number of servers, instances, partitions, or replicas may not result in the failure of the full collection.

In the example of FIG. 3, the Node Server architecture 300 may include the following:

Virtual Machine (305): a functioning software image that may encapsulate the server and software architecture of the invention so that it may run on hardware resources that may be isolated from other virtual machines on a physical server. Each Virtual Machine may be fully aware of the other nodes as well as the Messaging Server Virtual Machine(s), and may be capable of robustly communicating with other Virtual Machines equipped with the invention as desired.

Web Server (310): In general, may receive HTTP requests, typically from an internet browser, may forward those requests to the Application Server, and may deliver the response to the internet browser in the form of a web page.

Application Server (315): May typically interprets HTTP requests and may perform processes and operations required to respond to the request. May forward the response to the request to the web server.

Operating System (320): May typically include the set of programs and data that may manage interactions between software and the hardware on which software operates. Example operating systems may include but are not limited to: Linux, Unix, Microsoft Windows, and others.

Web Application (325): Software that may typically be accessed and run using an internet browser.
  Presentation Tier (330): typically the user interface to the web application
  Business Tier (335): typically includes the logic that may underlie a user interface; it may connect the Presentation Tier to the Persistence tier.

Database Manager (340): an abstraction layer between the web application and the database that may coordinate all communications and transactions.

Database configured according the principles of the disclosure (345): A construct that may store structured and unstructured data, indexes, processes, procedures, and other artifacts such as Forms, relations, entities, and relationship object generated using the Forms Language.
  Streambase (350): a construct that may manage and store unstructured data in the database configured according the principles of the disclosure.
  Tuplebase (355): a construct that may manage and store structured data in the database configured according the principles of the disclosure.
  Indexes (360): an ordered reference to structured data that may be used to optimize performance and data retrievals. Indexes may be stored in memory or on disk.

Forms Language (365): a collection of programming constructs configured according to principles of the disclosure that may be used to create and assemble diversely interwoven and richly linked webs of Entities, as well as may instruct computer hardware to perform a set of actions.

Adapter (370): application programming interface that may manage communications between the Web Application and the Persistence Tier.

Persistence Tier (375): A construct that may store structured and unstructured data and information by writing it to physical hardware.
  Database (380): a repository of discrete pieces of information that may be stored using a specific structure and specific constructs. Examples of databases may include: Coral Database, MySQL, Oracle, SQL Server, and the like. In a database configured according to the principles of the disclosure, the database may be distributed across a collection of nodes on multiple connected servers.
  Distributed File System (385): a repository of files stored across multiple connected servers.

Messaging Client (390): software interface through which the Web Application may access the Messaging Server.

Messaging Server Virtual Machine (395): a functioning software image that may encapsulate the complete or a portion of the messaging server and software architecture that may run on hardware resources isolated from any other virtual machine on a physical server. Each Messaging Server Virtual Machine may be fully aware of each Messaging Client, as well as each Virtual Machine, and may be capable of robustly communicating with other Virtual Machines in the architecture that are configured according to the principles of the disclosure as needed.

Messaging Server (396): May receive, queue, store, manage, and otherwise transact information packets being transferred between Node servers that are configured according to the principles of the disclosure.

Forms Language

In one implementation configured according to the principles of the disclosure, the Forms Language may provide a structure that may be used to create and assemble diverse and richly linked webs of Entities in streams, databases, graph databases, and the like. The Forms Language may permit the creation of "Forms", which may define the class properties of the Entities each represents and may define the relational structure of each specific type of Entity. The class defined by a Form may be a Form Entity, Relation Entity, Relationship Entity, or any other Entity that may be instantiated by a Form. In one example implementation, a java class may be declared for a particular Form type as follows:

public class Folder extends Content { . . .

In this example, the Folder Form class extends and inherits from the Content Form class. Continuing this example, the Content Form class declaration may be as follows:

public class Content extends Entity { . . .

Indicating that the Content Form class extends and inherits from the Entity Form class. Because the Folder Form class extends and inherits from the Content Form class, the Folder Form class also inherits from the Entity Form class. When inheriting from a class, the class hierarchy may typically mimic the Form hierarchy.

Each Entity instantiated from the Form may be an instance of the class the Form defines. The structure of a Form may be defined by a set of Relations that bind, or link, one Form together with other Forms. Each of the set of Relations may are be defined by Forms and may also be classes. These Relations may associate meaning, context, and content with Forms they link. The Relation may link the Form that contains it with the Form that is its target.

FIG. 4 is an illustration of a Form and its Relations, generally designated by reference numeral 400. In the Form and Relation example 400, Form 1 (410) includes Relation 1, Relation 2, and Relation N, where N signifies any number greater than 2. Relation 1 links Form 1 (410) to Form A (450) through right side Relation of Relation 1 and Corresponding Relation 1 on Relation Form 1 (420), respectively. Relation 2 links Form 1 (410) to Form B (460) through the right side Relation of Relation 2 and Corresponding Relation 2 on Relation Form 2 (430), respectively. Relation N links Form 1 (410) to Form C (470) through Relation N and Corresponding Relation N on Relation Form N (440), respectively. A Corresponding Relation may typically be used to join a Relation on a Relation Form to a specific Relation on the Form joined to by the right side Relation of the Relation Form.

Relations

In one implementation of the Forms Language, a Relation may be a function that maps a Form on one side (e.g., "logically" the left side or the input side) to a Form on the other side (e.g., "logically" the right side or the output side). The Relation itself may be a Form of type Function. FIG. 5 is an exemplary illustration of a Relation, generally designated by reference numeral 500. In this example, Relation Form 500 may include:

a Relation 1 Form (530) for Relation 1 (520), that links a Left/Input Form (510) through the Left Side/Input Relation (540) to a Right/Output Form (560), through the Right Side/Output Relation (550), and a Corresponding Relation (570) that links to Relation 2 (580) on the Right/Output Form.

Once a Form and its Relations are defined, the Form may be instantiated to create new Entities that are joined to other Entities through Relations and Relationship Entities. Each Entity instantiated from the Form is an instance of the class the Form defines. The example functions represented by the example Relations shown in FIG. 4 (400) are listed in Table 1.

TABLE 1

Example: Form 1 (410) Relation Functions

| Relation | Input/Left Side Form | Output/Right Side Form |
| --- | --- | --- |
| Relation 1 | Form 1 (410) | Form A (450) |
| Relation 2 | Form 1 (410) | Form B (460) |
| Relation N | Form 1 (410) | Form N (470) |

In the more specific example of a Relation Form, generally denoted by reference numeral 600, shown in FIG. 6, The Name Relation Form 600 may include a Person Form (610) with a Name Relation (620). The Name Relation (620) is defined by a Name Relation Form (630) that links the Person Form (610) through Left Side Relation 1 (640) to the Name Property Relationship Form (660) through Right Side Relation 1 (650). The Name Relation Form (630) may include a Corresponding Relation 1 (655) that links to the Parent Relation (668) on the Name Property Relationship Form (660). The Name Property Relationship Form (660) includes a Child Relation (665) which is defined by the Child Relation Form (670). The Child Relation Form (670) links the Name Property Relationship Form (660) through Left Side Relation 2 (675) to the String Primitive Form (685) through Right Side Relation 2 (680). The String Primitive Form (690) may include a Corresponding Relation 2 (685) that links to the String Value Relation (695) on the String Primitive Form (690). The String Primitive Form (690 may be instantiated to an Entity that may contain the string with the name when the Person Form is instantiated.

Throughout this disclosure, for ease of discussion and simplicity, the text and illustrations do not typically include a display and description of the Relation Form that corresponds to each Relation. Relations are typically shown as linking directly to the right side/output Form.

The phrase "left Form" and the phrase "right Form" used in this disclosure (including the claims) are names given to the respective logical objects associated with a relation Form and are not meant to refer to an actual specific physical limitation or a specific physical arrangement; the terms are simply names for the respective logical objects to permit improved explanation/description of the relation Form. Similarly, the phrase "left side relation" and the phrase "right side relation" (or "right side relations") used in this disclosure (including the claims) are names given to the respective logical references (i.e., pointers or linkages) associated with a relation Form and are not meant to refer to an actual specific physical limitation or a specific physical arrangement; the terms are simply names for the respective logical references to permit improved explanation/description of the references associated with a relation Form.

When a Form is said to "have" a set of Relations, it means that the Form is targeted by those Relations on one side (e.g., the left side, the input side). When a Form is "produced" by a Relation, it receives the Relation (e.g., the right side, the output side).

Using Forms Language, any number of Entities, including Forms, Relations, Relationships, Entities instantiated from Forms, and the like may be created. A Relation is an entity that may link one Form to another Form. A Relation may map a Form on one side, (e.g., the input side, the left side) to a Form on another side (e.g., the output side, the right side).

A Relation on a Form may point to another Form, a Relationship Form, or another entity. A Relationship Form may itself contain Relations that may point to another Relationship Form or another Form. The type of Form that a Relation points to may depend on whether the Relation is variant or invariant. A Relation may be designated as variant if there may be a need to change the target output at some time. A Relation may be designated as invariant if there will never be a need to change the target output.

Variant Relations: A Variant Relation may link a Form to an unlimited number of Forms or sets of Forms that may change over time, and may provide for a one-to-N (one-to-many) relation between two or more Forms. The right side relation of a Variant Relation may typically point to Relationship Forms. For example, a Folder Form may include multiple Child Relations that link it to a set of Child Folders and Child Files over time through Containment Relationships and Substitution Relationships. The Folder entity, when instantiated, may be related to a changing set of Child Folder Entities and a changing set of File Entities through Containment Relationship Entities and Substitution Relationship Entities. FIG. 7 is an exemplary illustration of a variant relation, generally denoted by reference numeral 700. In FIG. 7, a Folder Form (710) may be linked to multiple child Folder Forms (720) though one or more Containment Relationship Forms (3015) linked to the variant Child (subfolder) Relation (721) on the Folder Form (710). In this example, the Folder Form (720) may be instantiated to Folder Entity 1 (725). Continuing the example, there may be a need to add three Folder Entities (745, 750, 755) to Folder Entity 1 (725). Folder Entity 1 (725) may be related to Folder Entity 2 (745), Folder Entity 3 (750), and Folder Entity 4 (755) through a variant Child Relation (745) and Containment Relationship Entity 1 (730), Containment Relationship Entity 2 (735) and Containment Relationship Entity 3 (740). In other words, Folder Entity 1 (725) contains Folder Entity 2 (745), Folder Entity 3 (750), and Folder Entity 4 (755) as Subfolders.

Continuing the example shown in FIG. 7, if Folder Entity 3 (750) is deleted, Folder Entity 1 (725) may be updated through the creation of another Relationship. FIG. 8 is an exemplary illustration of a Relationship Entity Signifying Change to a Variant Relation, configured according to the principles of the disclosure, and designated generally by reference numeral 800. The illustration shows Folder Entity 1(825) as linked to Folder Entity 2 (845), Folder Entity 3 (850), and Folder Entity 4 (855) through Containment Relationship Entity 1(830), through Containment Relationship Entity 2(835), Containment Relationship Entity 3(840), and Substitution Relationship Entity 1(860). The illustration (800) shows creating a Relationship to signify a change to Folder 1's Variant Child Relation (890) to Folder Entity 4. In this example, to signify that Folder Entity 1 (825) no longer includes Folder Entity 4 (855), a Substitution Relationship Entity (860) is instantiated. The Next Relation (865) on Containment Relationship Entity 3 (840) is pointed to the Previous Version Relation (870) on Substitution Relationship Entity 1 (860), and the Next Version Relation (865) on Substitution Relationship Entity 1(860) is pointed to the NullEntity (880).

Because the link to Folder Entity 4 (855) is not modified in this example, it is possible for a system configured according to the principles of the disclosure to retrieve the history of folders contained by Folder Entity 1 (825).

Invariant Relations: Invariant relations may never change; invariants may represent one-to-one Relations. An invariant Relation typically links a Form with a single (and unchanging) Form over time. Invariant Relations may support the immutability of data in databases that are configured according to the principles of the disclosure. Invariant Relations may not be changed, assuring that the history of a Form and its Relations may be preserved, and consequently the history of corresponding Entities and Relationships created by instantiating the Form may be preserved. FIG. 9 is an exemplary diagram of an Invariant Person Form, generally denoted by 900. As shown in FIG. 9, a "Person" Form (910) may include an invariant Globally Unique Identifier (GUID) Relation (915) that points to a Unique Primitive Form (920). Once instantiated, the "Person" Entity (925) may be related to one and only one GUID through the invariant GUID Relation (930) that may point directly to the Unique Primitive Entity Form (935) that contain the GUID value.

In one implementation of the Forms Language, the combination of entities, variant relations, relationship Forms and entities, substitution relationships, may be used as a mechanism to assure immutability of data and capture change using new first class objects.

Relationships

A Relationship may be Entity and may therefore be defined by a Form and its Relations. A Variant Relation typically links to a Relationship through the ride side Relation on the Variant Relation Form. Relationship Entity maybe the link between the right side Relation of a Variant Relation on an Entity and another Entity Form, or when instantiated, may link a ride side Relation on the Variant Relation on one Entity to a Relationship Entity. Relationships created using the Forms Language, may be mostly invariant. Relationships are immutable because a relationship is an association. If any part of the association changed, it would no longer be the same association. Therefore, because Relationship entities are associations, a relationship entity may be invariant (or characterized by invariant relations). In a system configured according to the principles of the disclosure, changes may be signified only through the addition of new Relationship Entities that may create new linkage between entities.

Because Relationships may be defined by a Form, and a Form may be a class, a Relationship may also be a class. As a class, a Relationship may be considered a first-class object so that change itself may be an object in the system rather than simply the result of an action. According to the principles of the disclosure, a Relationship represents change in a system. Relations are mostly immutable, and rather than changing are classes that represent the changes in the system. As such, Relationships may reflect differential data with respect to one or more entities in a system. In one aspect, information may be expanded in such a system only through the accrual of differential data using Relationships and/or non-relationship entities.

The changes that may be signified by a Relationship may be considered to be changes on one entity with respect to one or more other entities. FIG. 8 is an exemplary diagram of a Relationship Entity Signifying Change to a Variant Relation, generally denoted by 800. For example, as shown in FIG. 8 (800) the removal of Folder Entity 4 (855) as a Child of Folder Entity 1 (825) is a change in the containment of Folder Entity 1 (825) with respect to Folder Entity 4 (855). Similarly, FIG. 10 is a simplified example of a substitution relationship, generally denoted by 1000. As shown in FIG. 10 (1000), the change of a Person Entity's Name (1020) from "Joe" to "Joseph" is a change of the Name Relationship Entity (1040) with respect to Person Entity 1 (1020).

Relationships may be versioned, or substituted, through a process in which the Relationship linking one Entity to another Entity may be updated by inserting a Substitution Relationship. This Substitution Relationship may point to the Relationship being updated as the Previous Version Relation and the new Relationship as the Version Next Relation. During the substitution process, the existing Relationship linking the two entities may be assigned to the "Previous Version Relationship" in the Substitution Relationship Entity. In addition, the newly created Relationship linking the two entities may be assigned to the "Next Version Relationship" in the Substitution Relationship. FIG. 10 is an illustration of a simplified example of a Substitution Relationship, configured according to the principles of the disclosure, generally denoted by reference numeral 1000. In this example, a Person Entity (1010) includes a Name Relation (1020) that is linked to the String Entity assigned a value of "Joe" (1030) through the Name Relationship Entity 1 (1040). The Name Relationship (1020) may be updated to point to the String Entity assigned a value of "Joseph" (1090) to "Joseph" by creating a Substitution Relationship Entity (1050) that assigns the existing Name Relationship 1 (1040) that points to the String Entity assigned a value of "Joe" (1030) as the Previous Version Relation (1060), and assigns the assigns the new Name Relationship 2 (1080) that points to the String Entity assigned a value of "Joseph" (1090) as the Next Version Relation (1070).

To negate a Relationship, the Next Relationship may be pointed to a null entity during the substitution process as shown in FIG. 8 (800).

Example Relations and Relationships

Several non-limiting examples of specific Relations and Relationships that may be used in one implementation of the Forms Language are described below:

An Invariant Relation may join two Forms in a one-to-one Relation.

A Variant Relation may join Forms in a one-to-many Relation.

The Side Relation may join two Forms through either the left side relation or the right side relation.

The Containment Relationship may join two Entities in a parent:child Relationship. This Relationship may be used to maintain and traverse the hierarchical organization of Entities created using the Forms Language.

The Access Relationship may specify whether and how Entities may be related to each other. This Relationship may be used to secure and protect Entities.

The Previous Version Relation and Next Version Relation may associate one Entity as a version of another Entity. Combined with time information, Version Relations may be traversed to follow the evolution of Entities.

The Content Relationship may join an Entity instantiated by a Form with complex data, such as Forms, folders, files, messages, and the like.

The Containment Relationship may join one Entity as a superset of another Entity.

The Attribute Relationship may join two Entities in a one-to-one Relationship.

The Element Relationship may join two Entities in a one-to-many Relationship.

The Substitution Relationship may designate one Entity as a version of another Entity.

Types of Forms

Any number of Forms and Form types may be created using the Forms Language. All Forms may be derived from the base, or parent, "Entity" Form; therefore any Form may derive from any other Form. The Child, or derived, Form may inherit all properties of the Parent Form, and additional properties may be added. Any number of unique Form types may be created using the Forms Language. Several example Forms may include the following:

Form Form (1100)
Entity Form (1200)
Relation Form (1300)
Relationship Form (1400)
Primitive Form (1500)
Substitution Relationship Form (1600)
Attribute Relationship Form (1700)
Versioned Attribute Relationship Form (1800)
Property Relationship Form (1900)
Element Relationship Form (2000)
Ownership Relationship Form (2100)
Content Form (2200)
Folder Form (2300)
Containment Relationship Form (2400)
NullEntity Form (2500)
Function Form (2700)
Pseudocode and Inheritance for Add Function Form (2800)
Pseudocode and Inheritance for Divide Function Form (2900)
Group (3100)
Message Form (3300)
File Form (3400)
Network Form (3500)
User Form (3600)
Variant Relation Form (3700)
Invariant Relation Form (3800)

In one or more implementations of the Forms Language, these Forms and their Relations may enable the combination of the object model and the programming model into a single unifying structure: a graph database that may implement linkage, immutability, versioning, and substitution into a single structure that may store objects and programs. Using these constructs, an implementation of a database may be developed using the Forms Language so that these Forms, Relations, Entities, and Relationships may:

Plug directly into a global collaboration grid comprised on connected nodes;

Serve an graphical user interface where users can create collaboration Networks with "a few clicks;"

Create and manage collaboration groups, networks, and users;

Manage files; and

Scale to store petabytes of information.

Descriptions of the function and purpose of the Forms developed in one implementation of the Forms Language are provided in the subsections that follow.

Form Form

FIG. 11 is an illustration showing an exemplary Form Form configured according to principles of the disclosure, generally denoted by 1100. In one implementation of the Forms Language, the Form Form (1100) may describe the logical composition of every Form in a system configured according to the principles of the disclosure. The Form Form may include numerous Relations, several of which may be described as follows. Other implementations of a Form Form may include additional Relations, exclude certain Relations, or name similar or the same Relations differently. Additional Relations not described below may be used to enable the Form Form using Forms Language, and provide other associations and functionality. The Form Form 1100 may include:

Globally Unique Identifier (GUID) Relation (1115): as understood by those practiced in the art, a distinct number (e.g., in hexadecimal or other format) that can be used to uniquely reference the entity with which it is associated;

Time Relation (1120): the date and time at which the entity was created;

FormGUID (1125): reference to the type of Form that defines the entity;

Name Relation (1130): a link to the Primitive Form that contains the name associated with this Form;

Abstract Relation (1135): Boolean flag that may indicate if the Form is abstract. Abstract Forms may not be instantiated and instead may only be extended by other Forms.

Final Relation (1140): Boolean Flag that may indicate whether a Form is final. A final Form may not be extended.

ClassInterface Relation (1145): Relation that may point to zero or more application class interfaces which may be used to create objects of this Entity type. For example, implementing this Relation in Java may associate the path to the Java Class used to create an Object of this Form and Entity type.

BaseForm Relation (1150): Relation that may point to zero or more base Forms which this Form may extend.

DerivedFrom Relation (1155): Relation that may point to zero or more Forms that may extend this Form.

OneToOne Relation (1160): Relation that may point to zero or more one-to-one relations that may be assigned to this Form.

OneToMany Relation (1165): Relation that may point to zero or more one-to-many relations that may be assigned to this Form.

Entity Form

In one implementation of the Forms Language, all objects may be entities and a unified approach to describing and handling all objects may be implemented. This unified and consistent approach may begin with the Entity Form, which may be subclassed and inherited by all other Forms, providing the foundation for flexibility in systems configured according to the principles of the disclosure. The Entity Form in one implementation of the Forms Language may include numerous Relations, several of which may be described as follows. Other implementations an Entity Form may include additional Relations, exclude certain Relations, or name similar or the same Relations differently. Additional Relations not described below may be used to enable the Entity Form using Forms Language, and provide other associations and functionality. FIG. 12 is an illustration showing an exemplary Entity Form configured according to principles of the disclosure, generally denoted by reference numeral 1200. The Entity Form 1200 may include:

Globally Unique Identifier (GUID) Relation (1215): as understood by those practiced in the art, a distinct number (e.g., in hexadecimal or other format) that can be used to uniquely reference the entity with which it is associated;

Time Relation (1220): the date and time at which the entity was created;

FormGUID (1225): reference to the type of Form that defines the entity;

Owners Relation (1230): the Entity that stores the information and any content for the Entity created when the Form is instantiated;

Name Relation (1235): a link to the Primitive Form that contains the name associated with this Form;

Thumbnail Relation (1240): a link to the Image Form that stores the location of the image file associated with the Form Example descriptions (pseudo code) of the opposing sides of the Relations contained by an Entity Form include:

An Entity Form is associated with its GUID through the GUID Relation.
Entity Form <GUID Relation> GUID Value An Entity Form is associated with its Date/Timestamp (DTS) through the DTS Relation
Entity Form <DTS Relation> DTS Value An Entity Form is associated with its FormGUID through the FormGUID
Entity Form <FormGUID Relation> FormGUID Value An Entity Form is associated with its Name through the Name Relation
Entity Form <Name Relation> Assigned ValueGUID <String Form Relation> String Value An Entity Form is associated with its Thumbnail through the Thumbnail Relation
Entity Form <Thumbnail Relation> Image Form <Image Relation> Assigned Entity Relation Form In one implementation of the Forms Language, the Relation Form may extend the Entity Form and may provide the associations required to link one Form to another Form. The Relations on a Form may give Forms their true shape by documenting the Forms to which another Form may link, as well as the properties of a Form. With the description of each Form stored directly in a system configured according to the principles of the disclosure, a fixed data structure may not be necessary, and a database configured according to the principles of the disclosure may become self-describing and extremely flexible. Because Forms may also be Entities, both the shape of Entities as well as the data associated with entities may be stored, copied, streamed, transferred, merged, or otherwise combined in different databases, information streams, nodes, and the like configured according to the principles of the disclosure.

The Relation Form may include numerous Relations, several of which are described as follows. Other implementations of a Relation Form may include additional Relations, exclude certain Relations, or name similar or the same Relations differently. Additional Relations not described below may be used to enable the Relation Form using Forms Language, and provide other associations and functionality. FIG. 13 is an exemplary illustration of the Relation Form generally denoted by reference numeral 1300. The Relation Form 1300 may include:

Globally Unique Identifier (GUID) Relation (1315): as understood by those of ordinary skill in the art, a distinct number (e.g., in hexadecimal or other format) that may be used to uniquely reference the entity with which it is associated;

Time Relation (1320): the date and time at which the entity was created;

FormGUID (1325): reference to the type of Form that may define the entity;

Owners Relation (1330): the Entity that may store the information and any content for the Entity created when the Form is instantiated;

Name Relation (1335): a link to the Primitive Form that may contain the name associated with this Form;

Thumbnail Relation (1340): may link to the Image Form that may store the location of the image file associated with the Form;

Corresponding Relation (1345): may typically join a Relation on a Relation Form to a specific Relation on the Form joined to by the right side Relation of the Relation Form.Left (1350): a link to the Form that may be the input to/left side of a Relation;

Right (1355): a link to the From that may be the output/right side of the Relation;

SuperRelation (1360): links to the Relations from which this Relation may derive;

SubRelation (1365): links to the Relations that may derive this relation;

MinOccurs (1370): may specify whether the relation points to zero or one, zero or more, one and only one, one or more, or some other number of Forms;

MaxOccurs (1375): may specify whether the relation points to zero or one, zero or more, one and only one, one or more, or some other number of Forms.

Relationship Form

In one implementation of the Forms Language, the Relationship Form may extend the Entity Form and may provide the associations needed to link one or more Entities to one or more other Entities. A Relationship may be an Entity that connects multiple other entities. For example, a human may have a "Contact Relationship". Each "Contact Relationship" may reference either the "Friend" or "Acquaintance" relation for that human. In addition to connecting two other entities, Relationships may also connect a many additional of entities. Relationships may connect Entities in a variety of different ways so that systems implemented according to the principles of the disclosure may provide a rich web of interconnected, interrelated data, and the interconnections and interrelation may transform disconnected data into information and knowledge.

The Relationship Form may include numerous Relations, several of which are described as follows. Other implementations of a Relationship Form may include additional relations, exclude certain relations, or name similar or the same relations differently. Additional Relations not described below may be used to enable the Relationship Form using Forms Language, and provide other associations and functionality. FIG. 14 is an illustration of an exemplary Relationship Form, configured according to the principles of the disclosure, generally denoted by reference numeral 1400. Relationship Form 1400 may include:

Globally Unique Identifier (GUID) Relation (1415): as understood by those of ordinary skill in the art, a distinct number (e.g., in hexadecimal or other format) that may be used to uniquely reference the entity with which it is associated;

Time Relation (1420): the date and time at which the entity was created;

FormGUID (1425): reference to the type of Form that may define the entity;

Owners Relation (1430): the Entity that may store the information and any content for the Entity created when the Form is instantiated;

Name Relation (1435): a link to the Primitive Form that may contain the name associated with this Form;

Thumbnail Relation (1440): a link to the Image Form that may store the location of the image file associated with the Form;

Next Version Relation (1450): a Relation that may be used to discover which Relation points to the current version.

Previous Version Relation (1455): a Relation that may be used to discover which Relation points to the current version Primitive Form In one implementation of the Forms Language, the Primitive Form may provide a construct for managing structured data of a specified type, such as the most distinct level at which data may be expressed, and may include a number, a string, a date, and the like. Each of these distinct and atomic pieces of data may be a separate subclass of the Primitive Form, so that each may be linked to using Relations and Relationships in the same that that any other Form and Entity may be linked. Additionally, linking these Primitive Forms using Relations and Relationships may allow tracking of changes through the Substitution Relationship.

The Primitive Form may include numerous Relations, several of which are described as follows. Other implementations of a Primitive Form may include additional Relations, exclude certain Relations, or name similar or the same Relations differently. Additional Relations not described below may be used to enable the Primitive Form using Forms Language, and may provide other associations and functionality. FIG. 15 is an exemplary illustration of the Primitive Form configured according to the principles of the disclosure, generally denoted by reference numeral 1500. Primitive Form 1500 may include:

Globally Unique Identifier (GUID) Relation (1515): as understood by those of ordinary skill in the art, a distinct number (e.g., in hexadecimal or other format) that may be used to uniquely reference the entity with which it is associated;

Time Relation (1520): the date and time at which the entity was created;

FormGUID (1525): reference to the type of Form that may define the entity;

Owners Relation (1530): the Entity that may store the information and any content for the Entity created when the Form is instantiated;

Name Relation (1535): a link to the Primitive Form that may contain the name associated with this Form;

Thumbnail Relation (1540): a link to the Image Form that may store the location of the image file associated with the Form;

Value Relation (1550): may store the actual content, such as a number or string.

Substitution Relationship Form

In a system configured according to the principles of the disclosure, data may not be directly modified, rather, a combination of new Relationships may signify the change: one new Relationship may link to the new information and a Substitution Relationship may link between the old Relationship and the new Relationship through a Previous Version Relation and a Next Version Relation. In this way, changes to a database, information stream, or web may be implemented by "layering" new information "on top of" old information. Data immutability is important in systems configured according to the principles of the disclosure so that one such system may distribute data to another such system and may assure referential integrity. FIG. 16 is an illustration showing an exemplary Substitution Relationship Form, configured according to principles of the disclosure, generally denoted by 1600. In one implementation of the Forms Language, the Substitution Relationship Form 1600 may be used to create a new Relationship(s) that may replace an existing Relationship(s) by providing a link between the Previous Version Relation and the Next Version Relation.

The Substitution Relationship Form 1600 may be derived from the Relationship Form and may include numerous Relations, several of which are described as follows. Other implementations of a Substitution Relationship Form 1600 may include additional Relations, exclude certain Relations, or name similar or the same Relations differently. Additional Relations not described below may be used to enable the Substitution Relationship Form using Forms Language, and provide other associations and functionality. The Substitution Relationship Form 1600 may include:

Globally Unique Identifier (GUID) Relation (1615): as understood by those of ordinary skill in the art, a distinct number (e.g., in hexadecimal or other format) that may be used to uniquely reference the entity with which it is associated;

Time Relation (1620): the date and time at which the entity was created;

FormGUID (1625): reference to the type of Form that may define the entity;

Owners Relation (1630): the Entity that may store the information and any content for the Entity created when the Form is instantiated;

Name Relation (1635): a link to the Primitive Form that may contain the name associated with this Form;

Thumbnail Relation (1640): a link to the Image Form that may store the location of the image file associated with the Form;

Next Version Relation (1650): a Relation that may be used to discover which Relation points to the current version.

NextVersion (1650): a link to the Relationship that may point to the current output of the Relationship, supports Relationship substitution;

PreviousVersion (1655): a link to the Relationship that may point to the previous output of the Relationship, supports Relationship substitution.

Attribute Form

In one implementation of the Forms Language, an Attribute Form may be a generic representation of how a Form of a specific data type and a specific value may be explicitly assigned. The Attribute Form may describe properties of an Entity that may not be changed. An Attribute may not be substituted using a Relationship. This may allow some information in the system to be immutable. The Attribute Form may derive from the Containment Relationship Form and may include numerous Relations, several of which may be described as follows. Other implementations of an Attribute Form may include additional Relations, exclude certain Relations, or name similar or the same Relations differently. Additional Relations not described below may be used to enable the Attribute Form using Forms Language, and provide other associations and functionality. FIG. 17 is an exemplary illustration of the Attribute Form, configured according to the principles of the disclosure, designated generally by reference numeral 1700. The Attribute Form 1700 may include:

Globally Unique Identifier (GUID) Relation (1715): as understood by those of ordinary skill in the art, a distinct number (e.g., in hexadecimal or other format) that may be used to uniquely reference the entity with which it is associated;

Time Relation (1720): the date and time at which the entity was created;

FormGUID (1725): reference to the type of Form that may define the entity;

Owners Relation (1730): the Entity that may store the information and any content for the Entity created when the Form is instantiated;

Name Relation (1735): a link to the Primitive Form that may contain the name associated with this Form;

Thumbnail Relation (1740): a link to the Image Form that may store the location of the image file associated with the Form;

Parent Relation (1750): a Relation that may be used to discover which Entity or Entities are the parents of the Entity instantiated using the Attribute Form.

Child Relation (1755): a Relation that may be used to discover which Entity or Entities are children of the Entity instantiated using the Attribute Form.

Assigned Entity Relation (1760): may contain the GUID of the Entity being assigned the value;

Assigned Value Relation (1765): may contain the value being assigned.

The two sides (e.g., left and right, input and output) of the Attribute Form Relation may generally be described as follows.

Entity Form <GUID Relation> GUID
Entity Form <DTS Relation> DTS
Entity Form <Form Relation> Form Type GUID
Entity Form <Name Relation> Name
Entity Form <Thumbnail Relation> Image Form
Attribute Form <Assigned Entity Relation> Attribute
Attribute Form <Assigned Entity Value Relation> Assigned Entity Value
Versioned Attribute Relationship Form FIG. 18 is an exemplary illustration of the Versioned Attribute Relationship Form, configured according to the principles of the disclosure, designated generally by reference numeral 1800. In one implementation of the Forms Language, a Versioned Attribute Form may also be a generic representation of the Form that may be used to explicitly relate a Form of one type to another Form, and it may provide for multiple versions of an attribute to be assigned over time. The Versioned Attribute Form may describe properties of an Entity that may be changed over time. The change may be signified with a Substitution Relationship. This may allows some information in the system to be mutable, and relationships signifying changes made to variant relations of the entity and separate relationship entities representing changes to the variant relations of the entity.

The Versioned Attribute Relationship Form may be derived from an Attribute Form and may include numerous Relations, several of which are described as follows. Other implementations of a Versioned Attribute Form may include additional Relations, exclude certain Relations, or name similar or the same Relations differently. Additional Relations not described below may be used to enable the Versioned Attribute Form using Forms Language, and provide other associations and functionality. Versioned Attribute Form 1800 may include:

Globally Unique Identifier (GUID) Relation (1815): as understood by those of ordinary skill in the art, a distinct number (e.g., in hexadecimal or other format) that may be used to uniquely reference the entity with which it is associated;

Time Relation (1820): the date and time at which the entity was created;

FormGUID (1825): reference to the type of Form that may define the entity;

Owners Relation (1830): the Entity that may store the information and any content for the Entity created when the Form is instantiated;

Name Relation (1835): a link to the Primitive Form that may contain the name associated with this Form;

Thumbnail Relation (1840): a link to the Image Form that may store the location of the image file associated with the Form;

Next Version Relation (1850): a Relation that may be used to discover which Relation points to the current version.

Parent Relation (1850): A reference to the Form that contains the Versioned Attribute Relation that the Versioned Attribute Relationship Form links. For example, a Person Form may include a Friends Versioned Attribute Relation. The Friends Versioned Attribute Relation may link to a Friends Versioned Attribute Relationship Form through the Parent Relation.

Child Relation (1855): A reference to the Form that directly or indirectly contains the information for the versioned attribute. For example, a Person Form may include a Friends Versioned Attribute Relation. The Friends Versioned Attribute Relation may link to a Friends Versioned Attribute Relationship. The Friends Versioned Attribute Relationship Form may link to the Person Forms of the Friends through the Child Relation. For example, suppose Kristina has friends Elizabeth and Sammy, and Person Entities exist for Kristina, Elizabeth, and Sammy. A Kristina Person Entity Friends Relation may link to Friends Versioned Attribute Relationship Entity through the Parent Relation/The Friends Versioned Attribute Relationship Entity may link to the Person Entities for Elizabeth and Sammy through the Child Relationship.

Assigned Entity Relation (1860): the GUID of the Entity that may be assigned the value;

Assigned Value Relation (1865): the value that may be assigned;

NextVersion Relation (1870): the GUID of the Substitution Relationship that may point to the Relationship that may contain the new Assigned Entity and new Assigned Value;

PreviousVersion (1875): the GUID of the Substitution Relationship that may point to the Relationship that may contain the previous Assigned Entity and previous Assigned Value.

Element Form

FIG. 19 is an exemplary illustration of the Element Form, configured according to the principles of the disclosure, designated generally by reference numeral 1900. In one implementation of the Forms Language, an Element Form 1900 may be generic representation of the Form that may be used to explicitly relate a Form of one type to another Form, and may also allow for a set, or array of values to be assigned to the element at the same time.

An Element Form 1900 may derive from a Containment Relationship Form and may include numerous Relations, several of which are described as follows. Other implementations of an Element Form may include additional Relations, exclude certain Relations, or name similar or the same Relations differently. Additional Relations not described below may be used to enable the Element Form using Forms Language, and provide other associations and functionality. Element Form 1900 may include:

Globally Unique Identifier (GUID) Relation (1915): as understood by those of ordinary skill in the art, a distinct number (e.g., in hexadecimal or other format) that may be used to uniquely reference the entity with which it is associated;

Time Relation (1920): the date and time at which the entity was created;

FormGUID (1925): reference to the type of Form that may define the entity;

Owners Relation (1930): the Entity that may store the information and any content for the Entity created when the Form is instantiated;

Name Relation (1935): a link to the Primitive Form that may contain the name associated with this Form;

Thumbnail Relation (1940): a link to the Image Form that may store the location of the image file associated with the Form;

Parent Relation (1850): A reference to the Form that contains the Relation that the Element Relationship Form links. For example, a Person Form may include an Age Relation. The Person Form may link to an Age Element Relationship Form through the Parent Relation.

Child Relation (1855): A reference to the Form that directly or indirectly contains the information for the element. For example, a Person Form may include an Age Relation. The Age Relation may link to an Age Element Relationship. The Age Element Form may link to the Age Primitive Entity through the Child Relation on the Age Element Relationship. For example, suppose Kristina is 25. A Kristina Person Entity Age Relation may link the Age Element Relationship Entity through the Parent Relation. The Age Element Entity may link to the Age Primitive Entity that contains "25" through the Child Relationship.

Property Relationship Form

FIG. 20 is an exemplary illustration of a Property Relationship Form, configured according to the principles of the disclosure, generally denoted by reference numeral 2000. In another implementation of the Forms Language, a Property Relationship Form may also be a generic representation of a Form that may be used to explicitly relate a Form of one type to another Form, and may also allow for a single or array of values or entities to be assigned to the property at the same time.

The Property Relationship Form 2000 may derive from the Containment Relationship Form and may include numerous Relations, several of which are described as follows. Other implementations of a Property Relationship Form 2000 may include additional Relations, exclude certain Relations, or name similar or the same Relations differently. Additional Relations not described below may be used to enable the Property Relationship Form 2000 using Forms Language, and provide other associations and functionality. Property Relationship Form 2000 may include:

Globally Unique Identifier (GUID) Relation (2015): as understood by those of ordinary skill in the art, a distinct number (e.g., in hexadecimal or other format) that may be used to uniquely reference the entity with which it is associated;

Time Relation (2020): the date and time at which the entity was created;

FormGUID (2025): reference to the type of Form that may define the entity;

Owners Relation (2030): the Entity that may store the information and any content for the Entity created when the Form is instantiated;

Name Relation (2035): a link to the Primitive Form that may contain the name associated with this Form;

Thumbnail Relation (2040): a link to the Image Form that may store the location of the image file associated with the Form;

Parent Relation (2050): A reference to the Form that contains the Relation that the Property Relationship Form links. For example, a Person Form may include an Eye Color Relation. The Person Form may link to an Eye Color Element Relationship Form through the Parent Relation.

Child Relation (2055): A reference to the Form that directly or indirectly contains the information for the element. For example, a Person Form may include an Eye Color Relation. The Eye Color Relation may link to an Eye Color Property Relationship. The Eye Color Form may link to the Eye Color Primitive Entity through the Child Relation on the Eye Color Property Relationship.

Ownership Relationship Form

FIG. 21 is an exemplary illustration of a Ownership Relationship Form, configured according to the principles of the disclosure, generally denoted by reference numeral 2100. In one implementation of the Forms Language, an Ownership Relationship Form 2100 may typically specify where the content and information associated with an Entity are stored. It may derive from the Relationship Form and may include numerous Relations, several of which are described as follows. Other implementations of an Ownership Relationship Form 2100 may include additional Relations, exclude certain Relations, or name similar or the same Relations differently. Additional Relations not described below may be used to enable the Ownership Relationship Form 2100 using Forms Language, and provide other associations and functionality. The Ownership Relationship Form 2100 may include:

Globally Unique Identifier (GUID) Relation (2115): as understood by those of ordinary skill in the art, a distinct number (e.g., in hexadecimal or other format) that may be used to uniquely reference the entity with which it is associated;

Time Relation (2120): the date and time at which the entity was created;

FormGUID (2125): reference to the type of Form that may define the entity;

Owners Relation (2130): the Entity that may store the information and any content for the Entity created when the Form is instantiated;

Name Relation (2135): a link to the Primitive Form that may contain the name associated with this Form;

Thumbnail Relation (2140): a link to the Image Form that may store the location of the image file associated with the Form;

Owner (2150): The Entity that may store another Entity's content;

Owned (2155): The Entity whose content is may be stored.

Content Form

FIG. 22 is an exemplary illustration of a Content Form, configured according to the principles of the disclosure, generally denoted by reference numeral 2200. In one implementation of the Forms Language, a Content Form 2200 may be used to store complex data in the system, including but not limited to Forms, folders, files, messages, and the like, and may specify the types of unstructured information which may be managed using Forms Language. It may derive from the Entity Form and may include numerous Relations, several of which are described as follows. Other implementations of a Content Form may include additional Relations, exclude certain Relations, or name similar or the same Relations differently. Additional Relations not described below may be used to enable the Content Form using Forms Language, and provide other associations and functionality. The Content Form 2200 may include:

Globally Unique Identifier (GUID) Relation (2215): as understood by those of ordinary skill in the art, a distinct number (e.g., in hexadecimal or other format) that may be used to uniquely reference the entity with which it is associated;

Time Relation (2220): the date and time at which the entity was created;

FormGUID (2225): reference to the type of Form that may define the entity;

Owners Relation (2230): the Entity that may store the information and any content for the Entity created when the Form is instantiated;

Name Relation (2235): a link to the Primitive Form that may contain the name associated with this Form;

Thumbnail Relation (2240): a link to the Image Form that may store the location of the image file associated with the Form;

Containers Relation (2250): a Relation that may store the listing of parents for this content;

Attributes Relation (2255): a Relation that may specify characteristics for this content;

Elements Relation (2260): a Relation that may specify the set of content;

Description Relation (2265): may include a description of the entity.

Folder Form

FIG. 23 is exemplary illustration of the Folder Form, configured according to the principles of the disclosure, generally denoted as 2300. In one implementation of the Forms Language, a Folder Form 2300 may structure and may organize content. It may be derived from the Content Form and may include numerous Relations, several of which are described as follows. Other implementations of a Folder Form 2300 may include additional Relations, exclude certain Relations, or name similar or the same Relations differently. Additional Relations not described below may be used to enable the Folder Form using Forms Language, and provide other associations and functionality. The Folder Form 2300 may include:

Globally Unique Identifier (GUID) Relation (2315): as understood by those of ordinary skill in the art, a distinct number (e.g., in hexadecimal or other format) that may be used to uniquely reference the entity with which it is associated;

Time Relation (2320): the date and time at which the entity was created;

FormGUID (2325): reference to the type of Form that may define the entity;

Owners Relation (2330): the Entity that may store the information and any content for the Entity created when the Form is instantiated;

Name Relation (2335): a link to the Primitive Form that may contain the name associated with this Form;

Thumbnail Relation (2340): a link to the Image Form that may store the location of the image file associated with the Form;

Containers Relation (2350): a Relation that may store the listing of parents for this content;

Attributes Relation (2355): a Relation that may specify characteristics for this content;

Elements Relation (2360): a Relation that may specify the set of content;

Description Relation (2365): may include a description of the entity

Parent Relation (2375): a link to the GUID of the Parents Relation in the associated Containment Relationship Form, indicates Folders that may contains this Folder.

Children Relation (2370): a link to the GUID of a Child Relation of Files Relation in the associated Containment Relationship Form, may indicate Folders that this Folder contains or a File that this Folder may contain.

Containment Relationship Form

FIG. 24 is an exemplary illustration of the Containment Relationship Form 2400, configured according to the principles of the disclosure, designated generally by reference numeral 2400. In one implementation of the Forms Language, the Containment Relationship Form 2400 may contain the Relations that define parent and child associations between Forms to preserve a hierarchical content structure. A Containment Relationship Form 2400 may typically be instantiated when there is a need to create a Parent/Child Relationship between Forms so that a Form may be connected to the Forms that contain its properties and may express the state of the data.

The Containment Relationship Form 2400 may derive from the Relationship Form and may include numerous Relations, several of which are described as follows. Other implementations of a Containment Relationship Form 2400 may include additional Relations, exclude certain Relations, or name similar or the same Relations differently. Additional Relations not described below may be used to enable the Containment Relationship Form 2400 using Forms Language and provide other associations and functionality. The Containment Relationship Form 2400 may include:

Globally Unique Identifier (GUID) Relation (2415): as understood by those of ordinary skill in the art, a distinct number (e.g., in hexadecimal or other format) that may be used to uniquely reference the entity with which it is associated;

Time Relation (2420): the date and time at which the entity was created;

FormGUID (2425): reference to the type of Form that may define the entity;

Owners Relation (2430): the Entity that may store the information and any content for the Entity created when the Form is instantiated;

Name Relation (2435): a link to the Primitive Form that may contain the name associated with this Form;

Thumbnail Relation (2440): a link to the Image Form that may store the location of the image file associated with the Form;

Parent Relation (2450): may specify the GUID of the Parents of the associated Form; a Form may have zero or more children.

Child Relation (2455): may specify the GUID of the Child (ren) of the associated Form; a Form may have zero or more children PreviousVersion (2460): the GUID of the Substitution Relationship that may point to the Relationship that may contain the previously associated Entity.

NextVersion Relation (2465): the GUID of the Substitution Relationship that may point to the Relationship that may contain the new associated Entity.

NullEntity Form

FIG. 25 is an exemplary illustration of the NullEntity Form, configured according to the principles of the disclosure, designated generally by reference numeral 2500. In one implementation of the Forms Language, a Null Entity Form 2500 may allow a Relationship to be pointed to nothing. A Null EntityForm 2500 may be derived from Entity and may include numerous Relations, several of which are described as follows. Other implementations of a Null Entity Form may include additional Relations, exclude certain Relations, or name similar or the same Relations differently. Additional Null Entity Form Relations not described may be used to enable the Form using Forms Language, and provide other associations and functionality. Note that any Relationship may link the Null Entity to another entity. The NullEntity Form 2500 may include:

- Globally Unique Identifier (GUID) Relation (2515): as understood by those of ordinary skill in the art, a distinct number (e.g., in hexadecimal or other format) that may be used to uniquely reference the entity with which it is associated;
- Time Relation (2520): the date and time at which the entity was created;
- FormGUID (2525): reference to the type of Form that may define the entity;
- Owners Relation (2530): the Entity that may store the information and any content for the Entity created when the Form is instantiated;
- Name Relation (2535): a link to the Primitive Form that may contain the name associated with this Form;
- Thumbnail Relation (2500): a link to the Image Form that may store the location of the image file associated with the Form;

FIG. 8 provides an example of using a NullEntity.

Function Form

FIG. 27 is an exemplary illustration of the Function Form, configured according to the principles of the disclosure, designated generally by reference numeral 2700. In one implementation of the Forms Language, every Form typically has Relations and Relations are typically Functions, and every Form may be thought of as having the characteristics of a Function. However, the Function Form may contains the Relations that link inputs and outputs explicitly to enable mathematical operations, logical operations, process flow, algorithmic, complex processing, and the like. The Function Form 2700 may derive from the Entity Form and may include numerous Relations, several of which may be described as follows. Other implementations of a Function Form may include additional Relations, exclude certain Relations, or name similar or the same Relations differently. Additional Relations not described may be used to enable the Function Form using Forms Language, and provide other associations and functionality. Function Form 2700 may include:

- Globally Unique Identifier (GUID) Relation (2715): as understood by those of ordinary skill in the art, a distinct number (e.g., in hexadecimal or other format) that may be used to uniquely reference the entity with which it is associated;
- Time Relation (2720): the date and time at which the entity was created;
- FormGUID (2725): reference to the type of Form that may define the entity;
- Owners Relation (2730): the Entity that may store the information and any content for the Entity created when the Form is instantiated;
- Name Relation (2735): a link to the Primitive Form that may contain the name associated with this Form;
- Thumbnail Relation (2740): a link to the Image Form that may store the location of the image file associated with the Form;
- Input Relation (2750): a link to the Form(s) that may contain the inputs to the function. The inputs of a function may be subdivided into many additional relations. For example, in one example implementation of a function designed to sum two values, the Input Relation may be subdivided into the Left Value (LValue) and Right Value (RValue) Relations to represent the values to be added;
- Output Relation (2755): a link to Forms that may contain the output(s) of the function. Functions may have more than one output;
- CRN Relation (2760): May reference a human readable unique identifier for a Function which may be used to route information to a specific function.

As an example, FIG. 28 is an illustration showing exemplary pseudocoding and Inheritance for an Add Form, configured according to principles of the disclosure, generally denoted by 2800. The Pseudocoding and Inheritance for an Add Form 2800 shows pseudocoding and derivation of a Function Form (2810) from an Entity Form and subsequent derivation of a sample of an Add Function Form from the generic Function Form. Note that this example only shows a subset of the Entity Form and Function Form Relations. The information to the right of the ":" colon indicates the Form or Relation that may be extended to create the new Form or Relation. In this example, the Function Form (2820) may be created by extending the Entity Form (2810). The Input Relation (2830) and Output Relations (2830) may be added to the Function Form (2820). The example Add Function Form (2850) may then be created by extending the Function Form (2820). The example LValue Relation (2860) and example RValue Relation (2870) may be created by extending the Input Relation (2830), and the Sum Relation (2880) may be created by extending the Output Relation (2840).

In another example, pseudocoding of the derivation of a Function Form from an Entity Form and subsequent derivation of a sample of a Divide Function Form from the generic Function Form is provided in FIG. 29 (2900). Note that this example only shows a subset of the Entity Form and Function Form Relations. The information to the right of the ":" colon indicates the Form or Relation that may be extended to create the new Form or Relation. In this example, the Function Form (2920) may be created by extending the Entity Form (2910). The Input Relation (2930) and Output Relations (2930) may be added to the Function Form (2920). The example Divide Function Form (2950) may then be created by extending the Function Form (2920). The example Divisor Relation (2960) and example Dividend Relation (2970) may be created by extending the Input Relation (2930), and the example Quotient Relation (2980) and example Remainder Relation (2990) may be created by extending the Output Relation (2940).

The function inputs relations and output relations may be variant relations, and may link to their target inputs and outputs through containment relationships. The target input forms and output forms, and the target input entities and target output entities, respectively, may be primitive entities or complex entities so that a function input may include another function entity, an input to a different function, an output form a different function, another relationship entity, and the like. A system configured according to the principles of the disclosure in which a function may link to one or more functions as inputs and/or may link to one or more functions as outputs provides for the creation of a web or collection of function entities linked through relationship entities. This web of function entities that may be linked through relationship entities may be written or appended to an information stream, appended or written to a database configured according to the principles of the disclosure. A subset of the linked web of function entities in the information stream or database may be distributed across a system of nodes configured according to the principles of the disclosure, and the immutability of the distributed entities maintained so that that nodes can participate in a distributed flow of functions that may converge or diverge based on the addition of new function entities, function input entities, function output entities, and relationship entities, and the like to the information stream.

Group Form

FIG. 31 is an illustration showing an exemplary Group Form configured according to principles of the disclosure, generally denoted by 3100. In one implementation of the Forms Language, a Group Form may derive from the Function Form. Users may join Groups through a relationship in a system configured according to the principles of the disclosure so that working space, resource, content, and other entities may be easily shared with the group. Groups may make it easier to work or collaborate with multiple users in the system, and may also provide for quickly providing access to a large or small set of shared resources to a large number of other users.

A Group Form may include numerous Relations, several of which may be described as follows. A Group Form may be used to organize a set of entities, such as users and/or Groups, into a collection that may be referenced by name or some other Relation on the Group Form. In some implementations, a Group may have a common purpose, such as the set of users collaborating on a specific project. Other implementations of a Group Form may include additional Relations, exclude certain Relations, or name similar or the same Relations differently. Additional Relations not described may be used to enable the Group Form using Forms Language, and provide other associations and functionality. The Group Form 3100 may include:

- Globally Unique Identifier (GUID) Relation (3115): as understood by those of ordinary skill in the art, a distinct number (e.g., in hexadecimal or other format) that may be used to uniquely reference the entity with which it is associated;
- Time Relation (3120): the date and time at which the entity was created;
- FormGUID (3125): reference to the type of Form that may define the entity;
- Owners Relation (3130): the Entity that may store the information and any content for the Entity created when the Form is instantiated;
- Name Relation (3135): may link to the Primitive Form that may contain the name associated with this Form;
- Thumbnail Relation (3140): may link to the Image Form that may store the location of the image file associated with the Form;
- Input Relation (3150): a link to the Form(s) that may contain the inputs to the Group. The inputs of a group may be subdivided into many additional relations.
- Output Relation (3155): a link to Forms that contain the output(s) of the Group. Groups may have more than one output;
- CRN Relation (3160): May reference a human readable unique identifier for a Function which may be used to route information to a specific function.
- Group Name Relation (3192): a link to the Primitive Form that may contain the name of the Group;
- Group Description Relation (3193): may link to the description of the Group;
- Group Contact Relation (3194): may link to contact information for the Group.

Message Form

FIG. 33 is an illustration showing an exemplary Message Form configured according to principles of the disclosure, generally denoted by 3300. In one implementation of the Forms Language, a Message Form may include Relations that may be needed to reflect information associated with a message, similar to a message in an electronic mail system. It may be derived from a Content Form and may include numerous Relations, several of which are described as follows. Other implementations of a Message Form may include additional Relations, exclude certain Relations, or name similar or the same Relations differently. Additional Relations not described below may be used to enable a Message Form using Forms Language, and provide other associations and functionality. The Message Form 3300 may include:

- Globally Unique Identifier (GUID) Relation (3315): as understood by those of ordinary skill in the art, a distinct number (e.g., in hexadecimal or other format) that may be used to uniquely reference the entity with which it is associated;
- Time Relation (3320): the date and time at which the entity was created;
- FormGUID (3325): reference to the type of Form that may define the entity;
- Owners Relation (3330): the Entity that may store the information and any content for the Entity created when the Form is instantiated;
- Name Relation (3335): a link to the Primitive Form that may contain the name associated with this Form;
- Thumbnail Relation (3340): a link to the Image Form that may store the location of the image file associated with the Form;
- Containers Relation (3350): a Relation that may store the listing of parents for this content;
- Elements Relation (3355): a Relation that may specify the set of content;
- Attributes Relation (3360): a Relation that may specify characteristics for this content;
- Description Relation (3365): may include a description of the entity
- Sender Relation (3370): a Relation that may link to the entity that sent the message;
- Subject Relation (3375): a Relation that may link to text that describes the purpose of the message;
- Body Relation (3380): a Relation that may link to the text of the message;
- Reply Relation (3385): a Relation that may link to the text of a response to the message;
- Recipients Relation (3390): a Relation that may link to the entities designated to be sent the message;
- Attachments Relation (3395): a Relation that may link to the entities linked as attachments to the message, such as Files, Folders, and the like.

File Form

FIG. 34 is an illustration showing an exemplary File Form configured according to principles of the disclosure, generally denoted by 3400. In one implementation of the Forms Language, a File Form may represent a file of any type that contains content in a system configured according to the principles of the disclosure, including but not limited to text files, documents, images, programs, and the like. It may be derived from a Content Form and may include numerous Relations, several of which are described as follows. Other implementations of a File Form may include additional Relations, exclude certain Relations, or name similar or the same Relations differently. Additional Relations not described below may be used to enable the File Form using Forms Language, and provide other associations and functionality. The File Form 3400 may include:

- Globally Unique Identifier (GUID) Relation (3415): as understood by those of ordinary skill in the art, a distinct number (e.g., in hexadecimal or other format) that may be used to uniquely reference the entity with which it is associated;
- Time Relation (3420): the date and time at which the entity was created;

FormGUID (3425): reference to the type of Form that may define the entity;

Owners Relation (3430): the Entity that may store the information and any content for the Entity created when the Form is instantiated;

Name Relation (3435): a link to the Primitive Form that may contain the name associated with this Form;

Thumbnail Relation (3440): a link to the Image Form that may store the location of the image file associated with the Form;

Containers Relation (3450): a Relation that may store the listing of parents for this content;

Elements Relation (3455): a Relation that may specify the set of content;

Attributes Relation (3460): a Relation that may specify characteristics for this content;

Description Relation (3465): may include a description of the entity;

NameOnDisk (3470): a reference such as the name of the file that may indicating where the file is stored in the Streambase;

Parents (3470): may link to one or more folder entities that may contain the File Entity;

Version (3470): may link the current version of the file.

Network Form

FIG. 35 is an illustration showing an exemplary Network Form configured according to principles of the disclosure, generally denoted by 3500. In one implementation of the Forms Language, the Network Form may derive from the Function Form and may include numerous Relations, several of which may be described as follows. The Network Form may be used to organize a set of many different types of entities, such as users, Groups, Files, Folders, and the like into a collection that may be referenced by name or some other Relation on the Network Form. A network may typically be instantiated for a larger organization (possibly a company or a division at a company) and may be comprised of multiple groups. This Form may be provided for convenience in systems configured according to the principles of the disclosure so that companies may more readily mimic their corporate structure in the system. In some implementations, a Network may have a common purpose, such as the set of users and content for a company or organization. Other implementations of a Network Form may include additional Relations, exclude certain Relations, or name similar or the same Relations differently. Additional Relations not described may be used to enable the Network Form using Forms Language, and provide other associations and functionality. The Network Form 3500 may include:

Globally Unique Identifier (GUID) Relation (3506): as understood by those of ordinary skill in the art, a distinct number (e.g., in hexadecimal or other format) that may be used to uniquely reference the entity with which it is associated;

Time Relation (3509): the date and time at which the entity was created;

FormGUID (3512): reference to the type of Form that may define the entity;

Owners Relation (3515): the Entity that may store the information and any content for the Entity created when the Form is instantiated;

Name Relation (3518): a link to the Primitive Form that may contain the name associated with this Form;

Thumbnail Relation (3521): a link to the Image Form that may store the location of the image file associated with the Form;

Input Relation (3527): may link to the Form(s) that may contain the inputs to the Network function. The inputs of a function can be subdivided into many additional relations. For example, in one example implementation of a function designed to sum two values, the Input Relation may be subdivided into the Left Value (LValue) and Right Value (RValue) Relations to represent the values to be added;

Output Relation (3530): may link to Forms that contain the output(s) of the function. Functions may have more than one output;

CRN Relation (3533): May reference a human readable unique identifier for a Function which may be used to route information to a specific function.

Group Name Relation (3557): a link to the Primitive Form that may contain the name of the Network Group;

Group Description Relation (3560): may link to the description of the Network Group;

Group Contact Relation (3563): may link to contact information for the Network Group.

Organization Relations (specify name, web address, etc.) (3566): may link to information about the organization that created the network;

Contact Relations (3569): May link to network contact information

User Form

FIG. 36 is an illustration showing an exemplary User Form configured according to principles of the disclosure, generally denoted by 3600. In one implementation of the Forms Language, the User Form may derive from the Function Form and may include numerous Relations, several of which may be described as follows. The User Form may be used to organize information about people or processes that access a system developed using the Forms Language. A User Form may capture the general information for a user on the system configured according to the principles of the disclosure.

Other implementations of a User Form may include additional Relations, exclude certain Relations, or name similar or the same Relations differently. Additional Relations not described may be used to enable the User Form using Forms Language, and provide other associations and functionality. The User Form 3600 may include:

Globally Unique Identifier (GUID) Relation (3615): as understood by those of ordinary skill in the art, a distinct number (e.g., in hexadecimal or other format) that may be used to uniquely reference the entity with which it is associated;

Time Relation (3620): the date and time at which the entity was created;

FormGUID (3625): reference to the type of Form that may define the entity;

Owners Relation (3630): the Entity that may store the information and any content for the Entity created when the Form is instantiated;

Name Relation (3635): a link to the Primitive Form that may contain the name associated with this Form;

Thumbnail Relation (3640): a link to the Image Form that may store the location of the image file associated with the Form;

First Name Relation (3645): may link to a Primitive Form that may contain the first name of the person or process associated with this Form;

Last Name Relation (3650): may link to a Primitive Form that may contain the last name associated with this Form;

Username Relation (3655): may link to a Primitive Form that may contain the username selected by or assigned to the user associated with this Form;

Password Relation (3660): may link to a Primitive Form that may contain the password selected by or assigned to a user associated with this Form;

Email Address Relation (3665): may link to a Primitive Form that may contain the email address selected by or assigned to a user associated with this Form.

Invariant Relation Form

FIG. 37 is an illustration showing an exemplary Invariant Form configured according to principles of the disclosure, generally denoted by 3700. In one implementation of the Forms Language, an Invariant Relation Form may extend the Relation Form and may provide the associations required to link one Form to one other Form in a one-to-one relation that may not be changed.

The Invariant Relation Form may include numerous Relations, several of which are described as follows. Other implementations of an Invariant Relation Form may include additional Relations, exclude certain Relations, or name similar or the same Relations differently. Additional Relations not described below may be used to enable an Invariant Relation Form using Forms Language, and provide other associations and functionality. Invariant Relation Form 3700 may include:

Globally Unique Identifier (GUID) Relation (3715): as understood by those of ordinary skill in the art, a distinct number (e.g., in hexadecimal or other format) that may be used to uniquely reference the entity with which it is associated;

Time Relation (3720): the date and time at which the entity was created;

FormGUID (3725): reference to the type of Form that may define the entity;

Owners Relation (3730): the Entity that may store the information and any content for the Entity created when the Form is instantiated;

Name Relation (3735): a link to the Primitive Form that may contain the name associated with this Form;

Thumbnail Relation (3740): a link to the Image Form that may store the location of the image file associated with the Form;

Corresponding Relation (3745): may typically join a Relation on a Relation Form to a specific Relation on the Form joined to by the right side Relation of the Relation Form.

Left (3750): a link to the Form that may be the input to/left side of a Relation;

Right (3755): a link to the From that may be the output/right side of the Relation;

SuperRelation (3760): links to the Relations from which this Relation may derive;

SubRelation (3765): links to the Relations that may derive this relation;

MinOccurs (3770): may specify whether the relation points to zero or one, zero or more, one and only one, one or more, or some other number of Forms;

MaxOccurs (3775): may specify whether the relation points to zero or one, zero or more, one and only one, one or more, or some other number of Forms.

Variant Relation Form

FIG. 38 is an illustration showing an exemplary Variant Relation Form configured according to principles of the disclosure, generally denoted by 3800. In one implementation of the Forms Language, a Variant Relation Form may extend the Relation Form and may provide the associations required to link one Form to multiple other Form in a one-to-many relation. The Variant Relation Form may include numerous Relations, several of which are described as follows. Other implementations of the Variant Relation Form may include additional Relations, exclude certain Relations, or name similar or the same Relations differently. Additional Relations not described below may be used to enable the Relation Form using Forms Language, and provide other associations and functionality. The Invariant Form 3800 may include:

Globally Unique Identifier (GUID) Relation (3815): as understood by those of ordinary skill in the art, a distinct number (e.g., in hexadecimal or other format) that may be used to uniquely reference the entity with which it is associated;

Time Relation (3820): the date and time at which the entity was created;

FormGUID (3825): reference to the type of Form that may define the entity;

Owners Relation (3830): the Entity that may store the information and any content for the Entity created when the Form is instantiated;

Name Relation (3835): a link to the Primitive Form that may contain the name associated with this Form;

Thumbnail Relation (3840): a link to the Image Form that may store the location of the image file associated with the Form;

Corresponding Relation (3845): may typically join a Relation on a Relation Form to a specific Relation on the Form joined to by the right side Relation of the Relation Form.

Left (3850): a link to the Form that may be the input to/left side of a Relation;

Right (3855): a link to the From that may be the output/right side of the Relation;

SuperRelation (3860): links to the Relations from which this Relation may derive;

SubRelation (3865): links to the Relations that may derive this relation;

MinOccurs (3870): may specify whether the relation points to zero or one, zero or more, one and only one, one or more, or some other number of Forms;

MaxOccurs (3875): may specify whether the relation points to zero or one, zero or more, one and only one, one or more, or some other number of Forms;

Subclassing Forms and Relations and Inheritance

In one implementation of Forms Language, Forms may be a class, or a construct similar to a class, and any entity defined by a Form may be a class or a construct similar to a class. One implementation of the Forms Language may permit subclassing, or derivation, of Forms, Relations, Relationship, and any other entities defined by Forms. The subclassing behavior provides for inheritance of Forms, Relations and Relationships. As may be understood by one of ordinary skill in the art, inheritance in object oriented programming allows for objects to share properties, structure, methods, and other code. If the objects share code, changes or updates made at the top of the inheritance tree automatically cascade down to the lowest branch or leaf.

In the Forms Language, it is through inheritance that:

A new Form type created by subclassing an existing Form may inherit all of the Relations (and methods) of an existing Form. The new Form may then be extended by including additional custom Relations and methods, without impacting the subclassed Form.

Relations are also defined by Forms; therefore a new Relation created by subclassing an existing Relation may inherit all of the Relations (and methods) of an existing Relation Form. The new Relation Form may then be extended by including additional custom Relations and methods, without impacting the subclassed Relation Form. Relations are the properties that describe and provide context to a Form. In traditional systems before the disclosure, a property of an object is typically just a data element. When configured according to the principles of the disclosure, a Relation is a class and may be subclassed with full inheritance to the derived Forms. This may be particularly useful, for example, when defining a Form such as a Function Forms. FIG. 29 (2900) illustrates an example Function Form, subclassed to create a Divide Function Form. The Divide Function Form (2950) subclassed the Input Relation (2930) into two new Relations: the Dividend Relation (2960) and the Divisor Relation (2970). The Divide Function Form (2950) also subclassed the Output Relation (2940) into two new Relations: the Quotient Relation (2980) and the Remainder Relation (2990). These Relations are Forms themselves and the full set of operations available for Forms may be applied to these Relations.

Relationships are also defined by Forms; therefore a new Relationship created by subclassing an existing Relationship inherits all of the Relations (and methods) of an existing Relation Form. The new Relation Form may then be extended by including additional custom Relations and methods, without impacting the subclassed Relation Form.

Entities are also defined by Forms, therefore a new Entity created by subclassing an existing Entity inherits all of the Entity (and methods) of an existing Entity. The new Entity may then be extended by including additional custom Relations and methods, without impacting the subclassed Entity.

The benefits of inheritance in one implementation of the Forms language may be demonstrated by the extension of Entity Form to create other Forms such as the Relationship Form, Container Form, and Function Form, to name a few. These Forms may then be further subclassed, as an example, to create the Containment Relationship Form, and Folder Form, respectively. Because the Entity Form may includes Relations (e.g. GUID, Date/Timestamp, Name, and Thumbnail), all of the Forms derived from the Entity Form may automatically inherit these Relations. In addition, and methods implemented to query or otherwise perform operations on the Relation, may also be inherited. For example, every Relation may have an input and an output, as well as a method to execute the Relation input to obtain the Relation output was implemented using FL. Therefore the Relation on any Form may be executed to determine its inputs and outputs. This Relational Execution or Relational Stepping provides the basis for discovering evolving content in a database configured according to the principles of the disclosure and is described in more detail in this specification.

A Form that is derived from another Form may be a subclass (or child) of that (parent) Form. Forms may be subclassed by establishing a "subclass" relation between a "subform" and a "superform". Subclassing may provide one-to-many (through reduction) or many-to-one (through consolidation) representation between the parent(s) and child (ren) Form(s). A one-to-many subclassing may be accomplished through reduction of the parent to multiple children. Many-to-one subclassing may be accomplished through consolidation of multiple parents to the child.

Relations may be similarly subclassed by establishing a "subclass" association between a "subrelation" and a "super relation". A Relation that is derived from another Relation may be a subclass of the Parent Relation. Subclassing may provide one-to-many (through reduction) or many-to-one (through consolidation) representation between the parent(s) and child(ren) Relation(s).

FIG. 39 (3900) provides an illustration of Form Subclassing, according to principles of the disclosure. In this example, Form E (3905) is subclassed by Form C (3910) and Form D (3915). Form C (3910) and Form D (3915) are child Forms of Form E, which is considered the Parent Form. Form C (3910) and Form D (3915) inherit the Relations of Form E (3905). Continuing the example, Form B (3920) subclasses Form C (3910) and Form D (3915). In this inheritance, Form B (3920) is a child Form of both Form C (3910) and Form D (3915), which are both parents. Form D (3920) inherits the Relations of both Form C (3910) and Form D (3915). Form D (3920) is said to be the union of Form C (3910) and Form D (3915). Additionally, Form E (3905) may be a superform (3945) of Form C (3910) and Form D (3915), which may be subforms (3950) of the superform (3945) through the subclass relation (3960).

Mapping Forms, Relations, Relationships, and Entities to a Database

In one implementation of the Forms Language, instantiating a Form to create an Entity may generate a tuple structure. Each invariant Relation belonging to a Form may be mapped as a tuple in a new column in the corresponding Entity's data row. Variant Relations may not be mapped to columns in the row; variant Relations may instead be mapped as rows. Once a row is populated, it may not be changed and may preserve the immutability of data in a database configured according to the principles of the disclosure. The implementation of immutability through the construction and relation of tuples may be is a powerful and differentiating objective of databases configured according to the principles of the disclosure. By providing structures that enable immutability, data may never be lost or conflict with other databases in a distributed system of databases configured according to the principles of the disclosure. The immutability of data coupled with signifying changes through relationship entities may provide a mechanism to discover the evolution of the data throughout a distributed system.

FIG. 40 (4000) shows a conceptual overview of an example Form and how it's invariant Relations may be mapped to a database configured according to principles of the disclosure. In this example, Form A (4005) contains four invariant Relations: Relation 1 (4015), Relation 2 (4020), Relation 3 (4025), and Relation N (4030). Form A (4005) is mapped into a database table (4010) with four columns, one corresponding to each relation: a Relation 1 column (4035), a Relation 2 column (4040), a Relation 3 column (4045), and a Relation N column (4050). Because the Relations are invariant, the Relation column directly contains the data from the Form that the Relation links to on the right side. For example, if Relation 1 is a "GUID" Relation, the Relation 1 column may be named "GUID" and the content of the columns would be the actual GUID values.

Relationship entities may also corresponds to a row in a table, and each row may represent a state change of at least one entity referenced by a relationship entity. Multiple state changes of an entity referenced by a relationship entity may be represented by:

multiple rows in the table, each of the multiple state changes may correspond to a new row, and/or represented by a single row in the table, each of the multiple state changes reflected in the single row.

FIG. 41 (4100) shows a sample Form (4105) from which several Entities (4115, 4120, 4125) were instantiated and provides a conceptual view of how the invariant Relations and the Entities may be stored in the Tuplebase. In general, invariant Relations for an Entity may be mapped as columns in the same table in the Tuplebase. Each Invariant Relation (4106, 4107, 4108, 4109) of the Form (4105) is mapped to a corresponding column (4130, 4135, 4145, 4150) in the table. Because the Relations are invariant, the data that corresponds to each Relation for each Entity may be directly written to rows in the table. Entity A (4115) data are written to an Entity A row (4150). Entity B (4120) data are written to an Entity B row (4155). Entity C (4125) data are written to an Entity C row (4160).

In a more detailed description of a system configured according to the principles of the disclosure, an Entity may be written to a database by writing the information for each Relation of the Entity to the database through the Steps shown in FIG. 42A (4200A) FIG. 42B (4200B) (4200) and described as follows. The Relation Entities on a Form may be variant or invariant, and the data associated with the variant Relation Entities or invariant Relation Entities may be primitive or complex. The process for writing Entities to a database may include the following steps:

- Step 4205: Determine the Relations on the Form defining the Entity to be written to a database.
- Step 4210: For each relation, determine its' type: primitive invariant, complex invariant, primitive variant, complex variant
- Step 4215: Determine whether a table exists for the Form that defines the Entity that contains the invariant relations.
- Step 4220: Step 4220 contains multiple substeps including:
  - If a table does not already exist for the Form, create a table for the Form that includes the following:
  - Include a column that corresponds to each primitive invariant relation of the Entity to be written to the database.
  - Include a set of three columns for each complex invariant relation of the Entity to be written to the database.
    - Assigned Entity GUID column, prefixed with the relation name
    - Assigned Form GUID column, prefixed with the relation name
    - Assigned relation name column, prefixed with the relation name.
- Step 4225: For any Primitive Invariant Relation Entity: write the invariant primitive relation data directly to the columns that correspond to the invariant primitive in the Entity Table.
- Step 4230: Write the data required to populate the three columns for each complex invariant in the Entity Table.
- Step 4235: Each variant primitive Relation points to a separate Relationship Entity that joins entity being written to the database to the Primitive Entity table that stores the data. Step 4235 contains multiple substeps including:
  - Determine to which Relationship Entity the variant primitive Relation points.
  - Determine whether a table already exists for the Relationship Entity.
  - If not, create it by:
    - Including columns for the invariant primitives of the relationship entity, typically: GUID, FormGUID, and Time.
    - Include a set of three columns that refer to the Entity that points to the relationship, typically referred to as the "Parent Entity" for the primitive variant relation of the Entity to be written to the database.
      - Assigned Entity GUID column, prefixed with the relation name
      - Assigned Form GUID column, prefixed with the relation name
      - Assigned relation name column, prefixed with the relation name.
    - Include a set of three columns that refer to the Variant Primitive Entity table that the Relationship points to, typically referred to as the "Child Entity" for the primitive variant relation of the Entity to be written to the database.
      - Assigned Entity GUID column, prefixed with the relation name
      - Assigned Form GUID column, prefixed with the relation name
      - Assigned relation name column, prefixed with the relation name.
- Step 4240: Write the data required to populate the three columns for each primitive variant in the Entity Table.
- Step 4245: Each variant complex Relation points to a separate Relationship Entity that joins entity being written to the database to the Variant Complex Entity table that stores the data. Step 4245 contains multiple substeps including:
  - Determine to which Relationship Entity the variant complex Relation points.
  - Determine whether a table already exists for the Relationship Entity.
  - If not, create it by:
    - Including columns for the invariant primitives of the relationship entity, typically: GUID, FormGUID, and Time.
    - Include a set of three columns that refer to the Entity that points to the relationship, typically referred to as the "Parent Entity" for the primitive variant relation of the Entity to be written to the database.
      - Assigned Entity GUID column, prefixed with the relation name
      - Assigned Form GUID column, prefixed with the relation name
      - Assigned relation name column, prefixed with the relation name.
    - Include a set of three columns that refer to the Variant Complex Entity table that the Relationship points to, typically referred to as the "Child Entity" for the variant complex relation of the Entity to be written to the database.
      - Assigned Entity GUID column, prefixed with the relation name
      - Assigned Form GUID column, prefixed with the relation name
      - Assigned relation name column, prefixed with the relation name.
- Step 4250: Write the data required to populate the three columns for each complex variant in the Entity Table.
- Step 4255: For each primitive invariant entity written as a three column set in a Relationship table, Repeat multiples Steps 3 through Step 5 to create and/or write the primitive invariant data to a table in the database.
- Step 4260: For each complex variant entity written as a three column set in a Relationship table, repeat multiple Step 1 through Step 11 until all tables required for all associated entities are written.

An illustrative example of writing one of each type of Relation of an Entity to a database is provided in FIG. 43A (4300A) and FIG. 43B (4300B).

Determine the Relations on the Form defining the Entity to be written to a database. In this example, Person Entity 1 (4305) includes the following Relations
  FormGUID Relation (4310)
  EntityGUID Relation (4315)
  Time Relation (4320)
  Name Relation (4325)
  Birth Information Relation (4330)
  Address Relation (4335)
For each relation, determine its' type: primitive invariant, complex invariant, primitive variant, complex variant
  FormGUID Relation (4310) is a primitive invariant relation
  EntityGUID Relation (4315) is a primitive invariant relation
  Time Relation (4320) is a primitive invariant relation
  Name Relation (4325) is a primitive variant relation
  Birth Information Relation (4330) is a complex invariant relation
  Address Relation (4335) is a complex variant relation
Determine whether a table exists for the Form that defines the Entity that contains the primitive invariant relation. In this example, assume the table does not yet exist.
If a table does not already exist for the Form, create a table for the Form.
  Create a Person Entity Table (4360)
  Include a column that corresponds to each primitive invariant relation of the Entity to be written to the database (4365)
    Add FormGUID Colum
    Add EntityGUID column
    Add Time column
  Include a set of three columns for each invariant complex relation of the Entity to be written to the database.
    For the Variant Birth Info Relation (4370)
      BirthInformationRelationEntityGUID column—corresponded to the Assigned Entity column prefixed with the relation name, includes the GUID of the BirthInfoRelation for the Person A Entity
      BirthInformationRelationEntityFormGUID column Assigned relation column, prefixed with the relation name, includes the FormGUID for the BirthInfoRelation
      BirthInformationRelationEntityRelation—corresponds to the Assigned Value column prefixed with the relation name, includes the GUID of the BirthInformation Entity for Person A Entity
For any Primitive Invariant Relation Entity: write the invariant primitive relation data directly to the columns that correspond to the invariant primitive in the Entity Table.
  Write the PersonEntity FormGUID in the FormGUID Column.
  Write the PersonA GUID in the EntityGUID column.
  Write the data and time the PersonA Entity was created in the Time column.
Write the data required to populate the three columns for each complex invariant in the Entity Table.
  For the Variant Birth Info Relation (4370)
    Write the GUID of the BirthInfoRelation for the Person A Entity in the BirthInformationRelationEntityGUID column
    Write the FormGUID for the BirthInfoRelation in the BirthInformationRelationEntityFormGUID column
    Write the GUID of the BirthInformation Entity for Person A Entity in the BirthInformationRelationEntityRelation column
Perform activities required to write the variant primitive Name Relation data to the database
  Assume that the Name Relationship Table pointed to by the variant primitive Name Relation already exists and includes the following columns:
    GUID
    FormGUID
    Time.
    ParentEntityGUID
    ParentEntityFormGUID
    ParentEntityRelation.
    ChildValueGUID
    ChildValueFormGUID
    ChildValueRelation column
  Write the information for the variant primitive Name Relation to the Name Relationship Table (4365)
    Write the Name Relationship GUID for Person A in the GUID column (4375)
    Write the Name Relationship FormGUID in the FormGUID column (4375)
    Write the data and time the Name Relationship for Person A was created in the Time column (4375)
    Write the Parent Entity information for the Name Relationship for Person A (4380)
      Write the PersonA GUID in the ParentEntityGUID column
      Write the PersonFormGUID in the ParentEntityFormGUID column
      Write PersonFormNameRelation in the ParentEntityRelation column.
    Write the Child Entity information for the Name Relationship for Person A (4385)
      Write the String GUID in the ChildValueGUID column
      Write the StringFormGUID in the ChildValueFormGUID column
      Write AdHocRelation in the ChildValueRelation column.
Perform activities required to write the variant complex Address relation data to the database. Although not shown in the Figure, the table created for the Address Relationship Entity would be very similar to the Name Relationship table (4365), with the exception that is would point to a complex variant table for the Address Form Entity rather than a String Entity Table.
  Assume that the Address Relationship Table pointed to by the variant complex Address Relation already exists and includes the following columns:
    GUID
    FormGUID
    Time.
    ParentEntityGUID
    ParentEntityFormGUID
    ParentEntityRelation.
    ChildEntityGUID
    ChildEntityFormGUID
    ChildEntityRelation column
  Write the information for the variant complex Address Relation to the Address Relationship Table. Although not shown in the Figure, the table created for the Address Relationship Entity would be very similar to the Name Relationship table (4365), with the exception that is would point to a complex variant table for the Address Form Entity rather than a String Entity Table.

Write the Address Relationship GUID for Person A in the GUID column
 Write the Address Relationship FormGUID in the FormGUID column
 Write the data and time the Address Relationship for Person A was created in the Time column
 Write the Parent Entity information for the Address Relationship for Person A (4380)
  Write the PersonA GUID in the ParentEntityGUID column
  Write the PersonFormGUID in the ParentEntityFormGUID column
  Write PersonFormNameRelation in the ParentEntityRelation column.
 Write the Child Entity information for the Address Relationship for Person A (4385)
  Write the AddressEntity GUID in the ChildEntityGUID column
  Write the AdddressEntityFormGUID in the ChildValueFormGUID column
  Write AdHocRelation in the ChildEntityRelation column.

Static Typing and Mapping Variant Relations to a Database

In one implementation of the Forms Language, Relations may be used to link or associate one Form with another Form. Unless otherwise specified, the actual content of a Relation on a Form may be of any type. In some cases, constraining the structure of the Form that may be associated through the Relation may be beneficial. These constraints may be applied by creating Attribute Forms or Element Forms of the desired type and adding Relations to those specific attributes or elements to the Form.

For example, a Person Form may include Relations to a Name Attribute Form and an Age Attribute Form. If the Name Attribute Form and Age Attribute Form are not further defined, any type of input may be associated with the Name or Age and linked to the Person Form.

An unconstrained Name Relation may be created by deriving the Name Relationship Form from the Relationship Form and adding a new Relation "Assigned Name".

A constrained, or statically typed Name Relation Form may be modeled by:
 Creating a User Form.
 Adding a Name Relation to a User Form.
 Creating a Name Property Relationship Form.
 Pointing the Name Property Relation Form Child Relation to a String
 Primitive Form so that only a string can be associated with the Name Relation.

FIG. 44 (4400) illustrates an example Person Form (4405) and the Name Relation (4410) and Age Relation (4415) configured as statically typed. The Name Relation (4410) links to a String Primitive Form (4430) through a Name Property Relationship Form (4420). The Age Relation (4415) links to a Number Primitive Form (4435) through an Age Property Relationship Form (4425).

FIG. 44 (4500) shows an example of how an invariant, statically typed Person Form Eye Color Relation and content may be mapped to a database configured according to the principles of the of the disclosure. Invariant relations are typically written directly to the tables mapped as into three columns: Assigned Entity, Assigned Entity Relation, and Assigned Entity Value.

In this Figure, the Person A Form (4505) links to an Eye Color as a variant String Primitive Form (4520) through a Eye Color Relation (4510) and a Eye Color Property Relationship Form (4515). A Person Entity and Eye Color "Blue" may be mapped to a database configured according to the principles of the disclosure as follows:
 Write the invariant GUID and Time data for the person entity to the Person Entity table (4525). Because this information is invariant, the values are stored directly in the table in a single column for each invariant relation.
 Write invariant data, write variant data for the parent relation, write variant data for variant name relation
 Write invariant data for string primitive Managing Entities and Relational Stepping Content that the Entities configured according to the principles of the disclosure may maintain may be stored in many different types of structures, including but not limited to:
 a hierarchical structure in which entities may be managed primarily through parent-child relations and containment relationships;
 a graph database structure in which entities may be linked to other entities through a collection of relations and relationships, creating a rich web of linkage
 a web structure;
 a stream structure in which entities, relations, and relationships may be appended together, and change may be signified primarily through the addition of entities, including relationship entities;
 a database structure wherein every entity is storable in the distributable electronic database as an object which contains immutable fields representing invariant relations of the entity, and separate relationship entities signifying changes to the variant relations of the entity;
 and the like The linkages between entities in the different types of structures may be traversed by "reading", or executing the Relations on a Form. These Relations may be thought of as "bridges" between Entities. FIG. 46A is a general example of a relational bridge joining two Forms, generally designated by reference numeral 4600A. The example relation bridge 4600A illustrates Form A (4605) as bridged, or linked, to Form B (4610) through Relation C (4615). After instantiation, Entity A may be bridged, or linked, to Entity B through a Relation as well.

For example, a system configured according to the principles of the disclosure may include an "Automobile" Form that may further include two invariant Relations: Automobile Make and Automobile Model. FIG. 46B is a general example of a relational bridge joining the three Forms through two invariant relations, generally designated by reference numeral 4600B. The example relation bridge joining three Forms 4600B illustrates the Automobile Form (4630) as:
 Bridged, or linked, to an Automobile Manufacturer Form (4640) through the Automobile Make Relation (4635), and
 Bridged, or linked, to a primitive integer Form (4650) through the Automobile Model Year Relation (4635).

These entities may be instantiated to create a collection of entities that model a fleet of cars.

Relations may be executed to traverse from one Entity to another through a Relational Stepping process. This process may be bi-directional because each Relational hop has a corresponding hop in the other direction, meaning that Entity A can hop to Entity B, and Entity B can hop to Entity A. Relational Stepping may be summarized as comprising two processes:

Entity-to-Relation Hop 1: Hop from an Entity to a Relation

Relation-to-Entity Hop 2: Hop from a Relation to a related Entity

Relational Stepping may be important to many operations of a structure configured according to the principles of the disclosure, and may be used to: retrieve all the subfolders of a parent folder, retrieve the file contents of a folder, retrieve the versions of an Entity such as a document, retrieving the characteristics of an entity, such as a file name or folder name, and many others. Using Relational Stepping, the set of entities associated with another entity may be retrieved. This may be useful in discovering the full set of linkage for an entity. For example, Relational Stepping may be used to retrieve a listing of the users that are members of a Group, users that have access to a file or folder, users who have shared a file or folder and whom they may shared it with, and the like. These example uses may be important to the development of collaboration networks and relationship-based programming enabled by the Forms Language.

FIG. 26 is an example flow diagram for the process of creating and executing functions for Relations, generally designated by reference numeral 2600. The creating and executing functions for Relations flow diagram 2600 may include the following steps:

Step 2660: Creating an executable function for at least one relation corresponding to at least one property on a first Form defining a class of entities, the at least one relation defined by a second Form that includes two additional relations being a left side relation and a right side relation, the executable function having an input and having an output, wherein the input is an instance of the first Form pointed to by the left side relation of the second Form and the output includes at least one instance of a third Form pointed to by the right side relation of the second Form.

Step 2665: Executing the executable function to provide an instance of the first Form pointed to by the left side relation and the executable function identifying and retrieving all instances of all third Forms pointed to by the right side relation that are discoverable outputs of the second Form for the executing function, providing a web of linked entities instantiated from the Forms defining the classes of entities so that the web of linked entities provides at least one immutable stream of information that is at least one of readable, searchable, traversable, appendable, expandable and shareable by producers and/or consumers of the stream of information.

FIG. 47 is an example of relation walking between a parent Folder Entity and a child Folder Entity, generally designated by reference numeral 4700. The parent-to-child relation walking example 4700 provides a conceptual overview of the process that may be used during relational stepping to hop between parent folders and child folders, according to principles of the disclosure. In this example, the parent Folder Entity (4705) may hop to (or locate) a Child Folder Entity (4715) through the Containment Relationship Entity (4710) by Parent-Containment Hop 1: the Parent Folder Entity (4705) may execute its Parent Relation 1 (4720) to hop to the Containment Relationship Entity (4710). Recalling to FIG. 4 (400), the Parent Relation 1 (4720) on FIG. 47 (4700) may be defined by a Parent Relation 1 Form that include a Left side/input Relation, a Right side/output Relation, and a Corresponding Relation. The Left side/input Relation of Parent Relation 1 joins to the Parent Folder Entity (4705). The Right side/output Relation of the Parent Relation 1 joins to the Containment Relationship Entity (4710). The Corresponding Relation of the Parent Relation 1 joins to the Child Relation 2 (4725) of the Containment Relationship Entity (4710).

Containment-Child Hop 2: From the Containment Relationship Entity (4710), the Parent elation (4725) may be executed to determine that Child Folder Entity B (4715) is linked as a child. Recalling to FIG. 4 (400), Parent Relation 2 on FIG. 47 (4700) may also be defined by a Parent Relation 2 Form that include a Left side/input Relation, a Right side/output Relation, and a Corresponding Relation. The Left side/input Relation of the Parent Relation 2 joins to the Containment Relationship Entity (4710), the Right side/output Relation of the Parent Relation 2 joins to Child Folder Entity B (4715). The Corresponding Relation of the Parent Relation 2 joins to the Child Relation 3 (4730) of Child Folder Entity B (4715).

In some scenarios, Child Folder Entity B (4715) may also be a parent folder and linked to one or more child folders through containment relationships. In these scenarios, Hop 1 and Hop 2 may be repeated, with the Child Folder Entity B as the parent. This process may repeat to retrieve child folders through as many nested level of folder as required. The process may end when the Child Relation of the Parent Folder Entity is not linked to a Containment Relationship Entity.

FIG. 48 is an example of the relation walking between a child Folder Entity and a parent Folder Entity, generally designated by reference numeral 4800. In the child-to-parent relation walking example 4800, the bi-directionality process that may be used during relational stepping to hop between a child folder and a parent folder is shown, according to principles of the disclosure. In this example, the parent Child Entity (4815) may hop to (or locate) a Parent Folder Entity (4805) through the Containment Relationship Entity (4810) by:

Child-Containment Hop 1: the Child Folder Entity (4815) may execute its Child Relation (4825) to hop to the Containment Relationship Entity (4810).

Containment-Parent Hop 2: From the Containment Relationship Entity (4810), the Parent Relation (4825) may be executed to determine that Child Folder Entity B (4815) is linked as a child (4820).

In some scenarios, Parent Folder Entity A (4815) may also be a child of one or more folders and linked to its parents through containment relationships. In these scenarios, Hop 1 and Hop 2 may be repeated, with the Parent Folder Entity A as the child. This process may repeat to retrieve parent folders through as many nested level of folder as required. The process may end when the Parent Relation of the Parent Folder Entity is not linked to a Containment Relationship Entity.

FIG. 49 is an additional example of relation walking between a parent Folder Entity and a child Folder Entity, generally designated by reference numeral 4900. In the additional parent-to-child relation walking example 4900, a more detailed example of one possible two-hop relational stepping process for a Folder and related child Folders according to principles of the disclosure, as well as the corresponding process flow. In this Figure, the following steps depicted using arrows:

Step 4920: Execute the ParentRelation in Parent Folder Entity A (4905) to return the of the Containment Relationship Entities targeted by e of the Parent Folder Entity A Recalling to FIG. 4 (400), the Parent Relation A on Parent Folder Entity A (4905) may be defined by a Parent Relation A Form that include a Left side/input Relation, a Right side/output Relation, and a Corresponding Relation. The Left side/input Relation of Parent Relation A joins to the Parent Folder Entity A (4905).

The Right side/output Relation of the Parent Relation A joins to the Containment Relationship Entity (4915). The Corresponding Relation of the Parent Relation A joins to the Child Relation 1 the Containment Relationship Entity (4915).

Step 4925: Retrieve GUID(s) of the Containment Relationship Entities (4915) that are associated with the Child Relations returned in Step 4920.

Step 4930: Retrieve the Parent Relations that correspond to the Containment Relations returned in Step 4925.

Step 4935: Retrieve the Child Folder Entities (4910) targeted by the GUIDs of the Child Relations returned in Step 4930. Recalling to FIG. 4 (400), Parent Relation 1 on FIG. 49 (4900) may also be defined by a Parent Relation 1 Form that include a Left side/input Relation, a Right side/output Relation, and a Corresponding Relation. The Left side/input Relation of the Parent Relation 1 joins to the Containment Relationship Entity (4915), the Right side/output Relation of the Parent Relation 1 joins to Child Folder Entity B (4910). The Corresponding Relation of the Parent Relation 1 joins to the Child Relation B of Child Folder Entity B (4910).

FIG. 50 is a flowchart of an exemplary Process Flow for Traversing Relations, performed according to the principles of the disclosure, generally designated by reference numeral 5000. The Exemplary Process Flow for Traversing Relations 5000 may indicate that each Relation in the example shown in FIG. 49 (4900) may actually be considered a function, with a left side/input relation and a right side/output relation. Re-integrating the functional nature of Relations, the steps that may be required to traverse a relation may be generalized as follows and are shown in FIG. 50 (5000):

Step 5005: Determine the Relation of interest on the Form type that defines the Entity of interest.

Step 5010: Treat as an executable function the Relation of interest, having a left side/input relation and a right side/output relation and a corresponding relation.

Step 5015: Discover the input/left side Entity pointed to by the input/left side relation.

Step 5020: In the context of the discovered input/left side Entity, execute the relation function for the Relation of interest discover the right side/output Entities pointed to by the right side/output of the relation.

Step 5025: Use the corresponding relation of the relation function to determine which relation on the right side/output Form is pointed to by the Relation of Interest.

Step 5030: Repeat for each Relation of interest on either the Left Side/Input Entity or Right Side/Output Entity (ies)

This process provides a web of linked entities instantiated from the Forms defining the classes of entities so that the web of linked entities provides at least one immutable stream of information that is at least one of readable, searchable, traversable, appendable, expandable and shareable by producers and/or consumers of the stream of information.

Immutability, Change, and State

In one implementation of the Forms Language, a database configured according to the principles of the disclosure may be implemented as non-destructive by evolving the database through the addition of entities rather than through traditional techniques such as overwriting other otherwise changing entities (techniques commonly employed in existing systems prior to the disclosure, typically using a row update procedure). In one implementation of a database configured according to the principles of the disclosure, insert methods may be used to evolve content. These inserts methods create new entities which include typically substitution relationships, enabling relationships previously created to be replaced by new relationships in a non-destructive and additive manner.

In one implementation of a database configured according to the principles of the disclosure, only row inserts are required to evolve the state of the database, thereby preserving row-level immutability because rows are typically inserted but typically not subsequently updated or altered after insert. In this configuration, an individual database row (R1) representing an entity (E1) does not change over time, in that is its field values are not updated or altered over time, since invariant relations (belonging to e1's Form) are mapped as columns in the row R1.

In this configuration, the difference between immutability and change is typically this: while the individual row representing e1 may not typically change over time and may typically be immutable (because invariant relations typically map to the columns of R1), the variant relations (VR-Set) defined on e1's Form (E1F) may not change over time, as new and separate relationship entities are created which reference or point back to existing entities (such as e1) under existing variant relations included in VR-Set. A variant relation (VR1) belonging to VR-Set may typically change over time as new relationships entities may be created which reference (or point back to) the entity e1 (the entity reference part of the reference triplet) under the relation VR1 (the relation reference part of the reference triplet). In this way, the invention is typically able to record change relationally without altering or modifying existing rows representing entities. The delta entity stream may typically include the relationship entities signifying those changes.

In this sense, the invention may include and enable the following: that rows in a database may represent immutable changes rather than mutable states; that logical changes to the state of the system may be accomplished through the addition of new database rows rather than the modification of existing database rows; that immutability configured according to the principles of the invention make it possible to think of data in a "differential" way (as opposed to the more classic way of looking at rows as "integral" states); that the integrated state of an entity may be computed by adding the set of relationships which point to the entity at a point in time minus the set of relationships negated out or substituted out at that same point in time (the relational algebra); that these integrated states may also be stored representing an integrated snapshot of an entity at a point in time; that the graph model of information in a database configured according to the principles of the invention represent both links in the web of entities and changes to the existing set of entities in the web relationships, of which there are typically many types; that these entities may be shared across many databases configured according to the principles of the invention making it possible to integrate states continuously so as to increase collaboration and cooperative advantage between organizations and the resulting information symmetries among their databases, while at the same time not sharing for a time certain other entities between databases, therefore making it possible to increase differentiation/asymmetries between organizations and increase competitive information advantage. The invention contemplates a model of computer science oriented around differential changes typically represented by entities, so that information processing may be driven in response to the creation of new changes (typically the creation of new entities). In this way, the differential model of data contemplated herein may be viewed as the medium required to perform information management and processing, if a relationship (R) entity representing a discrete change to referenced entities is viewed as a unit of information to be processed. Those entities (ESet) referenced by such a relationship R are typically said to change when R is created. For a given member of ESet (E1), E1 is typically referenced by relationship R using an entity reference, which includes the referenced variant relation (VR1) belonging to the form (F1) defining E1. When the relationship R is created which contains a reference to E1 and its VR1, the entity E1 is said to change with respect to the variant relation VR1. Consumers or algorithms interested in changes to the entity E1 may request an automatically generated information stream including changes made to E1 with respect to a certain variant relation (VR1). This stream may be called a delta stream since it describes changes made to E1 under one or more variant relations (including VR1). In certain implementations, rows may not be mutated, however rows may be deleted for purposes such as garbage collection, erasing entities, and the like.

In one example of inserting rows to evolve the state of the database configured according to the principles of the disclosure, a new row representing a substitution relationship may be added. This row may set a previous version of an entity as a previous relation, and to substitute a current followed by the addition of another row specifying the new Relationship. Through the use of these methods and relationships, the data medium in an implementation of a database configured according to the principles of the disclosure may be immutable; rather than changing a specific Entity (row), the Relationships between Entities (rows) may be changed. This may be accomplished by adding new Entities ("changes") that are Relationships that may signify changes between referenced entities. The process of capturing changes primarily as Relationships may be referred to a differential computing. The process of combining all Relationships referencing a specific entity to determine its current state may be referred to as integration of the differentials.

The Containment Relationship or Property Relationship linking Forms and Entities joined by a variant relation may both include a Next Relation and a Previous Relations, which are also variant relations. These relations may not be specified when the initial link between two Entities joined through the appropriate Relationship. At a later time, it may be desirable to update a Containment Relationship or Property Relationship joining two entities. This update may be completing using a Substitution Relationship. FIG. 51A and FIG. 51B are an exemplary flowchart of an Substitution Process Flow, performed according to the principles of the disclosure, generally designated by reference numerals 5100A and 5100B. The Exemplary Substitution Process Flow in 5100A and 5100B provide an example of one implementation and assumes String Primitive Form and Substitution Relationship Form and Property Relationship Forms already exist. In other implementations, certain steps may be completed in different order, concurrently, or may contain fewer or additional steps. The Exemplary Substitution Process Flow in 5100A and 5100B may include the following steps:

Create and Link Forms

Step 5105: Create Person Form.

Step 5110: Add a Name Relation to the Person Form.

Step 5115: Create a Name Property Relationship Form.

Step 5120: Point the Name Relation on the Person Form to the Parent Relation on the Name Property Relationship Form.

Step 5125: Point the Name Property Relationship Form Child Relation to the Name Relation and the String Primitive Form.

Instantiate the Person Entity "Joe"

Step 5130: Instantiate the Person Form as Person Entity 1.

Step 5135: Instantiate the Name Property Relationship Form as a Name Property Relationship Entity 1.

Step 5140: Point the Person Entity 1 Name Relation to the Name Property Relationship Entity 1.

Step 5145: Instantiate the String Primitive Form as String Primitive Entity 1.

Step 5150: Set the String Relation in the String Primitive Entity 1 to "Joe".

Substitute Name Relation with New Primitive Entity with the Value "Joseph"

Step 5155: Instantiate Name Property Relationship Entity 2.

Step 5160: Instantiate a String Primitive Form as String Primitive Entity 2.

Step 5165: Set the String Relation in the String Primitive Entity 2 to "Joseph".

Step 5170: Point the Name Property Relationship Entity 2 Child Relation to String Primitive Entity 2.

Step 5175: Point the Person Entity 1 Name Relation to the Name Property Relationship Entity 2. Note: Person Entity 1 is now has to two Name Relations.

Step 5180: Instantiate a Substitution Relationship Form as Substitution Relationship Entity 1.

Step 5185: Link the Previous Version Relationship in the Substitution Relationship Entity 1 to the Next Version Relation on Name Property Relationship Entity 1.

Step 5190: Link the Next Version Relationship in the Substitution Relationship Entity 1 to the Previous Version Relation on Name Property Relationship Entity 2.

One purpose of an immutable data medium is to prevent inconsistency among Entities when those Entities are duplicated widely across a distributed network of databases. Problems keeping Entities synchronized across a distributed network may be a significant barrier to the development and proper functioning of a distributed database. Implementing immutability according to the principles of the disclosure may prevent changes to existing Entities, as is typically done is systems today prior to the disclosure, and may address these problems. The immutability characteristics of a entities in a system configured according to the principles of the disclosure may provide for entities to be shared across a distributed network in a consistent manner. Entities may diverge after distribution through the addition of new entities and new relationships in any of the nodes to which the entity was distributed. These divergent changes may allow for competitive advantage to consumers of the entities through the development and inclusion of new information that is not shared with other nodes. For example, competitive advantage may be desired by two companies working to develop a product to meet the same market needs. The changes may also be selectively distributed to other nodes that contain the entity to achieve cooperative advantage through the convergence of the entity sets on the nodes. The new information may then be available to consumers of the node on which it was converged. Cooperative advantage may likely be desired by two companies collaborating to develop a joint product to meet a market need.

The conservation of data supports synchronization in a distributed setting as the Entity cannot be changed; rather layers of new relationships are created by adding new tuples. These information sets, from different databases distributed across nodes in a system configured according to the principles of the disclosure, may be combined without risk of a synchronization conflict. The total information set within a database therefore accumulates over time non-destructively and consistently, even as new information sets flow into one database configured according to the principles of the disclosure from other databases configured according to the principles of the disclosure.

The immutability characteristic of the database configured according to the principles of the disclosure has many applications. Substituting and versioning relationships rather than deleting relationships, coupled with methods to step through relationships, immutability may be used in the database to:

- View the evolution of an entity over time. For example, a user may view the evolution of a file over time, versions added, when, and by whom;
- Share different versions of an entity over time. For example, by not deleting previous versions of an entity, a version prepared at one point in time can be shared separately than a version prepared at a different point in time. This can be extremely useful for document-based collaborations with multiple levels of management reviews. Drafts of documents can be prepared and stored in a central collaboration environment. "Completed" drafts can be forwarded on for review while revised drafts can be prepared;
- Trace entity access: The listing of all users that have been granted access to a file, as well as who granted the access, the type of access, and the date/timestamp of access can be viewed. This is extremely useful for tracking access to sensitive information, as well as the identification of possible sources of information compromise;

Any change to a system configured according to the principles of the disclosure may be considered a change to the state of a system configured according to the principles of the disclosure. A change, and there for a change in state, may include but is not limited to the addition of a new entity to a system, stream, database, or the like configured according to the principles of the disclosure. Additional examples of state changes include but are not limited to:

- Instantiation of an entity and/or the relationships that link the instantiated entity to its properties may be considered state changes.
- Changes to a system, stream, database, or the like configured according to the principles of the disclosure may be signified by the creation of new relationships and may also be state changes.
- Creation of a relationship substituting one entity for another entity may also be a state change.
- Forms and non-relationships may also be entities for which additions or changing relationships may also be state changes.

Retrieving the Current State of an Entity

Changes through the addition of relationships may be referred to as the addition of differential data. These differential data may be integrated to determine the current or any state of an entity.

For example, a system may include the following as shown in Exemplary Substitution Process Flow in 5100A and 5100B:

- a Person Entity,
- a String Entity with the value of "Joe",
- a String Entity with the value of "Joseph",
- a Name Relationship Entity 1 that points to the "Joe" String Entity through Containment Relationship Entity 1,
- a Substitution Relationship Entity, and
- a Name Relationship that points to the "Joseph" String Entity through Containment Relationship Entity 2

FIG. 52 is an exemplary flowchart of an example Process Flow for Retrieving Entity State, performed according to the principles of the disclosure, generally designated by reference numerals 5200. The example Process Flow for Retrieving Entity State 5200, in one application to may be used to retrieve the current state of the Name Relation on the Person Entity shown in the Exemplary Substitution Process Flow in 5100B, may include:

- Step 5205: Provide the system with entity GUID, FormGUID, and the name of the relation that is being looked up. In this example, provide the GUID for the Person Entity.
- Step 5210: The system may use the Entity GUID to determine the FormGUID. In this example, the FormGUID is for the Person Form.
- Step 5215: The System may return the shape of the Form associated with the FormGUID, including all Relations.
- Step 5215: Branch the retrieval process according to the type of relation being retrieved.
- Step 5220—Branch 1 Invariant Primitive Relation: Invariant primitive values may be stored directly in the table for the Form under consideration with a value in a single column with the same name as the relation, and may be retrieved directly from the table by the system. For example, GUID and timestamp may be invariant primitive relations and may be stored in the Person From table in columns GUID and Time.
- Step 5225—Branch 2 Invariant Complex Relation: Invariant Complex Relations may be stored directly in the table for the form under consideration as the following three columns that may point to the value—assigned entity, assigned entity Form, assigned entity relation name. For example, the Model relation information for a Car Entity with an invariant complex Model Relation may be found in a table that includes a model$entity column, model$form column, and a model$relation column.
- Step 5230—Branch 3 Variant Primitive Relation: Variant Primitive Relations may be found in a Relationship table. The value associated with the relation may be stored directly in the relationship table as a value in the column with the name of the relation for that relationship.
- Step 5235—Branch 4 Variant Complex Relations: Variant Complex Relations: Relations may be found in a Relationship table with a reference to the table that includes a pointer to the complex entity: assigned entity, assigned value, assigned relation name. The system may retrieve the complex entity Form and GUID, which provides the complex variant's Form and GUID. The above steps may be repeated to locate specific information of interest.

In one embodiment of the invention the tables for each Form are created only when the first entity of that Form type is instantiated. One of ordinary skill in the art may also recognize that the tables may be created at the time that the Form is first created regardless of the existence of any entities of that form type.

Information Streams

In one implementation of a system configured according to the principles of the disclosure, an information stream may be a single entity or any collection of entities appended together. These entities may include but are not limited to Forms, Relations, Entities, and Relationships, as well as any subclasses of any Forms, Relations, Entities, and Relationships. For example, any of the following non-limiting example entities may be included in a stream: Form Entities, Relation Forms, Relation Entities, Relationship Forms, Relationship Entities, Primitive Forms, Primitive Entities, Substitution Relationship Forms, Substitution Relationship Entities, Attribute Forms, Attribute Entities, Versioned Attribute Forms, Versioned Attribute Entities, Element Forms. Element Entities, Property Relationship Forms, Property Relationship Entities, Ownership Forms, Ownership Relationship Entities, Content Forms, Content Entities, Folder Forms, Folder Entities, Containment Relationship Forms, Containment Relationship Entities, NullEntity Forms. NullEntities, Function Forms, Function Entities, Group Forms, Group Entities, Message Forms, Message Entities, File Forms, File Entities, Network Forms, Network Entities, User Forms, User Entities, Non-relationship Forms, and Non-relationship Entities. A conceptual overview of a stream is provided in FIG. 53 (5300). In this example illustration, the information stream (5305) includes appended Entity 1 through Entity N. Information streams may expand to a substantially unlimited length as new entities are appended.

The information stream may typically include at least one entity and at least one relationship entity that may signify a change with respect to at least one other entity or at least one other relationship entity. Every entity in the stream may include immutable data so that a change in the state of the stream may be reflected by the addition of a new entity to an information stream. These relationship entities may signify changes in the state of an entity so that the information content associated with the referenced entity may be logically changed while preserving the immutability of the referenced entity. The invariant portion of the information state of the an entity referenced by a relationship prior to the creation of the relationship entity may be preserved in at least one of the information streams and the invariant portion of the information state of the referenced entity after the creation of the relationship entity may also be preserved an information stream. Additionally, the information content associated with an entity referenced by a relationship may include immutable data associated with invariant relation, and the information content associated with the referenced entity may include variable data associated with variant relations, if variant relations are present.

Integrating the entities and relationship entities comprises a snapshot at a point in time of the immutable fields belonging to one or more entities. The state of an entity may be computed by logical integration over any particular time period.

An information stream configured according to the principles of the disclosure, or a subset of an information stream configured according to the principles of the disclosure, may be:

Streamable: an information stream containing entities that may be moved from one location to another through a communications protocol and may be merged, appended to, other otherwise combined with another stream.

Appendable: one information stream may be added another information stream.

Copyable: a subset of the collection of entities in one stream may be replicated to a second stream.

Mergeable: one information stream may be combined with another information stream. A merge may include set logic where the result of the merger is the union, intersection, or difference of the two streams.

Truncateable: the immutable elements of an information stream may be removed from the stream as a "reader" reads the stream forward and has no further need for the elements that have been read.

Distributable: an information stream or database graph configured according to the principles of the disclosure that may be spread across more than one of any type of electronic infrastructure and inter-connected via a communications channel. The electronic infrastructure may include, but is not limited to: virtual machines, physical servers, other computer servers, electronic devices (e.g., smart phones, tablet computers, desktop computers, laptop computers, netbooks, and the like), nodes, networks, or other computing environments or computing devices.

A subset of one information stream may be copied into a second information stream. That second information stream or the first stream from which it was copied may be merged with, appended to, or otherwise combined with a third stream configured according to the principles of the disclosure. Any information stream embodied according to the principles of the disclosure may be merged with, appended to, or otherwise combined any other information stream embodied according to the principles of the disclosure. In addition, a subset of any information stream embodied according to the principles of the disclosure may be copied to create a new information stream.

An information stream may be stored on a variety of media, including but not limited to a text file, the in memory storage space of a computer processor, a traditional SQL database, a non-traditional database, a message, an XML file, and the like.

When configured according to the principles of the disclosure, streams may be used to may be ordered in a specific way to store a sequence of entities inside a file, such as in a network stream. An information stream may be used to transfer a sequence of entities from one node to another where the streams may then be appended; and streams may be stored in memory so that all entities composing the stream are an in-memory representation such as with java.

Information flow may occurs in a system configured according to the principles of the disclosure when one or more entities are appended to an information stream, or one or more information streams are appended, copied, merged, or otherwise combining with other information streams configured according to the principles of the disclosure.

Writing an Entity to an Information Stream

In one implementation of a database configured according to the principles of the disclosure, an entity may be stored in a stream. New entities may be appended to the stream and operations such as create and read may be possible without locating or writing near the location of the original entity in the stream. FIG. 54 is a simplified conceptual view of writing of writing a person entity and related entities to an information stream, generally denoted by 5400A In this example, the Person Entity (5405), Name Property Relationship Entity 1 (5420), Age Property Relationship Entity 1 (5430), String Primitive Entity 1 (5425), and Number Primitive Entity 1 (5435) are appended to an Information Stream (5440).

Note that to simplify the example and discussion of FIG. 54 (5400), multiple entities may be referenced as a group rather than individually. In addition, the Relations shown for each Form or each Entity may only be a subset of the full set of Relations.

When configured according to the principles of the disclosure, entities in an information stream may be immutable and may not be changed. Instead, entities in an information stream may evolve through the addition of new Relationship Entities. A Relationship Entity may be used to substitute information associated with an entity at one point in time with different information at another point in time. Relationship Entities may be added to an Information Stream to associate new information with an Entity. The set of information, or state of an entity, may be determined by integrating an Entity and any Relationship entities signifying changes to that Entity up to a particular point in time.

FIG. 55A is simplified conceptual overview of writing changes to a person entity and related entities to an information stream, generally denoted by 5500A. In this example, the Person Entity shown in FIG. 54 (5400) has been updated to reflect a change in the Name Relation (5510). This update was made by the creation of Substitution Relationship Entity 1 (5545), Name Property Relationship Entity 2 (5550), and String Primitive Entity 2 (5555). As shown in the Figure, these entities are appended to the end of information stream (5540).

FIG. 55B is an example process flow for Creating Information Streams and Reflecting Change in State by the Addition of New Entities, generally denoted by 5500B. The Creating Information Streams and Reflecting Change in State by the Addition of New Entities Process Flow 5500B may include:

Step 5560: Creating an information stream, the stream including at least one entity and at least one relationship entity wherein the relationship entity signifies a change with respect to at least one other entity or signifies a change to at least one other relationship entity, wherein a relationship entity is also a type of entity Step 5570: Reflecting a change in a state of the information stream by addition of a new entity to the information stream, wherein every entity includes immutable data.

Writing an Information Stream to a Database

In systems of today prior to the invention, changes are typically stored outside the database, such as in a log file, and are not typically part of the database. In a database configured according to the principles of the disclosure, changes may be accomplished through the addition of new relationship entities, which themselves signify change and may be stored in the an information stream. An information stream may be stored in a database. Anytime a relationship is created or a new entity instantiated, there may be a state transition in the database configured according to the principles of the disclosure. These relationship entities may reference entities that exist anywhere in the stream, or anywhere in a different stream.

An information stream may be written to a database using the same method as when writing an entity to a database. The Relation Entities on a Form may be variant or invariant. The data associated with the variant Relation Entities of invariant Relation Entities may be primitive or complex. The process for writing Entities is shown in FIGS. 42A (4200A) and 42B (4200B).

Complex Entity Stream and Relation Join Stream

In one implementation of a database configured according to the principles of the disclosure, Complex Entity Stream and Relation Join Stream may also be structures that may be used to store entities in a database structure. Complex Entity Streams may store the database content and Relation Join Streams may store the associations, or links, between content in the database.

At least two types of entities may be stored in an example database configured according to the principles of the disclosure to use Complex Entity Streams and Relation Join Streams: Complex Entities and Primitive Entities. Complex entities may derive from the complex entity Form and may contain the following relations: GUID, date/timestamp, and one or more relations to complex content. Examples of complex entities may include: Form, document, image, or anything that is not a primitive entity.

Primitive entities may derive from the primitive entity Form and may include the following relations: GUID, date/timestamp, and value. A primitive may be a built-in data type in the database. Primitive entities may include but are not limited to: Boolean, number, string, time, and unique. Primitive entities may be of fixed length or variable length. Primitive entity streams may supported by a specific content model.

Complex and Primitive Entity Streams may be written to the an example database configured according to the principles of the disclosure, Complex Entity Streams and Relation Join Streams using a process that may record the entities themselves and all relations of the entity being stored with other entities. This stream writing process may alternate between streams of complex entity content and streams of relational joins that may link the content together. Each stream may be a complex entity itself. For example, FIG. 56 (5600) illustratively shows a Folder that may related to another Folder through a parent to child relation, configured according to principles of the disclosure.

When writing the relationships between a Parent Folder A (z5505) (a complex entity) and a Child Folder B (5515), another complex entity) to the Complex Entity Stream and Relational Join Stream, the Folder entity may be written to the streams shown in Table 2:

TABLE 2

Example Parent Folder to Child Folder Relationship Writing to Complex Entity Stream and Relational Join Stream

| Write Stream | Stream Type | Stream Content |
|---|---|---|
| Stream 1 | Complex Entity Stream | Parent Folder A entity (5605) |
| Stream 2 | Relation Join Stream | Parent Folder A Child Relation Entity (5620) |
| Stream 3 | Complex Entity Stream | Containment Relationship Entity (5610) |
| Stream 4 | Relation Join Stream | Containment Relationship Entity Parent Relation entity (5625) |
| Stream 5 | Complex Entity Stream | Child Folder B (5615) |
| Stream 6 | Relation Join Stream | GUID relation for child folder |
| Stream 7 | Primitive Entity Stream | GUID value relation |
| Stream 8 | Primitive Value | GUID value |

The alternating streams may continue until the complex entity may be related to a primitive entity. The primitive entity may be the lowest stream of the entity write process, and may terminate the complex entity stream. Because primitive entities may be supported by a specific content model, the stream writer may parse primitive entities, may convert the entities into bytes, and may write those bytes of content to the database as variable length binary strings in byte chunks of a specific or varied size.

The above example demonstrates writing one Folder relationship and the GUID of a related child into complex and primitive entity stream streams. Each complex entity may include more than one relationship. For example, as shown in FIG. 57 (5700) if the Parent Folder A entity is related to three subfolders, Stream 4 through Stream 8 may include the entries shown in Table 3.

TABLE 3

Writing Multiple Parent Folder-Child Folder Relationships

| Write Stream | Stream Type | Stream Content | | |
|---|---|---|---|---|
| Stream 1 | Complex Entity Stream | Parent Folder A Entity (5705) | | |
| Stream 2 | Relation Join Stream | Parent Folder A Child Relation | | |
| Stream 3 | Complex Entity Stream | Containment Relationship Entity 1 (5710) | Containment Relationship Entity 2 (5715) | Containment Relationship Entity 3 (5720) |
| Stream 4 | Relation Join Stream | Parent Relation | Parent Relation | Parent Relation 3 |
| Stream 5 | Complex Entity Stream | Child Folder B (5725) | Child Folder C (5730) | Child Folder D (5735) |
| Stream 6 | Relation Join Stream | GUID Relation for Child Folder B | GUID Relation for Child Folder C | GUID Relation for Child Folder D |
| Stream 7 | Primitive entity Stream | GUID Value Relation for Child Folder B | GUID Value Relation for Child Folder C | GUID Value Relation for Child Folder D |
| Stream 8 | Primitive Value | GUID Value for Child Folder B | GUID Value for Child Folder C | GUID Value for Child Folder D |

The Complex Entity Stream writer and Relational Join Stream writer may complete the full set of writes for the relationships that terminate in a primitive entity stream before moving on to the next relation. FIG. 58 (5800) in view of Table 4 may illustrate a more detailed display of the writing a Folder Form with a multiple relation to Complex Entity Stream and Relational Join Stream in a database configured to principles of the disclosure.

TABLE 4

Folder Entity -- Multiple Stream Writing

| Stream 1 (CES) | Stream 2 (RJS) | Stream 3 (CES) | Stream 4 (RJS) | Stream 5 (CES) | Stream 5 (PES) | Stream 6 (RJS) | Stream 7 (CES) | Stream 7 (PES) | Stream 8 (RJS) | Stream 9 (CES) | Stream 9 (PES) |
|---|---|---|---|---|---|---|---|---|---|---|---|
| Folder (5805) | GUID Relation | GUID Relation Entity | GUID Value Relation | GUID | | | | | | | |
| | Date/Timestamp Relation | Date/Timestamp Relation Entity | Date/Timestamp Value Relation | Date/Timestamp | | | | | | | |
| | Child Relation | Containment Relatnship Entity 1 (5810) | Parent Relation 1 | Child Folder B (5815) | | GUID Relation | GUID Relation Entity | | GUID Value Relation | | |
| | | Containment Relatnship Entity 2 (5820) | Parent Relation 2 | Child Folder C (5825) | | GUID Relation | GUID Relation Entity | | GUID Value Relation | | GUID |
| | | Containment Relatnship Entity 3 (5830) | Parent Relation 3 | Child Folder D (5835) | | GUID Relation | GUID Relation Entity | | GUID Value Relation | | GUID |
| | Parent Relation | Containment Relatnship Entity 4 (5850) | Child Relation | Parent Folder | | GUID Relation | GUID Relation Entity | | GUID Value Relation | | GUID |
| | | Folder Name Property Relatnship Entity (5840) | Folder Name Relation | Name Relation Entity | | Name Value Relation | | Name | | | |

TABLE 4-continued

Folder Entity -- Multiple Stream Writing

| Stream 1 (CES) | Stream 2 (RJS) | Stream 3 (CES) | Stream 4 (RJS) | Stream 5 (CES) | Stream 5 (PES) | Stream 6 (RJS) | Stream 7 (CES) | Stream 7 (PES) | Stream 8 (RJS) | Stream 9 (CES) | Stream 9 (PES) |
|---|---|---|---|---|---|---|---|---|---|---|---|
| | File/Document Relation | File/Document Relation Entity | File-GUID Relation | File GUID Relation entity | | File GUID Value Relation | | File GUID | | | |
| | | File/Document Relatnship Entity | File BLOB Relation | File BLOB Relation entity | | File BLOB Value Relation | | File BLOB | | | |

Self-Describing Nature of Databases and Information Streams

In one implementation of the Forms Language, the databases configured according to the principles of the disclosure may be self-describing and self-contained. Several characteristics that may provide for creation of self-describing and self-contained databases:

The shape of every Form, as well as the data for every Entity may be included as rows of information in a database. The database may then be queried to determine the shape of any Form.

The same database and same tables may also be queried to determine the current values for the properties an Entity of that Form Type.

The data stored in the tables for the entities may be immutable

Changes to the data stored in the tables may only be accomplished through the addition of new rows corresponding to relationship entities; existing rows may not be modified.

Given these characteristics, new Form types may be added to the database by inserting rows describing that new Form type into the tables. The newly defined Form type may then be instantiated and values may be assigned to its properties. The instantiation and property assignments may be accomplished through the insertion of new rows (records) into the database. The insertion of records for both the shape of the Form and values for the Entity's properties may be accomplished through appending the records onto the appropriate tables in the system.

Table 5 through Table 11 show a simplified implementation using the principles of the disclosure to implement a self-describing, self-contained database.

Table 5. Form Table: may include a listing of the each Form and a corresponding Form GUID (globally unique identifier), timestamp indicating when the record was created, and the name of the Form.

Table 6. Property Table: may include a listing of the properties that may be used for defining Forms and their corresponding GUID, creation timestamp, and name.

Table 7. Primitive Boolean Table: a table that may define the value properties of the Boolean Form type including GUID, creation timestamp, and Boolean value.

Table 8. Primitive String Table: a table that may define the properties of primitive strings, including GUID, timestamp, and String value Table 9. Document Table: a table that may define the properties of a Document, including columns for the invariant relations such as GUID and creation timestamp.

Table 10. Folder Table: a table that may define the properties of a Folder, including columns for the invariant relations such as GUID and creation timestamp.

Table 11. Containment Relationship: a table that may define the properties of a Containment Relationship including columns for the invariant relations such as GUID and creation timestamp, 3-column pointer to an Entity marked as the Parent, and 3-column pointer to an Entity marked as Child.

Multiple tables in the system may be queried to determine additional information about each Form or each Property. For example, in Table 11 Containment Relationship, includes a record with GUID 202. This record shows that the GUID property on the Property Form has its "IsVariant" property set to the Boolean with a value of False. This may indicate that the GUID Property of the Property Form is an invariant relation. The usage of a Property to describe a Property of the Property Form is an example of the self-describing nature of this system.

In two additional examples, Table 9 describes the Document Form and includes one document Entity, and Table 10 describes the Folder Form and includes one folder Entity. Table 6 Form Table may be used to determine that the GUID for the Document Form is 12 and the GUID for the Folder Form is 11. Table 11, Containment Relationship may then be examined for all records where the Parent$Entity column equals 11 to discover all of the properties associated with the Document Form, currently Contents property. Table 11, Containment Relationship may also be examined for all records where the Parent$Entity column equals 13 to discover all the properties of the Folder Form, currently Child Property and Parent Property.

In another example, given a Form GUID of 11 and Entity GUID of 31, the tables may be examined to discover the corresponding Form type, the properties of the Form, and the values that have been assigned to this particular instantiation of the Form. In this example, Table 6 Form Table indicated that a FormGUID of 11 corresponds to a Form Type Folder, EntityGUID of 31 in Table 9 Containment Relationship corresponds to the Parent$Entity Column, and the folder has a Name property with the current value of Folder1.

TABLE 5

Form Table

| GUID Property | Time Property | Form Name |
|---|---|---|
| 11 | (tacor) | "Folder" |
| 12 | (tacor) | "Document" |

TABLE 5-continued

Form Table

| GUID Property | Time Property | Form Name |
|---|---|---|
| 13 | (tacor) | "Containment Relationship" |
| 14 | (tacor) | "Property" |
| 15 | (tacor) | "Form Form" |
| 16 | (tacor) | "Object" |
| 17 | (tacor) | "String" |
| 18 | (tacor) | "Relationship Object" |
| 19 | (tacor) | "Standard Object" |
| 20 | (tacor) | "Boolean" |

*tacor = Timestamp At Creation Of Record

TABLE 6

Property Table

| GUID Property | Time Property | Property Name |
|---|---|---|
| 21 | (tacor) | "Parent" |
| 22 | (tacor) | "Child" |
| 23 | (tacor) | "GUID" |
| 24 | (tacor) | "Time" |
| 25 | (tacor) | "Contents" |
| 26 | (tacor) | "Containers" |
| 27 | (tacor) | "Name" |
| 28 | (tacor) | "Is Variant" |

*tacor = Timestamp At Creation Of Record

TABLE 7

Primitive Boolean Table

| GUID Property | Time Property | Value Property |
|---|---|---|
| 101 | (tacor) | "true" |
| 102 | (tacor) | "false" |

*tacor = Timestamp At Creation Of Record

TABLE 8

Primitive String Table

| GUID Property | Time Property | Value Property |
|---|---|---|
| 73 | (tacor) | "Folder1" |
| 74 | (tacor) | "Document1" |

*tacor = Timestamp At Creation Of Record

TABLE 9

Document Table

| GUID Property | Time Property | | |
|---|---|---|---|
| 51 | (tacor) | ← | document1 object |

*tacor = Timestamp At Creation Of Record

TABLE 10

Folder Table

| GUID Property | Time Property | | |
|---|---|---|---|
| 31 | (tacor) | ← | folder1 object |

*tacor = Timestamp At Creation Of Record

TABLE 11

Containment Relationship

| GUID Property | Time Property | Parent Property | | | Child Property | | | Purpose |
| | | Parent$ Form | Parent$ Entity | Parent$ Property | Child$ Form | Child$ Entity | Child$ Property | |
|---|---|---|---|---|---|---|---|---|
| 41 | (tacor) | 15 (form Form) | 13 (containment Form) | — | 14 (property Form) | 22 (child property) | — | Adds child property to containment Form |
| 42 | (tacor) | 15 (form Form) | 13 (containment Form) | — | 14 (property Form) | 21 (child property) | — | Adds parent property to containment Form |
| 43 | (tacor) | 15 (form Form) | 16 (object Form) | — | 14 (property Form) | 23 (GUID property) | — | Adds GUID property to object Form |
| 44 | (tacor) | 15 (form Form) | 16 (object Form) | — | 14 (property Form) | 24 (time property) | — | Adds time property to object Form |
| 45 | (tacor) | 15 (form Form) | 11 (folder Form) | — | 14 (property Form) | 25 (contents property) | — | Adds content property to folder Form |
| 46 | (tacor) | 15 (form Form) | 12 (document Form) | — | 14 (property Form) | 26 (containers property) | — | Adds containers property to document Form |

TABLE 11-continued

Containment Relationship

| GUID Property | Time Property | Parent Property | | | Child Property | | | Purpose |
|---|---|---|---|---|---|---|---|---|
| | | Parent$ Form | Parent$ Entity | Parent$ Property | Child$ Form | Child$ Entity | Child$ Property | |
| 47 | (tacor) | 11 (folder Form) | 31 (folder object) | 25 (contents property) | 12 (document Form) | 51 (document object) | 26 (containers property) | Adds document1 to folder1 |
| 48 | (tacor) | 11 (folder Form) | 31 (folder object) | 27 (name property) | 17 (string Form) | 73 ("folder1" string) | — | adds name to folder1 |
| 49 | (tacor) | 12 (document Form) | 51 (document object) | 27 (name property) | 17 (string Form) | 74 ("document1" string) | — | adds name to document1 |
| 201 | (tacor) | 15 (form Form) | 16 (object Form) | — | 14 (property Form) | 27 (name property) | — | adds name property to object Form |
| 202 | (tacor) | 14 (property Form) | 23 (GUID property) | 28 (isvariant property) | 20 (boolean Form) | 102 ("false" boolean object) | | Makes GUID an invariant property |

In a system configured according to the principles of the disclosure, entities may be written to a database, a graph database, a database web, a stream, or to other data structures. Each of those data structures may also be self-contained and self-describing. For example, a stream that contains the following may also be self-describing and self contained: the set of entities that correspond to the rows described above as required for the database to be self-describing; the Form entities that describe a total set of all entities in the stream; and all relationship entities signifying change in the stream.

Distributing, Converging, and Diverging Information Streams

An information stream configured according to the principles of the disclosure may be a collection of entities. These entities may be comprised of variant and invariant relations. The data associated with invariant relations may be written immutably to an information streams as part of the entity with which it is associated. Variant data may also be written immutably to streams, however the variant data are associated with the entities may be substituted with new information in Relationship Entities written to an information stream.

Information streams may be created on any system configured according to the principles of the disclosure and implemented on a system of nodes using an architecture or on an infrastructure such as that described in FIG. 2 (200) and FIG. 3 (300). Entities may be added to an information stream through appending, merging, or otherwise combining information streams. A subset of an information stream may be created by copying entities from the information stream into a new information stream. This new information stream may be transferred through a communications protocol to any other node, and appended or otherwise merged with any other information stream configured according to the principles of the disclosure and implemented using an architecture or on an infrastructure such as that described in FIG. 2 (200) and FIG. 3 (300). Information streams may be mutually appendable.

Relationships and other entities that may be added to an information stream may create information differentials that may cause one information stream to diverge from other information streams. Information streams may converge as the number of entities in common between the streams increases as a result of streaming and appending sets of entities.

Information streams are propagatable across of distributed network of nodes through a variety of communications protocols. FIG. 59 is an example process flow for Converging and Diverging Streams in a system of nodes, generally denoted by 5900. The Converging and Diverging Streams Process Flow 5900 may include:

Step 5910: Creating a first stream at a first node of a plurality of nodes, the first stream comprising a first set of entities including a first relationship entity;

Step 5920: Creating a second stream at a second node of the plurality of nodes, the second stream comprising a second set of entities including a second relationship entity;

Step 5930: Diverging the first stream in relation to the second stream by appending a third set of additional entities to the first stream;

Step 5940: Diverging the second stream in relation to the first stream by appending a fourth set of additional entities to the second stream, whereby the expanding first stream includes information causing asymmetry in relation to the information in the second stream and the second stream includes information causing asymmetry in relation to the information in the first stream;

Step 5950: Converging the first stream and the second stream by appending a subset of one of the streams to the other stream producing a converged stream at a point in time, while the first stream and second stream each continue to simultaneously diverge after the point in time through appending the first set of additional new entities to the first stream and the second set of additional new entities to the second stream.

One of ordinary skill in the art may recognize that a variety of processes may be used to diverge and converge streams.

Streams may be converged and diverged by propagating the streams in a network of distributed nodes configured according to the principles of the disclosure. FIG. 30 is an example process flow for Creating and Propagating Streams in a Network of Nodes, generally denoted by 3000. The Creating and Propagating Streams in a Network Process Flow 3000 may include:

Step 3060: Creating a stream by a computing device wherein the stream comprises a set of entities, including Form entities that describe a total set of all entities in the stream, and the stream further comprises relationship entities that signify changes to the set of entities including changes to any Form entities in the stream, thereby the stream is self-describing and self-contained and is propagatable across a network of nodes;

Step 3070: Propagating the stream from at least one node to another node in a network of nodes for use by a consumer of the stream.

The divergence and convergence of information streams is critical to achieving cooperative advantage and competitive disadvantage. The more streams tend toward convergence, the more entities the streams have in common, and the higher the degree of cooperative advantage. Businesses today often seek cooperative advantage when collaborating on activities, such as joint development of a product or other mutually beneficial teaming activities. The more information streams tend towards divergence, the higher the degree of competitive advantage. Businesses competing in the same market have more opportunity to increase their market share by having more information about their customer of client needs.

Consumers of entities and information streams, as may be recognized by one of ordinary skill in the art, may include: a user, device, computing device, process, application, another entity, an information stream that accepts one or more information objects and/or makes use of the one or more accepted information objects. Consumer of entities in an information streams may register interest in an entity and be notified through a variety of processes that a relationship entity referencing the entity of interest has been created, signifying a change in the entity. The entities representing information in a stream may be selectively controlled and disseminated to at least one consumer of the plurality of entities referenced by relationship entities at one or more of the computer-based nodes.

Producers of entities and information streams, as may be recognized by one of ordinary skill in the art, may include: a user, device, computing process, application, another entity, an information stream that creates or causes the creation of one or more information objects.

Information Streams to Graph Database/Database Web

When configured according to the principles of the disclosure, entities may be written to information streams, entities may be written to a database, information streams may be written to a database, streams may be distributed across a set of nodes, and entities in databases may be distributed across a collection of nodes. Information in a system configured according to the principles of the disclosure is characterized by the immutability of the data, the innumerable connections between data, the signification of change in a first class object called a relationship. Changes are made by adding new connections or nulling existing connections. The rich set of connections between data, the immutability of the data, the capturing of change in relationship entities provide for creation of a distributed graph database, or database web. The graph may expand continuously by adding new entities and the linkages intrinsic to the new entities. FIG. 32 is an example process flow for Expanding the Distributed Web by Appending Information Streams, generally denoted by 3200. The Expanding the Distributed Web Process Flow 3200 may include:

Step 3280: Creating a first information stream associated with a first node in a system of computer-based nodes, Step 3285: Creating a second information stream associated with a second node in a system of computer-based nodes, Step 3290: Appending one of: the first information stream and the second information stream with respect to the other at any node in the system of computer-based nodes so that the distributed web is expanded by adding new relationship entities to any of the streams, wherein the first information stream and second information stream comprise a plurality of entities representing information and each stream further comprises relationship entities, each relationship entity referencing at least one of the plurality of entities and signifying at least one change to the at least one of the plurality of entities so that the information content associated with the referenced entity is logically changed while preserving the immutability of the referenced entity Additional Detail on Creating, Instantiating, and Traversing Forms and Entities One implementation of the use of Forms Language and object-oriented programming techniques to create or instantiate Forms, add Relations to a Form, subclass a Form, and traverse Forms and related Entities, is described in this section. This implementation is exemplary and many alternate implementations are possible one of ordinary skill in the art may recognize.

Creating a Form

A new Form may be created by instantiating (creating a new instance of) the Form Form—that is, the Form which describes the structure of every Form. The Form Form may describe the structure of every derived Form in the database as having the following set of Relations:

(Relation 1) Name: A Form may have a name (defined as a string primitive). For example, a Form describing the structure of a document may have the name "Document".

(Relation 2) Abstract/Concrete: A Form may be either abstract or concrete (defined as a boolean primitive). If the Form is abstract, concrete instances (Entities) of the abstract Form may not be created. If the Form is not abstract (concrete), concrete instances (Entities) of the non-abstract Form may be created.

(Relation 3) The set of all Relations: The Form may have set of variant and invariant Relations.

(Relation 4) The set of variant Relations: A Form may have a set of zero or more variant Relations. Relation 4 may be a subclass of Relation 3.

(Relation 5) The set of invariant Relations: A Form may have a set of zero or more invariant Relations. Relation 5 may have a subclass of Relation 3.

(Relation 6) Base Forms: A Form may have a set of base Forms. The base Forms may be "superclasses" of the Form class, in that the Form class may inherit structure/behavior from the one or more base Forms according to the rules of Form subclassing.

(Relation 7) Subforms: A Form may have a set of subforms. The subforms may be "subclasses" of the Form class. These Forms may inherit structure/behavior from the Form according to the rules of Form subclassing.

Typically, these Relations may be required to create an instance of the Form Form that may yield a Form Entity. A Form that may have the required set of Relation "implementations" may be said to be "well-formed". A well-formed Form may typically specify at least Relations 1, 2, 3, 4, 5, and 6. Relation 7 may be "implemented" only when subclasses of the Form are created.

The Unification: Creating a Form may be no different from creating any other Entity, in that a Form may describe the structure of new Form Entities. Entities may describe Forms, and the database may store multiple levels of "formal interpretation" as Entities within the database. The design scales as formalization results in thousands or millions of Entities and the database may be well-suited to managing thousands or millions of Entities.

Adding a Relation to a Form

The process of "formalization" may occur by attaching (adding) one or more Relations to a Form. The Form may be characterized by the set of Relations associated with it. These Relations may be attached by the following sequence of steps:

Create a new Relation. The Relation may be instantiated by the following series of substeps.
Create an instance of the Relation Form.
Define the left side relation and right side relation.
Create primitive instances of Relation Attributes.
Attach Relation Attributes to the Relation Form using Attribute Relationships.
Create a new Side Relationship attaching the Relation to the Form.

Generating a Table from a Form

In a database configured according to the principles of the disclosure, columns of a table may be generated from the invariant Relations. As a result, the tables may include invariant columns. That is, rows created under the table may be invariant. The value of the invariance property may be described in the "immutability property" section.

To form the table corresponding to a Form, the algorithm may select the set of invariants associated with the Form (the algorithm which produces this set may be defined under the section "Getting the Relations attached to a Form"). For each invariant Relation, a test on the Relation may be performed to determine whether the Form on the "right side" (or "output side") of the Relation is a Primitive Form (meaning: the Form subclasses the "Primitive Form").

If the right side is a Primitive Form, then typically, a single column may be created which may contain the primitive value itself. If the right side is not a Primitive Form (which means that the right side is complex Form), typically, three columns may be created which map the "entity reference" to the complex Entity. The three columns may include:

The "Form Reference Column"
The "Relation Reference Column"
The "Entity Reference Column"

Computing the Relations which Belong to a Form

In one aspect, an algorithm that may be used to compute the Relations attached to a Form begin with the Form Entity A. Form Entity A may have two sets of Relations:

Relation Set 1: assigned Relations—the set of Relations directly attached to the Form
Relation Set 2: inherited Relations—the set of Relations inherited from the one or more Forms (Forms B, C, D) of which Form A is a subclass. Forms B, C, and D are considered superclasses.

Simple Relation Inheritance

In a simple example (which does not consider Relation subclassing), the members of Relation Set 1 and Relation Set 2 may be simply combined to form Relation Set 3. That is, the Form inherits Relations of the Forms of which it is a subclass.

In the absence of Relation subclassing, Relation Set 3 may also represent the total set of Relations attached to the Form (total Relations, abbreviated TR). The algorithm for computing the Relation Set 2 may be recursive. For example, Algorithm A may compute Relation Set 2 for Form A by taking the union of the following sets:

Its own set of directly assigned Relations:
The set of Relations directly assigned to the Form (Relation Set 1) And adds to that set the total set of Relation attached to each superForm of Form A:
The set of total Relations belonging to Form B (TR-B)
The set of total Relations belonging to Form C (TR-C)
The set of total Relations belonging to Form D (TR-D)

Because the algorithm is recursive, the sets TR-B, TR-C, and TR-D may be similarly computed using Algorithm A. The algorithm may terminates when no superForms exist for the Form Z. In this case, the total Relation set may include only Relations directly assigned to Z (DR-Z).

In one implementation, the only Form which has no superForms may be the Entity class. Therefore, in this implementation, the Entity Form may be the root from which all other Forms in the network subclass (or derive). As an example, consider the following the Form hierarchy:

Entity Form {GUID Relation, Time Relation}
Person Form (is a subform of Entity)
{Name Relation, Age Relation}

The Person Form, which may inherit from the Entity Form (which may be the same as saying that it is a subform or subclass of the Person Form), may have the following total set of Relations (TR-Person):

TR-Person {GUID Relation, Time Relation, Name Relation, Age Relation}

Advanced Relation Subclassing

Relation subclassing may add another dimension to the model of Relation inheritance previously described. In the same that way a Form may be a class, Relation may similarly be a class and may support subclassing. Consequently, a Relation A class can may subclass other Relations (its set of superrelations) and another distinct set of Relations may be subclasses of Relation A (its set of subrelations). A Relation may subclass another Relation, as long as the following conditions are met:

1) The subrelation (subclass) conforms to the constraints imposed by superrelation (superclass), which may typically include:
    a) The Relations must both relate sets or both relate sequences.
    b) The Form on the right side (output side) of the superrelation must be a superclass of the Form on the right side of the subrelation.
2) The superrelation is marked as final (which denotes that the superrelation may not be subclassed).

When a Relation subclasses another Relation, a special kind of "Relation subclassing" association (Relationship Entity) may be created connecting the superrelation with the subrelation. The Relation subclassing may be the same subclass association type used to subclass Forms.

To compute the total set of a Form's Relations with Relation overriding, the Relation class hierarchy may typically be considered. A database configured according to the principles of the disclosure may simply list out all inherited Relations, it may often be more useful to list only those Relations which are the leaves of the class inheritance tree. When a Database configured according to the principles of the disclosure is asked for and presents the set of Relations belonging to a Form, it may typically will exclude from the result set those Relations that are "overridden" (or subclassed) by other Relations (listing only those Relations which are not overridden).

For example, if the Function Form (a subform of Entity Form) specifies two Relations, Input and Output, a subform Difference may specify two further Relations, LValue and RValue, which each subclass the Input Relation. When the Difference Form is queried for its Relations, a database configured according to the principles of the disclosure may typically return the following set of variant Relations: {GUID, Time, LValue, RValue, Output}. The following list may explain the inclusion of each Relation:

GUID Relation: inherited from the Entity Form but not subclassed/overridden (the GUID Relation of the Entity Form may be marked Final, which prevents Relation subclassing)

Time Relation: also inherited from the Entity Form but not subclassed/overridden (the Relation may also typically be marked Final)

LValue Relation: The LValue and RValue Relations subclass the Input Relation. Because Input Relation is subclassed, it may typically not be included in the list. However, in a list provided by the Database including all Relations attached to the Form, the Input Relation may be included. As a class, the Input Relation may be used to by the getRelative algorithm to select the set of all LValue's and RValue's (all subclasses of the Input Relation superclass, which in this example include LValue and RValue, may be used to select the total set of Input).

RValue Relation: The LValue and RValue Relations may subclass the Input Relation. Using the getRelative algorithm, the Database may select only those Entities related under the subclass RValue by invoking the getRelative method with RValue Relation as its parameter. For example, the method function1.getRelative (RValue) may yield the total set of RValue Entities associated under the RValue Relation.

Instantiating a Form

Typically, after bootstrapping is completed, instances of certain type of Form (Entities) may be generated using a method defined on the Object-Oriented Programming Language (OOPL) Form class called "Instantiate". The method Form.Instantiate may analyzes the structure of the Form and generate a new instance (made up of at least one Entity in the database) according to the defined structure.

The values of invariant Relations may typically be provided to the Instantiate method as parameters. The arguments bound to these parameters at runtime may provide the actual "invariant' values assigned under invariant Relations to the new Entity instance constructed by Form.Instantiate. Typically, the RelationMap may be used to provide the values "mapped" under given Relations of the constructed Form.

In a database, a newly instantiated Entity may be represented in one or more of several ways. The database may be broken down into the following data representations: the Tuplebase and the Streambase. A Form may be instantiated, or a new Entity created, into either or both the Tuplebase and Streambase.

If instantiated into the Tuplebase, at least one new tuple representing the instantiated Entity may be created. In the Tuplebase, Form may typically correspond to a Table structure, whose columns may map to Invariant Relations defined for the Form.

Consequently, when a new instance of a Form is created, a new Row in the Table may be created containing the fields mapped to particular columns (or Relations). The RelationMap provided at Entity instantiation time provides the values mapped into these fields. For a more complete description of the mapping of a Form to a Table.

If instantiating into the Streambase, the data structure of the Streambase may be used to capture data "associated" with the instantiated Entity. Typically, the Entity stream may include alternating levels in a "forest" of root Entities. Level 1 may contain the set/sequence of root complex Entities. At level 2, there may exist a stream under each complex Entity in level 1. Level 2 may contain the set of Relation joins made linking the root complex Entity with "relatives". Each "Relation join" may correspond to a Relation attached to a Form describing the root complex Entity. Each level 2 Relation join may contain a level 3 Entity stream. In the simplest case in which a complex Entity may be constructed from a Form, the level 3 Entity streams may be "Primitive Entity Streams". Each Primitive Entity Stream may contain the content of the primitive data mapped under the Relation and provided by the RelationMap at Entity instantiation time. Append, in a more complex case, the relation of the relation join is executed, yielding a set of complex (non-primitive) entities, this set represented as level 3 entity stream.

Getting a Relative

A database configured according to the principles of the disclosure may obtain a "relative" by executing one or more Relations. A relative may be any Form that is associated (either directly or indirectly) by one or more relationships. For example, if a friendship relationship Entity (e1) may be created linking a user Entity (e2) with another user Entity (e3), then e1 may be considered to be a relative of e3. Similarly, if another friendship relationship Entity (e4) may be created and links e3 with e5, then e1 may be considered to be a relative of e3 and e5.

An algorithm or method referred to as "getRelative" on the Entity class may enable an Entity to obtain a relative separated by one relationship Entity (for example, an attribute relationship Entity or a friendship relationship Entity). Two Relations may be executed in order to "step" across such a relationship (a1). The expanded form of step may be "Relational step".

A Relational step may take an Entity as input and may produce one or more Entities as "output". The input of the Relational step may be called Entity1 (e1). The output of the Relational step may be called Entity2 (e2). The first Relation (r1) executed may belong to the Form (f1) describing e1. The first Relational step may execute r1, and may yield the relationship Entity a1. As an Entity, the relationship a1 may be described by a Form whose Relations may include two invariant Relations, IR1 (in the next example, PR) and IR2 (in the next example, CR). IR1 may "map" to the Relation r1 (in the next example, SubFR) by inserting the name or GUID of Relation R1 into the IR1$Relation column of the row representing a1, so that the relationship a1 references not only e1 but also references the r1 relation on the Form f1 describing e1. Relation r1 may also map to IR1 by setting the corresponding relation property on r1 equal to Relation IR1, so that the corresponding relation of Relation R1 is Relation IR1. IR1 and r1 may be, metaphorically, opposite directions of travel across a single Relational bridge. The Relation IR2 (in the next example, CR) may also have a corresponding Relation r2 (in the next example, SuperFR).

A database configured according to the principles of the disclosure may implement a "Relational mapping" in the following way. In this example, a Database may contain two Entities, the folder Entity 1 (FE1) and folder Entity 2 (FE2). FE1 and FE2 may be described by the same Folder Form (FF), since both are folders. The Folder Form may contains two variant Relations (Relations whose mapping may change over time), including the Subfolder Relation (SubFR) and the Superfolder Relation (SuperFR). A "containment relationship Entity" (CRE) may link the two folders—one as the parent folder (FE1) and one as the child folder (FE2). The structure of the Containment Relationship Entity (CRE) may be described by the Containment Relationship Form (CRF). CAF may have two invariant Relations (Relations whose mapping does not change over time). Those Relations may include the Parent Relation (PR) and Child Relation (CR). Two "Relational mappings" may be made connecting the four Relations in the following way: The first Relation pairing (P1) symmetrically may "map" the Subfolder Relation (SubFR) to the Parent Relation (PR). The second Relation pairing (P2) may "map" the SuperFolder Relation (SuperFR) to the Child Relation (CR). This may typically be accomplished using the corresponding relation as the mapping tool. Typically, in P1, the corresponding relation of the Subfolder Relation (SubFR) is Parent Relation PR. Typically, in P2, the corresponding relation of the SuperFolder Relation (SuperFR) is the Child Relation (CR). Similarly, when CRE is created, the Parent Relation (PR) and Child Relation (CR), both invariant relations, are typically stored as data fields in CRE using the entity reference format (referenced Form, referenced Entity, referenced Relation), so that the Parent Relation (PR) is stored as the entity reference in the form (PR$FormReference, PR$EntityReference, PR$RelationReference) and the Child Relation (CR) is stored as an entity reference in the form (CR$FormReference, CR$EntityReference, CR$RelationReference), wherein PR$FormReference is typically the unique identifier of the Folder Form (FF), PR$EntityReference is typically the unique identifier of the folder Entity 1 (FE1), PR$RelationReference is typically the name or unique identifier of the SubFolder relation SubFR, CR$FormReference is typically the unique identifier of the Folder Form (FF), CR$EntityReference is typically the unique identifier of the folder Entity 2 (FE2), CR$RelationReference is typically the name or unique identifier of the SuperFolder relation SuperFR. The first Relation pairing (P1) typically includes the relation reference PR$RelationReference. The second Relation pairing (P2) typically includes the relation reference CR$RelationReference.

Detailed Relational Stepping Example

When the user provides the "Input" Entity (Entity1) to the Relational step on the Subfolder Relation (SubFR), the system may determine the corresponding ("mapped" or "paired") Relation, PR. A database configured according to the principles of the disclosure may query the table corresponding to the Containment Relationship Table (CRT). This may typically be accomplished using the corresponding relation and reference$relation. CRT may contain a set of three columns representing the Parent Relation (PR) and may contain three columns representing the Child Relation (CR). The column triplet may include the following: a column containing the GUID (globally unique identifier) for the target Entity's Form (FG); a column containing the GUID of the "mapped" Relation (RG), and a column containing the GUID of the target Entity (EG).

In the case of the Parent Relation (PR), the triplet (PRTriplet) may contain a GUID reference (PR$FG) to the Folder Form FF (under FG), a GUID reference (PR$EG) to the folder Entity1 (under EG), and a GUID reference (PR$RG) to the GUID of the Relation SubFR (under RG. In the case of Child Relation (CR), the triplet (CRTriplet) may contain a GUID reference (CR$FG) to the Form Form FF (under FG), and a GUID reference (CR$EG) to the folder Entity2 (under EG), and a GUID reference (CR$RG) to the GUID of the Relation SuperFR (under RG).

When the Relational step is executed (RS1), the Database configured according to the principles of the disclosure may execute the following selection (S1) on the table corresponding to the Folder Form (CAT). The query may ask for all "containment relationship" rows where (selecting from the columns of PRTriplet) where:

1) the column FG equals the GUID of the Folder Form (FF), and
2) the column RG equals the GUID of the Subfolder Relation (SubR), and 3) where the column EG equals the GUID of the Folder Entity (e1).

In the previous step, the query selects from the columns of the PRTriplet by determining that the Parent Relation (PR) is mapped as the corresponding relation of SubFolder Relation (SubFR). The query typically reads the corresponding relation of a variant relation (such as SubFR) that is selected to execute in order to determine which invariant relation (such as PR) typically belonging to a relationship Form (such as the Containment Relationship Form) maps back to the variant relation being executed (SubFR). By determining this mapping, the selection S1 typically knows which columns of the containment relationship table to query (such as the columns mapped to the Parent Relation PR).

The set of rows (SR) returned from query Q1 may each include Containment Relationship Entities. For each such Containment Relationship Entity (CRE), the Database configured according to the principles of the disclosure may construct a set of output folder Entities (all Entity2's) by performing the following selection (S2). The selection (S2) may select the fields contained by the second triplet (CRTriplet), and may inject the three selected fields of the row into an Entity Reference (ER2) by the following mapping:

map the FG column to the Entity Reference object's Form GUID property map the RG column to the Entity Reference object's Relation GUID property map the EG column to the Entity Reference object's Entity GUID property For each ER2 reference, corresponding Entity E object (whose class constructor may accepts a reference as a parameter) may be constructed. The set of E2's constructed from all rows (SR) may constitute the output of the Relational step (RS1). The set of E2's typically contain the set of entities (in this case, folders) referenced by the "Input Entity" (in this case, the folder e1) under a relation belonging to the Form of the "Input Entity" (in this case, SubFR).

Bootstrapping: Providing the "Base Case"

The Forms Language may require a special bootstrapping phase in order to bring up the "base case" of the recursive process used to build Forms and Entities. In one aspect, the recursive process may be defined in the following way: each Entity in the database may be defined by at least one Form and a set of attached Relations. However, the Form and the attached Relations may be themselves described using Entities. So in a circular manner, Entities may describe Forms and Forms may describe Entities. The circularity may require a bootstrapping phase in order to overcome the classic "chicken and egg" problem.

The Database configured according to the principles of the disclosure may "bootstrap" the Forms Language by injecting rows directly into the Database representing Entities which may describe the Forms Language. The definition of the Forms Language may begin with the Form Form. That is, the Form which may describe the structure of every Form.

After bootstrapping, these bootstrapped Relations may be used to generate every Form in the Database configured according to the principles of the disclosure. Post bootstrapping, the process of generating a Form may be no different from generating any other type of Entity: the Instantiate method belonging to the Form class may be invoked on the Form Entity object. As an example, to generate a Containment Entity, the following method may be invoked:

containtmentForm.Instantiate([parameters])

Similarly, to generate a Form, the following method may be invoked:

formForm.Instantiate([parameters]).

Consequently, the instantiation of a Form (such as containmentForm) may not take place until the Form Form exists. For this reason, the Form Form (and all of its Relations) may be "bootstrapped".

Forms Language Class Derivation Structure

FIG. 60 (6000) may provide a summary of selected portion of the Forms Language Class Derivation structure. The lines in the diagram may represent the derivation and inheritance map. One of ordinary skill in the art may recognize that this may be one implementation of a class derivation structure for the Forms Language, fewer or additional classes may be implemented, and alternate derivations may be possible. The primary classes in the structure may include: Form (6005), Entity (6010), Relation (6015), Relationship (6020). These Forms are described in detail throughout this specification.

Illustrative Examples of Using the Principles of the Disclosure

This system and method for a computer based Forms Language may be used as a platform on which a variety of software applications may be built and connected to, delivered with or without a graphical user interface, using tools such as Java, Flash, HTML, and the like. Exemplary implementations of a software application delivered through a web interface and internet communications protocol that creates, stores, manages, and retrieves forms, entities, relations, and relationships as information streams and in databases configured according to the principles of the disclosure are described in this section.

Create user accounts: creating a user account may result in the instantiation of a user entity that contains the information associated with the relations of the user form 3600 that are entered by the user through the interface. The system may write to the user entity and related entities to the information stream, which may include writing the entities in the information stream to a database.

Login and access: when a user logs in to an interface implemented using a system configured according to the principles of the disclosure, the system traverses the relations on the user entity using a process such as that described in the Example Process Flow for Retrieving Entity State 5200 to retrieve the user's username and password to use in an authentication process.

Create networks: creating a network may result: in the instantiation of a network entity that contains the information associated with the relations of the network form 3500 that are entered by the user through the interface. The system may write the network entity and related entities to the information stream, which may include writing the entities in the information stream to a database.

The creation of a network may also result in the creation of a new node integrated into a system of distributed nodes such as that shown in FIG. 2 (200). Information streams may be propagated from a node to another node in the system of distributed nodes as shown in the process Flow for Creating and Propagating Streams in a Network of Nodes 3000.

Invite users to join networks, join networks: inviting a user to join a network and a user joining a network may create relationships between the user and the network.

Create groups: creating groups may result in the instantiation of a group entity that contains the information associated with the relations of the group form 3100 that are entered by the user through the interface. The system may write the group entity and related entities to the information stream, which may include writing the entities in the information stream to a database according to the process flow for writing entities to a database.

Invite users to join groups, join groups: inviting a user to join a group and a user joining a group may create a relationship between the user and the group.

Create folders may result in the instantiation of a folder entity that contains the information associated with the relations of the folder form 2300 that are entered by the user through the interface. The system may write the folder entity and related entities to the information stream, which may include writing the entities in the information stream to a database.

Adding folders to a folder, or creating subfolders, may create new folder entities and join those entities with the folder they are added to through containment relationship entities, where the folders being added to another folder are children of that folder. The system may write the folder entities, containment relationship entities, and related entities to the information stream, which may include writing the entities in the information stream to a database.

Add files to a folder may result in the instantiation of a file entity that contains the information associated with the relations of the file form 3400 that are entered by the user through the interface. Because a file entity is typically added to a folder entity, the file is typically associated with the folder through a containment relationship entity, where the file being added to a folder is a child of the folder, and the folder is a parent of the file. The system may write the file entities, folder entities, containment relationship entities, and related entities to the information stream, which may include writing the entities in the information stream to a database.

Adding a new version of a file may result first in the creation of a new file entity, a new containment relationship entity, and the creation of a substitution relationship entity that contains the information associated with the relations of substitution relationship form 1600. The system may write the file entities, folder entities, containment relationship entities, and related entities to the information stream, which may include writing the entities in the information stream to a database.

Moving a file or folder within a node may result in the creation of new containment relationship entities and substitution relationship entities to update the parent of the moved file or moved folder to the new location. The system may write the containment relationship entities, substitution relationship entities, and related entities to the information stream, which may include writing the entities in the information stream to a database.

Create messages may result in the instantiation of a message entity that contains the information associated with the relations of the message form 3300 that are entered by the user through the interface. The system may write the message entity and related entities to the information stream, which may include writing the entities in the information stream to a database.

Send messages to users on different networks, may result in the message being streamed from one node in the system of nodes to another node in the system of nodes, and appended or otherwise merged with the stream at the another node according to the Process Flow for Creating and Propagating Streams in a Network of Nodes 5900.

Sharing files and folder with users on different nodes may result in the message being streamed from one node in the system of nodes to another node in the system of nodes, and appended or otherwise merged with the stream at the another node according to the Process Flow for Creating and Propagating Streams in a Network of Nodes 5900.

Sharing content with users on different networks provides for the competitive advantage and cooperative advantage, according to the Process Flow for Diverging and Converging Streams in 5900.

The listing above describe a number of examples of the creation of new entities that may result of a user interaction with the GUI. The system that underlies the GUI that is configured according to the principles of the invention may write each of those entities to the information stream according to the process flow for creating Information Streams and Reflecting Change in State by the Addition of New Entities in 2900, which may include writing the entities in the information stream to a database according to the process flow for writing entities to a database in 4200A and 4200B.

One of ordinary skill in the art may recognize that using the Forms Language, any number of software applications may be developed to power a web interface; user interface for a mobile device such as a cell phone, netbook, or tablet computer; an interface to a computer desktop application; and the like.

One of ordinary skill in the art may also recognize that the Figures illustrating the interface features, organization of elements on an interface screen or page, inclusion of specific elements, use of a specific language, and naming of elements are exemplary; many variations of the provided examples are possible. These figures are designed to demonstrate how a system configured according to the principles of the invention may enable the functionality required for the interface to function. Any number of additions, substitutions, deletions, reordering, and renaming may be possible and the interface may still be enabled by the invention. FIG. 61 through FIG. 94 are exemplary illustrations of graphical user interfaces (GUI) configured according to the principles of the disclosure. The GUIs may represent functionality (i.e., software components executed by appropriate hardware) that requests user input, translates the input into entities that may instantiate from Forms created using the Forms Language described herein, may instantiate required relation entities and relationship entities, may create a user account, and may provide appropriate outputs. One of ordinary skill in the art may recognize that many other implementations of an account creation interface are possible. The Figures showing graphical user interfaces (including FIGS. 61-94) may also represent block diagrams of software components embodied in a storage medium that when executed by an appropriate computing device produce the respective graphical user interface and may display updates thereto and receive inputs from a user. The Figures showing graphical user interfaces (including FIGS. 61-94) may also represent steps for constructing the various constructs described by the respective Figures and associate description, including but not limited to: entities including relationship entities, Forms, streams, and other constructs described herein.

Create a User Account

In an example web interface configured according to the principles of the invention, a user may create an account to access the application configured according the principles of the disclosure as follows:

FIG. 61 is an illustrative graphical user interface showing an exemplary Login page for a web application built on a system configured according the principles of the disclosure, generally denoted by reference numeral 6100. A user may access the login page similar to the one shown in FIG. 61 (6100) using an internet browser such as Microsoft Internet Explorer, Mozilla Firefox, and the like. The Login page (6100), and additional pages (6200, 6300, 6400, 6500, 6700) may be accessed on a web site that are associated with creating a user account, may include:

A header section (6105): a header section typically exist across all pages in a web site, may display a logo or other identifier, list the Company or Organization Name and a Tag Line, provide links to general pages such as about, contacts, help, for more information, and the like.

A body section (6115): a body section of a web page typically includes the content, controls, elements, and other features that provide the primary functionality for a page.

A footer section (6125): a footer section on a web typically includes other general content and link that are less important, such as copyright information, link to a privacy statement, user information, and the like.

After accessing the login page (6105), the body section (6115) of this page may include another section (6120) with controls that may allow entry of user name and password to login to the system. If a user does not have an account, the user may click the "Create an Account" link (6125).

FIG. 62 is an illustrative graphical user interface showing an exemplary Create Account—Enter Account Information page for a web application built on a system configured according the principles of the disclosure, generally denoted by reference numeral 6200. After clicking the "Create an Account" link (6125), the page such as the one shown in FIG. 62 (6200) may be displayed and may include a header section (6205), a body section (6215) and a footer section (6225). The header (6205) and footer (6225) sections may be similar to those described previously for FIG. 61 (6100). The body section (6215) may include information that may be required to create an account for the user to access the system, including interface controls to enter a username and password that may be used to populate a User entity instantiated from a User Form. The username and password may then be used by the user and the system for login and for authentication purposes.

After entering account information and clicking the "Next" button ion the Enter Account Information page (6200), the page shown in FIG. 63 (6300) may be displayed. This body section (6315) of this page may list terms and conditions for use of a web site for which a user is creating an account.

After agreeing to the terms and conditions on of use and license restrictions that may be displayed the page shown in FIG. 63 (6300), clicking to agree to the terms, and clicking the "Next" button, the page shown in FIG. 64 (6400) may be displayed. The body section (6415) may display the information the user entered in creating an account.

After clicking Confirm on the page shown in FIG. 64 (6400), the page shown in FIG. 65 (6500) may be displayed. The body section (6515) on this page may provide additional information to the user about next steps required to complete the account creation process.

As is typical with many web-based software applications, a confirmation email may be sent to the user that created an account to confirm that they requested the creation of an account, and requesting that the user confirm their account information. FIG. 66 (6600) shows an example of email content that might be sent from the web site on which the user tried to create an account, and viewed with any traditional email client software. The message may contain a verification code that can be used to verify their account and a link that the user may navigate to with an internet browser.

After accessing the web page at the link provided in the confirmation email shown in FIG. 66 (6600), the Verify Account Creation Page shown in FIG. 67 (6700) may be displayed. The body section (6715) of this page may include controls for the user to enter the verification code that was emailed, their username, and password. After the user clicks Verify in the body section (6715) of the page, the system may then compare the information the user entered with the entities stored in the information stream and complete the account verification process.

Login to a System

After creating an account, a user may wish to log in to a web application built on a platform configured according to the principles of the disclosure. A user may access the login page perhaps similar to the one shown in FIG. 61 (6100) using an internet browser such as Microsoft Internet Explorer, Mozilla Firefox, and the like. In the body section (6115) of the page, the user may enter a username and password and click login to access the application. The system may attempt to authenticate the user and if successful, a My Networks page may be displayed. FIG. 68 is an illustrative graphical user interface showing an exemplary My Networks page for a web application built on a system configured according the principles of the disclosure, generally denoted by reference numeral 6800. This My Networks 6800, and any pages accessed after logging in to the web application, may include the following sections:

- A header section (6805): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (6810): a menu or navigation bar may include additional links that when clicked, may display to the user other pages of the application.
- A body section (6815): a body section of a web page typically includes the content, controls, elements, and other features that provide the primary functionality for a page.
- A footer section (6825): a footer section on a web typically includes other general content and link that are less important, such as the copyright information, link to a privacy statement, the name of the user logged in and accessing the page, and the like.

The body section (6815) of a My Networks Page may include a listing of the names of the networks a user may access and the status of the networks. The page may also provide links or buttons the user may click to access functionality to create a new network or edit his/her global profile.

Create a Network

After logging in to the web application built on a platform configured according to the principles of the disclosure and clicking the Create a Network link or button shown in the body section (6815) of FIG. 68 (6800), a network name and description page such as shown in FIG. 69 (6900) may be displayed. The Enter Network Name and Description page (6900) and additional pages (7000, 7100, 7200, 7300, 7400) that may be accessed on the web site that are associated with creating a network may include the following sections:

- A header section (6905): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (6910): a menu or navigation bar may include additional links that when clicked, may display to the user other pages of the application.
- A body section (6915): a body section of a web page typically includes the content, controls, elements, and other features that provide the primary functionality for a page.
- A footer section (6920): a footer section on a web typically includes other general content and link that are less important, such as the copyright information, link to a privacy statement, the name of the user logged in and accessing the page, and the like. After clicking the "Create New Network" link (6815), a page such as the one shown in FIG. 69 (6900) may be displayed. The body section of this page (6915) may include information that may be required to create a new network, which may include a new node in a distributed database graph configured according to the principles of the disclosure, including a network name, a network domain, and a network description.
- After entering the network information and clicking the "Next" button in the body section (6915), a page similar to the Enter Network Contact and Security Information page shown in FIG. 70 (7000) may be displayed. The body section (7015) of this page may include interface components the user may need to enter: information about the organization requesting the network, such as the name and web address; information about a contact person for the organization, including first name, last name, email, and phone number; information about an administrator for the organization, including first name, last name, email, and phone number.
- After entering the organization, contact, and administrator information and clicking a "Next" button at the bottom of the body section (7015), a page similar to the Select a Network Plan page shown in FIG. 71 (7100) may be displayed. The body section (7115) of this page may include interface components that may allow the user to make selections related to server, infrastructure, and backup specifications desired for the network being created, including: number of users, server memory and storage, incoming and outgoing bandwidth allowances, data backup plan, service plan. The body section of the page (7115) may include a calculation of monthly pricing based on the user selections.
- After selecting network plan information and clicking the "Next" button in the body section (7115), a page similar to that shown in FIG. 72 (7200) may be displayed. This body section (7215) of this page may list terms and conditions for use of a web site for which a user is creating a network.

After agreeing to the terms and conditions of use and license restrictions and clicking "Next," a page similar to that shown in FIG. 73 (7300) may be displayed. The body section (7315) may display the information the user entered in creating the network, including the Network Name and Description, the Organization Information, the Contact Person Information, the Administrator Information, agreement with the Terms, Conditions, and License governing use, and the selected Network plan and estimated cost.

After clicking "Confirm" in the body section (7315) of the page shown in FIG. 73 (7300), the My Networks page shown in FIG. 68 (6800) may be displayed.

As is typical with many web-based software applications, a confirmation email may be sent to the user that created the network to confirm that they requested the creation of a network, and requesting that the user verify their request. FIG. 74 (7400) shows an example of email content that might be sent from the web site on which the user tried to create a network, and viewed with any traditional email client software. The message may contain a verification code that can be used to verify the network creation request and a link that the user may navigate to with an internet browser.

After accessing the web page at the link provided in the network creation confirmation email shown in FIG. 74 (7400), a Verify Network Creation Request page similar to that shown in FIG. 75 (7500) may be displayed. The body section (7515) of this page may include controls for the user to enter the verification code that was emailed, their username, and password. After the user clicks "Verify" in the body section (7515) of the page, the system may compare the information the user entered with the entities stored in the information stream and complete the network creation verification process.

After verifying the network creation request, the user may login again through a page similar to the one shown in FIG. 61 (6100). After logging in, a page similar to the My Networks page shown in FIG. 76 (7600) may be displayed. Assuming the user requested created of a network named "Acme", the body section of the page (7615) may show the "Acme" Network with a status of "Building."

Access a Network

After logging in to the web application built on a platform configured according to the principles of the disclosure, a My Networks page similar to that shown in FIG. 68 (6800) may be displayed. FIG. 68 is an illustrative graphical user interface showing an exemplary My Networks page for a web application built on a system configured according the principles of the disclosure, generally denoted by 6800. The My Networks page (6800) on the web site may include the following sections:

- A header section (6805): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (6810): a menu or navigation bar may include additional links that when clicked, may display to the user other pages of the application.
- A body section (6815): a body section of a web page typically includes the content, controls, elements, and other features that provide the primary functionality for a page.
- A footer section (6825): a footer section on a web typically includes other general content and link that are less important, such as the copyright information, link to a privacy statement, the name of the user logged in and accessing the page, and the like.

A user may click on the name of the network in the body section (6815) of a My Networks page similar to that shown in FIG. 68 (6800) to access a Network. A Network Home page similar to that shown in FIG. 77 (7700) may be displayed. The Network Home page (7700) on the web site may include the following sections:

- A header section (7705): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (7710): a menu or navigation bar may include additional links that when clicked, may display to the user other pages of the application.
- A shortcut/secondary navigation bar (7725):
- A body section (7715): a body section of a web page typically includes the content, controls, elements, and other features that provide the primary functionality for a page.
- A Personal Folders section (7730): A section of the page that may display a file explorer view of the user's documents organized into folders and subfolders, inbox containing messages sent to the user, and outbox containing message sent by the user are displayed. The user may click on the triangle to the left of any of the elements in the Personal Folders section (7730) to show an expanded view of the contents. For example: Clicking on a triangle or other icon to the left of My Documents or clicking on My Documents directly in the Personal Folders Section (7730) may:
- Show an indented list of subfolders related to the My Document Folder in the Personal Folders section (7730). These subfolders, as well as the My Document Folder, may be entities instantiated from the Folder Form (2300) and associated with the My Documents Folder through Containment Relationship Entities instantiated from the Containment Relationship Form (2400).
- Show a list of documents related to the My Documents Folder in the List Pane (7740). The documents may be related to folders through Containment Relationship Entities instantiated from the Containment Relationship Form (2400).
- Show a set of action buttons that may be used to perform activities specific to folders or files in the Action and Details Pane (7745). This pane may also show information related to a document entity or folder entity folder, such as name, description, date created, and the like.

Clicking on a triangle or other icon to the left of My Inbox or clicking on My Inbox directly in the Personal Folders Section (7730) may:

- Show an indented list of Inbox relations in the Personal Folders section (7730). These inbox relations may point to Folders through Containment Relationship Entities instantiated from the Containment Relationship Form (2400).

Show in the List Pane (7740) a list of message entities related to a folder related to a selected Inbox relation. The message entities may be instantiated from the Message Form (3300) and related to the folders through additional Containment Relationship Entities instantiated from the Containment Relationship Form (2400).

Show a set of action buttons that may be used to perform activities specific to messages in the Action and Details Pane (7745). This pane may also show information related to a message, such as sender, recipient, text of the message, and the like.

Clicking on the triangle to the left of My Outbox in the Personal Folders Section (7730) may:

Show an indented list of Outbox relations in the Personal Folders section (7730). These outbox relations may point to Folders through Containment Relationship Entities instantiated from the Containment Relationship Form (2400).

Show in the List Pane (7740) a list of message entities related to a folder related to a selected outbox relation. The message entities may be instantiated from the Message Form (3300) and related to the folders through additional Containment Relationship Entities instantiated from the Containment Relationship Form (2400).

Show a set of action buttons that may be used to perform activities specific to messages in the Action and Details Pane (7745). This pane may also show information related to a message, such as sender, recipient, text of the message, and the like.

A Group Folders section (7735): A section of the page that may display a file explorer view of the content related to Group entities available the user. The Group entities may be instantiated from a Form, and that Form may include relations that linked to content such as document(s), folder(s), inbox(es), and outbox(es), primarily through Containment Relationship Entities instantiated from the Containment Relationship Form (2400).

A user may click on a triangle or other icon to the left of any Group name or click on any Group name directly in the Group Folders Section (7735) to expand the file explorer display to include Documents, Inbox, and Outbox for a selected Group.

Clicking on a triangle or other icon to the left of Documents element for a Group, or clicking on Documents directly for a Group in the Group Folders Section (7735) may:

Show an indented list of subfolders related to the Document Folder in the Group Folders section (7735). These subfolders, as well as the Document Folder, may be entities instantiated from the Folder Form (2300) and associated with the Documents Folder for the Group through Containment Relationship Entities instantiated from the Containment Relationship Form (2400).

Show a list of documents related to the Documents Folder for the selected Group in the List Pane (7740). The documents may be related to folders through Containment Relationship Entities instantiated from the Containment Relationship Form (2400). Show a set of action buttons that may be used to perform activities specific to folders or files in the Action and Details Pane (7745). This pane may also show information related to a Group entity, document entity or folder entity folder, such as name, description, date created, and the like.

Clicking on a triangle or other icon to the left of Inbox for a Group or clicking on Inbox directly for a Group in the Group Folders Section (7735) may:

Show an indented list of Inbox relations for a Group in the Group Folders section (7735). These inbox relations may point to Folders through Containment Relationship Entities instantiated from the Containment Relationship Form (2400).

Show in the List Pane (7740) a list of message entities related to a folder related to a selected Inbox relation. The message entities may be instantiated from the Message Form (3300) and related to the folders through additional Containment Relationship Entities instantiated from the Containment Relationship Form (2400).

Show a set of action buttons that may be used to perform activities specific to messages in the Action and Details Pane (7745). This pane may also show information related to a message, such as sender, recipient, text of the message, and the like.

A List Pane (7740): The List Pane (7740) may typically display a listing of the collection of entities associated with the entity clicked in the Personal Folder section (7730) or Group Folder section (7735). A few examples of selections in the Personal Folders section (7730) or Group Folders section (7735) and resulting display in the List Pane (7740) may include:

Clicking a Group Name in the Group Folder section (7735) may result in the list of users related to the group as members being displayed in the List Pane (7740).

Clicking a Folder name in the Personal Folders Section may result in the list of documents related to the folder being displayed in the List Pane (7740).

Clicking an Inbox for a specific Group in the Group Folder section (7735) may result in the list of messages related to the inbox being displayed in the List Pane (7740).

An Action and Detail Pane (7745): The Action and Detail Pane (7745) may typically provide a list of buttons or link that can be clicked to perform an action on the entity selected in the Personal Folder section (7730), Group Folder section (7735), or List Pane (7740): A few examples of selections in the Personal Folders section (7730), Group Folders section (7735), or List Pane (7740) and resulting display in the Action and Detail Pane (7745) may include:

Clicking the name of a group member being displayed in the List Pane (7740) may result in the display of the following in the Action and Detail Pane (7745):

Action buttons: Send Message, Remove Member, and the like

Details: User name and other user information

Clicking on a message being displayed in the List Pane (7740) may result in the display of the following in the Action and Detail Pane (7745):

Action buttons: Send Message, Remove Member, and the like

Details: Sender, Recipient, Data, subject, attachments, message text, and other message information Clicking the name of a file being displayed in the List Pane (7740) may result in the display of the following in the Action and Detail Pane (7745):

Action buttons: Download Latest, Upload New Version, Edit Information, Move File, Share File, Delete File, and the like.

Details: File name, file extension, file size, file description, file versions, and other message information.

Clicking on a folder name under My Documents in the Personal Folders section (7730) or clicking on a folder name under Documents in the Group Folders (7735) may result in the display of the following in the Action and Detail Pane (7745):

Action buttons: Add folder, add File, Edit Folder, Move Folder, Share Folder, Delete Folder, and the like Details: Folder name, Folder description, and other folder information.

Clicking on a Group name under in the Group Folders (7735) may result in the display of the following in the Action and Detail Pane (7745):
- Action buttons: Invite members, Edit Group, Delete Group, and the like
- Details: Group Name, Group Domain Name, Group description, and other Group information.
- A footer section (7720): a footer section on a web typically includes other general content and link that are less important, such as the copyright information, link to a privacy statement, the name of the user logged in and accessing the page, and the like.

Invite a Network Member

A user may log in to a web application built on a system configured according to the principles of the disclosure using a page similar to the Login page shown in FIG. 61 (6100), the user may see a My Networks page such as that shown in FIG. 68 (6800). The user may access a network by clicking on a Network Name, and the Network Home page shown in FIG. 77 (7700), which was previously described in this disclosure.

To invite a new member to a Network (i.e., to become a member of the network), a user my click on the name in the Group Folder section (7735) that matches the name of the network. This may result in the List Pane (7740) displaying a list of all network members, and the Action and Details pane (7745) may display:
- Acton buttons: Invite members
- Details: Network Name, Network Description, and other Network information.

The user may then click the Invite Members button in the Action and Details pane (7745) to begin the process of inviting a new member. This may result in the display of the Invite Network Members popup shown in FIG. 78 (7800). FIG. 78 is an illustrative graphical user interface showing an exemplary Invite Member popup for a web application built on a system configured according the principles of the disclosure, generally denoted by 7800. This Invite Network Members popup 7800 may include the following:
- Title (7805): May display the title of the popup
- Action Buttons (7810): Buttons a user may click to either Send Invitations to invitees or Cancel the invitation process
- Hand Enter (7815): An area for the user to hand enter an email address for an invitee so that an invitation may be sent to those email addresses.
- Available Existing Contacts (7820): A file explorer-like view of contacts on nodes of a web application built on a platform configured according to the principles of the disclosure and nodes of the application. The user may click on the name of a node to show the list of available contacts. The user may then select a contact by double-clicking the name or clicking the name and clicking the arrow to move names between available and selected.
- Selected Existing Contacts (7825): Displays the list of selected existing contacts.

After selecting existing contacts and/or hand entering email addresses, the user may click the Send Invitations action button (7810) and the system may generate and send invitations to the selected users to join a network.

Create a Group

To create a Group, a user may log in to a web application built on a system configured according to the principles of the disclosure using a page similar to the Login page shown in FIG. 61 (6100), after which the user may view a My Networks page such as that shown in FIG. 68 (6800). The user may access a network by clicking on a Network Name, and the Network Home page shown in FIG. 77 (7700) may be displayed. The pages associated with FIG. 61 (6100), FIG. 68 (6800), and FIG. 77 (7700) have been described in other sections of this disclosure.

Creating a Group on a Network may instantiate a new entity from the Form that defines a Group in a web application built on a system configured according to the principles of the disclosure. To create a Group, the user may click on the Create Group button in the in the Shortcut/Secondary Navigation bar (7725) on the Network Home page (7700). This may result in the display of the Create Group popup shown in FIG. 79 (7900). FIG. 79 is an illustrative graphical user interface showing an exemplary Create Group popup for a web application built on a system configured according the principles of the disclosure, generally denoted by 7900. This Create Group popup 7900 may include:
- Title (7905): May display the title of the popup as Create Group.
- Action Buttons (7910): Button to
- Save the information entered on the popup and create the group
- Cancel to Create Group process.
- Group Information (7915): Interface controls that allow a user to enter a name for the group, a domain for the group, and a description for the group.

After entering the Group information, the user may click the Save action button (7910) and the system may generate an entity for the Group that corresponds to the Form that defines the group.

View Group and Group Members

To view a Group and Group member, a user may log in to a web application built on a system configured according to the principles of the disclosure using a page similar to the Login page shown in FIG. 61 (6100), after which the user may view a My Networks page such as that shown in FIG. 68 (6800). The user may access a network by clicking on a Network Name, and the Network Home page shown in FIG. 77 (7700) may be displayed. The pages associated with FIG. 61 (6100), FIG. 68 (6800), and FIG. 77 (7700) have been described in other sections of this disclosure.

To view the member of a Group, the user may click on the name of the Group of interest in the Group Folders section (7735) of the Network Home page shown in FIG. 77 (7700). After clicking on the Group Name, the Network Home page shown in FIG. 77 (7700) may be updated to the Group and Group members view shown in FIG. 80 (8000). FIG. 80 is an illustrative graphical user interface showing an exemplary Group and Group Members View page for a web application built on a system configured according the principles of the disclosure, generally denoted by 8000. The Group and Group Members View 8000 may include:
- A header section (8005): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (8010): a menu or navigation bar may include additional links that when clicked, may display to the user other pages of the application.
- A shortcut/secondary navigation bar (8025): a shortcut/secondary navigation bar may include additional buttons or icons that provide easier access to specific features of an application.

A body section (8015): a body section of a web page typically includes the content, controls, elements, and other features that provide the primary functionality for a page.

A Personal Folders section (8030): A section of the page that may display a file explorer view of the user's documents organized into folders and subfolders, inbox containing messages sent to the user, and outbox containing message sent by the user are displayed. The user may click on the triangle to the left of any of the elements in the Personal Folders section (8030) to show an expanded view of the contents. For example:

A Group Folders section (8035): A section of the page that may display a file explorer view of the content related to Group entities available the user. The Group entities may be instantiated from a Form, and that Form may include relations that linked to content such as document(s), folder(s), inbox(es), and outbox(es), primarily through Containment Relationship Entities instantiated from the Containment Relationship Form (2400). In FIG. 80 (8000), the Engineers Group (8050) is selected.

A List Pane (8040): The List Pane (8040) may typically display a listing of the collection of entities associated with the entity clicked in the Personal Folder section (8030) or Group Folder section (8035). In FIG. 80 (8000), the selection of the Engineers Group (8050) in the Group Folders section (8035) may result in the List Pane (8040) displaying the list of members related to the Group through a relationship.

An Action and Detail Pane (8045): The Action and Detail Pane (8045) may typically provide a list of buttons or link that can be clicked to perform an action on the entity selected in the Personal Folder section (8030), Group Folder section (8035), or List Pane (8040). In FIG. 80 (8000), the selection of the Engineers Group (8050) in the Group Folders section (8035) may result in Action and Detail Pane displaying:

Action buttons to Invite Members to the Group or Edit the Group

Details including the Group name, group domain, and group description.

A footer section (8020): a footer section on a web typically includes other general content and link that are less important, such as the copyright information, link to a privacy statement, the name of the user logged in and accessing the page, and the like.

In FIG. 80 (8000), the user selection of the Engineers Group (8050) in the Group Folders section (8035) may result in the List Pane (8040) displaying the list of members related to the Group through a Relationship Entity.

Invite Group Members

When Viewing Group Members as shown in FIG. 80 (8000) the user may invite another member to the Group by clicking the Invite Members button in the Action and Details Pane (8045). This may result in the display of the Invite Group Members popup shown in FIG. 81 (8100). FIG. 81 is an illustrative graphical user interface showing an exemplary Invite Member popup for a web application built on a system configured according the principles of the disclosure, generally denoted by 8100. This Invite Network Members popup 8100 may include the following:

Title (8105): May display the title of the popup as Invite Group Members

Action Buttons (8110): Buttons a user may click to either Send Invitations to invitees or Cancel the invitation process Available Contacts (8115): A file explorer-like view of contacts on the network that the user is currently accessing. The display may include network members names organized by Group, alphabetically, or in some other order. In other implementations, the contact list may include users from any nodes of a web application built on a platform configured according to the principles of the disclosure and nodes of the application. The user may click on the name of a group to show the list of available contacts. The user may then select a contact by double-clicking the name or clicking the name and clicking the arrow to move names between available and selected.

Selected Contacts (8120): Displays the list of selected contacts.

After selecting contacts, the user may click the Send Invitations action button (8110) and the system may generate and send invitations to the selected users to join a group. Inviting a member to a Group creates a new relationship between the Group entity and the entity that represents the invited user.

Group Folders Expanded View

To view a Group and Group Folders, a user may log in to a web application built on a system configured according to the principles of the disclosure using a page similar to the Login page shown in FIG. 61 (6100), after which the user may view a My Networks page such as that shown in FIG. 68 (6800). The user may access a network by clicking on a Network Name, and the Network Home page shown in FIG. 77 (7700) may be displayed. The pages associated with FIG. 61 (6100), FIG. 68 (6800), and FIG. 77 (7700) have been described in other sections of this specification.

To view the Folders associated with a Group, the user may click on the name of the Group of interest in the Group Folders section (7735) of the Network Home page shown in FIG. 77 (7700). After clicking on the Group Name, the display may update to show the Documents Folder and Inbox Folder for the Group. After clicking on the Documents Folder, the display may update to show any folders contained in the document folder. Clicking on one of the folders in the Document folder may show folders related to the selected folder in the Group Folders section (7735), and any files in the folder may be displayed in the List Pane (7740).

FIG. 82 is an illustrative graphical user interface showing an exemplary Group Folders Expanded View page for a web application built on a system configured according to the principles of the disclosure, generally denoted by 8200. The Group Folders Expanded View page 8200 is an example of how the Network Home page (7700) display may be updated after a user clicks on the Engineers Group, the Document Folder in the Engineers Group, the Projects Folder in the Documents Folder, and a New Widget Folder in the Projects Folder. The Group Folders Expanded View (8200) may include:

A header section (8205): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.

A menu/navigation bar (8210): a menu or navigation bar may include additional links that when clicked, may display to the user other pages of the application.

A shortcut/secondary navigation bar (8225): a shortcut/secondary navigation bar may include additional buttons or icons that provide easier access to specific features of an application.

A body section (8215): a body section of a web page typically includes the content, controls, elements, and other features that provide the primary functionality for a page.

A Personal Folders section (8230): A section of the page that may display a file explorer view of the user's documents organized into folders and subfolders, inbox containing messages sent to the user, and outbox containing message sent by the user are displayed. The user may click on the triangle to the left of any of the elements in the Personal Folders section (8230) to show an expanded view of the contents.

A Group Folders section (8235): A section of the page that may display a file explorer view of the content related to Group entities available the user. The Group entities may be instantiated from a Form, and that Form may include relations that linked to content such as document(s), folder(s), inbox(es), and outbox(es), primarily through Containment Relationship Entities instantiated from the Containment Relationship Form (2400). In FIG. 82 (8200), the New Widget Folder (8265) of the Projects Folder (8260) of the Documents Folder (8255) of the Engineers Group (8250) is selected. Each of these Folders may be entities related to each other through a series of Containment Relationship Entities.

A List Pane (8240): The List Pane (8240) may typically display a listing of the collection of entities associated with the entity clicked in the Personal Folder section (8230) or Group Folder section (8235). In FIG. 82 (8200), selection of the New Widget Folder (8265) in the Group Folders section (8235) may result in the List Pane (8240) displaying the list of files associated with the New Widget Folder (8265) through Containment Relationship Entities and other Entities.

An Action and Detail Pane (8245): The Action and Detail Pane (8245) may typically provide a list of buttons or link that can be clicked to perform an action on the entity selected in the Personal Folder section (8230), Group Folder section (8235), or List Pane (8240). In FIG. 82 (8200) selection of the New Widget Folder (8265) in the Group Folders section (8235) may result in the Action and Detail Pane displaying:

Action buttons to Add Folder, Add File, Edit Folder, Move Folder, Share Folder, and Delete Folder.

Details including the folder name, folder description, and other information.

A footer section (7720): a footer section on a web typically includes other general content and link that are less important, such as the copyright information, link to a privacy statement, the name of the user logged in and accessing the page, and the like.

In FIG. 82 (8200), selection of the New Widget Folder (8265) in the Group Folders section (8235) may result in the List Pane (8240) displaying the list of files associated with the New Widget Folder (8265) through Containment Relationship Entities and other Entities.

Add Folders

When Viewing Folder Information in the Action and Detail section (8250) as shown in FIG. 82 (8200) the user may add a new folder, and the system may create a new folder entity as well as associated relationship entities by clicking the Add Folder button in the Action and Details Pane (8245). This may result in the display of the Create Folder popup shown in FIG. 83 (8300). FIG. 83 is an illustrative graphical user interface showing an exemplary Create Folder popup for a web application built on a system configured according the principles of the disclosure, generally denoted by 8300. The Create Folder popup 8300 may include the following:

Title (8305): May display the title of the popup as Create Folder

Action Buttons (8310): Buttons a user may click to either Save the information to be used to create the Folder entity or Cancel the folder creation process.

Group Information (8315): Interface controls that allow a user to enter a name for the folder and a description for the folder.

After entering the Folder information, the user may click the Save action button (8310) and the system may generate an entity for the Folder that corresponds to the Folder Form, as well as containment relationships to add it to any Groups and any Folders as appropriate.

Move Folders or Files

When viewing the expanded Group Folders (8235) or Personal Folders (8230) as shown in FIG. 82 (8200) the user may move a folder from one location to another location. Moving folder locations may cause the creation of one or more substitution relationships that replace the linkage between the folder being moved from its current location to a new location. A user may move a folder by clicking the Move Folder button in the Action and Details Pane (8245). This may result in the display of the Move Folder popup shown in FIG. 84 (8400). FIG. 84 is an illustrative graphical user interface showing an exemplary Move Folder popup for a web application built on a system configured according the principles of the disclosure, generally denoted by 8400. The Move Folder popup 8400 may include the following:

Title (8405): May display the title of the popup as Folder Selector

Action Buttons (8410): Buttons a user may click to either Accept the selection of a destination folder to which the Folder of interest may be moved, or Cancel the Folder moving process.

Available Personal Folders (8420): A file explorer-like view of Personal folders that the user may expand and contract by clicking the triangle or icon to the left of folder name or directly clicking the folder name to expand the view so that is lists any folders that may exist in another folder. A user may select a destination folder by double-clicking the folder name of interest. The system will then add the double-clicked destination folder name to the Selected Folder list.

Available Group Folders (8425): A file explorer-like view of Group folders that the user may expand and contract by clicking the triangle or icon to the left of folder name or directly clicking the folder name to expand the view so that is lists any folders that may exist in another folder. A user may select a destination folder by double-clicking the folder name of interest. The system will then add the double-clicked destination folder name to the Selected Folder list.

Currently Selected Folder (8440): May display of a name and description for the selected destination folder.

After selecting the destination folder, the user may click the Accept action button (8410) and the system may move the Folder from its current location to the selected destination folder location, creating any required substitution and containment relationships.

Add File

When Viewing Folder Information in the Action and Detail section (8250) as shown in FIG. 82 (8200) the user may add a new file and the system may create a new file entity as well as associated relationship entities by clicking the Add File button in the Action and Details Pane (8245). This may result in the display of the Add File popup shown in FIG. 85 (8500). FIG. 85 is an illustrative graphical user interface showing an exemplary Add File popup for a web application built on a system configured according the principles of the disclosure, generally denoted by 8500. The Add File popup 8500 may include the following:

- Title (8505): May display the title of the popup as Add File
- Action Buttons (8510): Buttons a user may click to Browse for a file to upload, Save the uploaded file and other information entered, or Cancel add file process.
- File Information Group (8515): Interface controls that allow a user to enter a name and description for the file, and view the name of the file being uploaded.

The user may select a file to be uploaded from a computer hard drive, server, flash drive, CD, or any media or electronic device which they can access. To select a file, the user may click the Browse for File action button (8510). This may result in the display of the Select File to Upload popup shown in FIG. 86 (8600). FIG. 86 is an illustrative graphical user interface showing an exemplary Select File to Upload popup for a web application built on a system configured according the principles of the disclosure, generally denoted by 8600. The Select File to Upload File popup 8600 may include the following:

- Title (8605): May display the title of the popup as Select File to Upload
- Browse Section (8610): A typical file explorer view that allow the user to click on folder of file names to expand or contract the listing of contents. The user double-clicks on a file name to select it.
- Selected File Information (8615): Displays the File name for the selected file and types of files being viewed in the Browse section (8610).
- Action Buttons (8620): Buttons a user may click to Open, or confirm selection of a file that may be uploaded, or Cancel the file selection process.

After navigating to and selecting a file to upload, the user may click Open in the action button section (8620). The system may initiate the upload process and may return the user to the Add File Popup shown in FIG. 85 (8500). The user may then click Save in the Action Button section (8510), and the system may create the file entity and any relationships required to add it to the folder as shown in FIG. 8210 for which the Add File button (8250) was clicked.

File Detail View

To view the Details of a File, a user may log in to a web application built on a system configured according to the principles of the disclosure using a page similar to the Login page shown in FIG. 61 (6100), after which the user may view a My Networks page such as that shown in FIG. 68 (6800). The user may access a network by clicking on a Network Name, and the Network Home page shown in FIG. 77 (7700) may be displayed. The pages associated with FIG. 61 (6100), FIG. 68 (6800), and FIG. 77 (7700) have been described in other sections of this disclosure.

A user may view file details for files in personal folders of group folders using a similar process. In this description, the process that may be used to view the details of a file, and its corresponding file entity, in the Group Folders section is described. These details may be retrieved by the system by using a process such as that described in the Example Process Flow for Retrieving Entity State 5200.

To view a file that is contained in a Group folder, the user may click on the name of the Group of interest in the Group Folders section (7735) of the Network Home page shown in FIG. 77 (7700). After clicking on the Group Name, the display may update to show the Documents and Inbox Folders for the Group. After clicking on the Documents Folder, the display may update to show any folders contained in the document folder. Clicking on one of the folders in the Document folder may show folders related to the selected folder in the Group Folders section (7735), and any files in the folder may be displayed in the List Pane (7740).

FIG. 87 is an illustrative graphical user interface showing an exemplary File Detail View page for a web application built on a system configured according the principles of the disclosure, generally denoted by 8700. The File Detail View page 8700 is an example of how the Network Home page (7700) display may be updated after a user clicks on the Engineers Group, the Document Folder in the Engineers Group, the Projects Folder in the Documents Folder, and a New Widget Folder in the Projects Folder, and the analysis-.docx file (8770) in the List Pane (8740). The File Detail View (8700) may include:

- A header section (8705): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (8710): a menu or navigation bar may include additional links that when clicked, may display to the user other pages of the application.
- A shortcut/secondary navigation bar (8725): a shortcut/secondary navigation bar may include additional buttons or icons that provide easier access to specific features of an application.
- A body section (8715): a body section of a web page typically includes the content, controls, elements, and other features that provide the primary functionality for a page.
- A Personal Folders section (8730): A section of the page that may display a file explorer view of the user's documents organized into folders and subfolders, inbox containing messages sent to the user, and outbox containing message sent by the user are displayed. The user may click on the triangle to the left of any of the elements in the Personal Folders section (8730) to show an expanded view of the contents.
- A Group Folders section (8735): A section of the page that may display a file explorer view of the content related to Group entities available the user. The Group entities may be instantiated from a Form, and that Form may include relations that linked to content such as document(s), folder(s), inbox(es), and outbox(es), primarily through Containment Relationship Entities instantiated from the Containment Relationship Form (2400). In FIG. 87 (87200), the New Widget Folder (8765) of the Projects Folder (8760) of the Documents Folder (8755) of the Engineers Group (8750) is selected. Each of these Folders may be entities related to each other through a series of Containment Relationship Entities.
- A List Pane (8740): The List Pane (8740) may typically display a listing of the collection of entities associated with the entity clicked in the Personal Folder section (8730) or Group Folder section (8735). In FIG. 87 (8700), selection of the New Widget Folder (8765) in the Group Folders section (8735) may result in the List Pane (8740) displaying the list of files associated with the New Widget Folder (8765) through Containment Relationship Entities and other Entities.

An Action and Detail Pane (8745): The Action and Detail Pane (8745) may typically provide a list of buttons or link that can be clicked to perform an action on the entity selected in the Personal Folder section (8730), Group Folder section (8735), or List Pane (8740). In FIG. 87 (8700) selection of the analysis.docx file (8770) in the List Pane (8740) may result in the Action and Detail Pane displaying:

Action buttons (8775) to Download Latest version of a file, Edit Info for a file, Upload New Version of a file, Move File, Share File, and Delete File.

Details including the file name, file extension, file description, and other information.

Version display (8780): may show the list of versions of the file that may have been uploaded. Users may click on a version to view a popup with the full version description and option to download the older version.

A footer section (7720): a footer section on a web typically includes other general content and link that are less important, such as the copyright information, link to a privacy statement, the name of the user logged in and accessing the page, and the like.

In FIG. 87 (8700), selection of analysis.docx file (8770) in the List Pane (8740) may result in the Action and Detail Pane displaying the file entity and information associated with the file entity through its relations and relationships.

New Version of File

When Viewing File Information in the Action and Detail section (8750) as shown in FIG. 87 (8700) the user may upload a new version of the file and the system may create a new file entity and a substitution relationship to designate the file as a new version in the system, as the as well other relationship entities as needed. The user may begin by clicking the Upload New Version button in the Action and Details Pane (8745). This may result in the display of the Add Version popup shown in FIG. 88 (8800). FIG. 88 is an illustrative graphical user interface showing an exemplary Add Version popup for a web application built on a system configured according the principles of the disclosure, generally denoted by 8800. The Add Version popup 8800 may include the following:

Title (8805): May display the title of the popup as Add Version

Action Buttons (8810): Buttons a user may click to Browse for a file to upload, Save the uploaded file and other information entered, or Cancel add file process.

File Information Group (8815): Interface controls that allow a user to enter a description for the new version of the file, and view the name of the file being uploaded as a new version.

The user may select a file that will be uploaded as a new version from a computer hard drive, server, flash drive, CD or any media or electronic device which the user can access. To select a file, the user may click the Browse for File action button (8810). This may result in the display of the Select File to Upload popup shown in FIG. 86 (8600). FIG. 86 is an illustrative graphical user interface showing an exemplary Select File to Upload popup for a web application built on a system configured according the principles of the disclosure, generally denoted by 8600. The Select File to Upload File popup 8600 may include the following:

Title (8605): May display the title of the popup as Select File to Upload

Browse Section (8610): A typical file explorer view that allow the user to click on folder of file names to expand or contract the listing of contents. The user double-clicks on a file name to select it.

Selected File Information (8615): Displays the File name for the selected file and types of files being viewed in the Browse section (8610).

Action Buttons (8620): Buttons a user may click to Open, or confirm selection of a file that may be uploaded, or Cancel the file selection process.

After navigating to and selecting a file to upload, the user may click Open in the action button section (8620). The system may initiate the upload process and may return the user to the Add File Popup shown in FIG. 85 (8500). The user may then click Save in the Action Button section (8810), and the system may create the file entity, create the substitution relationship designating the uploaded file as a new version, and other required relationships required to add it as a new version of the file and add it to the folder as shown in FIG. 8710) for which the Add File button (8750) was clicked.

Download File

When Viewing File Information in the Action and Detail section (8750) as shown in FIG. 87 (8700) the user may choose to Download a file and the system retrieve the file from the information for the download. The user may begin the download process by clicking the Download Latest button in the Action and Details Pane (8745). Note that a similar process may be followed to download other versions of a file but are not described. Clicking the Download Latest button in the Action and Details Pane (8745) may result in the display of the Download File popup shown in FIG. 89 (8900). FIG. 89 is an illustrative graphical user interface showing an exemplary Download File popup for a web application built on a system configured according the principles of the disclosure, generally denoted by 8900. The Download File popup 8900 may include the following:

Title (8905): May display the title of the popup as Add Version

Save in Section (8910): A typical file explorer view that allow the user to click on folder to expand or contract the listing of content which are also folders. The user double-clicks on a folder name to select it.

Selected File Information (8915): Displays the name of the file to be saved in the folder selected in the Save in section (8910) and type of file being saved.

Action Buttons (8920): Buttons a user may click to Save, or download the file, or cancel the download process.

After selecting the folder in which to store the downloaded file, the user may click Save in the action button section (8920). The system may initiate the download and may return the user to the File Detail View shown in FIG. 87 (8700).

View Message

To view a Message, a user may log in to a web application built on a system configured according to the principles of the disclosure using a page similar to the Login page shown in FIG. 61 (6100), after which the user may view a My Networks page such as that shown in FIG. 68 (6800). The user may access a network by clicking on a Network Name, and the Network Home page shown in FIG. 77 (7700) may be displayed. The pages associated with FIG. 61 (6100), FIG. 68 (6800), and FIG. 77 (7700) have been described in other sections of this specification.

A user may view messages in the Inbox in the Personal Folders section or the Group Folders section using a similar process. In this description, the process that may be used to view a message, and its corresponding message entity, in the Personal Folders section is described.

To view a message that is contained in the Inbox in the Personal folder section, the user may click on arrow to the left of Inbox or click directly on Inbox in the Personal Folders section (7735) of the Network Home page shown in FIG. 77 (7700). After clicking on Inbox, the display may update to show additional inboxes contained in the main Inbox folder. After clicking an Inbox of interest, messages in the Inbox may be displayed in the List Pane (7740).

FIG. 90 is an illustrative graphical user interface showing an exemplary View Messages and Details page for a web application built on a system configured according the principles of the disclosure, generally denoted by reference numeral 9000. The View Messages and Details page 9000 is an example of how the Network Home page (7700) display may be updated after a user clicks on Inboxes (9055) in the Personal Folders section (9030), the Gadget Project Inbox (9060) and the message with the subject "budget attached" (9065) in the List Pane (9040). The View Messages and Details page (9000) may include:

- A header section (9005): a header section typically consistent across all pages in a web site, may display a logo or other identifier, list the Company or Organization Name and a Tag Line, provide links to general pages such as about, contacts, help, for more information, the name of the network or node with which the page the user is viewing is associated, link or button to logout of the application, and the like.
- A menu/navigation bar (9010): a menu or navigation bar may include additional links that when clicked, may display to the user other pages of the application.
- A shortcut/secondary navigation bar (9025): a shortcut/secondary navigation bar may include additional buttons or icons that provide easier access to specific features of an application.
- A body section (9015): a body section of a web page typically includes the content, controls, elements, and other features that provide the primary functionality for a page.
- A Personal Folders section (9030): A section of the page that may display a file explorer view of the user's documents organized into folders and subfolders, inbox containing messages sent to the user, and outbox containing message sent by the user are displayed. The user may click on the triangle to the left of any of the elements in the Personal Folders section (9030) to show an expanded view of the contents. In FIG. 90 (9000), the Gadget Project Inbox (9055) of the Inbox Folder (9060) is selected. Each of these Inbox Folders may be entities related to each other through a series of Containment Relationship Entities.
- A Group Folders section (9035): A section of the page that may display a file explorer view of the content related to Group entities available the user. The Group entities may be instantiated from a Form, and that Form may include relations that linked to content such as document(s), folder(s), inbox(es), and outbox(es), primarily through Containment Relationship Entities instantiated from the Containment Relationship Form (2400).
- A List Pane (9040): The List Pane (9040) may typically display a listing of the collection of entities associated with the entity clicked in the Personal Folder section (9030) or Group Folder section (9035). In FIG. 90 (9000), selection of the Gadget Project Inbox (9060) in the Personal Folders section (9030) may result in the List Pane (9040) displaying the list of messages associated with the Gadget Project Inbox (9060) through Containment Relationship Entities and other Entities.
- An Action and Detail Pane (9045): The Action and Detail Pane (9045) may typically provide a list of buttons or link that can be clicked to perform an action on the entity selected in the Personal Folder section (9030), Group Folder section (9035), or List Pane (9040). In FIG. 90 (9000) selection of the message with the subject "Budget attached" (9065) in the List Pane (9040) may result in the Action and Detail Pane displaying:
- Action buttons (9050) to Reply, Reply to All, Forward, or Delete a message.
- Details including the name of the sender of the message, the recipients of the message, the date of the message, attachments to the message, and the text of the message, and other information.
- A footer section (9020): a footer section on a web typically includes other general content and link that are less important, such as the copyright information, link to a privacy statement, the name of the user logged in and accessing the page, and the like.

In FIG. 90 (9000), selection of the message with the subject "Budget attached" (9065) in the List Pane (9040) may result in the Action and Detail Pane displaying the message entity and information associated with the message entity through its relations and relationships.

Create Message

To create a Message, a user may log in to a web application built on a system configured according to the principles of the disclosure using a page similar to the Login page shown in FIG. 61 (6100), after which the user may view a My Networks page such as that shown in FIG. 68 (6800). The user may access a network by clicking on a Network Name, and the Network Home page shown in FIG. 77 (7700) may be displayed. The pages associated with FIG. 61 (6100), FIG. 68 (6800), and FIG. 77 (7700) have been described in other sections of this specification.

Creating a Message on a Network may instantiate a new entity from the Form that defines a Message in a web application built on a system configured according to the principles of the disclosure. In addition, the message may be streamed form one node to another node, depending on the node with which the message recipients are associated. To create a Message, the user may click on the Create Message button in the in the Shortcut/Secondary Navigation bar (7725) on the Network Home page (7700). This may result in the display of the Create Message popup shown in FIG. 91 (9100). FIG. 91 is an illustrative graphical user interface showing an exemplary Create Message popup for a web application built on a system configured according the principles of the disclosure, generally denoted by 9100. This Create Message popup 9100 may include:

- Title (9105): May display the title of the popup as Create Message.
- Action Buttons (9010): Buttons that may:
- Send the message
- Open the user's address book for selection of recipients
- Attach a file to the message
- Cancel the message.
- Message Information (7915): Interface control that display the message recipients, entry of the message subject, a list of attachment to the message, and entry of the message text.

The user may enter the message subject and message text, and may also wish to select recipients for the message. The user may click Address Book in the Acton buttons section (9010) and this may result in the display of the Address Book popup shown in FIG. 92 (9200). FIG. 92 is an illustrative graphical user interface showing an exemplary Address Book popup for a web application built on a system configured according the principles of the disclosure, generally denoted by 9200. This Address Book popup 9200 may include the following:

Title (9205): May display the title of the popup as Address Book

Action Buttons (9210): Buttons a user may click to either Save Selection or Cancel the message recipient selection process Hand Enter (9215): An area for the user to hand enter an email address for a recipient so that a message may be sent to those email addresses.

Available Existing Contacts (7820): A file explorer-like view of contacts on nodes of a web application built on a system configured according to the principles of the disclosure. The user may click on the name of a node to show the list of available contacts. The user may then select a contact by double-clicking the name or clicking the name and clicking the arrow to move names between available and selected.

Selected Existing Contacts (7825): Displays the list of selected existing contacts.

After selecting existing contacts and/or hand entering email addresses, the user may click the Save Selections button (9205) to save the selections and return to the Create Message popup shown in FIG. 91 (9100). A user may add an attachment to a message by clicking the Attach File/Folder action button on the Create message popup (9100). After clicking, the Attach Files and Folders popup shown in FIG. 93 (9300) may be displayed. FIG. 93 is an illustrative graphical user interface showing an exemplary Attach Files and Folders popup for a web application built on a system configured according the principles of the disclosure, generally denoted by 9300. This Address Book popup 9300 may include the following:

Title (9305): May display the title of the popup as Folder Selector

Action Buttons (9310): Buttons a user may click to either Attach to accept the selection of a file(s) and/or folder(s) to be attached to the message, or Cancel the attaching process.

A body section (9315): a body section of a web page typically includes the content, controls, elements, and other features that provide the primary functionality for a page Personal Folders (9320): A file explorer-like view of Personal folders that the user may expand and contract by clicking the triangle or icon to the left of folder name or directly clicking the folder name to expand the view so that is lists any folders that may exist in another folder.

Select a Personal Folder: A user may select a Personal folder to attach by clicking the folder name of interest and then clicking the Select Active Folder button (9335). The system will then add the folder to the Selected section (9340).

Select a File in a Personal Folder: The user may view the list of files in a Personal folder by clicking the folder name of interest. The Available Files section (9330) may display the list of files in the folder. The user may select a file to attach by double-clicking the file name. The system may add the name of the double-clicked file to the Selected section (9340).

Group Folders (9325): A file explorer-like view of Group folders that the user may expand and contract by clicking the triangle or icon to the left of folder name or directly clicking the folder name to expand the view so that is lists any folders that may exist in another folder.

Select a Group Folder: A user may select a Group folder to attach by clicking the folder name of interest and then clicking the Select Active Folder button (9335). The system will then add the folder to the Selected section (9340).

Select a File in a Group Folder: The user may view the list of files in a Group folder by clicking the folder name of interest. The Available Files section (9330) may display the list of files in the folder. The user may select a file to attach by double-clicking the file name. The system may add the name of the double-clicked file to the Selected section (9340).

Select Active Folder (9335): May be used to select a highlighted Folder from the Personal folders section (9320) or to select a highlighted Folder from the Group folders section (9325) and add it to the Selected section (9340).

Available Files (9330): May display the list of files contained in a highlighted Folder from the Personal folders section (9320) or a highlighted Folder from the Group folders section (9325)

Selected (9340): May display the name of the selections and whether each is a file of folder.

After selecting the file(s) and or folder(s) to attached, the user may click the Attach action button (9310) and the system may initiate the attachment process and display the Create message Popup (9100).

After completing all selections and entries, the user may Send the message by clicking the Send action button (9110). The system may create the message entity and any required relationships. If recipients are located on a different node the message entity, any attachments, and any appropriate relationship entities may be streamed to another node.

Share File or Folder

A user may begin the process of sharing a file by clicking on the triangle or other icon, or directly on folder names in the Personal Folders section (8730) or Group Folders section (8735) as shown in FIG. 87 (8700) File Detail View. The user may begin the process of sharing a file by clicking on the triangle or other icon, or directly on folder names in the Personal Folders section (8730) or Group Folders section (8735). The list of folders associated with each folder will be displayed. The files in a selected folder may also be displayed in the List Pane (8740). The user may click on the name of the file to be shared in the List Pane (8740). Selecting a file populates that Action and Details section (8745) for the file. The user may then click the Share File action button (8775). The selection of the Share File button may result in the display of the Share Options popup shown in FIG. 94 (9400). FIG. 94 is an illustrative graphical user interface showing an exemplary Share Options popup for a web application built on a system configured according the principles of the disclosure, generally denoted by 9400. The Share Option popup 9400 may include the following:

Title (9405): May display the title of the popup as Share Options

Action Buttons: Buttons a user may click to:
Share the file by sending it as an attachment to a message (9410),
Share the file by copying it to a folder (9415),
Cancel the share process (9420).

A user may begin the process of sharing a folder by clicking on the triangle or other icon, or directly on folder names in the Personal Folders section (8230) or Group Folders section (8235) as shown in FIG. 82 Group Folders Expanded View. The list of folders associated with a selected folder will be displayed. This view would be similar for both selected Group Folders of selected Personal Folders. After locating and clicking to highlight a folder to be shared, the user may click the Share action button (8775). The selection of the Share button may result in the display of the Share Options popup shown in FIG. 94 (9400). FIG. 94 is an illustrative graphical user interface showing an exemplary Share Options popup for a web application built on a system configured according the principles of the disclosure, generally denoted by 9400. The Share Option popup 9400 may include the following:

Title (9405): May display the title of the popup as Share Options

Action Buttons: Buttons a user may click to:

Share the file by sending it as an attachment to a message (9410),

Share the file by copying it to a folder (9415),

Cancel the share process (9420).

After selecting a file or folder of interest, the user may click the Share File button in the Action and Details Pane shown in FIG. 87 (8745) or the Share Folder button in the Action and Details pane as shown in FIG. 82 (8245). The selection of the Share button may result in the display of the Share Options popup shown in FIG. 94 (9400). FIG. 94 is an illustrative graphical user interface showing an exemplary Share Options popup for a web application built on a system configured according the principles of the disclosure, generally denoted by 9400. The Share Option popup 9400 may include the following:

Title (9405): May display the title of the popup as Share Options

Action Buttons: Buttons a user may click to:

Share the file by sending it as an attachment to a message (9410),

Share the file by copying it to a folder (9415),

Cancel the share process (9420).

If the user chooses to share the File or Folder as an attachment to a message (9410), the Create Message popup shown in FIG. 91 (9100) and the process and option described previously would follow, with the exception that the message Attachments listing (9115) would already be populated with the selected file(s) and/or folder(s). Depending on the node on which the user the folder is being shared has a user account, the file entity and related entities, or folder entity and related entities (which may include files and additional folders) may be copied form one information stream to another information stream, streamed form one node to another node, and appended or merged with the information stream at the other node.

If the user chooses to share the File or Folder by copying it to a folder (9415), a popup similar to that shown in and described in FIG. 84 (8400), except that the selected file or folder would be copied rather than moved.

All flow diagrams herein (including FIGS. 30, 32, 42A, 42B, 49, 50, 52, 55B, 59) and any drawing showing relational type constructs (including FIGS. 1, 4-10, 28, 29, 39, 41, 43A-45, 48, 49, 51A, 51B, 54, 55A, 56-58) may equally represent a high-level block diagram of computer based components of the invention implementing the steps thereof. The Figures showing relational type constructs (such as FIGS. 1, 4-10, 28, 29, 39, 41, 43A-45, 48, 49, 51A, 51B, 54, 55A, 56-58) also represent steps for creating the respective relational type constructs. The steps and/or components may be implemented as computer logic or computer code in combination with the appropriate computing hardware. This computer program code or computer logic may be stored on storage media such as a diskette, hard disk, CD-ROM, DVD-ROM or tape, as well as a memory storage device or collection of memory storage devices such as read-only memory (ROM) or random access memory (RAM), for example. Additionally, the computer program code can be transferred to a workstation over the Internet or some other type of network. The computer code may be a computer program product that is stored on a non-transitory computer readable medium.

While the invention has been described in this disclosure by way of illustrative examples, those skilled in the art will recognize that the invention can be practiced with modifications and in the spirit and scope of the appended claims.

I claim:

1. A computer implemented method embodied as computer code in a non-transitory computer readable medium for managing convergence and divergence of information in a system of nodes, the computer code when read and executed by a computer performing the steps comprising:

creating a first stream at a first node of a plurality of nodes, the first stream comprising a first set of entities including a first relationship entity;

creating a second stream at a second node of the plurality of nodes, the second stream comprising a second set of entities including a second relationship entity;

diverging the first stream in relation to the second stream by appending a third set of additional entities to the first stream;

diverging the second stream in relation to the first stream by appending a fourth set of additional entities to the second stream, whereby the expanding first stream includes information causing asymmetry in relation to the information in the second stream and the second stream includes information causing asymmetry in relation to the information in the first stream;

converging the first stream and the second stream by appending a subset of one of the streams to the other stream producing a converged stream at a point in time, while the first stream and second stream each continue to simultaneously diverge after the point in time through appending the first set of additional new entities to the first stream and the second set of additional new entities to the second stream.

2. The computer-implemented method of claim 1, wherein the converging step includes increasing the population of entities in one of the streams from the other stream over time, thereby providing a cooperative advantage benefit to the producers or consumers of the information in either or both streams.

3. The computer-implemented method of claim 1, wherein in the diverging step includes decreases the population of entities in one of the streams from the other stream over time, thereby providing a competitive advantage to the producers or consumers of the information in either or both streams.

4. The computer-implemented method of claim 1, wherein the first stream and second stream are immutable and referential integrity of each stream is maintained before and after convergence.

5. The method for managing convergence and divergence of information of claim 4, wherein the converged stream at the point in time includes all entities and relationship entities of the appended subset thereby assuring the immutability of the converged stream and maintaining the referential integrity of the converged stream across the plurality of nodes.

6. The computer-implemented method of claim 1, wherein a state of the first stream is different from a state of the second stream while each stream continue to simultaneously diverge, thereby providing a loosely coupled distributed system of information management and exchange among the plurality of nodes.

7. A computer-implemented method embodied as computer logic in a non-transitory computer readable storage medium, the computer logic when read and executed by a computer performing the following steps:
   creating an executable function for at least one relation corresponding to at least one property on a first Form defining a class of entities, the at least one relation defined by a second Form that includes two additional relations being a left side relation and a right side relation, the executable function having an input and having an output, wherein the input is an instance of the first Form pointed to by the left side relation of the second Form and the output includes at least one instance of a third Form pointed to by the right side relation of the second Form; and
   executing the executable function to provide an instance of the first Form pointed to by the left side relation and the executable function identifying and retrieving all instances of all third Forms pointed to by the right side relation that are discoverable outputs of the second Form for the executing function, providing a web of linked entities instantiated from the Forms defining the classes of entities so that the web of linked entities provides at least one immutable stream of information that is at least one of readable, searchable, traversable, appendable, expandable and shareable by producers and/or consumers of the stream of information.

8. The computer implemented method of claim 7, wherein the second Form defines the relation corresponding to at least one property on the first Form.

9. The computer implemented method of claim 7, wherein the right side relation is an invariant relation that does not change over time, signifying a one-to-one relation between two Forms.

10. The computer implemented method of claim 7, wherein the right side relation is a variant relation that points to a plurality of relationship Forms, providing a one-to-N relation between two or more Forms over time.

11. The computer implemented method of claim 7, further comprising repeating the creating and executing steps for the relations of the relationship Form.

12. The computer implemented method of claim 7, wherein the stream of information comprises a database.

13. The computer implemented method of claim 7, wherein the at least one relation comprises a plurality of relations, the creating step creating a plurality of executable functions for each of the plurality of relations.

14. The computer implemented method of claim 11, wherein the at least one relation comprises a plurality of relations, the creating step creating a plurality of executable functions for each of the plurality of relations.

15. The computer implemented method of claim 13, wherein the executing step includes executing the plurality of functions to traverse the web of linked entities to discover all the outputs pointed to by all of the right side relations.

16. The computer implemented method of claim 15, wherein the discovered outputs represent an integrated state at a particular point in time of an entity instantiated from the first Form which contains the plurality of relations.

17. The computer implemented method of claim 15, wherein the discovered outputs represent a net state at a particular point in time of an entity instantiated from the first Form which contains the plurality of relations, taking into account any changes to the entity signified by any relationship entities pointed to by the right side relation of the plurality of relations.

18. The computer implemented method of claim 7, wherein the web of linked entities comprises a graph database.

* * * * *